(12) United States Patent
Bowman

(10) Patent No.: US 10,983,957 B2
(45) Date of Patent: Apr. 20, 2021

(54) DISTRIBUTED COLUMNAR DATA SET STORAGE

(71) Applicant: SAS Institute Inc., Cary, NC (US)

(72) Inventor: Brian Payton Bowman, Apex, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/037,652

(22) Filed: Sep. 29, 2020

(65) Prior Publication Data
US 2021/0042265 A1    Feb. 11, 2021

Related U.S. Application Data

(63) Continuation-in-part of application No. 16/233,644, filed on Dec. 27, 2018, now Pat. No. 10,789,207, (Continued)

(51) Int. Cl.
*G06F 12/00* (2006.01)
*G06F 16/13* (2019.01)
(Continued)

(52) U.S. Cl.
CPC .......... *G06F 16/137* (2019.01); *G06F 3/061* (2013.01); *G06F 3/064* (2013.01); *G06F 3/0604* (2013.01);
(Continued)

(58) Field of Classification Search
CPC ...... G06F 16/137; G06F 21/602; G06F 16/22; G06F 16/278; G06F 3/0644;
(Continued)

(56) References Cited

U.S. PATENT DOCUMENTS 9,952,808 B2 *  4/2018  Kaushik ............... G06F 3/0643
10,437,797 B1   10/2019 Johnson et al.
(Continued)

FOREIGN PATENT DOCUMENTS

WO       2012138296 A1    10/2012

OTHER PUBLICATIONS

Author unknown, "Apache Avro" Wikipedia [online] 2019 [retrieved on Dec. 13, 2019]. Retrieved from Internet URL: https://en.wikipedia.org/wiki/Apache_Avro, 5 pages.
(Continued)

*Primary Examiner* — Mark A Giardino, Jr.
(74) *Attorney, Agent, or Firm* — Kacvinsky Daisak Bluni PLLC

(57) ABSTRACT

An apparatus includes a processor to: instantiate collection threads, data buffers of a queue, and aggregation threads; within each collection thread, assemble a row group from a subset of the multiple rows, reorganize the data values row-wise to columnar organization, and store the row group within a data buffer of the queue; operate the buffer queue as a FIFO buffer; within each aggregation thread, retrieve multiple row groups from multiple data buffers of the queue, assemble a data set part from the multiple row groups, transmit, to storage device(s) via a network, the data set part; and in response to each instance of retrieval of a row group from a data buffer of the buffer queue for use within an aggregation thread, analyze a level of availability of at least storage space within the node device to determine whether to dynamically adjust the quantity of data buffers of the buffer queue.

30 Claims, 77 Drawing Sheets

Related U.S. Application Data which is a continuation of application No. 16/233,400, filed on Dec. 27, 2018, now Pat. No. 10,402,372, which is a continuation-in-part of application No. 15/992,670, filed on May 30, 2018, now Pat. No. 10,185,722, which is a continuation of application No. 15/694,217, filed on Sep. 1, 2017, now Pat. No. 9,990,367, which is a continuation-in-part of application No. 15/220,182, filed on Jul. 26, 2016, now Pat. No. 9,811,524, which is a continuation of application No. 15/220,034, filed on Jul. 26, 2016, now Pat. No. 9,619,148, said application No. 16/233,400 is a continuation-in-part of application No. 15/984,706, filed on May 21, 2018, now Pat. No. 10,303,670, which is a continuation of application No. 15/838,110, filed on Dec. 11, 2017, now Pat. No. 9,977,805.

(60) Provisional application No. 62/654,864, filed on Apr. 9, 2018, provisional application No. 62/519,824, filed on Jun. 14, 2017, provisional application No. 62/535,961, filed on Jul. 23, 2017, provisional application No. 62/197,514, filed on Jul. 27, 2015, provisional application No. 62/197,519, filed on Jul. 27, 2015, provisional application No. 62/458,162, filed on Feb. 13, 2017, provisional application No. 62/936,668, filed on Nov. 18, 2019, provisional application No. 62/971,288, filed on Feb. 7, 2020.

(51) Int. Cl.

| | | |
|---|---|---|
| *G06F 21/60* | (2013.01) | |
| *G06F 16/22* | (2019.01) | |
| *G06F 16/27* | (2019.01) | |
| *G06F 3/06* | (2006.01) | |
| *G06F 9/50* | (2006.01) | |
| *G06F 12/02* | (2006.01) | |
| *G06F 16/182* | (2019.01) | |
| *G06F 13/00* | (2006.01) | |
| *G06F 13/28* | (2006.01) | |

(52) U.S. Cl.
CPC ............ *G06F 3/067* (2013.01); *G06F 3/0643* (2013.01); *G06F 3/0644* (2013.01); *G06F 9/5072* (2013.01); *G06F 9/5077* (2013.01); *G06F 12/0292* (2013.01); *G06F 16/1827* (2019.01); *G06F 16/22* (2019.01); *G06F 16/278* (2019.01); *G06F 21/602* (2013.01); *H05K 999/99* (2013.01); *G06F 2212/1016* (2013.01); *G06F 2212/1056* (2013.01); *G06F 2212/154* (2013.01); *G06F 2212/262* (2013.01); *G06F 2212/263* (2013.01)

(58) Field of Classification Search
CPC ...... G06F 3/0643; G06F 9/5072; G06F 3/061; G06F 12/0292; G06F 3/067; G06F 3/0604; G06F 9/5077; G06F 16/1827; G06F 3/064; G06F 2212/1056; G06F 2212/1016; G06F 2212/263; G06F 2212/262; G06F 2212/154
See application file for complete search history.

(56) References Cited

U.S. PATENT DOCUMENTS

| | | | |
|---|---|---|---|
| 2005/0080945 | A1 | 4/2005 | Carroll |
| 2007/0083730 | A1 | 4/2007 | Vorbach et al. |
| 2010/0011031 | A1 | 1/2010 | Huang et al. |
| 2016/0026574 | A1 | 1/2016 | Frank et al. |
| 2016/0294696 | A1* | 10/2016 | Gafni ..................... H04L 49/30 |
| 2016/0357740 | A1 | 12/2016 | Deng et al. |
| 2018/0189227 | A1 | 7/2018 | Korthikanti et al. |
| 2020/0125751 | A1 | 4/2020 | Hariharasubrahmanian et al. |
| 2020/0250192 | A1 | 8/2020 | Roelke et al. |
| 2020/0295779 | A1 | 9/2020 | Ki et al. |

OTHER PUBLICATIONS

Author unknown, "Apache Parquet" Apache Software Foundation [online] 2019 [retrieved on Dec. 13, 2019]. Retrieved from Internet URL: parquet.apache.org/documentation/latest/, 7 pages.
Konda, P.K., "Between Avro, Parquet, and RC/ORC which is useful", MyCloudera blog [online] 2018 [retrieved on Dec. 13, 2019]. Retrieved from Internet URL: https://community.cloudera.com/t5/Support-Questions/Between-Avro-Parquet-and-RC-ORC-which-is-useful-for/td-p/222271, 7 pages.
Bhatia, R., "Big Data File Formats", Clairvoyant Blog [online] 2019 {retrieved on Dec. 13, 2019]. Retrieved from Internet URL: https://blog.clairvoyantsoft.com/big-data-file-formats-3fb659903271, 10 pages.
Woodie, A., "Big Data File Formats Demystified", datanami Data Science—AI—Advanced Analytics [online] 2018 [retrieval date unknown]. Retrieved from Internet URL: https://www.datanami.com, 4 pages.
Author unknown, "The Data Lake Engine" Dremio [online] 2019 [retrieved on Dec. 13, 2019]. Retrieved from Internet URL: https://www.dremio.com, 6 pages.
Plusplusjiajia, and Gszadovsky "Apache Parquet" GitHub [online] 2013 [retrieved on Dec. 13, 2019]. Retrieved from Internet URL: https://github.com/apache/parquet-format, 7 pages.
Manannykov, D., "How to Work With Avro Files", DZone [online] 2018 [retrieved on Dec. 13, 2019]. Retrieved from Internet URL: https://dzone.com/articles/new-article, 14 pages.
Author unknown, "Lightning-fast queries, directly on data lake storage", Dremio [online] 2019 [retrieved on Dec. 13, 2019]. Retrieved from Internet URL: https://www.dremio.com/data-lake-engine/fast-queries/, 3 pages.
Karanjawala, R., "ORC Vs Parquet Vs Avro: How to select a right file format for Hive" Ellicium [online] 2017 [retrieved on Dec. 13, 2019]. Retrieved from Internet URL: https://www.ellicium.com/orc-parquet-avro/, 4 pages.
Palkar, S., et al., "Weld: A Common Runtime for High Performance Data Analytics", abstract for 8th Biennial Conference on Innovative Data Systems Research, Chaminade, CA (Jan. 2017) 1 page.
Author unknown, "Ursa Labs Technology", Apache Arrow Platform, no date given. 14 pages.
International Search Report and Written Opinion for the International Patent Application No. PCT/US20/60379, dated Feb. 25, 2021, 34 pages.

* cited by examiner

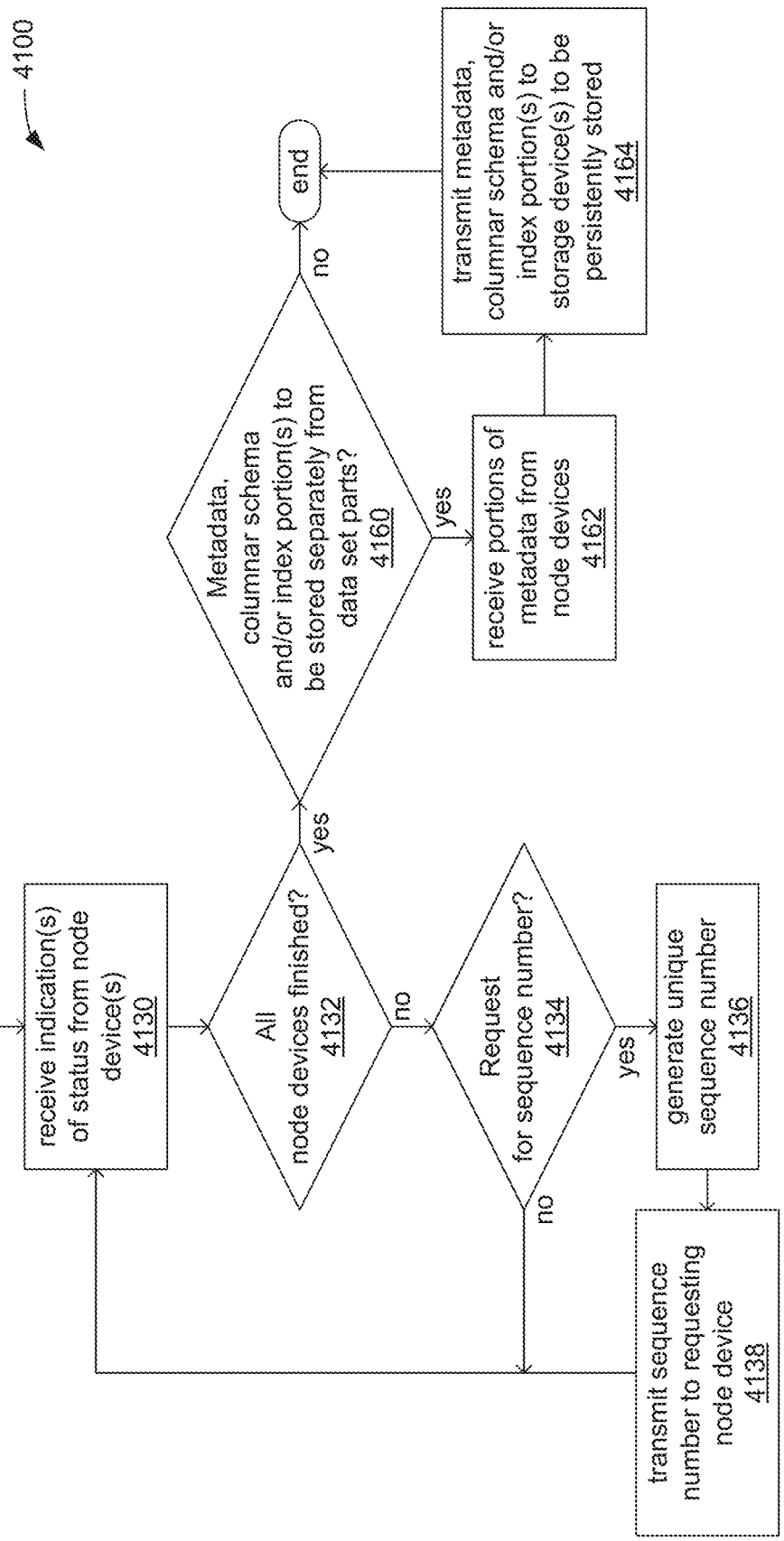

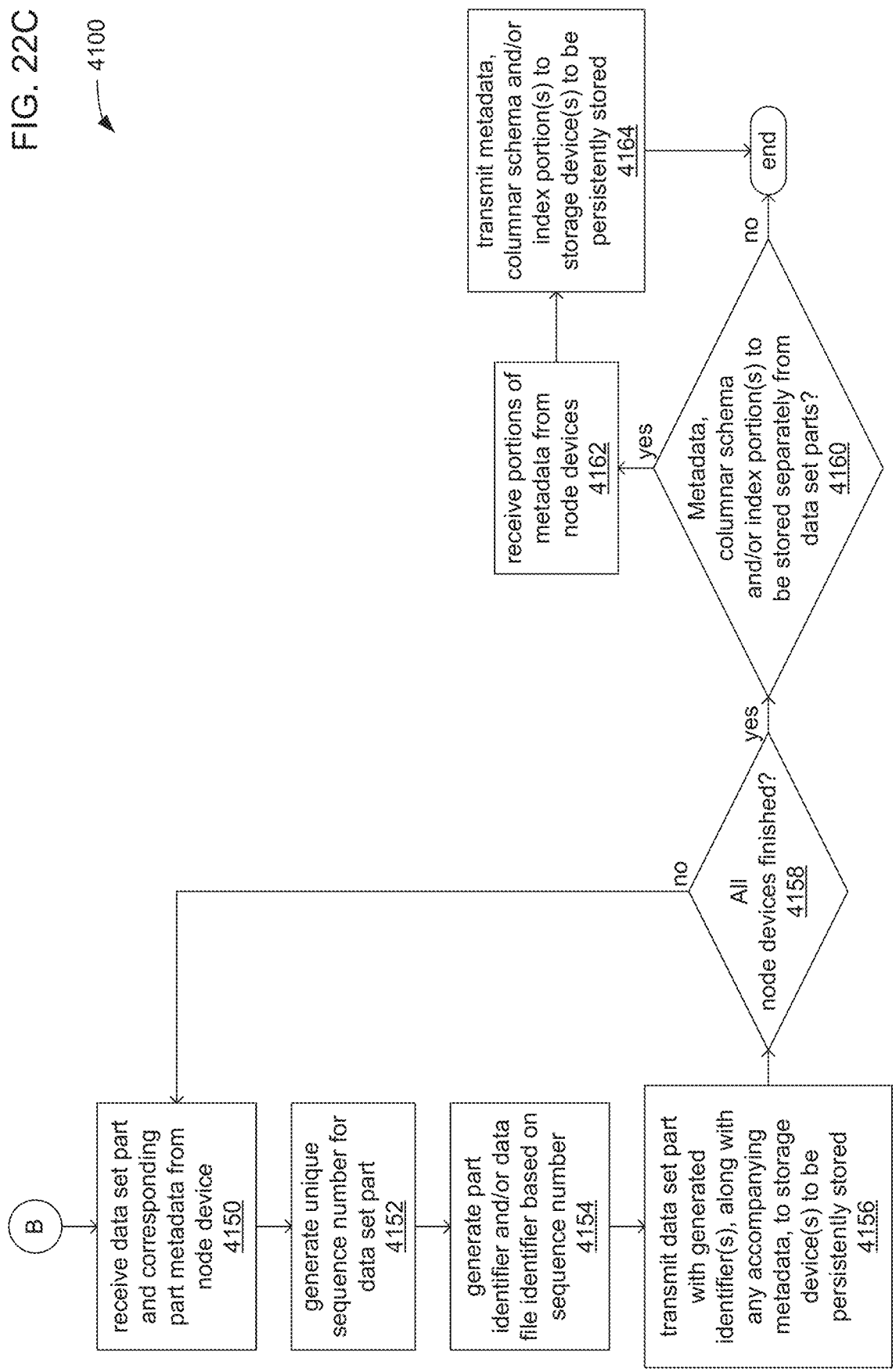

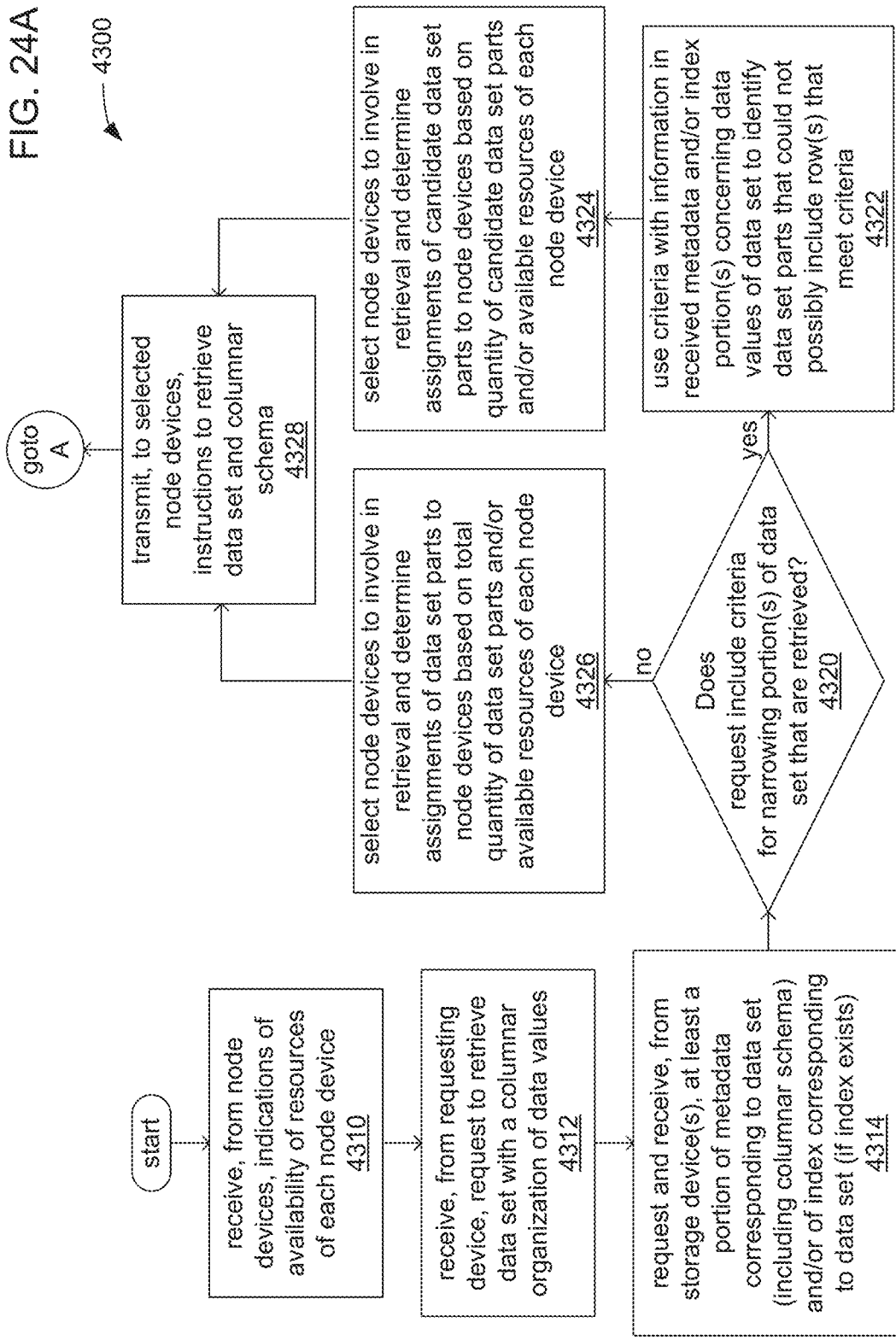

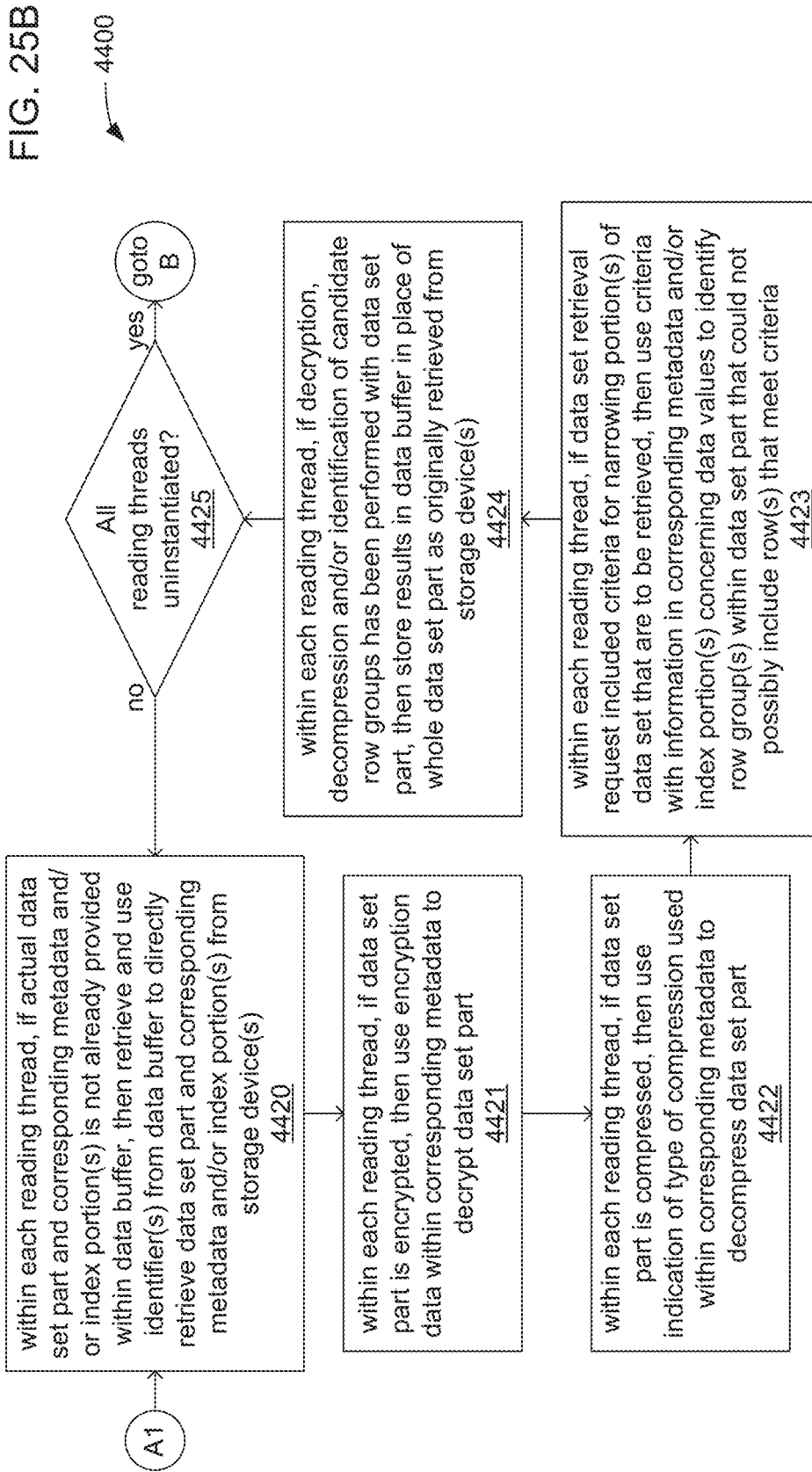

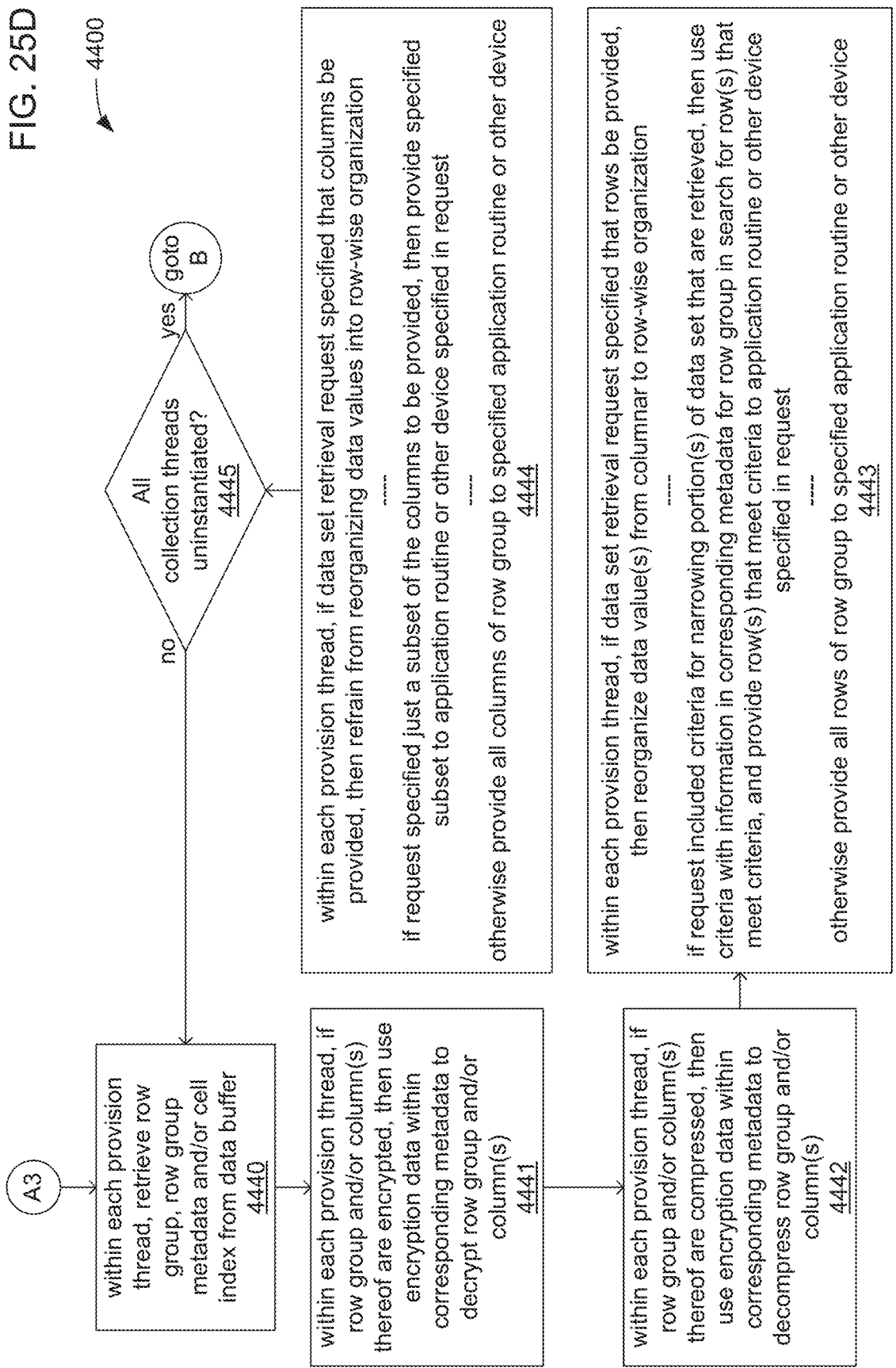

DISTRIBUTED COLUMNAR DATA SET STORAGE

CROSS-REFERENCE TO RELATED APPLICATIONS

This application is a continuation-in-part under the provisions of 35 U.S.C. § 120 of U.S. application Ser. No. 16/233,644 filed Dec. 27, 2018; which is a continuation under the provisions of 35 U.S.C. § 120 of U.S. application Ser. No. 16/233,400 filed Dec. 27, 2018 (now U.S. Pat. No. 10,402,372); which is a continuation-in-part under the provisions of 35 U.S.C. § 120 of U.S. application Ser. No. 15/992,670 filed May 30, 2018 (now U.S. Pat. No. 10,185,722); which is a continuation under the provisions of 35 U.S.C. § 120 of U.S. application Ser. No. 15/694,217 filed Sep. 1, 2017 (now U.S. Pat. No. 9,990,367); which is a continuation-in-part under the provisions of 35 U.S.C. § 120 of U.S. application Ser. No. 15/220,182 filed Jul. 26, 2016 (now U.S. Pat. No. 9,811,524); which is a continuation under the provisions of 35 U.S.C. § 120 of U.S. application Ser. No. 15/220,034 also filed Jul. 26, 2016 (now U.S. Pat. No. 9,619,148); all of which are incorporated herein by reference in their respective entireties for all purposes.

Application Ser. No. 16/233,400 is also a continuation-in-part under the provisions of 35 U.S.C. § 120 of U.S. application Ser. No. 15/984,706 filed May 21, 2018 (now U.S. Pat. No. 10,303,670); which is a continuation under the provisions of 35 U.S.C. § 120 of U.S. application Ser. No. 15/833,110 filed Dec. 11, 2017 (now U.S. Pat. No. 9,977,805); both of which are incorporated herein by reference in their respective entireties for all purposes.

Application Ser. No. 16/233,400 also claims the benefit of priority under 35 U.S.C. § 119(e) to U.S. Provisional Application Ser. No. 62/654,864, filed Apr. 9, 2018, which is incorporated herein by reference in its entirety for all purposes. Application Ser. No. 15/694,217 also claims the benefit of priority under 35 U.S.C. § 119(e) to U.S. Provisional Application Ser. No. 62/519,824 filed Jun. 14, 2017, and to U.S. Provisional Application Ser. No. 62/535,961 filed Jul. 23, 2017, both of which are incorporated herein by reference in their respective entireties for all purposes. Application Ser. No. 15/220,034 also claims the benefit of priority under 35 U.S.C. § 119(e) to U.S. Provisional Application Ser. Nos. 62/197,514 and 62/197,519, both filed Jul. 27, 2015, both of which are incorporated herein by reference in their respective entireties for all purposes. Application Ser. No. 15/838,110 also claims the benefit of priority under 35 U.S.C. § 119(e) to U.S. Provisional Application Ser. No. 62/458,162, filed Feb. 13, 2017, which is incorporated herein by reference in its entirety for all purposes.

For sake of ease of discussion, U.S. application Ser. Nos. 15/220,034, 15/220,182, 15/220,192 and 15/804,570, which all share a common description and drawings (and which are all incorporated herein by reference in their respective entireties for all purposes), are collectively referred to hereinafter as the "Distributed File System Cases."

For sake of ease of discussion, U.S. application Ser. Nos. 15/694,217, 15/694,662, 15/694,674 and 15/992,670, which all share a common description and drawings (and which are all incorporated herein by reference in their respective entireties for all purposes), are collectively referred to hereinafter as the "Distributed Encryption Cases."

For sake of ease of discussion, U.S. application Ser. Nos. 16/233,400, 16/233,573 and 16/233,644, which all share a common description and drawings (and which are all incorporated herein by reference in their respective entireties for all purposes), are collectively referred to hereinafter as the "Distributed Grouping Cases."

For sake of ease of discussion, U.S. application Ser. Nos. 15/838,110, 15/838,175, 15/838,195, 15/838,211 and 15/984,706, which all share a common description and drawings (and which are all incorporated herein by reference in their respective entireties for all purposes), are collectively referred to hereinafter as the "Distributed Indexing Cases."

TECHNICAL FIELD

Various embodiments described herein are generally directed to inter-device coordination to dynamically allocate resources of multiple devices to improve the distributed storage and retrieval of a data set.

BACKGROUND

The performance of analyses of large data sets (e.g., what is commonly referred to as "big data") is becoming increasingly commonplace in such areas as simulations, process monitoring, decision making, behavioral modeling and making predictions. Such analyses are often performed by grids of varying quantities of available node devices, while the data sets are often stored within a separate set of storage devices. This begets the challenge of efficiently storing such large data sets across multiple storage devices for future use, efficiently generating and maintaining indexes for such large data sets to enable efficient data searches, and efficiently retrieving some or all of such large data sets for use by a grid of node devices. Among such challenges in the storage of such large data sets may be various constraints on the exchange of such large data sets with storage devices, and/or various constraints on the encryption and/or decryption of such large data sets.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus includes at least one processor and a storage to store instructions that, when executed by the at least one processor, cause the at least one processor to perform operations including, receive, at a node device of multiple node devices, and from a control device via a network, an instruction to the multiple node devices to persistently store a data set within at least one storage device, wherein: the data set comprises multiple data values organized into numerous rows; each row comprises multiple data fields that each fall within a column of multiple columns; the numerous rows of the data set are divided into subsets of multiple rows that are distributed among multiple storage spaces provided by the multiple node devices; and the data values of the multiple rows that are stored within the storage space provided by each node device are stored in a row-wise organization in which data values within each row are stored at adjacent storage locations. The at least one processor is also caused to, in response to receiving the instruction to persistently store the multiple rows that are stored within the storage space provided by the node device, the at least one processor is caused to perform operations including: instantiate a quantity of collection threads of execution, a quantity of data buffers of a buffer queue, and a quantity of aggregation threads of execution, and within each collection thread of the quantity of collection threads, the at least one processor is caused to perform operations including: assemble a row group from a subset of the multiple rows stored within storage space provided by the node device; reorganize the data values within the row group from the row-wise organization to a columnar organization in which data values within each column of the multiple columns within the row group are stored at adjacent storage locations within the storage space provided by the node device; and store the row group with the data values in the columnar organization within a data buffer of the buffer queue. The at least one processor is also caused to operate the buffer queue as a first-in-first-out (FIFO) buffer in which the first data buffer to be filled with a row group from a collection thread becomes the first data buffer from which a row group is retrieved by an aggregation thread, and within each aggregation thread of the quantity of aggregation threads, the at least one processor is caused to perform operations including: retrieve multiple row groups from multiple data buffers of the buffer queue; assemble a data set part of multiple data set parts of the data set from the multiple row groups; transmit, to the control device via the network, a request for a sequence number; receive, from the control device via the network, the sequence number; and transmit, to the at least one storage device via the network, the data set part along with an identifier that includes the sequence number to uniquely identify the data set part. The at least one processor is also caused to, in response to each instance of retrieval of a row group from a data buffer of the buffer queue for use within an aggregation thread, analyze a level of availability of at least storage space within the node device to determine whether to dynamically adjust the quantity of data buffers of the buffer queue.

A computer-program product tangibly embodied in a non-transitory machine-readable storage medium includes instructions operable to cause at least one processor of a node device of multiple node devices to perform operations including, receive, at a node device of multiple node devices, and from a control device via a network, an instruction to the multiple node devices to persistently store a data set within at least one storage device, wherein: the data set comprises multiple data values organized into numerous rows; each row comprises multiple data fields that each fall within a column of multiple columns; the numerous rows of the data set are divided into subsets of multiple rows that are distributed among multiple storage spaces provided by the multiple node devices; and the data values of the multiple rows that are stored within the storage space provided by each node device are stored in a row-wise organization in which data values within each row are stored at adjacent storage locations. The at least one processor is also caused to, in response to receiving the instruction to persistently store the multiple rows that are stored within the storage space provided by the node device, the at least one processor is caused to perform operations including: instantiate a quantity of collection threads of execution, a quantity of data buffers of a buffer queue, and a quantity of aggregation threads of execution, and within each collection thread of the quantity of collection threads, the at least one processor is caused to perform operations including: assemble a row group from a subset of the multiple rows stored within storage space provided by the node device; reorganize the data values within the row group from the row-wise organization to a columnar organization in which data values within each column of the multiple columns within the row group are stored at adjacent storage locations within the storage space provided by the node device; and store the row group with the data values in the columnar organization within a data buffer of the buffer queue. The at least one processor is also caused to operate the buffer queue as a first-in-first-out (FIFO) buffer in which the first data buffer to be filled with a row group from a collection thread becomes the first data buffer from which a row group is retrieved by an aggregation thread, and within each aggregation thread of the quantity of aggregation threads, the at least one processor is caused to perform operations including: retrieve multiple row groups from multiple data buffers of the buffer queue; assemble a data set part of multiple data set parts of the data set from the multiple row groups; transmit, to the control device via the network, a request for a sequence number; receive, from the control device via the network, the sequence number; and transmit, to the at least one storage device via the network, the data set part along with an identifier that includes the sequence number to uniquely identify the data set part. The at least one processor is also caused to, in response to each instance of retrieval of a row group from a data buffer of the buffer queue for use within an aggregation thread, analyze a level of availability of at least storage space within the node device to determine whether to dynamically adjust the quantity of data buffers of the buffer queue.

A computer-implemented method includes receiving, at a node device of multiple node devices, and from a control device via a network, an instruction to the multiple node devices to persistently store a data set within at least one storage device, wherein: the data set comprises multiple data values organized into numerous rows; each row comprises multiple data fields that each fall within a column of multiple columns; the numerous rows of the data set are divided into subsets of multiple rows that are distributed among multiple storage spaces provided by the multiple node devices; and the data values of the multiple rows that are stored within the storage space provided by each node device are stored in a row-wise organization in which data values within each row are stored at adjacent storage locations. The method also includes, in response to receiving the instruction to persistently store the multiple rows that are stored within the storage space provided by the node device, performing operations including, instantiating, by a processor, a quantity of collection threads of execution, a quantity of data buffers of a buffer queue, and a quantity of aggregation threads of execution, and within each collection thread of the quantity of collection threads, performing operations including: assembling, by the processor, a row group from a subset of the multiple rows stored within storage space provided by the node device; reorganizing, by the processor, the data values within the row group from the row-wise organization to a columnar organization in which data values within each column of the multiple columns within the row group are stored at adjacent storage locations within the storage space provided by the node device; and storing the row group with the data values in the columnar organization within a data buffer of the buffer queue. The method also includes operating, by the processor, the buffer queue as a first-in-first-out (FIFO) buffer in which the first data buffer to be filled with a row group from a collection thread becomes the first data buffer from which a row group is retrieved by an aggregation thread, and within each aggregation thread of the quantity of aggregation threads, performing operations including: retrieving multiple row groups from multiple data buffers of the buffer queue; assembling, by the processor, a data set part of multiple data set parts of the data set from the multiple row groups; transmitting from the processor, to the control device via the network, a request for a sequence number; receiving at the processor, from the control device via the network, the sequence number; and transmitting from the processor, to the at least one storage device via the network, the data set part along with an identifier that includes the sequence number to uniquely identify the data set part. The method also includes, in response to each instance of retrieval of a row group from a data buffer of the buffer queue for use within an aggregation thread, analyzing, by the processor a level of availability of at least storage space within the node device to determine whether to dynamically adjust the quantity of data buffers of the buffer queue.

An apparatus includes at least one processor and a storage to store instructions that, when executed by the at least one processor, cause the at least one processor to perform operations including receive, at a node device of multiple node devices, and from a control device via a network, instruction data comprising an instruction to the multiple node devices to persistently store a data set within at least one storage device, wherein: the data set comprises multiple data values organized into numerous rows; each row comprises multiple data fields that each fall within a column of multiple columns; the numerous rows of the data set are divided into subsets of multiple rows that are distributed among multiple storage spaces provided by the multiple node devices; and the data values of the multiple rows that are stored within the storage space provided by each node device are stored in a row-wise organization in which data values within each row are stored at adjacent storage locations. The at least one processor is also caused to, in response to the reception of the instruction to persistently store the multiple rows that are stored within the storage space provided by the node device, the at least one processor is caused to perform operations including: within each collection thread of a quantity of collection threads, the at least one processor is caused to perform operations including: assemble a row group from a subset of the multiple rows stored within storage space provided by the node device in which the data values are organized into a columnar organization in which data values within each column of the row group are stored at adjacent storage locations within the storage space provided by the node device; for each column of the row group, identify highest and lowest data values, and each unique data value; generate row group metadata corresponding to the row group that includes, for each column, indications of the highest and lowest data values, and each unique data value; and store the row group and row group metadata within a data buffer of a buffer queue. The at least one processor is also caused to operate the buffer queue as a first-in-first-out (FIFO) buffer interposed between the quantity of collection threads and a quantity of aggregation threads in which the first data buffer of multiple data buffers to be filled with a row group from a collection thread becomes the first data buffer from which a row group is retrieved by an aggregation thread, and within each aggregation thread of the quantity of aggregation threads, the at least one processor is caused to perform operations including: retrieve multiple row groups and corresponding row group metadata from multiple data buffers of the buffer queue; assemble a data set part of multiple data set parts of the data set from the multiple row groups; generate part metadata corresponding to the data set part that includes the row group metadata corresponding to each row group of the multiple row groups; transmit, to the at least one storage device via the network, the data set part; and transmit, to the control device via the network, the part metadata. The at least one processor is also caused to, in response to each instance of retrieval of a row group and corresponding row group metadata from a data buffer of the buffer queue for use within an aggregation thread, analyze a level of availability of at least storage space within the node device to determine whether to dynamically adjust the quantity of data buffers of the buffer queue.

An apparatus comprising at least one processor and a storage to store instructions that, when executed by the at least one processor, cause the at least one processor to perform operations including receive, at a node device of multiple node devices, and from a control device via a network, instruction data comprising an instruction to the multiple node devices to retrieve a data set from persistent storage within at least one storage device, wherein: the data set comprises multiple data set parts that are persistently stored within the at least one storage device; each data set part comprises multiple row groups; each row group comprises data values of multiple rows of the data set; each row comprises multiple data fields that each fall within a column of multiple columns of the data set; and the data values within each row group are arranged in a columnar organization in which data values within each column are stored in adjacent storage locations. The at least one processor is also caused to receive, at the node device, a quantity of identifiers that each identify a data set part of the multiple data set parts that the node device is assigned by the control device to retrieve from the at least one storage device, and in response to the reception of the identifiers from the control device, the at least one processor is caused to perform operations including: instantiate a quantity of data buffers of a buffer queue, wherein each data buffer stores a single identifier of the quantity of identifiers received from the control device; instantiate a quantity of reading threads of execution and a quantity of provision threads of execution; and within each reading thread of the quantity of reading threads, the at least one processor is caused to perform operations including: retrieve the identifier of a data set part stored in a data buffer of the buffer queue, use the identifier in communications with the at least one storage device via the network to retrieve the corresponding data set part and corresponding part metadata, and store the corresponding data set part and corresponding part metadata within the data buffer from which the identifier was retrieved. The at least one processor is also caused to operate the buffer as a first-in-first-out (FIFO) buffer interposed between the quantity of reading threads and the quantity of provision threads in which the first data buffer to be filled with a data set part becomes the first data buffer from which the multiple row groups of the data set part are retrieved by multiple provision threads, and within each provision thread of the quantity of provision threads, the at least one processor is caused to perform operations including: retrieve a row group from among the multiple row groups within the data set part stored in the data buffer; retrieve row group metadata corresponding to the row group from the part metadata stored in the data buffer; use an indication in the corresponding row group metadata of a characteristic of compression performed on at least one column of the row group to decompress the at least one column; and transmit, to the control device via the network, an indication of successful retrieval of the row group. The at least one processor is also caused to, in response to each instance of storage of a data set part of the data set within a data buffer of the buffer queue, analyze a level of availability of at least one of storage space within the node device and processing resources of the at least one processor to determine whether to dynamically adjust the quantity of reading threads.

An apparatus includes at least one processor and a storage to store instructions that, when executed by the at least one processor, cause the at least one processor to perform operations including receive, at a node device of multiple node devices, and from a control device via a network, instruction data comprising an instruction to the multiple node devices to retrieve rows of data values of a data set that meet specified criteria from persistent storage within at least one storage device, wherein: the data set comprises multiple data set parts that are persistently stored within the at least one storage device; each data set part comprises multiple row groups; each row group comprises data values of multiple rows of the data set; each row comprises multiple data fields that each fall within a column of multiple columns of the data set; and the data values within each row group are arranged in a columnar organization in which data values within each column are stored in adjacent storage locations. The at least one processor is also caused to receive, at the node device, a quantity of identifiers that each identify a data set part of the multiple data set parts that the node device is assigned by the control device to retrieve rows that meet the criteria from, and in response to the reception of the identifiers from the control device, the at least one processor is caused to perform operations including, within each reading thread of a quantity of reading threads, the at least one processor is caused to perform operations including: use one of the identifiers in communications with the at least one storage device via the network to retrieve the corresponding data set part and corresponding part metadata; for each row group of the multiple row groups of the data set part, analyze corresponding row group metadata within the part metadata to determine if the row group could include at least one row that meets the criteria; and store just a subset of the multiple row groups of the data set part that each could include at least one row that meets the criteria, along with corresponding row group metadata, within a data buffer of a buffer queue. The at least one processor is also caused to operate the buffer queue as a first-in-first-out (FIFO) buffer interposed between the quantity of reading threads and a quantity of provision threads in which the first data buffer of multiple data buffers to be filled with a subset of row groups of a data set part becomes the first data buffer from which the subset of row groups is retrieved by multiple provision threads, and within each provision thread of the quantity of provision threads, the at least one processor is caused to perform operations including: retrieve a row group from among the subset of row groups stored in the data buffer; retrieve row group metadata corresponding to the row group retrieved from the subset of row groups stored in the data buffer; use at least one indication of a characteristic of data values in at least one column of the row group to identify a subset of the multiple rows within the row group that meet the criteria; and transmit, to the control device via the network, an indication of successful retrieval of the subset of the multiple rows within the row group. The at least one processor is also caused to, in response to each instance of storage of a subset of the multiple row groups of a data set part of the data set within a data buffer of the buffer queue, analyze a level of availability of at least one of storage space within the node device and processing resources of the at least one processor to determine whether to dynamically adjust the quantity of reading threads.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 22A, 22B and 22C, together, illustrate an example logic flow of operations by a control device in persistently storing a data set.

FIGS. 24A and 24B, together, illustrate an example logic flow of operations by a control device in retrieving a data set from persistent storage.

FIGS. 25A, 25B, 25C and 25D, together, illustrate an example logic flow of operations by a node device in retrieving a data set from persistent storage.

DETAILED DESCRIPTION

Figure 1:
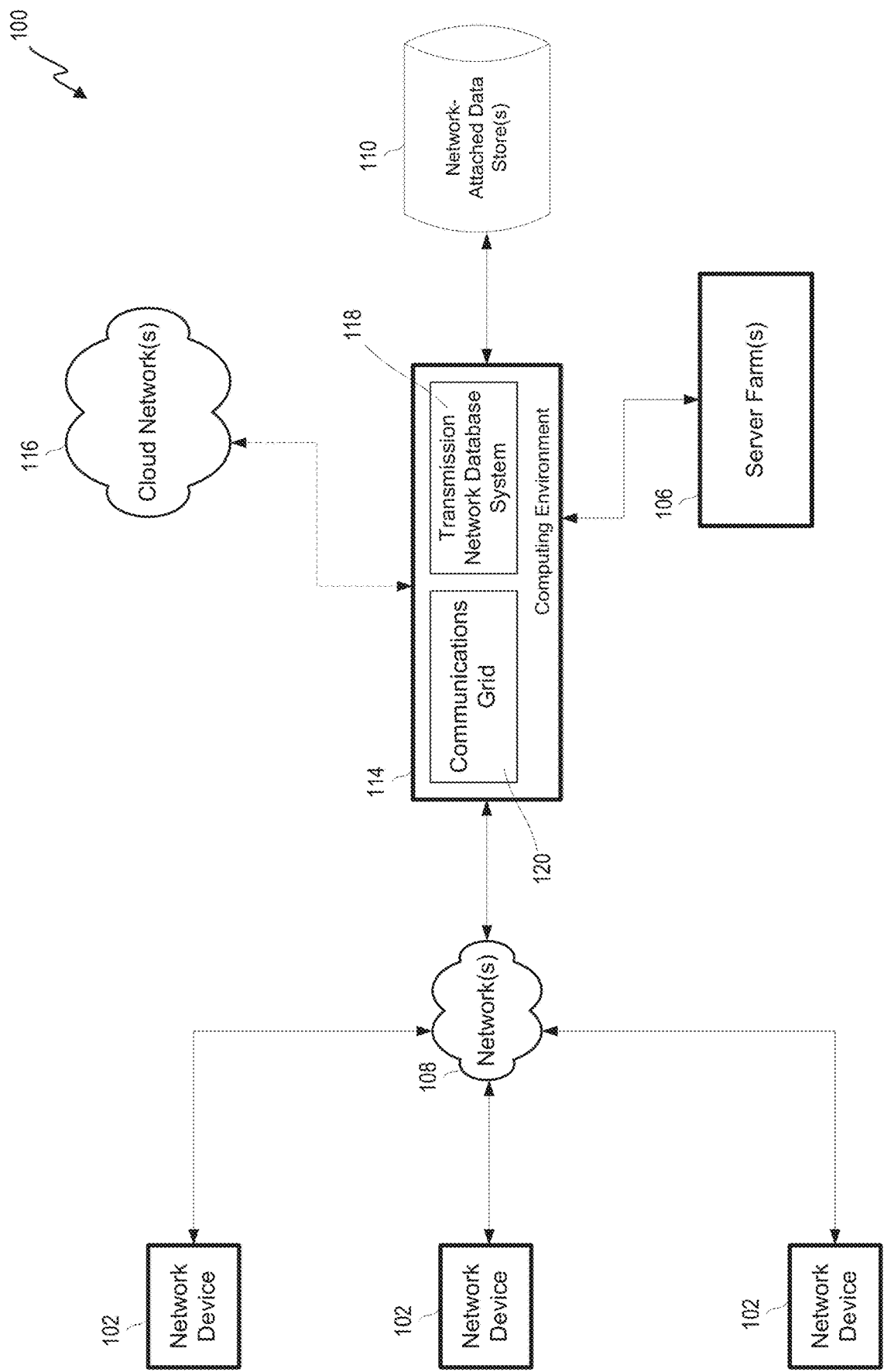
FIG. 1 illustrates a block diagram that provides an illustration of the hardware components of a computing system, according to some embodiments of the present technology.

Various embodiments described herein are generally directed to inter-device and/or inter-process coordination to improve the distributed persistent storage of a large data set within a set of storage devices, and/or the distributed retrieval of a large data set from such persistent storage for use in distributed processing. The data set may be persistently stored as a single file or across multiple data files. Within each such data file, the data set may be stored with a columnar organization in which, for each group of rows of multiple groups of rows, the data values of each column may be stored contiguously at adjacent storage locations. Such distributed persistent storage of a data set may entail defining the row groups, organizing the data values within each row group by column, employing per-column compression to reduce the storage space occupied by the data values of each column, performing encryption, providing the columns of each row group to the set of storage devices, and/or providing attribute metadata descriptive of various attributes of the data within each row group to the set of storage devices. Such distributed retrieval of the data set from persistent storage may entail retrieving one or more particular columns (if not all of the columns) of each row group, deriving the distribution of row groups among multiple node devices, performing decryption, and/or performing per-column decompression. The distributed processing used in effecting either of such distributed persistent storage or such distributed retrieval may be enabled through the dynamic allocation of processing threads, and inter-process communications may be enabled through the dynamic allocation of data buffers and/or queues of data buffers. In embodiments incorporating multiple node devices, a control device may coordinate the parallelization of operation thereamong, thereby obviating the need for direct communication thereamong, and enabling dynamic allocation of resources across the multiple node devices.

The data of a data set may be any of a variety of types of data (e.g., societal statistics data, business operations data, raw data from sensors of large scale experiments, financial data, medical treatment analysis data, data from geological or meteorogical instruments, streams of data collected from Internet-attached appliances, etc.). The size of the data set may be sufficiently large that accessing and/or processing the data set using a single processing device may be deemed highly impractical. Indeed, it may be that the data set also changes frequently enough over time (e.g., is updated hourly, daily, weekly, etc.) such that the length of time required to access and/or process the data set using a single processing device would yield results that would already be out of date before such operations could be completed. Thus, it may be deemed highly desirable to access and/or process the data set in a distributed and at least partially parallel manner using numerous processor cores able to support numerous threads of execution within a single device, or a group of interconnected devices (sometimes referred to as a "grid" of devices) that each include one or more processors that may each include multiple processor cores.

As will be familiar to those skilled in the art, it has long been commonplace to organize a wide variety of types of data into two-dimensional data structures made up of a great many records that are treated as rows that each have a set of data values that are distributed among a set of columns. In very large data sets, it is typically the case that the quantity of rows greatly outnumbers the quantity of columns. It is also typically the case that the quantity of columns and the types of data stored within each column is defined before the data set is generated, and remains unchanged, even as more data is typically added to the data set over time through the addition of more rows. Further, it has become increasingly commonplace for the types of processing operations that are typically performed with such large data sets to require the data values present within a particular subset of the columns, rather than to require the data values present within all of the columns. Thus, it has become desirable to better optimize the manner in which large data sets are stored to increase the efficiency of per-column accesses. As a result, it has become more commonplace to persistently store data sets with a columnar organization in which the data values of each column spanning multiple rows are stored in adjacent data storage locations within data files.

However, while it may be theoretically possible to persistently store a data set with a columnar organization in which data values of each column spanning all of the rows of the entire data set are stored contiguously in adjacent data storage locations, there may be practical limitations that militate against doing so. More specifically, limitations imposed by the limited resources of the set of storage devices, of the one or more processing device(s) (e.g., a grid of node devices), and/or of the networks that interconnect those devices may necessitate the division of a data set (especially a large data set) into groups of rows, with a separate and distinct columnar organization of the data values within each such group. As will be explained in greater detail, this may better enable the distributed generation of the data set by multiple processing devices and/or better enable the distribution of the data set among the multiple processing devices. As previously discussed, it may be that the quantity of columns remains fixed, while the quantity of rows may increase over time as more of the data set is generated. Thus, it may be deemed advantageous to arrange for the defining of new groups of rows as more and more rows of data values are added to a data set over time.

Turning to the persistent storage of a data set organized into a columnar form, in embodiments where a data set is distributed across multiple node devices, a control device may coordinate actions by the multiple node devices to, at least partially in parallel, effect the distributed persistent storage of the data set within a set storage devices through a network. It may be that each of the node devices has generated a portion of the data set, and/or it may be that each of the node devices has received a portion of the data set from an external source. Within each node device, multiple data collection threads and multiple data aggregation threads may be instantiated for execution by the processor(s) of the node device to perform various operations to effect the persistent storage of its corresponding portion of the data set. Also within each node device, a buffer queue of multiple data buffers may be instantiated to enable thread-safe data exchange from the data collection threads to the data aggregation threads within the node device. Within the control device, one or distributed operations threads may be instantiated to perform operations to maintain coordination among the multiple node devices.

In some embodiments, the quantity of data buffers within the buffer queue, the quantity of data collection threads, and/or the quantity of data aggregation threads may be dynamically alterable within each node device based on ongoing monitoring of what node device processing and/or storage resources are available versus what of such resources are required. The set of data buffers within the buffer queue may be operated together to form a ring buffer in which each of the data buffers are filled with data values of a row group of the data set by the data collection threads, and are emptied of those data values by the data aggregation threads in a first-in-first-out (FIFO) order. Thus, the interposing, within each node device, of a buffer queue of data buffers between the data collection threads and the data aggregation threads provides multiple sets of storage locations through which a dynamically changing quantity of data collection threads are able to provide data values of the data set to a dynamically changing quantity of data aggregation threads, while obviating the need to in some way coordinate the quantities of data collection threads and data aggregation threads. In some of such embodiments, the quantity of data buffers may be dynamically adjustable based on the rate at which the data collection threads fill the data buffers versus the rate at which the data aggregation threads empty them.

Among the operations caused to be performed within each node device by execution of the data collection threads by the processor(s) thereof may be the division of its portion of the data set into row groups that each include a quantity of rows of data values of its corresponding portion of the data set. In some embodiments, the quantity of rows per row group may be a predetermined quantity of rows, such as a predetermined minimum and/or maximum quantity of rows per row group. In other embodiments, the quantity of rows per row group may be derived within each node device based on how much storage space is occupied by the data values of each row and a predetermined data size for each row group, such as a predetermined minimum and/or maximum quantity of bytes per row group. In still other embodiments, the quantity of rows per row group may be a specifiable parameter and/or a selectable option.

Following the definition of each row group, another of the operations caused to be performed within each node device may be the reordering of the data values within each row group from what may have originally been a row-wise organization and into a columnar organization. As previously discussed, the data values of a data set may be received and/or generated in sets of data values at a time in which each such set corresponds a to row, rather than to a column. As a result, the data values of a data set may initially be temporarily stored within each node device in a row-wise manner in which data values of the same row are initially stored contiguously at adjacent storage locations. Thus, within each node device, the data values within each newly defined row group may then be reordered into a columnar organization in which data values of the same column across all of the rows of each row group are caused to be stored contiguously at adjacent storage locations.

Along with the definition of row groups and/or the reordering of data values within each row group into a columnar organization, execution of the data collection threads within each of the node devices may also cause the conversion of data types and/or formats of at least a subset of the data values into data types and/or formats that are specified by a columnar schema. The columnar schema may define various characteristics of the manner in which the data set is to be persistently stored. It may be that the columnar schema was defined at an earlier time, and may have been used to define the same various characteristics of the persistent storage of previous data sets. In some embodiments, those earlier defined characteristics may be based on a definition of characteristics for the file type that is to be used in the persistent storage of the data set by the set of storage devices. In other embodiments, it may be that the columnar schema is at least partially defined based on observations of characteristics of the data set and/or of the data values thereof, especially where the data set is at least partially received from source(s) external to the multiple node devices. In still other embodiments, one or more of the parameters specified in the columnar schema may be set and/or overridden by in a request to perform operations that may include an explicit or implied instruction to persistently store a data set. By way of example, while a columnar schema may specify a pre-determined quantity of rows to be included in each row group, a request for the persistent storage of a data set may specify a different quantity that may take precedence over what that predetermined quantity specified in the columnar schema.

Execution of each of the data collection threads within each of the node devices may also cause the performance of some degree of per-column data compression. By way of example, a form of per-column run length encoding (RLE) may be employed where a column in which all of the data values are found to be the same single data value may be compressed to an indication of that single value. It may be that, as the data values within each row group are reordered into a columnar organization, a set of flag bits are generated to enable various characteristics of each column to be indicated with single bit values, including a bit value that indicates whether or not all of the data values within a column are the same, and/or whether or not all of the data values within a column are a null or empty value. Where all of the data values within a column are a null or empty value, the actual null or empty value, itself, may not actually be stored.

Execution of each of the data collection threads within each of the node devices by the processor(s) thereof may further cause the filling of each of the data buffers of the buffer queue with the data values of a corresponding row group. In some embodiments, it may be that one or more of the reordering of data values into a columnar organization, the per-column compression, and/or the conversion of data types and/or formats is performed as each data buffer is filled with the data values of a corresponding row group. In other embodiments, it may be that one or more of these operations is performed with the data values of each row group prior to the filling of a corresponding data buffer with those data values.

Still further, in some embodiments, advantage may be taken of the aforedescribed operations for the preparation and/or reordering of data values of the data set into a columnar organization to additionally derive an index of the data values within at least a subset of the newly generated columns. Such an index may then be persistently stored within the set of storage devices alongside the data set, itself.

Indeed, and as will be explained in greater detail, such generation and storage of such an index may be performed as described in one or more of the "Distributed Indexing Cases" listed above, and incorporated herein by reference.

Among the operations caused to be performed within each node device by execution of the data aggregation threads by the processor(s) thereof may be the formation of data set parts from multiple row groups retrieved from corresponding multiple data buffers that have been filled by data collection threads. More specifically, each data aggregation thread may retrieve multiple row groups from multiple corresponding data buffers of the buffer queue in FIFO order, and may assemble those multiple row groups into a single data set part. In a manner similar to the quantity of rows that are included in each row group, the quantity of row groups within each data set part may be a predetermined quantity of row groups, such as a predetermined minimum and/or maximum quantity of row groups per data set part, or may be derived based on how much storage space is occupied by the columns of data values of each row group and a predetermined data size for each row group, such as a predetermined minimum and/or maximum quantity of bytes per row group, or may be a specifiable parameter and/or a selectable option.

Along with the formation of data set parts, execution of the data aggregation threads within each of the node devices may also cause the transmission of the newly formed data set parts to the set of storage devices to be persistently stored. In so doing, each data aggregation thread may communicate with the one or more distributed operations threads instantiated and executed within the control device to request and receive a unique sequence value for each data set part that it forms prior to transmission to the set of storage devices. Execution of the one or more distributed operations threads by the processor(s) of the control device may cause the generation of a series of the sequence values based on the incrementing of a counter or other mathematical mechanism operated on a first-come-first-served basis that ensures that no sequence value is ever assigned to more than one data set part. Each of the aggregation threads may combine the unique sequence value it receives in response to each request it makes for each separate data set part with a universal identifier of the data set and/or an identifier of a file type that is to be used for persistent storage to form a unique identifier for each data set part. The set of storage devices may use such a unique identifier for each data set part to associate each data set part with the data set to which it belongs, to confirm receipt of all of the data set parts by the set of storage devices, and/or to provide the set of storage devices with an indication of what file format is to be used in persistently storing the data set within the set of storage devices. As will be explained in greater detail, the data set may be persistently stored as a single file object that includes all of the data set parts thereof, or as multiple file objects that each include one or more of the data set parts.

Execution of each of the data aggregation threads within each of the node devices may also cause the performance of further compression and/or of encryption. By way of example, further compression may be performed on a per-column basis within each of the row groups that are included within a data set part, on a per row group basis within a data set part, and/or of an entire data set part. Whether such further compression is performed and/or the type thereof may be based on the columnar schema. Similarly, and also by way of example, encryption may be performed on a per-column basis, a per row group basis and/or of an entire data set part, and may also be based on the columnar schema. However, again, where the performance of persistent storage of a data set is triggered through the receipt of an instruction to do so, that instruction may be accompanied by the specification of one or more parameters that are in addition to or in lieu of parameters specified in columnar schema, including types of compression and/or encryption to be used. Thus, and more specifically, such a received instruction may be accompanied by a specification of a choice of encryption algorithm that is to be used instead of what is specified in the columnar schema, or where the columnar schema may have not specified any particular encryption algorithm, at all.

In various embodiments, the degree of independent processing ability of the set of storage devices and/or the selection of protocols used in communications between the multiple node devices and the set of storage devices may at least partially determine the manner in which the transmission, further compression, and/or encryption of data set parts is performed and/or caused to be performed by the multiple node devices. By way of example, in embodiments in which the set of storage devices incorporates sufficient processing resources as to enable the set of storage devices to independently manage various details of the file system and/or file types by which data sets are stored therein, the protocols for communications between the multiple node devices and the set of storage devices may be at a relatively high level (e.g., through use of a storage substrate API) that may be entirely independent of the selection of the file system used across the set of storage devices. Thus, in such embodiments, the multiple node devices may play little or no role in dividing the data set parts into data blocks of a type and/or size that may be required for storage in accordance with requirements associated with the file system, and/or may play little or no role in the selection and/or specification of storage locations within the set of storage devices at which such data blocks may be stored. Also, in such embodiments, it may be that the further compression and/or the encryption of portions of data set parts and/or of whole data set parts may be performed directly within the data aggregation threads by the processor(s) of the node devices (e.g., using one or more thread-safe callable libraries of routines), and/or may be performed by the processor(s) of the set of storage devices.

Alternatively, and by way of another example, in other embodiments in which the set of storage devices does not incorporate such sufficient processing resources, or in which it is deemed desirable for the set of storage devices to not operate so independently, execution of the aggregation threads by the processor(s) of the node devices may cause the processor(s) of the node devices to directly perform operations involving the division of the data set parts into data blocks of a type and/or size that may be required by the file system, and/or involving the selection and/or specification of storage locations within the set of storage devices at which to store such data blocks. Additionally, in such other embodiments, the control device, in coordinating the operations performed by the multiple node devices, may control the allocation of such storage locations within the set of storage devices, and may therefore provide the multiple node devices with pointers thereto. Indeed, and as will be explained in greater detail, such operations performed directly by the control device and the multiple node devices, and/or such coordination thereamong, may be performed as described in one or more of the "Distributed File System Cases", one or more of the "Distributed Encryption Cases", and/or one or more of the "Distributed Grouping Cases" listed above, and incorporated herein by reference.

Beyond the persistent storage of the data set, itself, in various embodiments, the control device and/or the multiple node devices may perform additional operations to effect storage of attribute data descriptive of various characteristics of the data set as persistently stored, including characteristics of the data values, characteristics of the columnar organization of the data values, characteristics of the division of the data set into row groups and/or data set parts, etc. Thus, some or all of the parameters indicated in the columnar schema may be included in the attribute data that is so persistently stored. It may be that the manner in which the attribute data is persistently stored may be at least partially determined by the file type and/or the file system used to persistently store the data set, and/or may be at least partially determined by whether the data set is persistently stored as a single file object or as multiple file objects. By way of example, where the data set is to be persistently stored as a single file object, execution of the one or more distributed operations by processor(s) of the control device may cause the control device to persistently store a single portion of attribute data at a single location within the single file object (e.g., as part of a file header and/or at a predetermined location within a payload section of the single file object). However, and also by way of example, where the data set is to be persistently stored as multiple file objects that may each include one or more data set parts, execution of the data aggregation threads by processor(s) within each of the multiple node devices may cause each of the multiple node devices to persistently store at least a portion of the attribute data within each of the multiple file objects. This may entail the persistent storage of a single portion of attribute data at a single location within each of the multiple file objects, and/or may entail the persistent storage of a separate portion of attribute data within or alongside each of the data parts that are included within each of the multiple file objects. Alternatively or additionally, and by way of a further example, at least a portion of the attribute data may be stored at an entirely different location within set of storage devices that is not within either a single data set file object, or any of multiple file objects.

Turning to the retrieval of a persistently stored data set organized into columnar form, in embodiments where one or more columns of a data set is to be retrieved and distributed among multiple node devices, a control device may coordinate actions by the multiple node devices to, at least partially in parallel, effect the distributed retrieval of the one or more columns of the data set from a set of storage devices in which the data set has previously been persistently stored. It may be that the multiple node devices are to be operated, at least partially in parallel, to perform various distributed processing operations that require the data values present within one or more of the columns of the data set, and it may be that such distributed retrieval is triggered by the control device receiving a request to retrieve those one or more columns of the data set to enable such distributed processing. Within each node device, multiple reading threads and multiple provision threads may be instantiated for execution by the processor(s) of the node device to perform various operations to effect such retrieval and use of a corresponding portion of the data set. Also within each node device, a buffer queue of multiple data buffers may be instantiated to enable thread-safe data exchange from the reading threads to the provision threads within each node device. Within the control device, one or more distributed operations threads may be instantiated to perform operations to maintain coordination among the multiple node devices.

In a manner similar to what has been described for distributed persistent storage, the quantity of data buffers within the buffer queue, the quantity of reading threads, and/or the quantity of provision threads may be dynamically alterable within each node device based on ongoing monitoring of what node device processing and/or storage resources are available versus what of such resources are required. The set of data buffers within the buffer queue may be operated together to form a ring buffer in which each of the data buffers are filled with data values of a row group of the data set by the reading threads, and emptied of those data values by the provision threads in a FIFO order. Thus, the interposing, within each node device, of a buffer queue of data buffers between the reading threads and the provision threads provides multiple sets of storage locations through which a dynamically changing quantity of reading threads are able to provide data values of the data set to a dynamically changing quantity of provision threads, while obviating the need to in some way coordinate the quantities of reading threads and provision threads. In some of such embodiments, the quantity of data buffers may be dynamically adjustable based on the rate at which the reading threads fill the data buffers versus the rate at which the provision threads empty them.

Among the operations caused to be performed by execution of the one or more distributed operations threads by the processor(s) of the control device may be the receipt of a request to retrieve one or more specified columns of a data set that has been previously persistently stored within the set of storage devices. The request may provide an identifier of the data set and an indication of which columns are among the one or more that are to be retrieved (which may include either some or all of the columns). However, the request may provide little or no information concerning various aspects of the manner in which the data set was persistently stored that may need to be known to enable its retrieval. Thus, execution of the one or more distributed operations threads may also cause the use of the received identifier of the data set in communications with the set of storage devices to retrieve information concerning such aspects of the storage of the data set that were not provided in the received request.

In various embodiments, the degree of independent processing ability of the set of storage devices and/or the selection of protocols used in communications between the multiple node devices and the set of storage devices may at least partially determine what information is needed by the control device and/or the multiple node devices to retrieve one or more columns of a data set, and/or may determine various aspects of the communications required to obtain and/or use such information. By way of example, in embodiments in which the set of storage devices incorporates sufficient processing resources as to enable the set of storage devices to independently manage various details of the file system and/or file types by which data sets are stored therein, the protocols for communications between the multiple node devices and the set of storage devices may be at a relatively high level (e.g., through use of a storage substrate API) that may be entirely independent of the selection of the file system used across the set of storage devices. Thus, in such embodiments, detailed information concerning exact storage locations within the set of storage devices at which data blocks of the data set are persistently stored and/or information concerning the manner in which the data set is divided into data blocks for such storage within those exact locations may not be needed by the control device and/or by the multiple node devices to retrieve the specified one or more columns of the data set. Instead, the identifier of the data set provided in the received request may be sufficient to use in communications with the set of storage devices to request, and to be provided with, information concerning such details as the manner in which the data set has been divided at a higher level into columns and/or data set parts, and/or such information as identifiers that may be used to request particular data columns and/or data set parts. The provision of such identifiers may then be sufficient for the control device to use in retrieving some or all of a single data set part, thereby enabling the control device to obtain attribute data that may provide further details concerning the columns of the data set and/or the manner in which the data set may be divided into row groups. From such information, the control device may be able to provide each of the node devices with one or more identifiers that may be used by reading threads executed within each of the node devices to independently communicate with the set of storage devices and retrieve, at least partially in parallel, the specified one or more columns within the one or more data set parts that are assigned by the control device to each of the node devices.

Alternatively, and by way of another example, in other embodiments in which the set of storage devices does not incorporate such sufficient processing resources, or in which it is deemed desirable for the set of storage devices to not operate so independently, execution of the one or more distributed operations threads by the processor(s) of the control device may cause the control device to more directly employ known file type and/or file system details to more directly access and retrieve information concerning the storage locations of data blocks within the set of storage devices that are used to store the data set to retrieve such attribute data from a particular set of storage locations. More specifically, it may be that a file header structure that begins at a particular offset from the start of a data file of the data set contains such attribute data and/or an indication of a further offset to where such attribute data may be found. From such information, the control device may be caused to provide each of the node devices with one or more pointers to addresses of data storage locations within the set of storage devices from which each of the reading threads executed within each node device is to independently retrieve, at least partially in parallel, the specified one or more columns within the one or more data set parts that are assigned by the control device to each of the node devices. Indeed, and as will be explained in greater detail, such operations performed directly by the control device and the multiple node devices, and/or such coordination thereamong may be performed as described in one or more of the "Distributed File System Cases", one or more of the "Distributed Encryption Cases", and/or one or more of the "Distributed Grouping Cases" listed above, and incorporated herein by reference.

In some embodiments, the request received by the control device may specify what data values of the data set to retrieve with greater granularity than simply specifying one or more columns. By way of example, the request may specify the retrieval of data values within one or more specific columns that fall within one or more specific data set parts and/or row groups, instead of spanning all rows of the entire data set. Alternatively, and also by way of example, the request may specify the retrieval of data values within one or more specific columns that fall within rows meeting one or more specific criteria, such as having particular data value(s) that fall within specified range(s). As mentioned above, in some embodiments, during preparations for persistently storing a data set, the processor(s) of the multiple node devices may additionally be caused to generate an index of at least a subset of the data values within one or more selected columns thereof. Again, such an index may be persistently stored as part of or alongside the data set within the set of storage devices as described in one or more of the "Distributed Indexing Cases" listed above, and incorporated herein by reference. As will be explained in greater detail, in such embodiments, it may be that the control device is caused to retrieve at least a portion of the index from the set of storage devices along with other information needed to enable retrieval of the requested subset of the data set by the multiple node devices.

Regardless of the distribution of processing operations between the node devices and the storage devices, and regardless of whether an index is employed, further execution of the one or more distributed operations threads by processor(s) of the control device may cause a derivation of the columnar schema that defines various aspects of the manner in which the data set is stored with columnar organization within the set of storage devices. This may occur in situations such as where the file type used for the persistent storage of the data set would not accommodate the storage of some or all of the columnar schema, and/or where an error or other inconsistency is found in the columnar schema as stored. In response to such a situation, execution of the reading threads within the multiple node devices may cause the provision, to the control device, of indications of observed characteristics of the portions of the data set retrieved by each of the node devices. Within the control device, execution of the one or more distributed operations threads may cause the use of such observations received from the multiple node devices to derive the columnar schema.

Execution of each of the provision threads within each of the node devices may also cause the performance of decompression and/or of decryption. By way of example, where per-column compression was performed as part of persistently storing the requested one or more columns of the data set, the processor(s) of each of the node devices may be caused to decompress those compressed columns. Again, whether such compression was performed and/or the type thereof may be based on the columnar schema under which the data set was persistently stored. Similarly, and also by way of example, decryption may similarly be performed depending on whether the data values of the one or more requested columns were encrypted as per the columnar schema.

Among the operations caused to be performed within each node device by execution of the one or more provision threads by the processor(s) within each node device may be the assembly of a portion of the data set that contains the requested one or more columns of row groups retrieved from corresponding data buffers that have been filled by reading threads. More specifically, within each node device, the one or more provision threads executed therein may use the requested one or more columns falling within the portion of the data set assigned to the node device as input to whatever distributed processing operation that the node device is to perform therewith. Whether there is a single data provision thread or multiple provision threads executed within each node device may depend on the type of distributed processing that is to be performed across the multiple node devices, and for which the requested columns of data values of the data set were needed.

As previously mentioned, in some embodiments, a form of distributed indexing may be employed to aid in the identification of subsets of the one or more columns of a data set that are requested to be retrieved from persistent storage.

More specifically, it may be that only portions of one or more specified columns that fall within a subset of rows that meet one or more specified criteria are meant to be retrieved from persistent storage and provided to multiple node devices for use as input to various distributed processing operations. As also previously mentioned, such a distributed indexing system may be of a type described in one or more of the "Distributed Indexing Cases" listed above. As described therein, a data set may be treated, for purposes of indexing, as being divided into multiple super cells that are each, in turn, divided into multiple data cells. Correspondingly, and as also described therein, the index for the data set may include a set of separate super cell indexes where each super cell index corresponds to one of the super cells of the data set, and each super cell index may be accompanied by a set of cell indexes where each cell index corresponds to one of the data cells within the super cell to which that super cell index corresponds. As further described therein, each data cell may include numerous data records corresponding to rows that each include multiple data fields corresponding to columns. And as still further described therein, the super cell indexes and/or cell indexes may include indications of what data values are present and/or ranges of what data values are present within a subset of the data fields (i.e., column positions within the rows) within each super cell and/or each data cell to enable data records (i.e., rows of data values) meeting a specified search criteria to be more efficiently identified.

As previously mentioned, it may be that such a distributed index of multiple super cell indexes and accompanying sets of data cell indexes are generated for a data set as the data set is being formed into row groups of multiple rows, and then formed into data set parts of multiple row groups, in preparation for being persistently stored. Thus, it may be that, as each data set part is generated by a data aggregation thread in preparation for the persistent storage, that data set part is treated as a super cell for purposes of also generating a corresponding super cell index, and each row group within that data set part is treated as a data cell for purposes of also generating a corresponding cell index. As described in the "Distributed Indexing Cases" listed above, after being generated, the super cell indexes and accompanying cell indexes may then be transferred along with their corresponding data set parts between threads, processes, devices and/or sets of devices to remain readily available for use in increasing the efficiency with which the data set may be searched. Thus, where such a distributed index is generated as part of preparing a data set for being persistently stored in columnar form, the distributed index may be provided to a set of storage devices to be persistently stored along with the data set. At a later time, if an entire data set that has previously been persistently stored in columnar form is retrieved for distribution among multiple node devices, such a distributed index may be retrieved along with it, with each super cell index and its accompanying cell indexes being distributed to a node device together with its corresponding data set part.

However, in instances where just a subset of a data set that has previously been persistently stored in columnar form is to be retrieved, it may be that the distributed index corresponding to that data set is initially retrieved and used to determine which data set parts should be retrieved. More specifically, where there is a need to limit the retrieval of a data set to rows that include data within one or more specific columns that are of one or more specific values and/or that fall within one or more specific ranges, it may be deemed desirable to avoid retrieving at least data set parts that do not include any row groups that include any rows that meet such search criteria, since again, each data set part may be of considerable size and such that the retrieval of each data set part may consume considerable resources. In response to such a need, indications within the super cell index of highest and lowest data values for the specified one or more columns may be analyzed to identify one or more candidate data set parts that may have data rows that meet the search criteria. Then, for each candidate super cell, indications within the associated cell indexes of highest and lowest data values for the specified one or more columns may be analyzed to identify one or more candidate row groups that may have rows that meet the search criteria. Following such narrowing down to candidate row groups, just the data set parts that are identified as including such candidate row groups may then be retrieved from persistent storage, while not expending the resources required to retrieve the other data set parts.

Although it may be possible to generate indexes that include indications of specific values and/or ranges of values for all columns, it is envisioned that the data values of a relatively small subset of the columns may be used in search criteria. In some embodiments, the subset of columns used in such search criteria may be well known and may be explicitly specified (e.g., as part of a columnar schema for a data set). In other embodiments, there may alternatively or additionally be a specification of rules and/or heuristic algorithms for the identification of the subset of columns based on a history of previous queries and/or other factors. Regardless of the manner in which the subset of columns is specified and/or identified, the generation of cell indexes and super cell indexes by the multiple node devices may be limited in scope to such a subset of the columns to avoid expending excessive resources in generating an overly inclusive distributed index.

In generating each cell index, the data values in the subset of columns within each of the rows of the corresponding row group are retrieved. As another measure to increase the efficiency with which each cell index is generated, such retrieval of data values for multiple rows may be performed in a single read pass through the rows of the corresponding row group. For each cell index that is to be generated, a separate binary tree may be generated for each column of the subset of columns that are to be included in the distributed index. As each such binary tree is generated, the various data values that are identified as present within the corresponding column of the subset of columns may be sorted in accordance with one or more rules that may be selected based on the type of data within the column. Also, as each such binary tree is generated, the binary tree may be used to identify any duplicates of any of the data values identified as present within the corresponding column across all of the rows within the corresponding row group. As such duplicates among data values within a column in a row group are identified, tables and/or other data structures may be generated that correlate each instance of such a duplicate data value to an identifier of the row within the row group in which the duplicate data value is present.

With a binary tree for each column of the subset of columns so generated within each cell index for its corresponding row group, a separate index of unique values may be generated from each binary tree. Within each unique values index, the identifiers of the rows within which each unique data value was identified may be arranged in an order that corresponds to the order into which the unique data values were sorted during generation of the corresponding binary tree. Generation of each unique values index may entail an in-order traversal of the corresponding binary tree.

Each unique values index may also include and/or be accompanied by a count of the unique data values, indications of highest and lowest unique data values that were identified within the corresponding column across all of the rows of the corresponding row group, and/or highest and lowest hash values generated from the unique data values.

In some embodiments, one or more of the unique values indexes may include and/or be accompanied by a vector or other data structure of the unique data values also arranged in the order that corresponds to the order into which the unique data values were sorted during generation of the corresponding binary tree. Alternatively or additionally, one or more of the unique values indexes may include and/or be accompanied by a vector or other data structure of ordered hash values derived from the unique data values. In some of such embodiments, the determination of whether a vector of unique values and/or whether a vector of hash values is generated for each unique values index within a cell index may be based on the identified data type of the data values within the corresponding column of the corresponding row group. By way of example, for numeric values and/or fixed length text strings, a vector of the unique data values may be generated. However, data of variable data size and/or of large data size, such as audio and/or video streams, and/or such as text strings of variable length, a vector of hash values derived from each of the data values may be generated.

Where there are one or more tables or other data structures that have been generated to indicate duplicates of data values identified within one or more columns within a row group, such one or more tables or other data structures may be used to generate one or more indexes of duplicate values within the cell index. In some embodiments, each duplicate value index may be separately generated for a single duplicated data value, and may specify the one or more rows within the corresponding row group in which each duplicate of the data value is present. Each such duplicate value index may also include a count of the duplicates of the data value within the corresponding column across all of the rows within the corresponding row group.

Following the generation of a cell index for each row group of a data set part, the generation of indexes for the data set part may continue with the generation of a corresponding super cell index. Each super cell index may be generated to include indications of the highest and lowest data values identified within each column of the subset of columns across the row groups within the corresponding data set part. Additionally, each super cell index may be generated to include indications of the highest and lowest hash values among the highest and lowest hash values generated from unique data values for each row group. In generating each indication of the highest and lowest data values for a column within the super cell index, the highest and lowest data values for that column within each of the cell indexes for one of the row groups of the corresponding data set part may be retrieved, and the highest and lowest among the retrieved data values may be selected. More specifically, a binary tree may be generated using the highest and lowest values indicated within each cell index for a column among all of the row groups of a data set part, and then the highest and lowest values for the column within the rows throughout all of the row groups within the data set part may be identified from the binary tree.

Where there is a need to make use of such a distributed index to select data set parts of a data set to be retrieved from persistent storage, in some embodiments, one or more distributed operations threads of a control device may perform the retrieval of, and make such use of, the distributed index. In other embodiments, the control device may assign one or more reading threads executed within one or more node devices to perform at least a subset of such operations.

Regardless of whether it is the resources of the control device and/or a node device that performs operations to identify candidate data set portions, the identification of candidate data set parts may entail comparing the one or more discrete data values and/or ranges of data values specified as the search criteria to the range(s) of data values defined in each super cell index with indications of highest and lowest data values therein. By way of example, if the search criteria of a query indicates that a specific data value or a data value within a specific range of data values is required to be present in a specific column of any row that meets the search criteria, and if such a data value or range of data values so specified by the query falls entirely outside the range of data values defined by the highest and lowest data values indicated in a super cell index for the specific column across all the rows of all the row groups within the corresponding data set part, then that corresponding data set part cannot be a candidate data set part. Further, in embodiments in which the super cell indexes include an indication of a range of hash values defined by highest and lowest hash values for the specific column, and in which the query specifies one or more discrete data values as the search criteria, a hash value may be generated from each such specific data value, and each such hash value may be compared to the range of hash values indicated in the super cell index as an additional test of whether the corresponding data set part can be a candidate data set part. Following the identification of one or more candidate data set parts (presuming any data set parts were identified as candidates), identifying candidate row groups within each candidate data set part may entail a similar comparison of the data values and/or ranges of data values specified as the search criteria to the range(s) of data values defined in each cell index with indications of highest and lowest data values therein. Further, such identification of candidate row groups may additionally entail the comparison of hash value(s) generated from specific data value(s) specified as the search criteria (if any specific data values were so specified) to the range(s) of hash values that may be defined in each cell index with indications of highest and lowest hash values therein.

In some embodiments, following the identification of one or more candidate data set parts, the control device may distribute the work of retrieving the candidate data set part(s) among multiple node devices. Following the retrieval of the candidate data set part(s), and following the identification of one or more candidate row groups within each candidate data set part, each of the multiple node devices may be caused by execution of reading threads to perform decompression and/or decryption of the candidate data set part(s) as needed to isolate the one or more candidate row groups within each candidate data set part, and may discard others of the row groups within the candidate data set parts that are not identified as candidate row groups. Such retrieval of whole candidate data set parts and discarding of non-candidate row groups may be necessary where the file system and/or file format used in persistently storing the data set, and/or where compression and/or encryption of the data set parts in preparation for being persistently stored, prevents retrieval of individual row groups from persistent storage. Otherwise, following the identification of the one or more candidate data set parts, and then the identification of one or more candidate row groups within each candidate data set part, the control device may distribute the work of retrieving the candidate row group(s) among the multiple node devices.

Regardless of the actual manner in which candidate row groups are retrieved and/or isolated from non-candidate row groups, the rows within each candidate row group may then be searched to identify one or more rows that meet the search criteria. In embodiments in which the unique values index for a column within the cell index for a corresponding candidate row group does not include or is not accompanied by a vector or other data structure of either the unique data values or hash values generated from the unique data values, the identifiers of rows that include each unique data value, and/or one or more duplicate value indexes, may be used to guide a search through the rows of the corresponding candidate row group. However, in embodiments in which the unique values index for a column within the cell index for a corresponding candidate row group does include or is accompanied by a vector or other data structure of either the unique data values or hash values generated therefrom, such a vector or data structure may be used to determine whether there are any rows in that candidate row group that meet the search criteria. If it is determined that there is at least one such row in embodiments in which the vector or other data structure is of hash values generated from the unique data values, then a search among the rows within that corresponding candidate row group to retrieve the one or more rows that meet the search criteria may be performed. In contrast, if it is determined that there is at least one such row in embodiments in which the vector or other data structure is of the unique data values, then the need to perform such a search may be obviated as a result of each of the unique data values within the vector or other data structure already being correlated by the unique values index to the row in which it is present.

As previously discussed, the processor(s) of each node device of the multiple node devices may execute multiple reading threads as part of performing the retrieval of at least a subset of a data set at least partially in parallel. Thus, the retrieval and/or isolation of candidate row groups may be performed in such a distributed manner across multiple reading threads across the multiple node devices, and so may the performances of searches for rows within the candidate row groups that meet the search criteria. In such embodiments, it may be that, for each row group in which at least one row meeting the search criteria is identified, the data values within that identified at least one row may be stored within a data buffer of a buffer queue to be provided to a provision thread. Where more than one rows meeting the search criteria are identified within a row group, the data values of those identified rows may be isolated from the data values of the other rows within that row group, and may be stored within a data buffer still in columnar form, but spanning just those identified rows.

As previously mentioned, in some embodiments, such factors as the processing resources of the set of storage devices, the choice of file system used in persistently storing data sets within the set of storage devices, and/or the choice of protocol used in exchanging data sets with the set of storage devices may result in the control device and/or the multiple node devices becoming more directly involved in various aspects of the manner in which data blocks of a data set are persistently stored within the set of storage devices, and/or the retrieval of those data blocks therefrom. As also previously mentioned, such direct involvement in such aspects may be carried out in a manner similar to what is described in one or more of the "Distributed File System Cases", one or more of the "Distributed Encryption Cases", and/or one or more of the "Distributed Grouping Cases" listed above. As described in various ones of those cases, in such embodiments, the control device may control the use of storage locations provided by the set of storage devices to store each data block. In so doing, the control device may control the division of data sets into the individual data bocks for storage and their re-assembly during retrieval, as well as controlling the assignment of operations to store and/or retrieve each data block by each node device through the provision thereto of pointers to specific storage locations provided by the set of storage devices. As also described in various ones of these cases, the control device may control the definition of various aspects of data files within which data sets are stored as data blocks and/or data sub-blocks, including defining aspects of the file header, the metadata, and/or the generation and storage of a map of the storage locations at which the data blocks and/or data sub-blocks are stored.

As also described in the "Distributed File System Cases", the "Distributed Encryption Cases", the "Distributed Grouping Cases" listed above, in preparation for being persistently stored, a data set may be broken up into numerous data blocks. Additionally, at least a subset of the data blocks may be broken up into data sub-blocks, and/or partitions may be defined as a mechanism to keep one or more groups of data blocks from being distributed among multiple node devices for the performance of processing operations. Thus, in embodiments in which the control device and the multiple node devices cooperate to persistently store a data set as multiple data set parts that each include multiple row groups in which the data values of multiple rows are organized in a columnar matter, and in which the control device and the multiple node devices are to exercise control over the organization of individual data blocks within the set of storage devices, the manner in which the persistent storage and retrieval of row groups and data set parts are performed may be caused to resemble the manner of performance of storage and retrieval of either data blocks and data sub-blocks, or partitions and data blocks described in those various cases.

More specifically, in such embodiments, where a data set is to be persistently stored, the control device may provide the node devices with a separate pointer indicating where each data block (which, again, may correspond to a row group or a data set part) is to be stored within storage space provided by the set of storage devices, and may generate map data that includes at least indications of the size and storage location within the set of storage devices of each of those data blocks. Also, where the data set is to be persistently stored in encrypted form, the control device may additionally generate separate encryption data for each data block, and provide the encryption data to the node devices along with the pointers for use in performing the encryption of each data block. The multiple node devices may use those pointers to store the data blocks where directed thereby. The control device may then store the map as one or more map blocks within the storage space provided by the set of storage devices along with the metadata. Also, where the data set is to be persistently stored in encrypted form, the control device may separately encrypt each map block, and each map block (except the last one) may store the encryption data needed to decrypt a next one of the map blocks, such that the map blocks must be decrypted in a chain in a particular order. Alternatively or additionally, the control device may encrypt the metadata, and may store the encryption data employed in encrypting the metadata in one of the one or more map blocks.

Correspondingly, in such embodiments, where a data set is to be retrieved from persistent storage in the set of node devices, the control device may initially retrieve at least the one or more map blocks of the map along with the metadata. Where the data set was persistently stored in encrypted form, the control device may perform the decryption of each map block and/or the metadata. Based at least on the indications of locations of data blocks in the map, the control device may then provide the node devices with pointers to the storage locations at which the data blocks were persistently stored as a mechanism to distribute the data set thereamong. Also, where the data set was stored in encrypted form, the control device may retrieve the encryption data for the data blocks from the one or more map blocks, and provide the encryption data to the node devices along with the pointers for use in performing the decryption of each data block. Each of the node devices may then use the pointers to retrieve the data blocks from persistent storage.

In some of such embodiments, the one or more storage devices may enforce various restrictions on the manner in which the data set, as well as such accompanying pieces of information as the map and/or the metadata, may be transmitted to the one or more storage devices for storage therein. By way of example, an upper limit may be placed on the quantity of distinct units of data into which the data set may be broken up for transmission to the one or more storage devices, and/or either or both of a minimum size threshold and a maximum size threshold may be placed on each distinct unit of data that is transmitted to the one or more storage devices. The control device and the multiple node devices may cooperate to group the data blocks to form segments of the data set that meet such a minimum size threshold and/or to reduce the overall quantity of distinct units of data, and/or to split data blocks that exceed such a maximum size threshold into multiple segments that don't. In the performance of such grouping, the control device may coordinate exchanges of data blocks among various ones of the node devices (in either encrypted or non-encrypted form) to cause a subset of the node devices to be provided with a sufficient quantity of data blocks as to be able to form segments that are large enough in size as to meet such a minimum size threshold, but not too large to meet such a maximum size threshold. Still further, depending on whether the overall size of at least the map data and the metadata combined is large enough in size to meet such an imposed minimum size threshold, the control device may provide the map data and/or the metadata (in encrypted or non-encrypted form) to one of the node devices to be included within a segment along with one or more data blocks.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
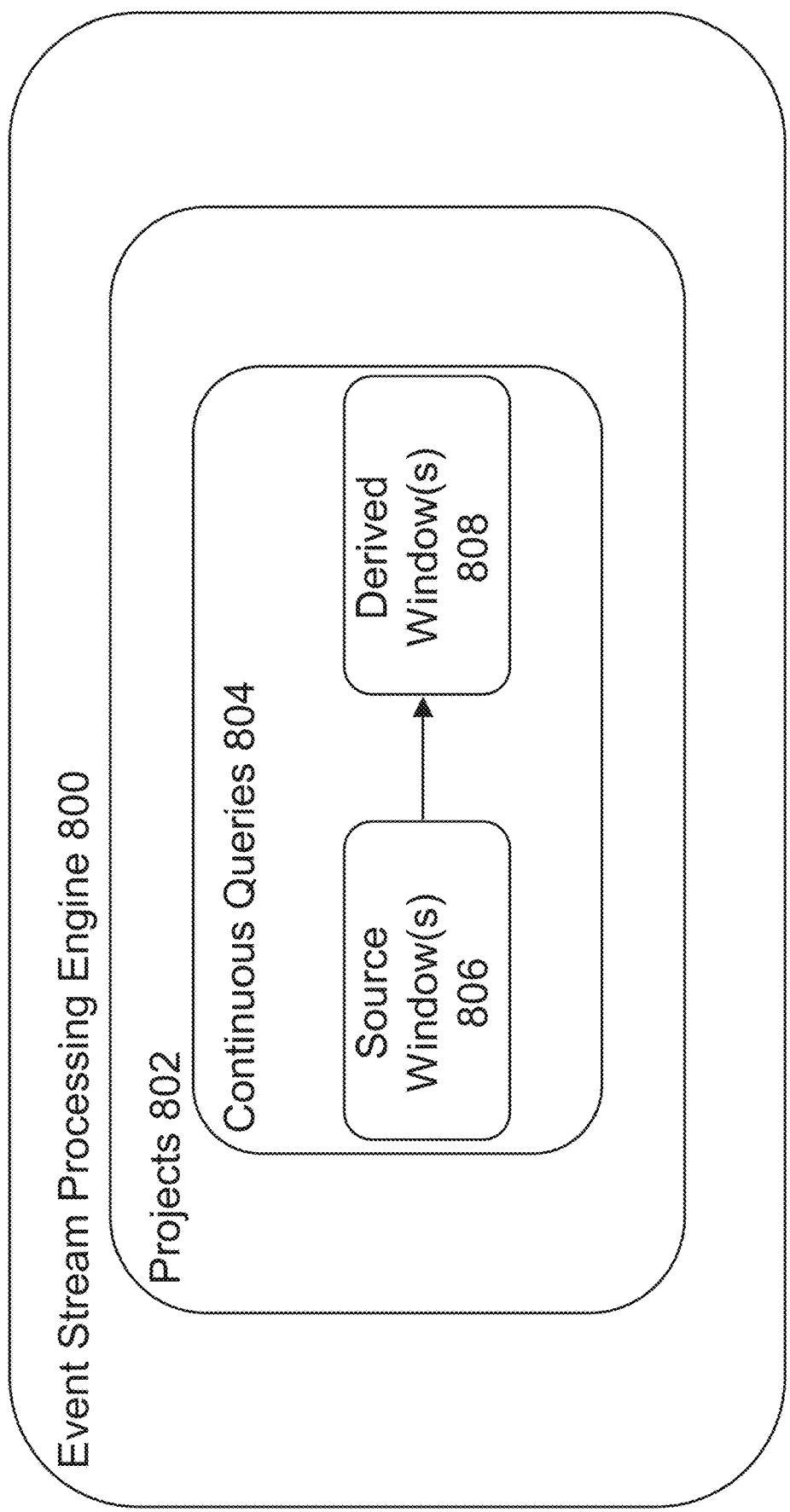
FIG. 8 illustrates a block diagram including components of an Event Stream Processing Engine (ESPE), according to embodiments of the present technology.
Figure 9:
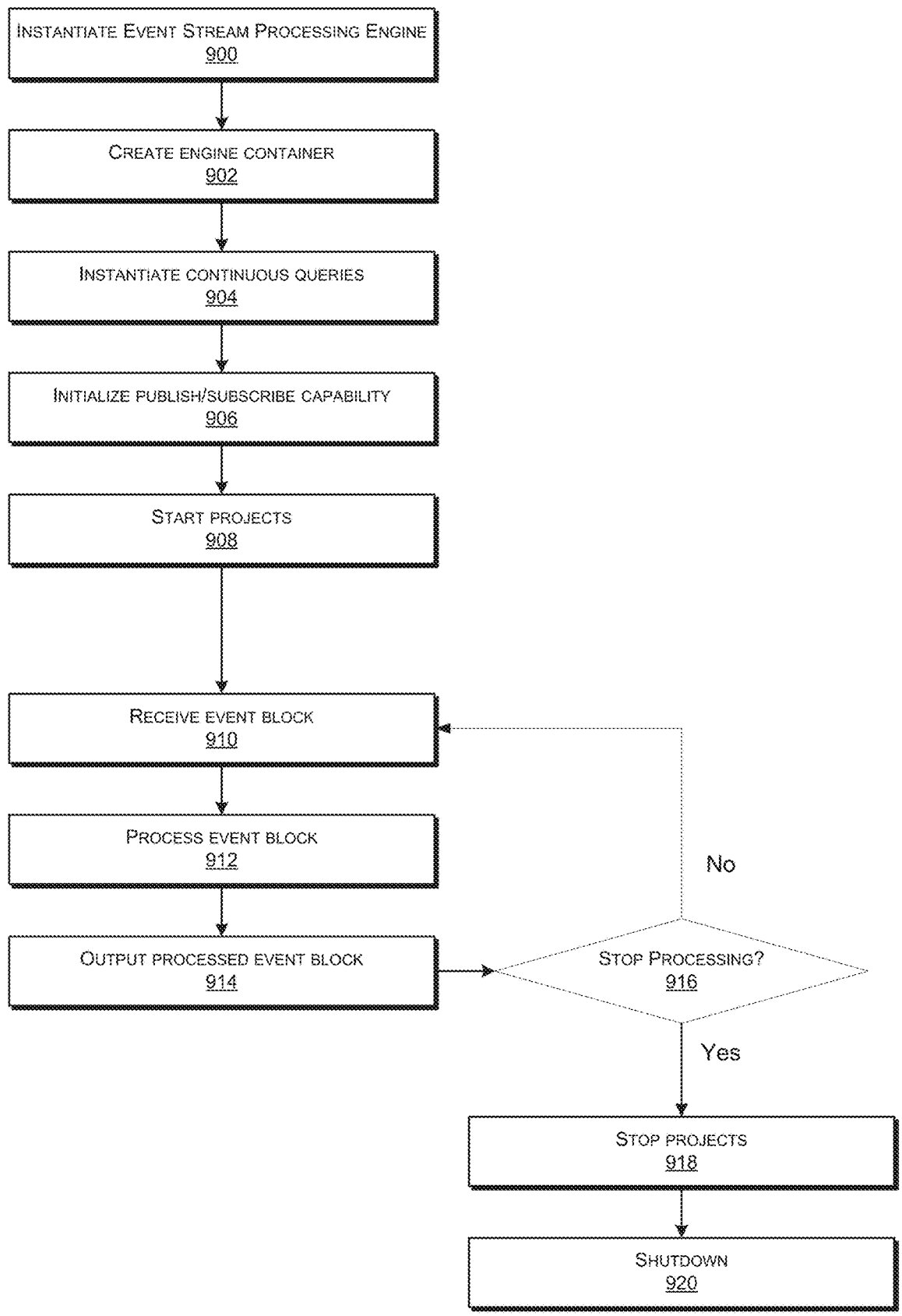
FIG. 9 illustrates a flow chart showing an example process including operations performed by an event stream processing engine, according to some embodiments of the present technology.
Figure 10:
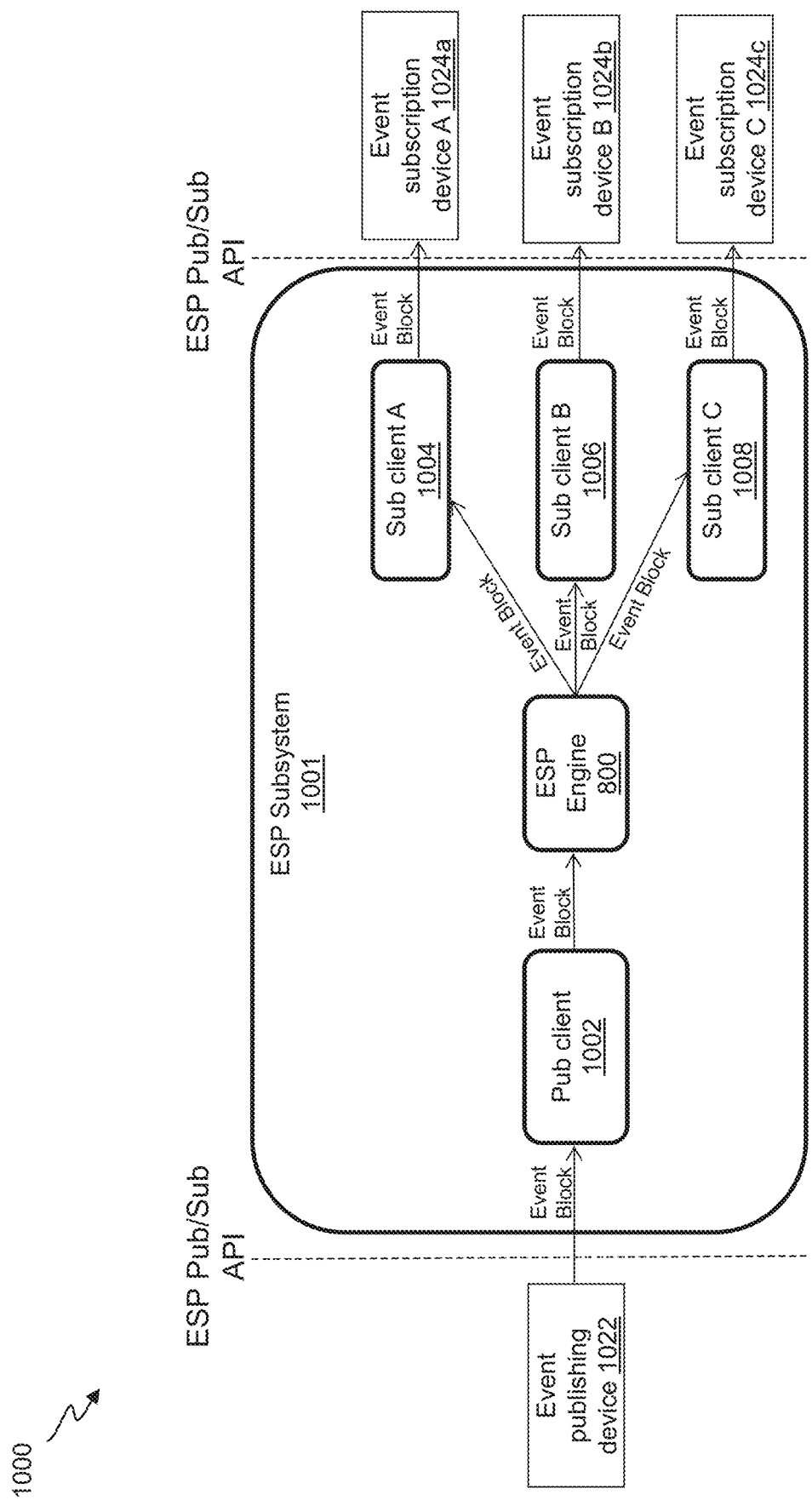
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
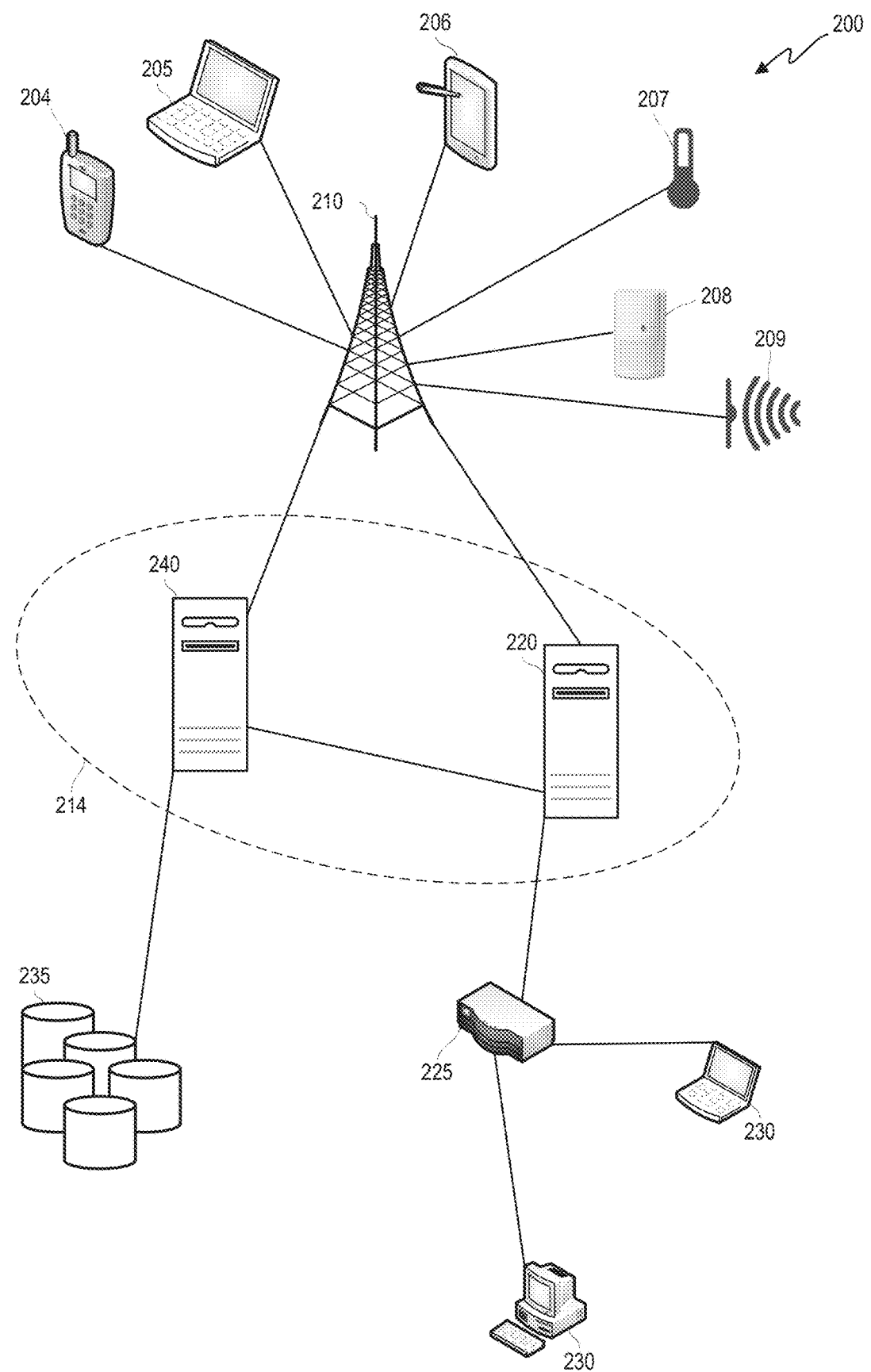
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
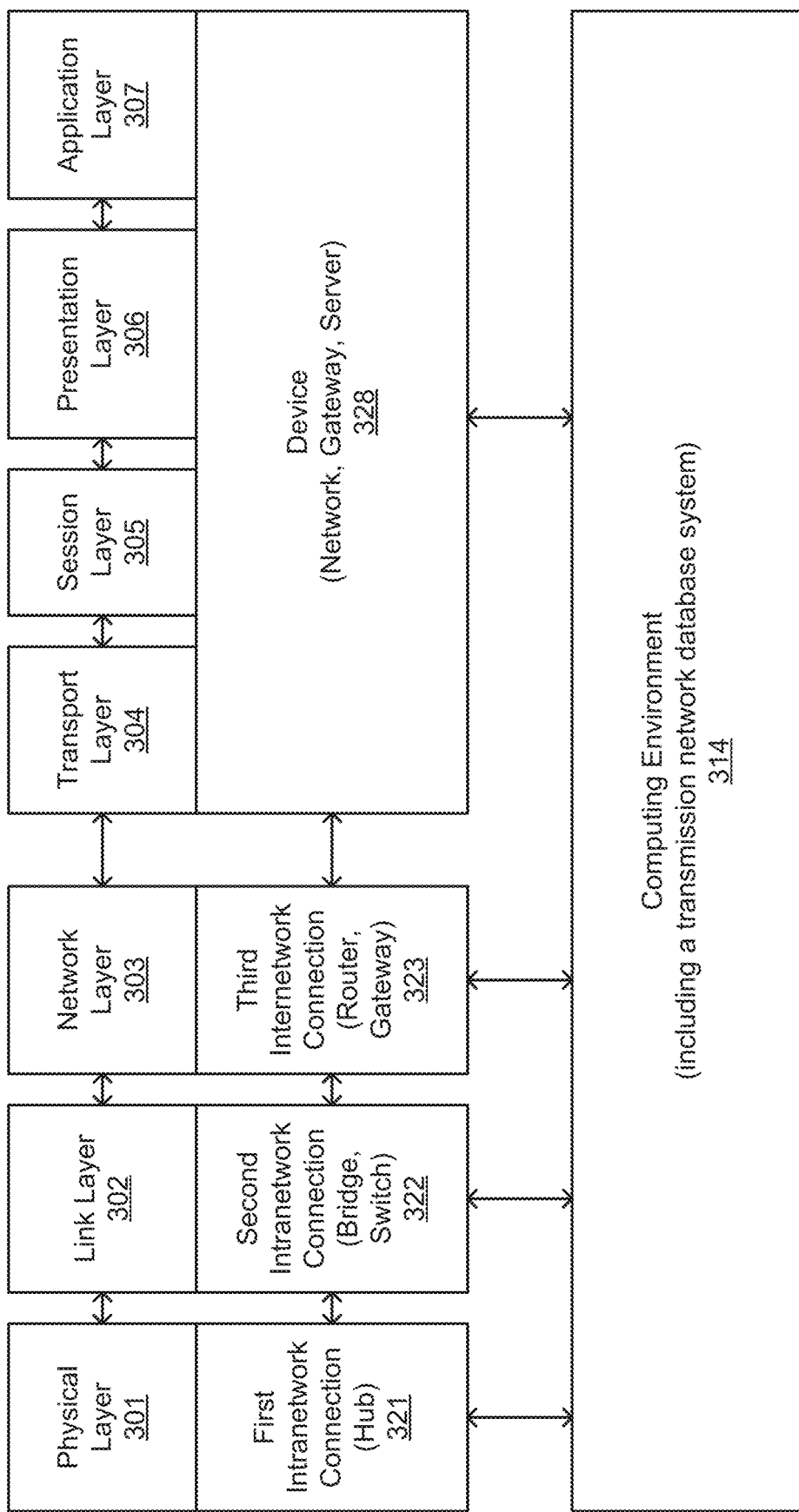
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
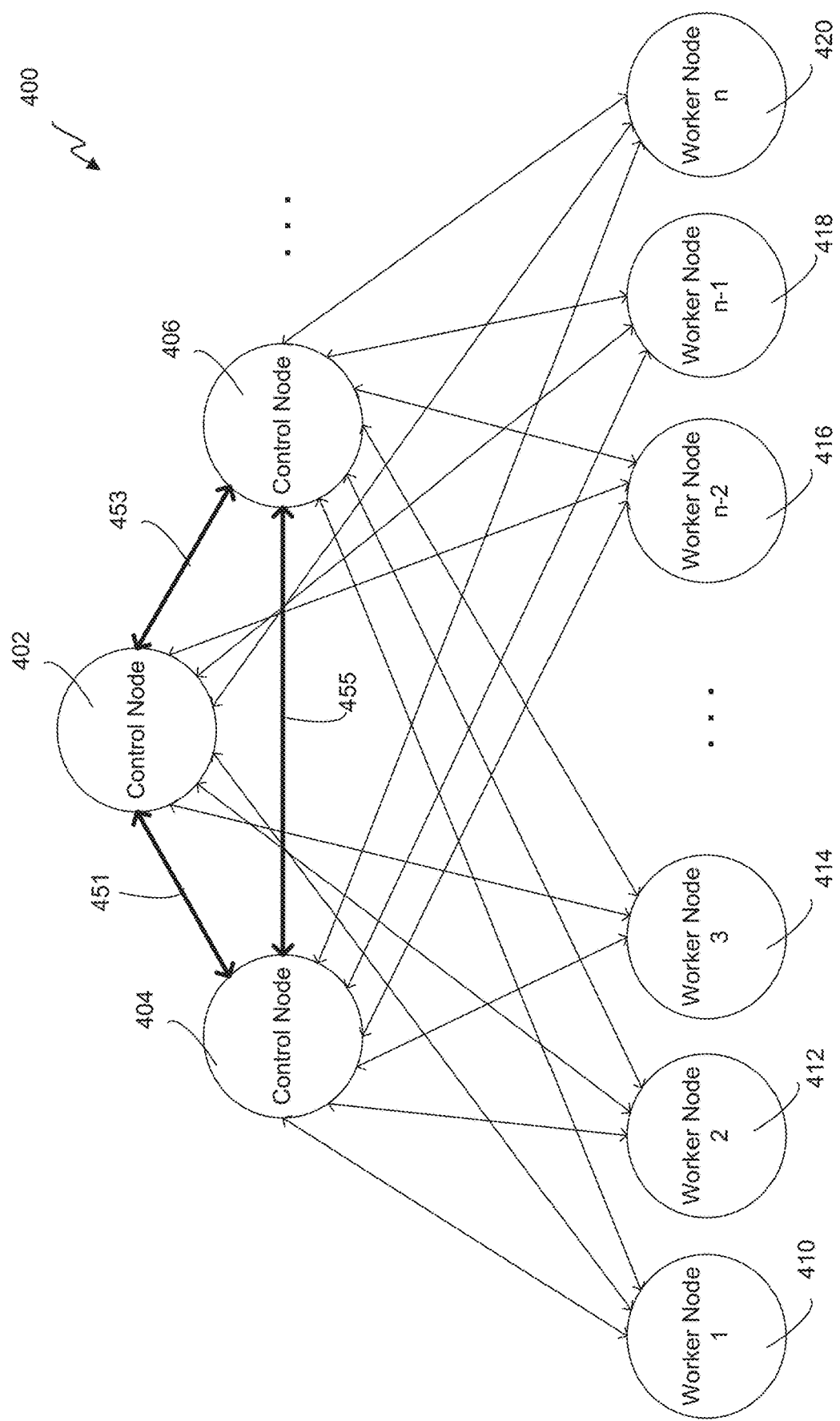
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection.

If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
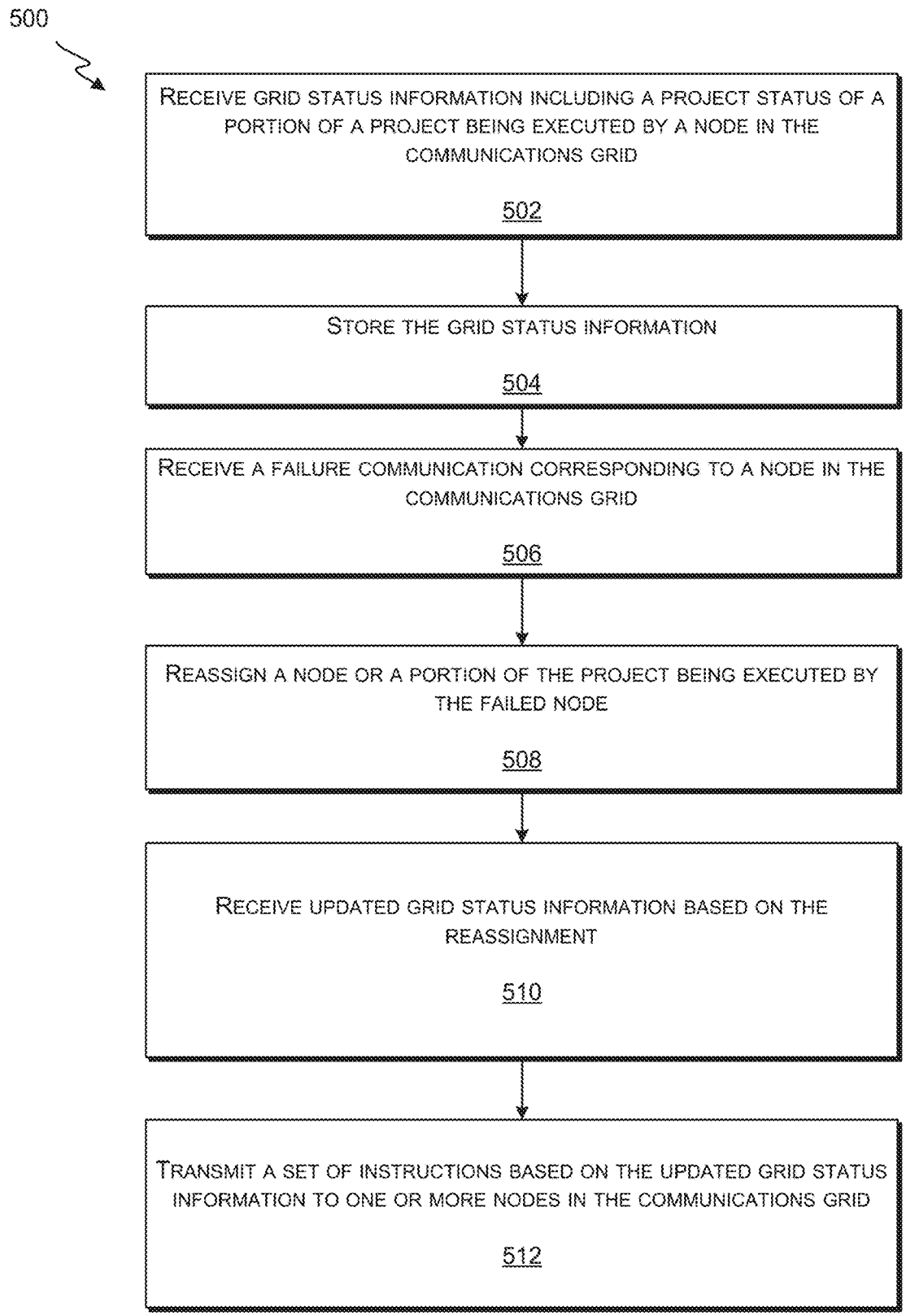
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
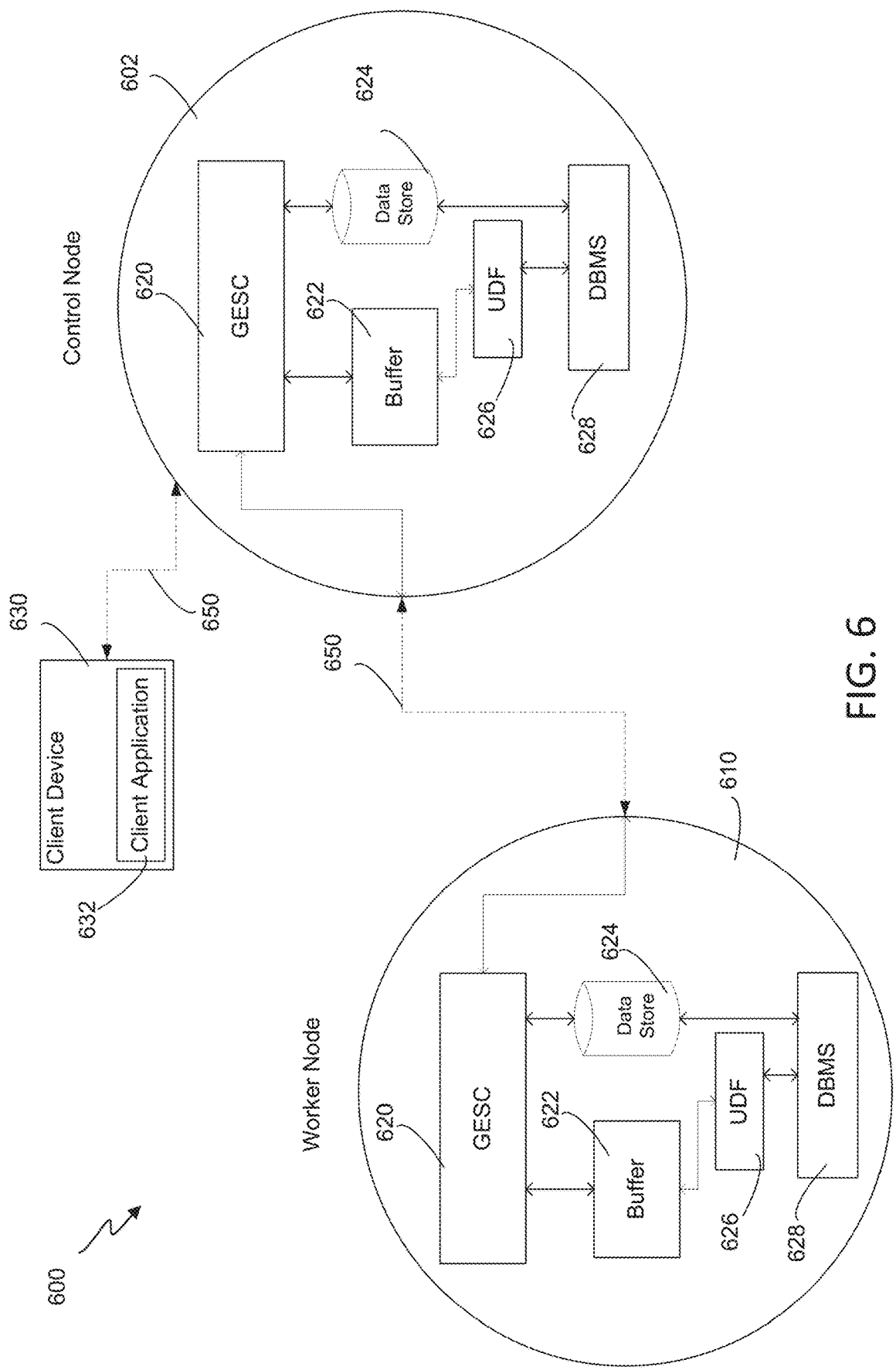
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
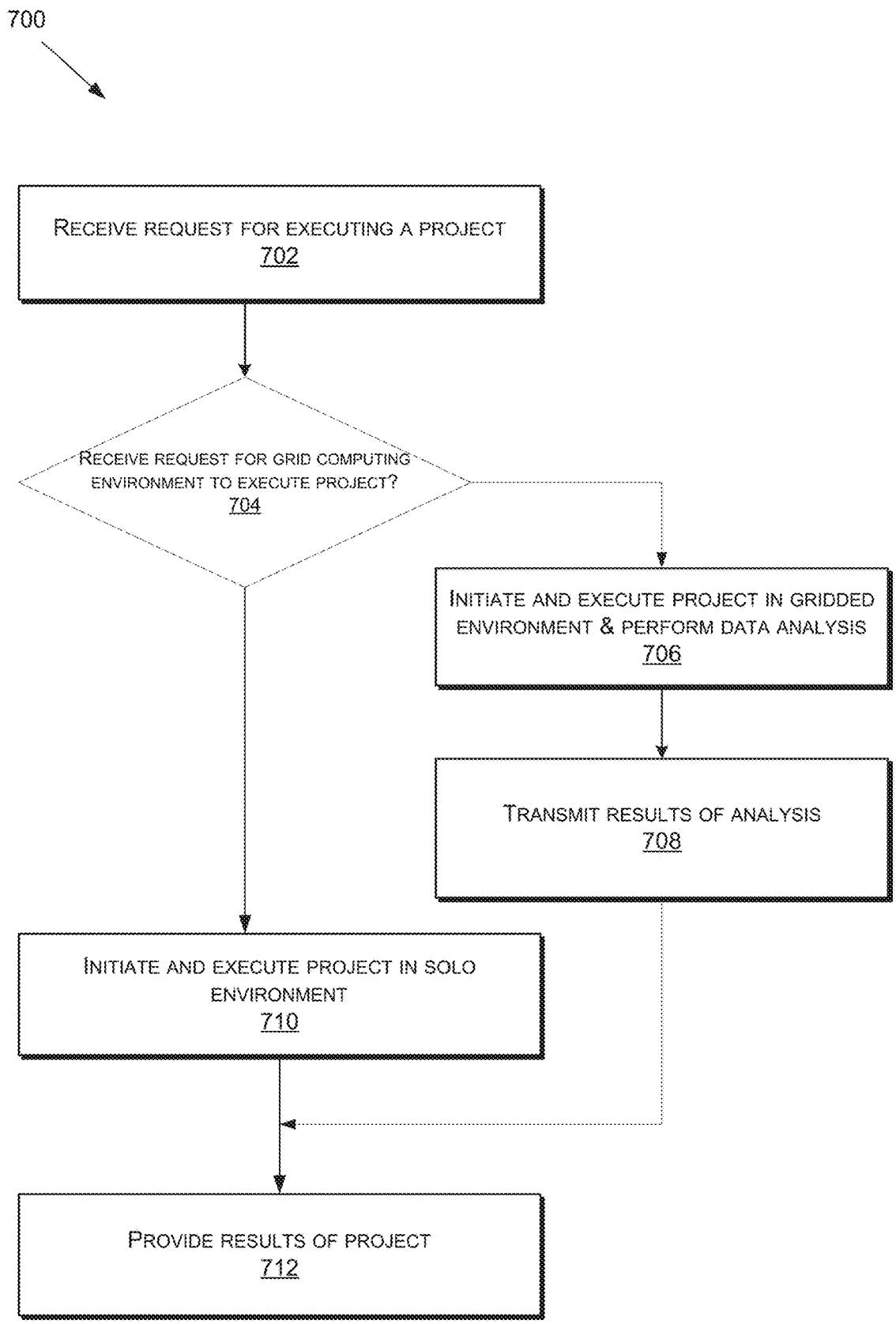
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a*-*c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a*-*c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
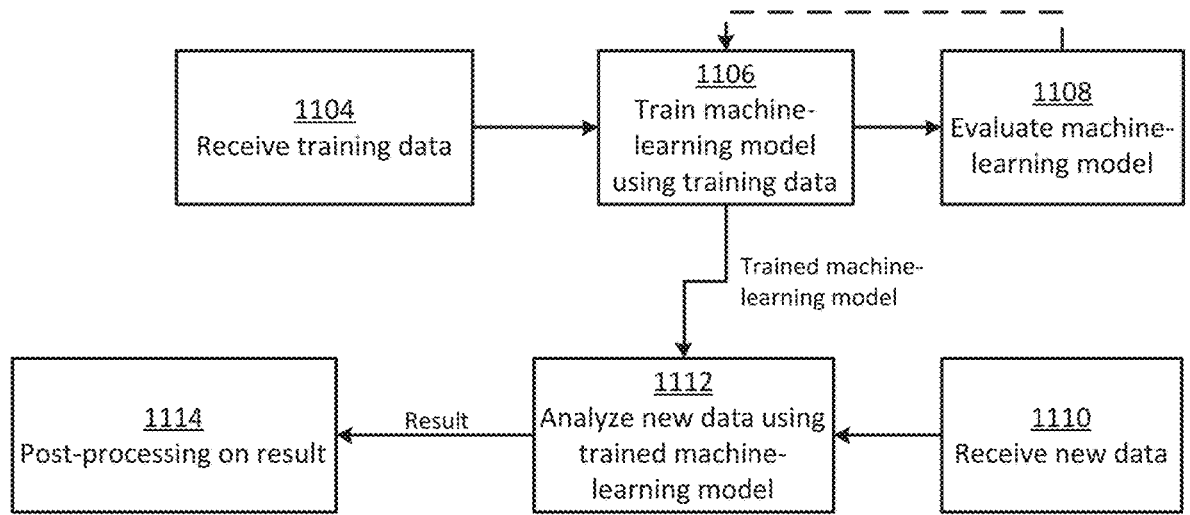
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
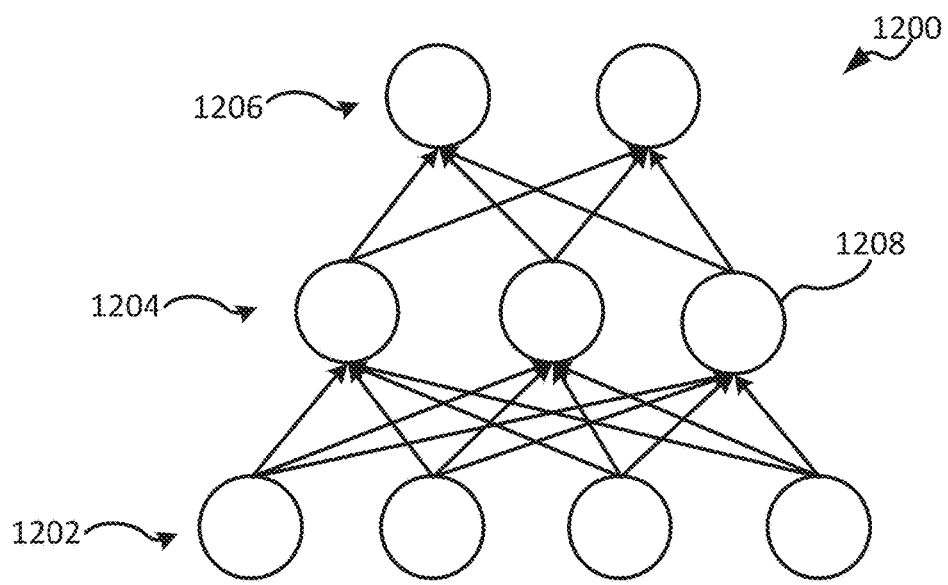
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 13A:
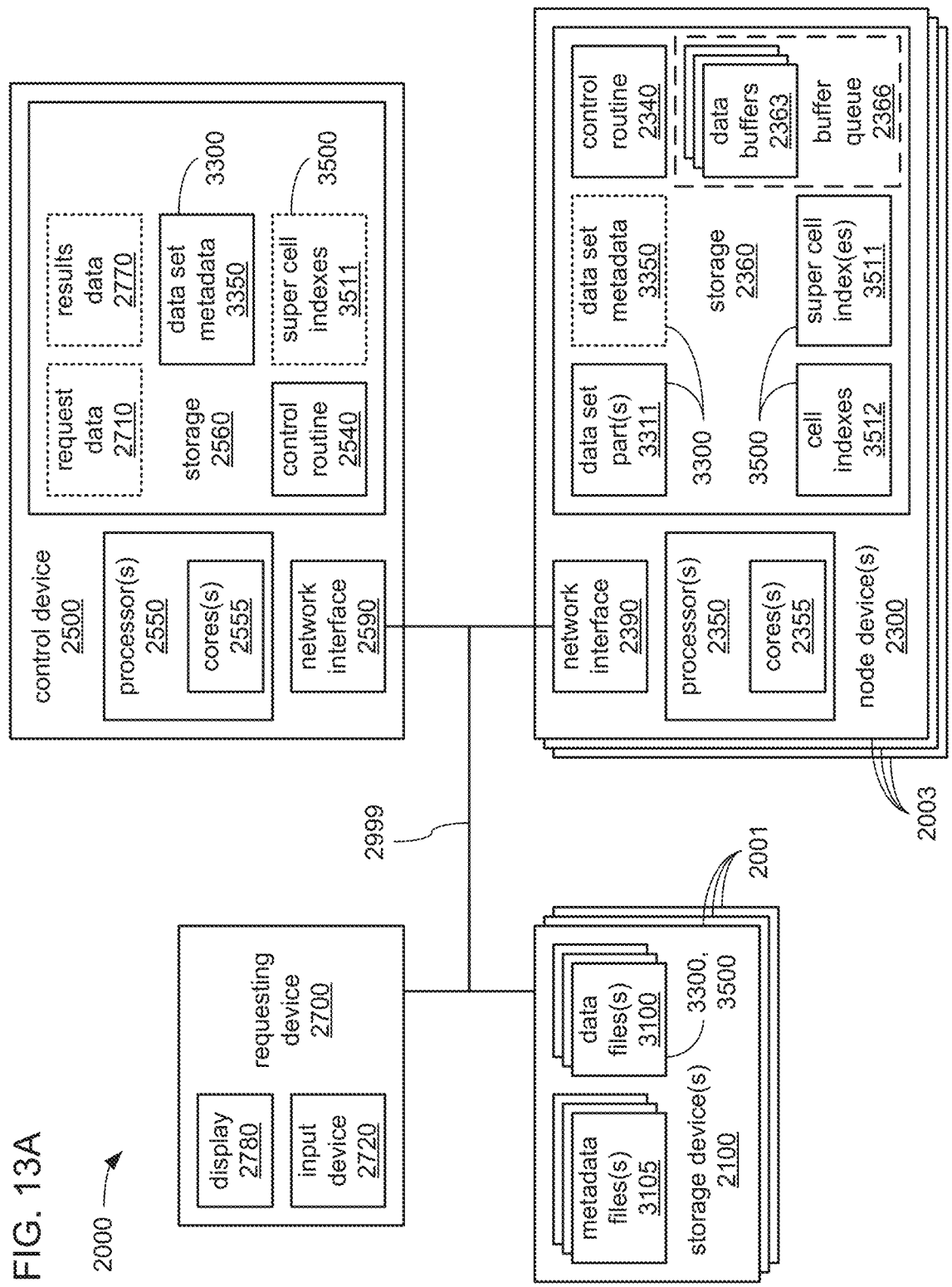
FIGS. 13A and 13B each illustrate an example embodiment of a distributed processing system.
Figure 13B:
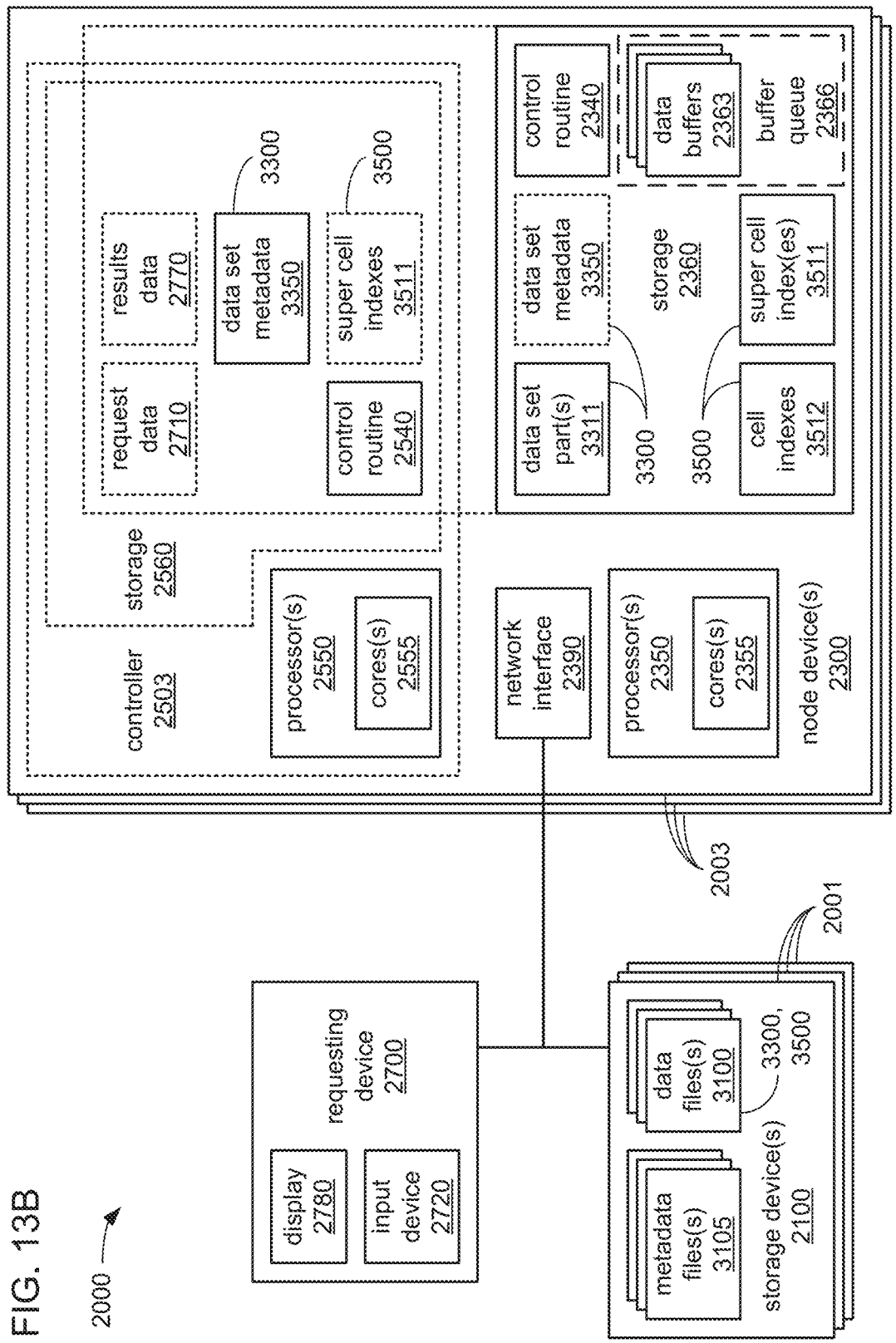

FIG. 13A illustrates a block diagram of an example embodiment of a distributed processing system 2000 incorporating one or more storage devices 2100 that may form a storage grid 2001, one or more node devices 2300 that may form of a node device grid 2003, at least one control device 2500 and/or at least one requesting device 2700 coupled by a network 2999. FIG. 13B illustrates a block diagram of an alternate example embodiment of the distributed processing system 2000 in at which one of multiple node devices 2300 may incorporate a controller 2503 to perform the functions of the entirely separate control device 2500 of FIG. 13A. In both of the embodiments of FIGS. 13A and 13B, the storage device(s) 2100 may persistently store a data set 3300 that may have been previously persistently stored therein by the node device(s) 2300 in a distributed manner that may be coordinated by the control device 2500 (or controller 2503), and which may be retrieved therefrom by the node device(s) 2300 in a distributed manner that may also be coordinated by the control device 2500 (or controller 2503). Such distributed persistent storage and/or such distributed retrieval of the data set 3300 may be occasioned by operations of an applications routine that may be executed in a distributed manner across the node device(s) 2300, and/or in response to a request received from the requesting device 2700 to perform one or more operations with at least a subset of the data set 3300. As will be explained in greater detail, the data set 3300 may be persistently stored by the storage devices 2100 as one or more data files 3100, and with its data values organized in columnar form. As will also be explained in greater detail, a data set index 3500 may be generated in a distributed manner by the node device(s) 2300 under the coordination of the control device 2500 to enhance subsequent search and/or retrieval of the data set 3300 from the storage device(s) 2100.

In support of such operations, the devices 2100, 2300, 2500 and/or 2700 may exchange portions of the data set 3300, portions of a corresponding data set index 3500, pieces of metadata concerning the data set 3300, and/or various commands and/or other information concerning assembling, indexing, searching and/or performing various operations with at least portions of the data set 3300 as an input and/or to generate at least portions of the data set 3300 as an output. In various embodiments, the network 2999 may be a single network that may extend within a single building or other relatively limited area, a combination of connected networks that may extend a considerable distance, and/or may include the Internet. Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

The data of a data set 3300 may be any of a variety of types of data concerning any of a wide variety of subjects, including and not limited to, technical or scientific data, patient or sociological data, shipping or activity tracking data, historical or real-time event data, geological or meteorological data, etc. As will be explained in greater detail, it is envisioned that the data set 3300 may be sufficiently large in size such that storage and/or processing of the entirety of the data set 3300 within a single device may be deemed to be at least impractical, if not impossible. Therefore, to facilitate storage and/or processing of the data set 3300 in a distributed manner across multiple devices, and as will be explained in greater detail, the data set 3300 may be divided into multiple data set parts 3311 that may be distributed among the node devices 2300, either as a result of each node device 2300 generating one or more of the data set parts 3311, or as a result of each node device 2300 being provided with one or more of the data set parts 3311 during retrieval of the data set 3300 from persistent storage within the storage device(s) 2100. Where a corresponding data set index 3500 is generated and/or maintained for the data set 3300, and as will also be explained in greater detail, the data set index 3500 may include a super cell index 3511 and/or multiple cell indexes 3512 that corresponds to each data set part 3311.

In some embodiments, multiple ones of the storage devices 2100 may be operated together (e.g., as a network-attached drive array, etc.) primarily for the purpose of persistently storing data, such as one or more data sets 3300 and/or corresponding data set indexes 3500. In such embodiments, the storage device(s) 2100 may be capable of exchanging the entirety of the data set 3300 with the node device(s) 2300 in a set of data transfers of the data set parts 3311 performed at least partially in parallel through the network 2999, and such transfers of the data set parts 3311 may be coordinated by the control device 2500 (or controller 2503). In such an exchange of the data set 3300, the data set index 3500 may also be exchanged along with the data set 3300. In some embodiments, the multiple ones of the storage devices 2100 may be accompanied by a storage control device (not shown) that may serve to coordinate storage operations among the multiple storage devices 2100 and/or may serve as a gateway controlling access to the data sets 3300 and/or data set indexes 3500 stored among the multiple storage devices 2100.

As previously mentioned, and as will be discussed in greater detail, it may be that all of the data set parts 3311 of a data set 3300 are persistently stored within a single one of the data files 3100, or it may be that a data set 3300 is persistently stored with its data set parts 3311 distributed among multiple data files 3100. Also, it may be that the metadata concerning details of a data set 3300, and/or the metadata concerning details of the data file(s) 3100 within which the data set parts 3311 of a data set 3300 are stored, may itself be stored within those same data file(s) 3100, or it may be that at least a portion of such metadata is stored within a separate metadata file 3103. In various embodiments, such aspects of the persistent storage of a data set 3300 may be at least partially determined by the choice of what file system is used by the storage device(s) 3100 in the persistent storage of data sets 3300, and/or what file type is used for the data file(s) 3100 in which a particular data set 3300 is persistently stored. Regardless of what file system is used and/or what file type(s) are used, as previously discussed, within each data set part 3311 that is persistently stored within the storage device(s) 2100, the data values may be organized in a columnar manner to enable more efficient retrieval and/or use as inputs in columnar form to the performance of various processing operations. It may also be that aspects of such columnar organization are described in metadata concerning details of a data set 3300 that may be included within the one or more data files 3100 and/or within such a separate metadata file 3103.

Where a data set index 3500 corresponding to a data set 3300 is generated and/or maintained, and as will also be explained in greater detail, the super cell indexes 3511 and/or cell indexes 3512 thereof may be stored within the one or more data files 3100 along with the data set parts 3311 to which they correspond. More specifically, it may be that each data set part 3311 stored within a data file 3100 may directly incorporate the super cell index 3511 and/or cell indexes 3512 that correspond to it. Alternatively, it may be that each data set part 3311 stored within a data set file 3100 may be accompanied within that data set file 3100 by its corresponding super cell index 3511 and/or cell indexes 3512. As still another alternative, it may be that a data set index 3500 corresponding to a data set 3300 is persistently stored in one or more entirely separate index files 3105.

In various embodiments, each of the multiple node devices 2300 may incorporate one or more of processors 2350, a storage 2360 and a network interface 2390 to couple each of the node devices 2300 to the network 2999. The processor(s) 2350 may incorporate multiple processing cores 2355 and/or other features to support the execution of multiple executable routines and/or multiple instances of executable routine(s) across multiple execution threads. The storage 2360 may store a control routine 2340, one or more data set parts 3311 of a data set 3300, data set metadata 3350 descriptive of various aspects of the data set 3300 and/or its persistent storage, one or more super cell indexes, and/or one or more cell indexes 3512. A portion of the storage 2360 may be allocated as a buffer queue 2366 in which a set of data buffers 2363 may be operated together as a form of circular or ring buffer that implements FIFO behavior. The buffer queue 2366 may be employed to provide a thread-safe mechanism to exchange data values of a data set 3300 between routines being executed on different threads. It may be that the quantities of threads on which routines are executed and/or the quantity of data buffers 2363 within the buffer queue 2366 is dynamically alterable.

The control routine 2340 may incorporate a sequence of instructions operative on the processor(s) 2350 to implement logic to perform various functions. In some embodiments, in executing the control routine 2340, the processor(s) 2350 of each of the node devices 2300 may be caused to operate the network interface 2390, at least partially in parallel with the processor(s) 2350 of one or more others of the node devices 2300, to transmit one or more data set parts 3311 of a data set 3300 to the storage device(s) 2100 for persistent storage, and/or to operate the network interface 2390 to receive one or more data set parts 3311 of a data set 3300 therefrom.

It should be noted that the node device(s) 2300 may be provided with data values of a data set 3300 and/or data set parts 3311 of a data set 3300 in various ways beyond the aforedescribed retrieval of data set parts 3311 from the persistent storage within the storage device(s) 2100. By way of example, in some embodiments, a data set 3300 may be generated within the node device(s) 2300 through the performance of any of a variety of operations, including and not limited to, the generation of simulated data associated with the performance of a Bayesian analysis and/or a regression analysis of a model of a system being evaluated (e.g., a simulation of human behavior in a building fire and/or the model on which the simulation is based). By way of another example, the node device(s) 2300 may be coupled to any of a variety of sensors and/or other data source devices that generate data values indicative of measurements that have been taken of natural phenomena (e.g., seismic or meteorological measurements) and/or of aspects of a scientific experiment (e.g., measured indications of particle emissions from a collider experiment).

Within each node device 2300 having the data values of one or more data set parts 3311 of a data set 3300 that is to be persistently stored, the processor(s) 2350 may be caused by execution of the control routine 2340 to perform various operations to separately prepare the data set values of each data set part 3311 for persistent storage. As will be explained in greater detail, the data values may be subject to various normalization operations (e.g., changes of data type, etc.), and/or grouped rows of data values of the data set 3300 may be reorganized from a row-wise organization and into a columnar organization. Also, such grouped rows of data values (either during or after reorganization into columns of data values) may be compressed and/or encrypted. Various aspects of the manner in which such operations may be performed may be determined by a columnar schema that may be included in the data set metadata 3350. The columnar schema may reflect choices of types of data formats, types of compression, types of encryption, etc. that are to be employed, and may be based on the type of data file 3100 into which the data set 3300 is to be persistently stored within the storage device(s) 2100. Alternatively or additionally, as such operations are performed, indications may be included in the data set metadata 3350 of aspects of the performances of those operations for each column of data values (e.g., whether compression needed to be performed, whether all of the data values in a column are identical, encryption values used, etc.). It may be that each data set part 3311 that is prepared for being persistently stored may include, and/or be otherwise accompanied by, its own data set metadata 3350.

Correspondingly, within each node device 2300 that receives one or more data set parts 3311 as part of the retrieval of a data set 3300 from storage, the processor(s) 2350 may be caused by execution of the control routine 2340 to perform various operations to reverse at least some of the aforedescribed preparations made to the data values of each data set part 3311 for persistent storage. As will be explained in greater detail, decryption and/or decompression may be performed to make the earlier-generated columns of data values more accessible. However, it may be that no reversal of the earlier reorganization of data values into a columnar organization is performed, as it may be that the columnar organization is more optimal for enabling the data values within each retrieved data set part 3311 to be used as input to the performance of various processing operations that may be performed within the node devices 2300. As part of performing at least such decryption and/or decompression operations, and/or as part of identifying individual data values, the processor(s) 2350 of each node device 2300 may employ indications within the data set metadata 3350 of relevant aspects of the columnar schema and/or specific indications for each data set part 3311 concerning operations that were previously performed in preparing each data set part 3311 for persistent storage.

In embodiments in which a data set index 3500 may be generated and/or maintained for a data set 3300, further execution of the control routine 2340 as part of further preparations of data set parts 3311 for persistent storage may cause the processor(s) 2350 of each of the node devices 2300 to generate super cell indexes 3511 and/or cell indexes 3512 for each data set part 3311. The processor(s) 2350 of each of the node devices 2300 may then be caused to also operate the network interface 2390 to transmit such super cell indexes 3511 and/or cell indexes 3512, along with the data set parts 3311 to which they correspond, to the storage device(s) 2100 for persistent storage. As will be described in greater detail, the super indexes 3511 and/or the cell indexes 3512 of a data set index 3500 may be subsequently retrieved from the storage device(s) 2100 for use in selecting data set parts 3311 of a data set 3300 to be retrieved and/or in enhancing searches within a retrieved data set 3300.

Amidst being caused to perform various ones of the aforedescribed operations as a result of executing the control routine 2340, the processor(s) 2350 of each of the node devices 2300 may be caused to allocate multiple execution threads to enable multiple instances of performances of such operations to occur at least partially in parallel. In so doing, the processor(s) 2350 may be caused to monitor the consumption of at least processing resources associated with each allocated thread on an ongoing basis, and to dynamically adjust the allocation of execution threads as needed to enable more or fewer instances of performances of each such operations to occur. Alternatively or additionally, the processor(s) 2350 of each of the node devices may be caused by further execution of the control routine 2340 to monitor the consumption of storage resources arising from use of data buffers 2363 within the buffer queue 2366 on an ongoing basis, and to dynamically adjust the quantity of data buffers 2363 within the buffer queue 2366 as needed to enable more or fewer thread-safe exchanges of data values between execution threads.

In various embodiments, the control device 2500 may incorporate one or more of a processor 2550, a storage 2560 and a network interface 2590 to couple the control device 2500 to the network 2999. The processor(s) 2550 may incorporate multiple processing cores 2555 and/or other features to support the execution of multiple executable routines and/or multiple instances of executable routine(s) across multiple execution threads. The storage 2560 may store a control routine 2540, data set metadata 3350 that includes at least the columnar schema applicable to all of the data set parts 3311 of a data set 3300, super cell indexes 3511, request data 2710 that may convey a request to perform various processing operations with a data set 3300, and/or results data 2770 that may be generated as a result of performing such requested processing operations.

The control routine 2540 may incorporate a sequence of instructions operative on the processor 2550 to implement logic to perform various functions. In executing the control routine 2540, the processor(s) 2550 may be caused to operate the network interface 2590 to coordinate performances by the node devices 2300, at least partially in parallel, of the aforedescribed various operations involved in communicating and cooperating with the storage device(s) 2100, through the network 2999, to persistently store and/or to retrieve data set parts 3311 of a data set 3300, and or corresponding super cells indexes 3511 and cell indexes 3512 of a data set index 3500. As will be explained in greater detail, the processor(s) 2550 may also be caused to provide the node device(s) 2300 with unique identifier values for use by the node device(s) 2300 in generating and assigning unique identifiers for each data set part 3311 of a data set 3300 that is being persistently stored.

As previously discussed, a variety of differing circumstances may trigger the persistent storage of a data set 3300 within storage space provided by the storage device(s) 2100, and/or the retrieval of a data set 3300 from such persistent storage. Many of such circumstances may include the provision of a request (e.g., in the form of the request data 2710 being provided to the control device 2500) to persistently store and/or to retrieve at least a portion of a data set 3300, or to coordinate the performance of operations among the node device(s) 2300 that include the persistent storage and/or retrieval of at least a portion of a data set 3300. By way of example, such a request may be received by the control device 2500 from another device (e.g., the requesting device 2700) that expressly commands the persistent storage of a data set 3300. By way of another example, a request for access to a particular portion of a data set 3300 may be similarly received from the requesting device 2700, and as will be explained in greater detail, may trigger the retrieval and use of a corresponding data set index 3500 in an effort to limit the retrieval of the data set 3300 to just one or more data set parts 3311 that are deemed to be candidates for including data values that meet search criteria specified in the request. By way of still another example, an application routine that is executed in a distributed manner by the processor(s) 2350 of multiple node devices 2300, under the coordination of the control device 2500, may request retrieval of at least a subset of the data values of a particular data set 3300 to use as input, and/or may request that a data set 3300 that has been generated and/or modified as a result of such execution of the application routine be persistently stored.

More specifically, in executing the control routine 2540, the processor(s) 2550 of the control device 2500 may be caused to operate the network to receive indications from each of the node devices 2300 concerning the available processing and/or storage resources of each on an ongoing basis to enable the processor(s) 2550 to dynamically allocate such resources. The processor(s) 2550 may also be caused to operate the network interface 2590 to receive various request data 2710 from other devices (e.g., the requesting device 2700), and may relay the request data 2710 (or a derivative form thereof) to at least a subset of the node devices 2300 as part of coordinating an at least partially parallel performance of one or more operations among at least the subset of the node devices 2300 in answer to the received request. Further, in executing the control routine 2540, the processor 2550 may be caused to operate the network interface 2590 to receive portions of the results of the performance of at least the search requested in the request data 2710, and to transmit the results of the distributed performance of operations among the node devices 2300 that may have been occasioned by the request (e.g., results data 2770) back to the requesting device 2700.

Amidst being caused to perform various ones of the aforedescribed coordinating operations as a result of executing the control routine 2540, the processor(s) 2550 of the control device 2500 may be caused to allocate multiple execution threads to enable multiple instances of performances of such coordination operations to occur at least partially in parallel. In so doing, the processor(s) 2550 may be caused to monitor the consumption of at least processing resources associated with each allocated thread on an ongoing basis, and to dynamically adjust the allocation of execution threads as needed to enable more or fewer instances of performances of each such coordination operations to occur.

Comparing FIGS. 13A and 13B, as an alternative to the distributed processing system including a separate and distinct control device 2500, one of the node devices 2300 may alternately incorporate the controller 2503, which may incorporate at least the processor(s) 2550. In differing embodiments, the controller 2503 may also incorporate a separate and distinct storage 2560, or may use a portion of the 2360 of the node device 2300 into which the controller 2503 is incorporated. To gain access to the network 2999, the processor(s) 2550 of the controller 2503 may operate the network interface 2390 of such a node device 2300 in lieu of there being a separate and distinct network interface for use by the processor(s) 2550.

It should be noted that some embodiments of the distributed processing system 2000 of FIG. 13A may include multiple ones of the control device 2500, and/or that some embodiments of the distributed processing system 2000 of FIG. 13B may include multiple node devices 2300 that may each include the controller 2503. It may be that the provision of multiple control devices 2500 or multiple controllers 2503 serves the purpose of providing redundancy in the functions performed thereby in which a failure within one control device 2500 or controller 2503 results in a takeover of the functions performed thereby by another control device 2500 or controlled 2503. Alternatively or additionally, in an amalgam of the distributed processing systems 2000 of FIGS. 13A and 13B, it may be that a node device 2300 incorporates a controller 2503 to take over the functions of a separate and distinct control device 2500 should a failure of the control device 2500 occur. Alternatively or additionally, it may be that multiple control devices 2500 and/or multiple controllers 2503 are incorporated into an embodiment of the distributed processing system 2000 to interact with what may be multiple ones of the requesting device 2700 in order to employ some degree of parallel processing in the receipt and handling of multiple instances of the request data 2710 received therefrom, each of which may trigger the distributed performances of various operations by various subsets of the node devices 2300 under the control of differing ones of the control device(s) 2500 and/or the controller(s) 2503.

In various embodiments, the requesting device 2700 may incorporate an input device 2720 and/or a display 2780 that may be operable to provide a graphical user interface (GUI), a command line interface (CLI) and/or an application programming interface (API) by which an operator of the requesting devices 2700 may enter specific operations to be performed in what may be a distributed manner in the distributed processing system 2000, and/or search criteria for the identification and/or retrieval of one or more data values of a data set 3300. As previously discussed, such entered operations and/or search criteria may be incorporated as the basis of a request for the performance of one or more operations in request data 2710 that may be transmitted via the network 2999 to the control device 2500. As also previously discussed, upon completion of such requested operations, results data 2770 that includes or is otherwise indicative of the results of the performance of such operations may be received by the requesting device 2700, and presented on the display 2780 for viewing by the operator.

It should be noted that some embodiments of the distributed processing system 2000 of FIG. 13A or FIG. 13B may include multiple ones of the requesting device 2700. It may be that an embodiment of the distributed processing system 2000 of either FIG. 13A or FIG. 13B is shared among a great many institutions and/or personnel thereof, and therefore, may routinely perform numerous searches and/or other processing tasks at least partially in parallel in response to the receipt of numerous instances of the request data 2710. As earlier discussed, such an embodiment of the distributed processing system 2000 of either FIG. 13A or FIG. 13B may incorporate multiple ones of the control device 2500 and/or of the controller 2503 incorporated into multiple ones of the node devices 2300 to more efficiently receive such multiple instances of the request data 2710, and to more efficiently control the performances of searches and/or other processing tasks in response.

Figure 14A:
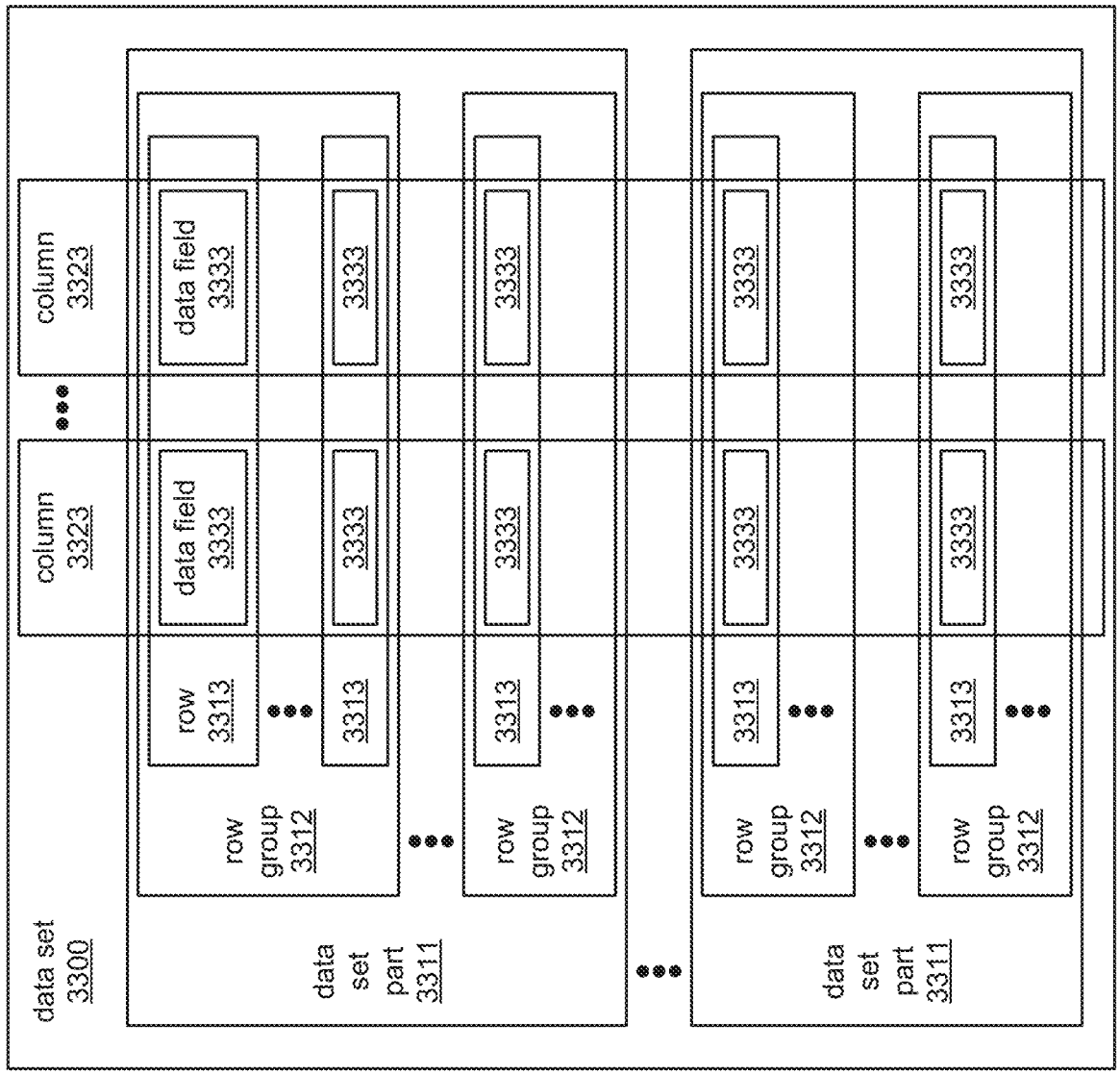
FIGS. 14A, 14B, 14C, 14D, 14E, 14F, 14G, 14H, 14I, 14J and 14K, together, illustrate an example of a data set.
Figure 14B:
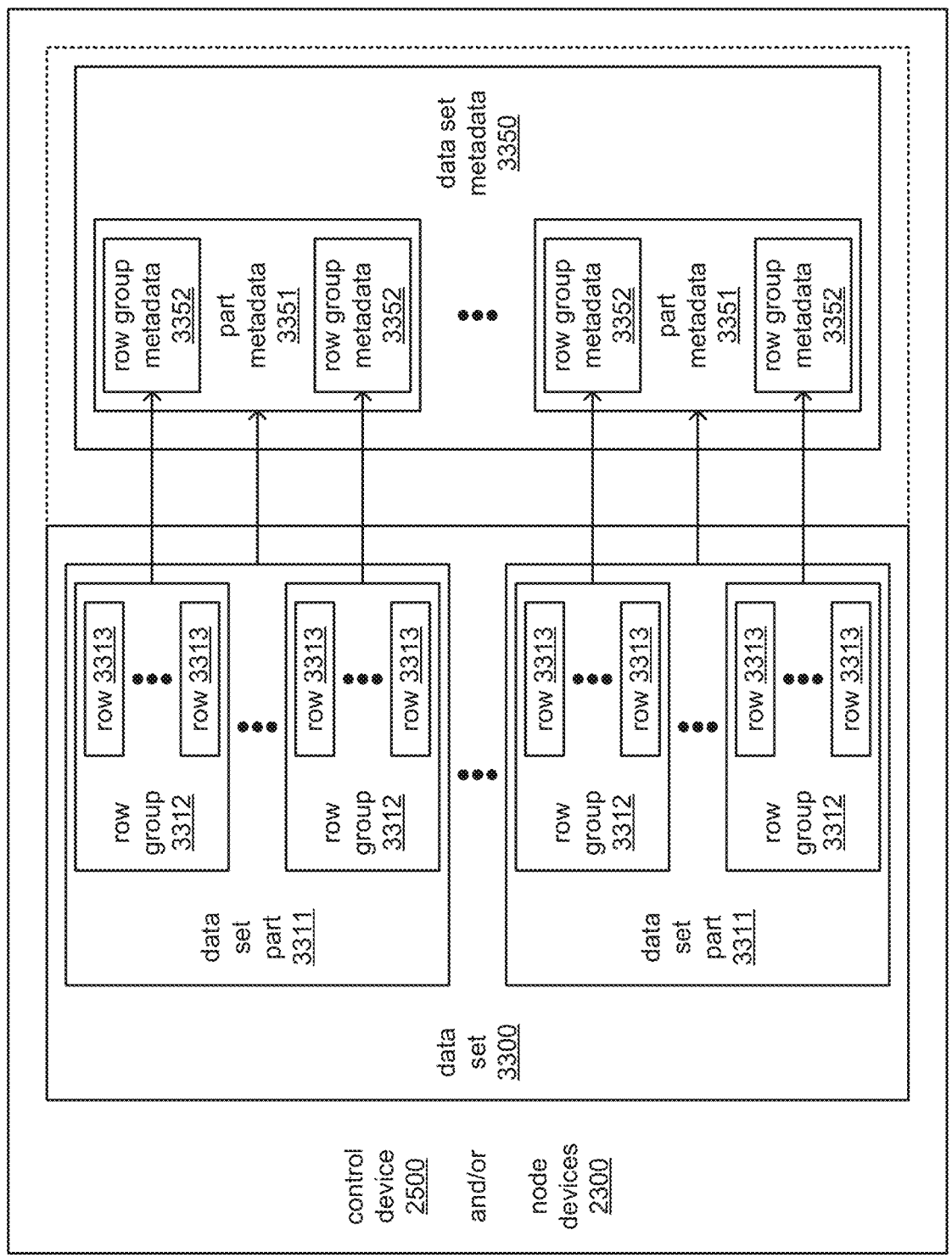
Figure 14C:
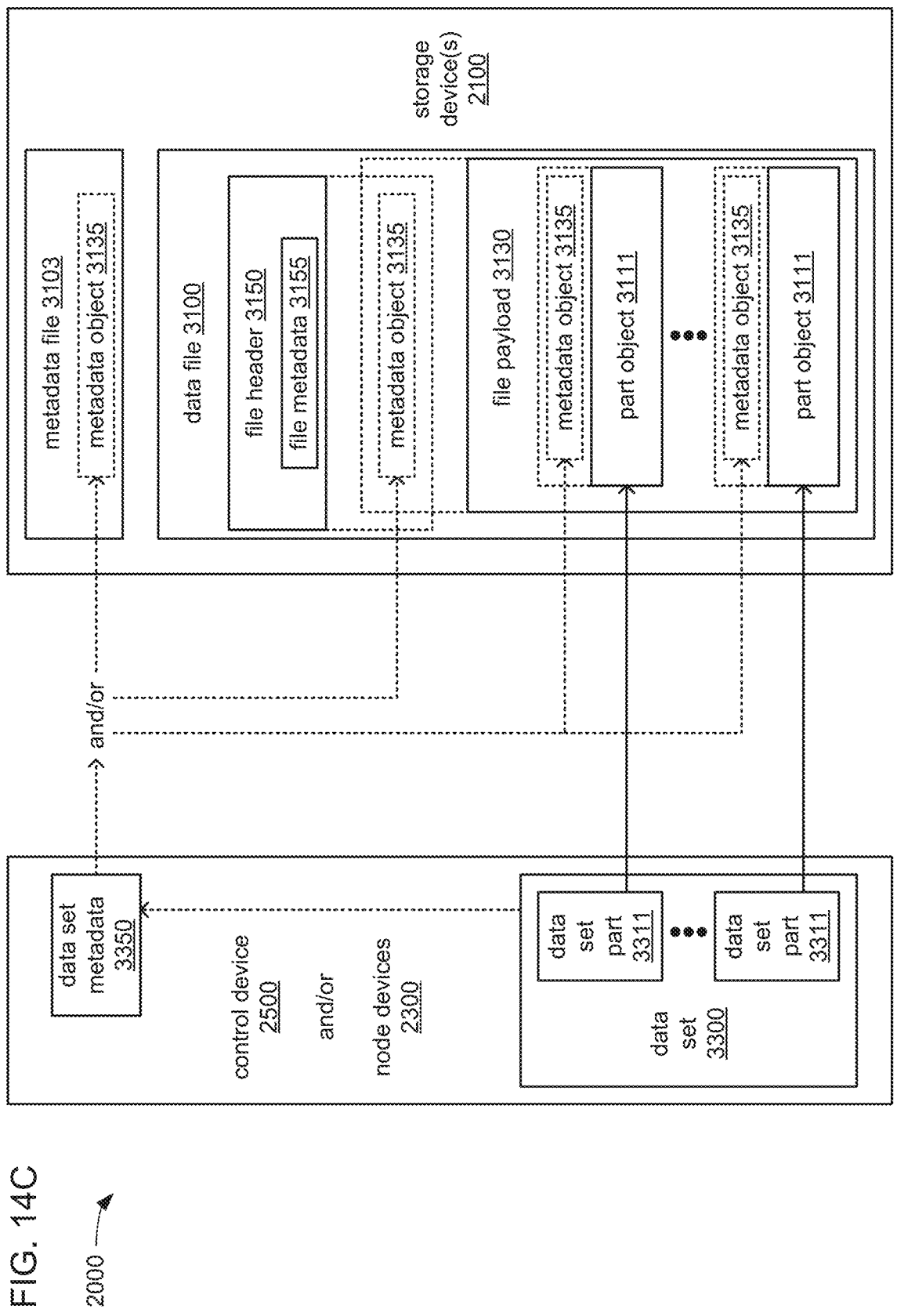
Figure 14D:
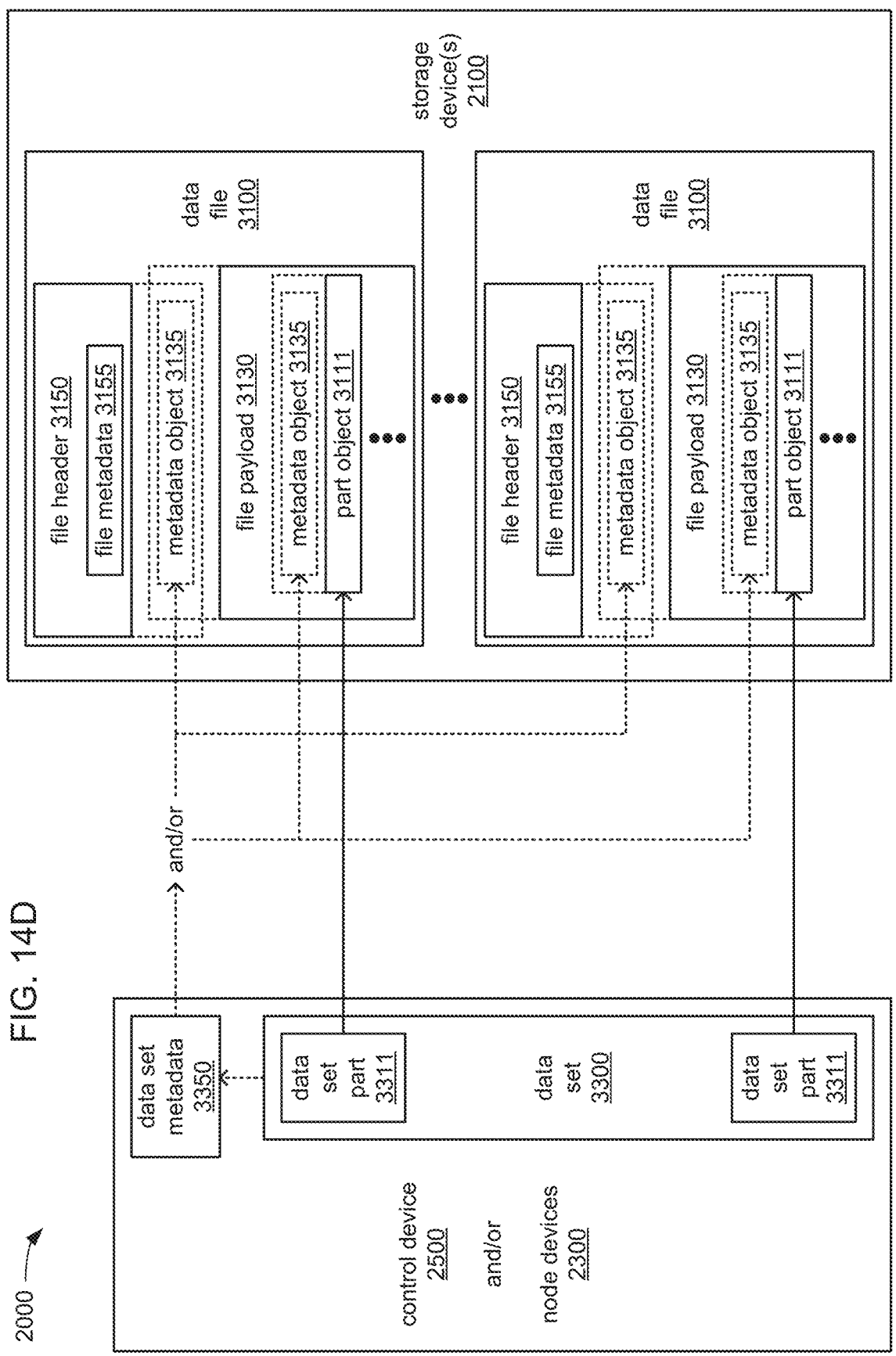
Figure 14E:
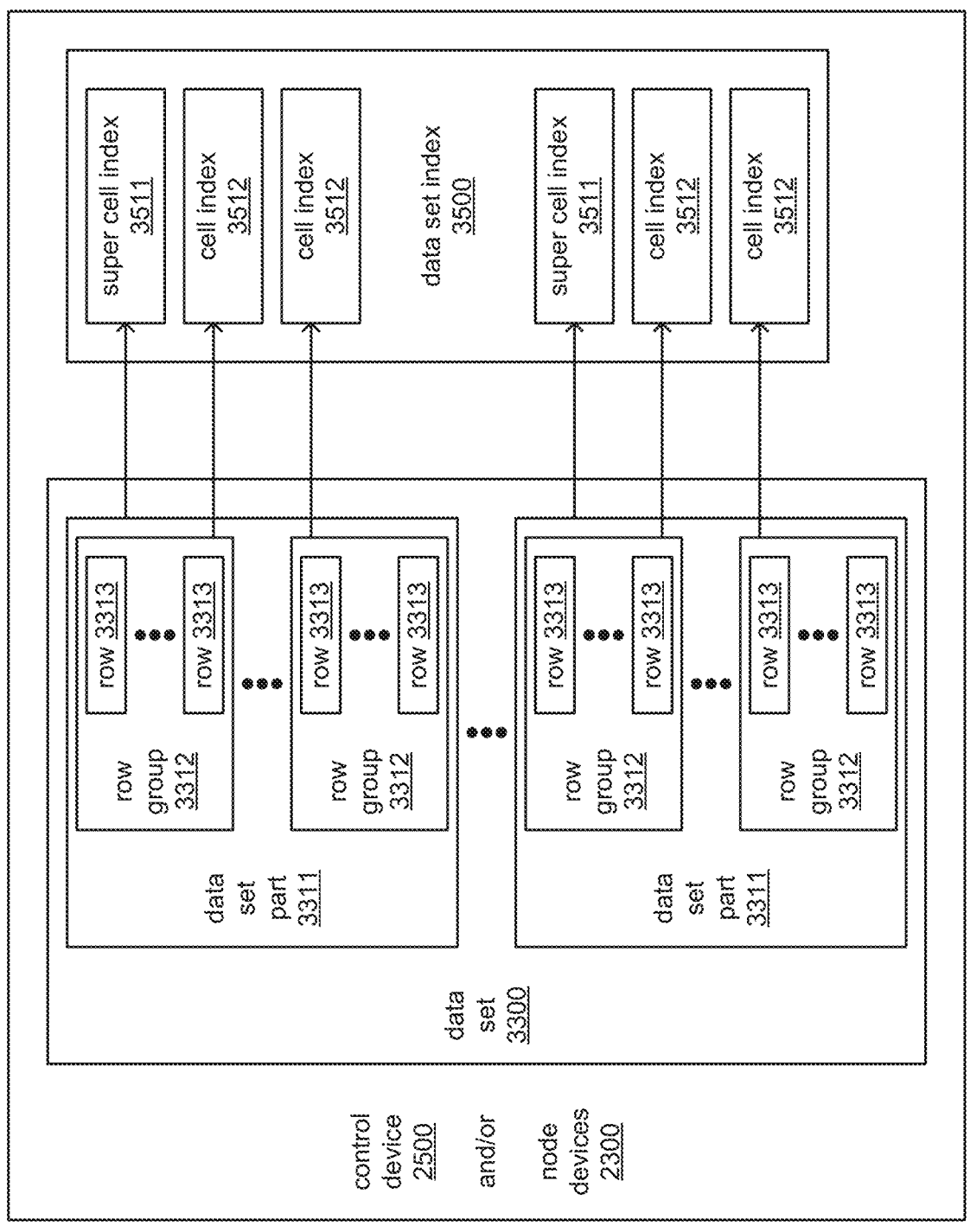
Figure 14F:
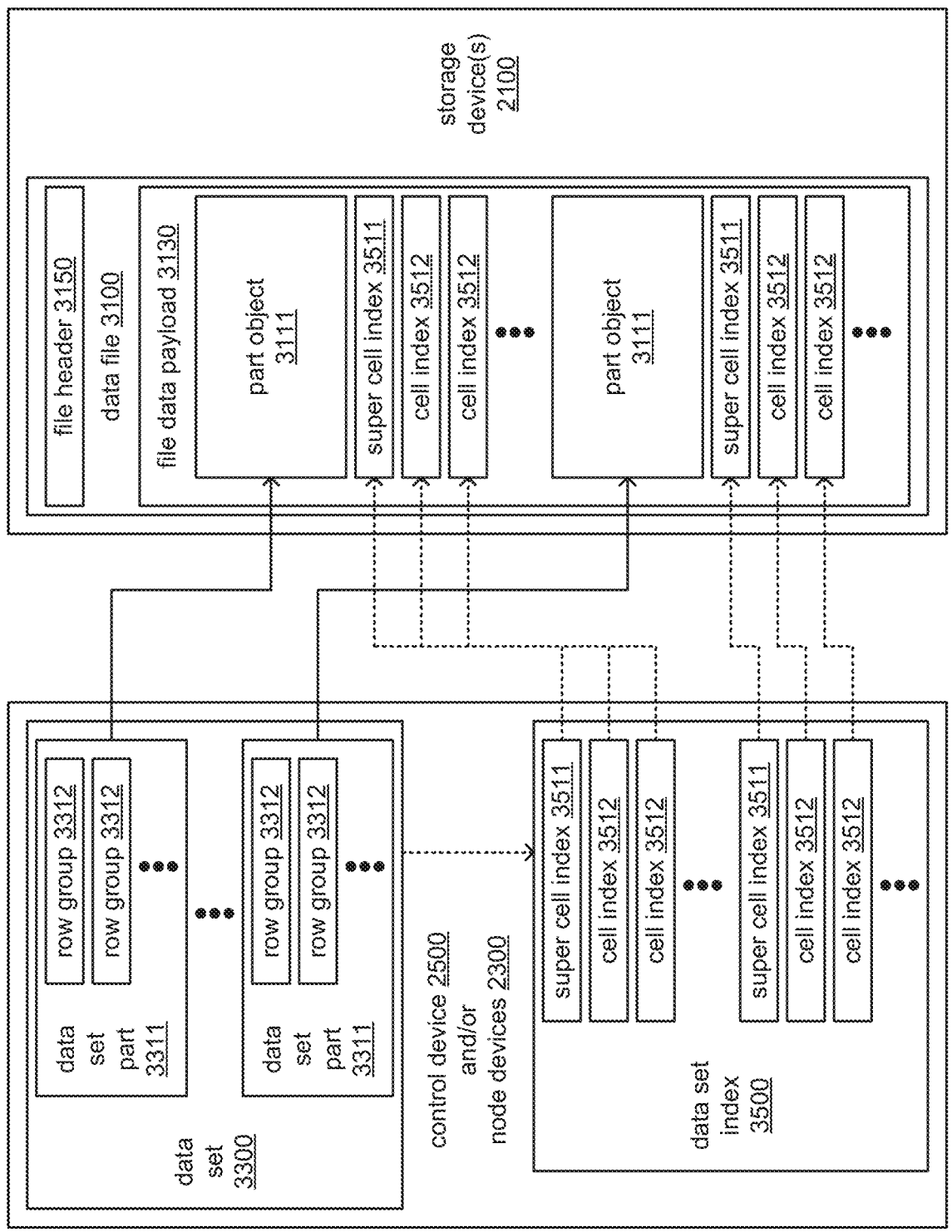
Figure 14G:
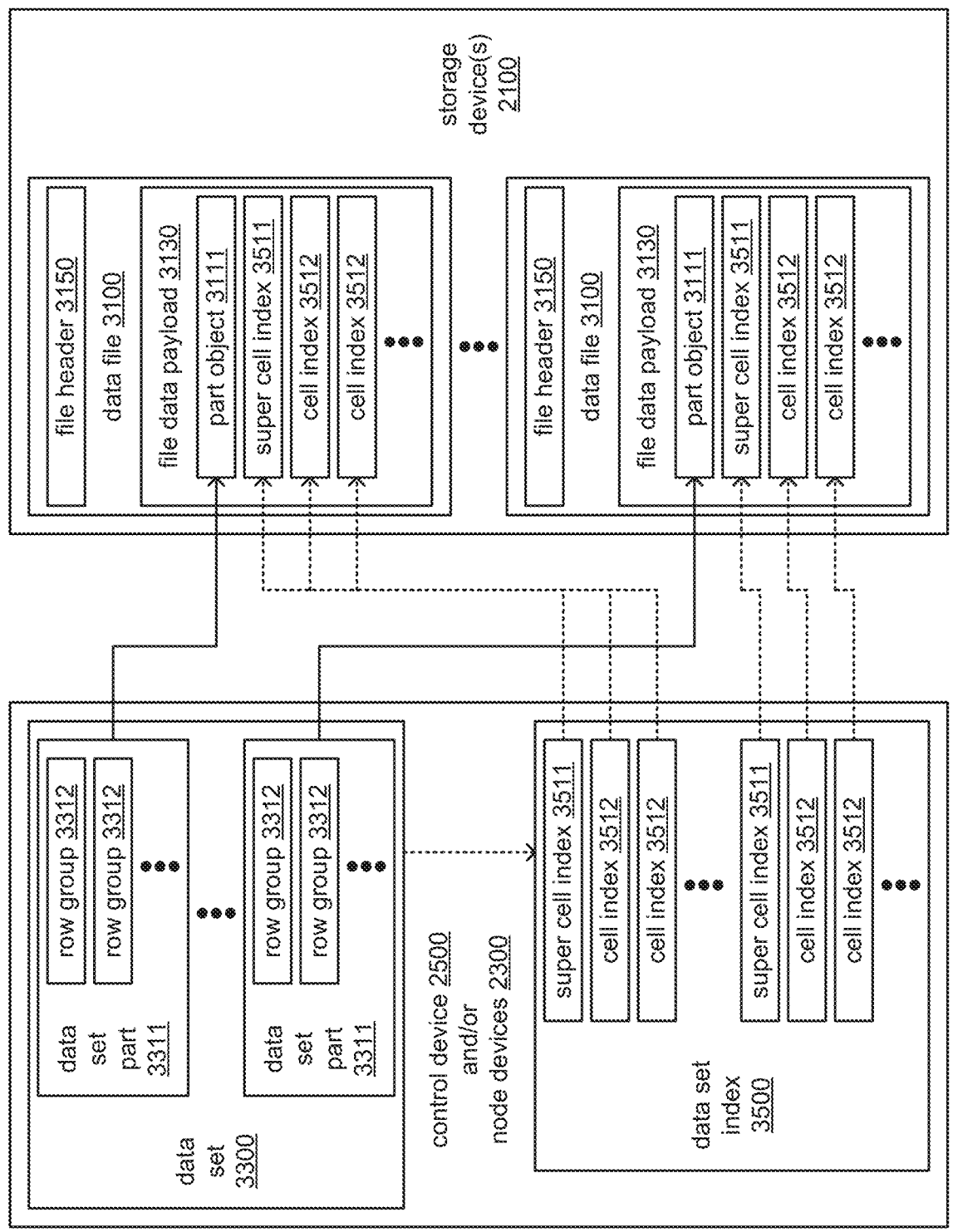
Figure 14H:
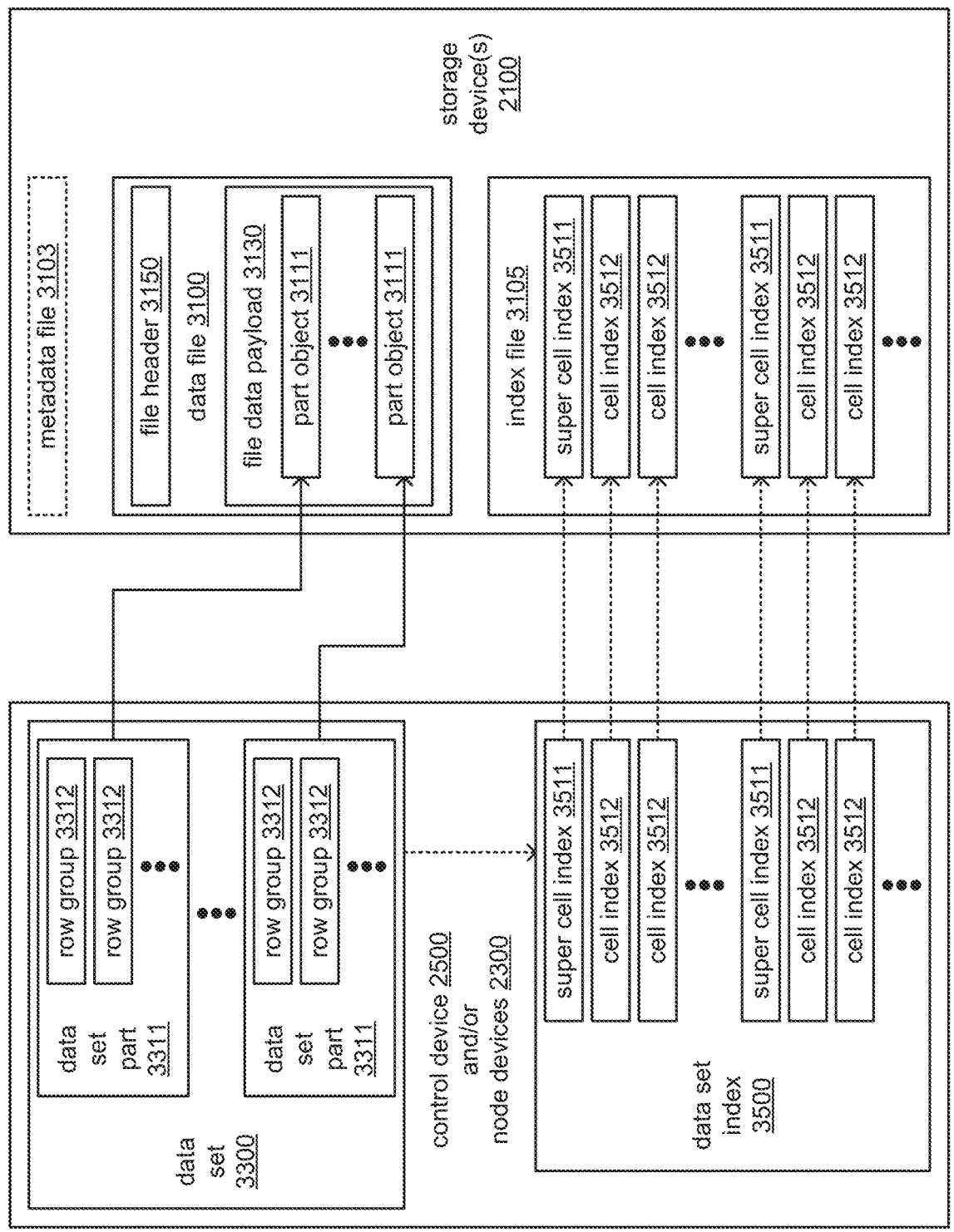
Figure 14I:
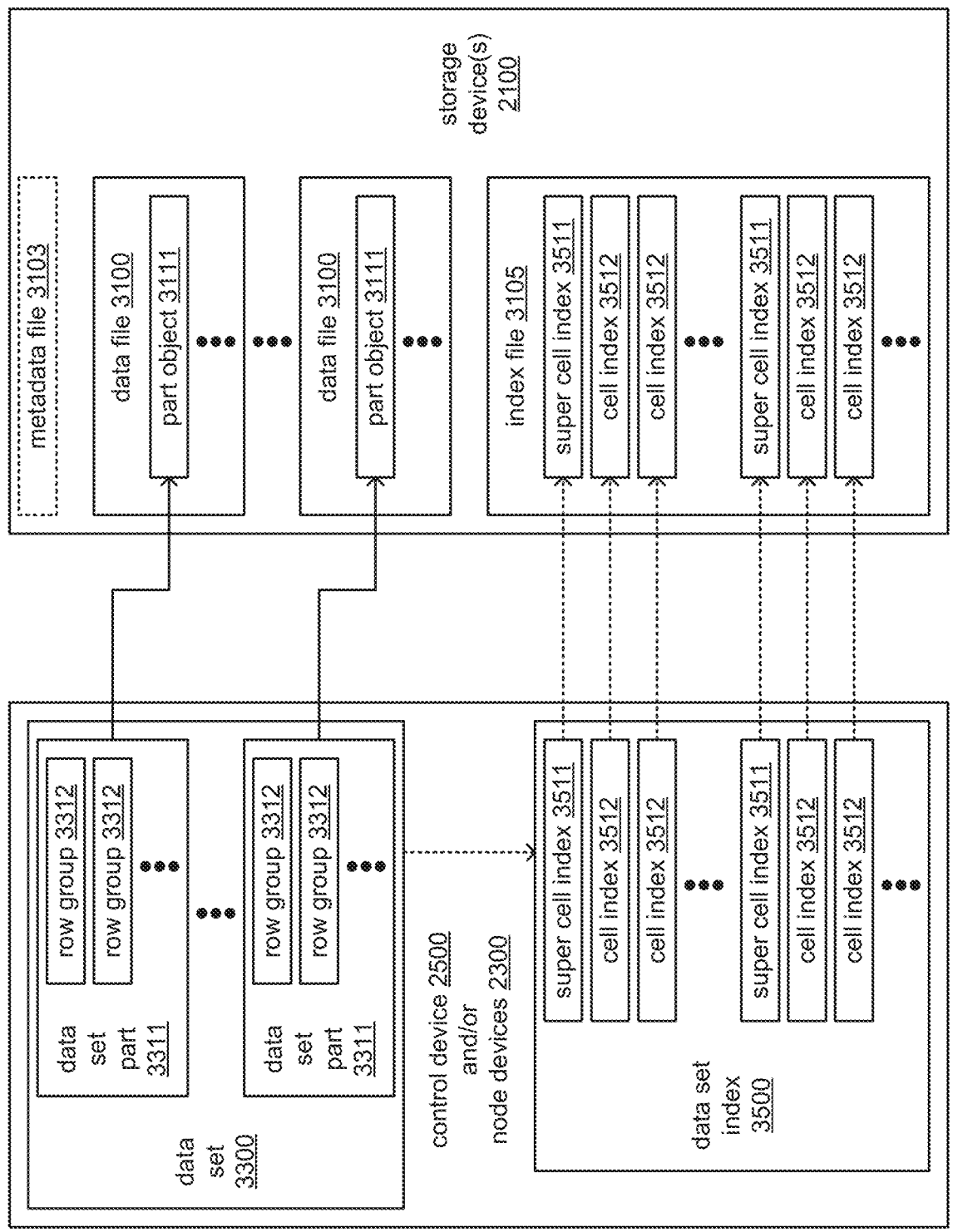
Figure 14J:
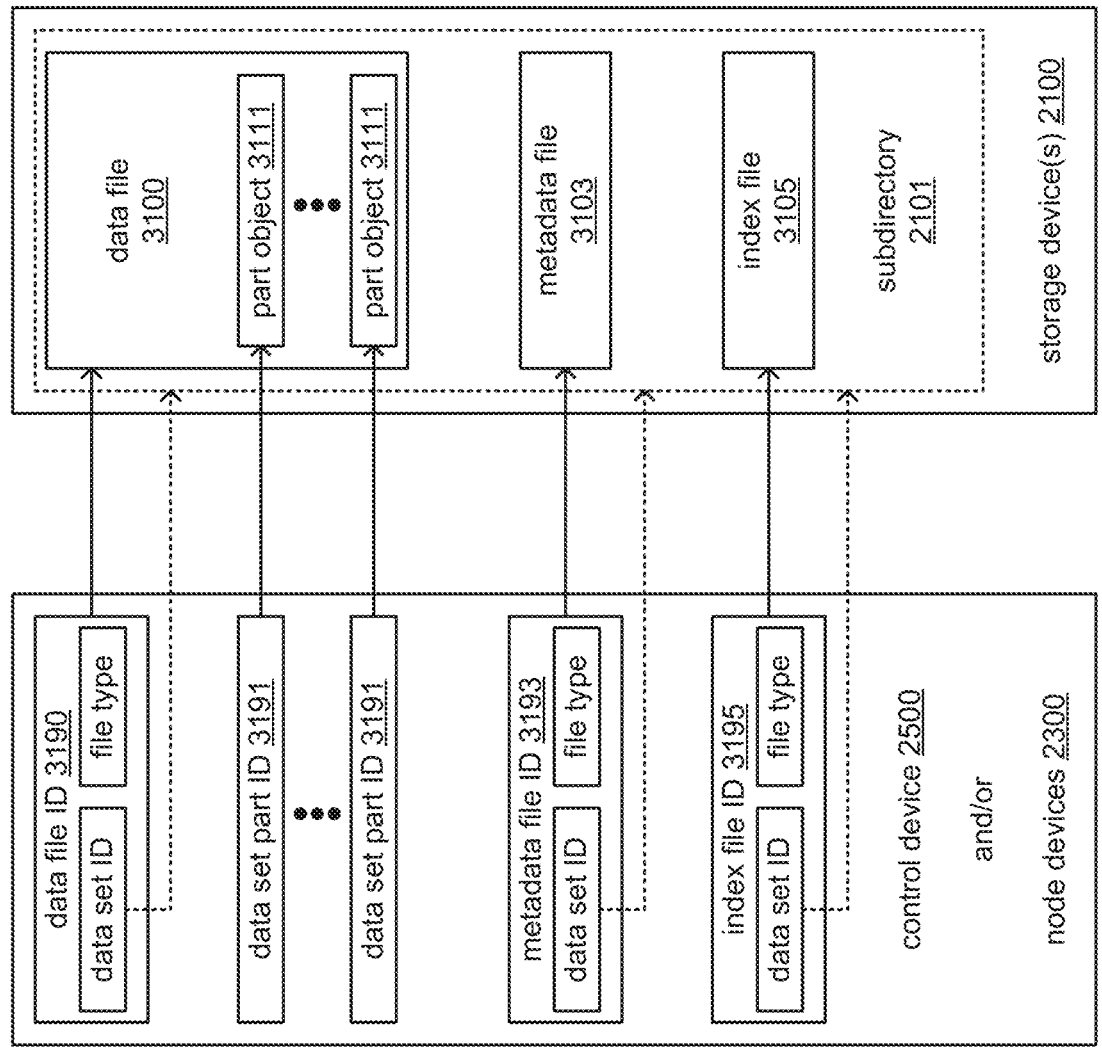
Figure 14K:
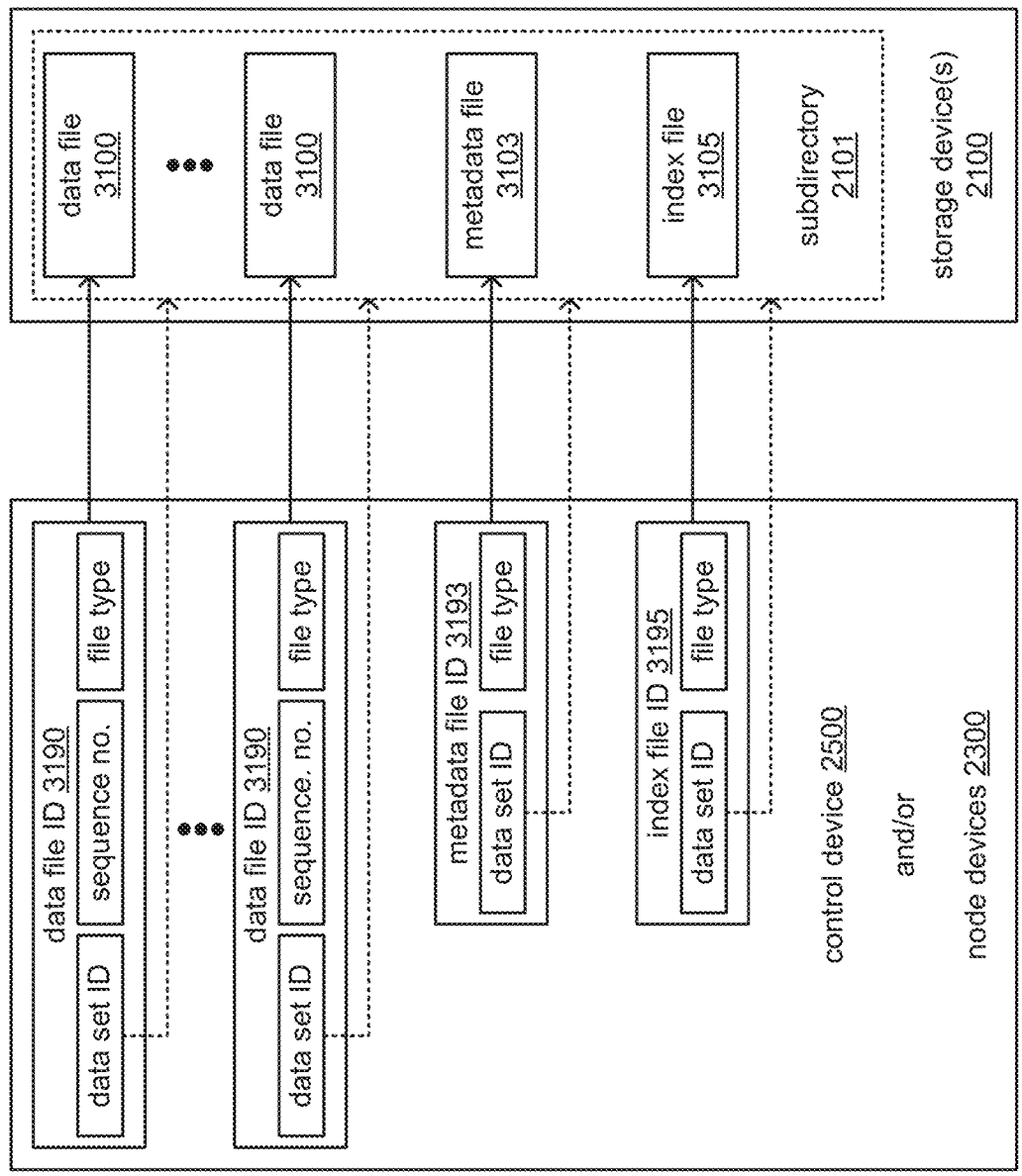

FIGS. 14A-K, together, depict various aspects of the manner in which data values of an example data set 3300 may be organized and/or otherwise prepared for being persistently stored within storage space provided by the storage device(s) 2100. FIGS. 14A-D, together, depict aspects of the persistent storage of data set parts 3311 of a data set 3300, either within a single data file 3100 or across multiple data files 3100. FIGS. 14B-D, together, also depict various aspects of the generation and persistent storage of data set metadata 3350, either with the part metadata 3351 and/or row group metadata 3352 of the data set metadata 3350 stored along with corresponding ones of the data set parts 3311 of a data set 3300, or within at least one separate metadata file 3103. FIGS. 14E-I, together, depict aspects of the generation and persistent storage of a data set index, either within at least one separate index file 3105, or with the super cell indexes 3511 and/or cell indexes 3512 stored along with corresponding ones of the data set parts 3311 of a data set 3300. FIGS. 14J-K, together, depict aspects of the manner in which multiple files associated with the persistent storage of a data set may be grouped within the storage device(s) 2100, as well as aspects of the manner in which they may be referred to with file identifiers.

Turning to FIG. 14A, as previously discussed, a wide variety of types of data may be organized into a two-dimensional (2D) data structure (e.g., the depicted example data set 3300) made up of a great many records that are treated as rows 3313 that each have a set of data values that are distributed among a set of columns 3323. At the intersection of each combination of a row 3313 and a column 3323 is a data field 3333 at which a data value may be stored. Again, it is envisioned that the quantity of rows 3313 greatly outnumbers the quantity of columns 3323, and that the quantity of columns 3323 is unchanging, even as more data is typically added to the data set 3300 over time through the addition of more records of data values that become more rows 3313 in the 2D structure.

However, as has also been discussed, there is an increasing variety of processing operations that provide new and useful insights into the data values of large data sets 3300 that require the data values present within particular subsets of the columns such that a per-column form of access to data values becomes more efficient than a per-row form access. Thus, again, it has become desirable to better optimize the manner in which large data sets are stored to increase the efficiency of per-column accesses. This creates a dichotomy in which a data set 3300 is more likely to be generated one or more rows 3313 at a time, but is then more likely to need to be accessed one or more columns 3323 at a time. As a result, and as will shortly be explained in greater detail, it has become desirable to persistently store a data set 3300 with a columnar organization in which the data values of each column 3323 spanning multiple rows 3313 are stored in adjacent data storage locations within a data file 3100, rather than a row-wise organization in which the data values of each row 3313 spanning multiple columns 3323 are persistently stored in adjacent data storage locations.

It should be noted that it is envisioned that what is described and claimed herein is likely to be applied to data sets 3300 that are sufficiently large in size as to be at least difficult, if not impossible, to store within a single device (even temporarily for relatively brief periods of time) such that it must be stored across multiple storage devices 2100 and/or must be distributed across multiple node devices 2300 to enable processing operations to be performed therewith. It is for this reason that the view of an example data set 3300 provided in FIG. 14A may remain nothing more than a conceptual view, and should not be taken as necessarily indicating that the entirety of such an example data set 3300 is able to be stored within a single device.

Thus, as depicted and as previously discussed, such a large data set 3300 may be divided into multiple data set parts 3311 to better enable exchanges of the data set 3300 between node device(s) 2300 and storage device(s) 2100 (e.g., enabling at least partially parallelized exchanges). In turn, each data set part 3311 may include multiple row groups 3312 from which the data set part 3311 is formed, and each row group 3312 may be defined from multiple rows 3313 of data values that span all of the columns 3323. As will be explained in greater detail, following the definition of each row group 3312, the data values within each row group 3312 may be reorganized from their original row-wise organization and into a columnar organization. Each data set part 3311 may then, in turn, be formed by combining multiple row groups 3312 in which such a reorganization into columnar form has taken place.

Turning to FIG. 14B, as previously discussed, as a data set 3300 is prepared for being persistently stored, a data set metadata 3350 may be generated therefrom, and components of the data set metadata 3350 may be persistently stored, either embedded with the data set 3300 or stored alongside the data set 3300, so as to be available for retrieval from persistent storage along with the data set 3300. As will be explained in greater detail, while the data set metadata 3350 may include indications of various characteristics of the data values of the data set 3300 and/or of various characteristics of the manner in which those data values are organized and/or are made otherwise accessible, the data set metadata 3350 may be generated primarily to include various pieces of information needed to reverse many of the operations that may be performed on the data set 3300 to prepare it for being persistently stored.

More specifically, and as depicted, separate row group metadata 3352 may be generated for each row group 3312 that may include indications of characteristics of the data values within its corresponding row group 3312, indications of the manner in which the data values are organized within its corresponding row group 3312, and/or indications of characteristics of operations that have been performed on its corresponding row group 3312 to prepare it for being persistently stored. Correspondingly, separate part metadata 3351 may be generated for data set part 3311 that may include indications of characteristics of the data values within its corresponding data set part 3311, indications of the manner in which the data values are organized within its corresponding data set part 3311, and/or indications of characteristics of operations that have been performed on its corresponding data set part 3311 to prepare it for being persistently stored. In some embodiments, and as depicted, it may be that, just as a data set part 3311 may be formed from multiple row groups 3312, the corresponding part metadata 3351 may be formed from multiple corresponding ones of row group metadata 3352, such that the part metadata 3351 includes a superset of the information contained within those multiple ones of row group metadata 3352.

Turning to FIGS. 14C-D, as previously discussed, the data set parts 3311 of a data set 3300 may all be persistently stored together within a single data file 3100 (as depicted in FIG. 14C), or may be persistently stored in a manner in which they are distributed across multiple data files 3100 (as depicted in FIG. 14D). Also, regardless of whether the data set parts 3311 are stored within a single data file 3100 or across multiple data files 3100, it may be that all metadata concerning aspects of the data set 3300 may be stored within each of the one or more data files 3100 within which the data set 3300 is stored (as depicted in both FIGS. 14C and 14D), or it may be that at least a portion of such metadata may be stored within a separate and distinct metadata file 3103 (as depicted as an alternative in FIG. 14C).

FIG. 14C presents an example of all data set parts 3311 of a data set 3300 being persistently stored within a single data file 3100. The depicted single data file 3100 may include a header 3150 that includes at least file metadata 3155 that includes indications of various characteristics of the data file 3100, and a file payload 3130 in which at least the data set parts 3311 of the data set 3300 may each be stored as part objects 3111. As also depicted, a variety of approaches may be used to store the data set metadata 3350, either all together at a single location, or divided in various ways into multiple portions that may be distributed throughout the single data file 3100.

By way of one example, in some embodiments, a single metadata object 3135 may be generated that includes indications of various characteristics applicable to the entire data set 3300, as well as indications of various characteristics applicable to individual data set parts 3311 and/or indications of characteristics applicable to individual row groups 3312. As depicted, such a single metadata object 3135 may be persistently stored within the same single data file 3100 as the data set 3300 (e.g., either within the file header 3150 or the file payload 3130, as depicted), or may be persistently stored within a single separate metadata file 3103 that corresponds to the single data file 3100.

Alternatively, by way of another example, in other embodiments, multiple metadata objects 3135 may be generated that each include a different set of indications of various characteristics of applicable to different portion(s) of the data set 3300. More specifically, and as also depicted, a separate metadata object 3135 may be generated for each data set part 3311, may each include indications of characteristics associated with its corresponding data set part 3311 (as well as indications of characteristics associated with each row group 3312 within its corresponding data set part 3311), and may be persistently stored as either embedded within its corresponding data set part 3311 or as alongside (or otherwise associated with) its corresponding data set part 3311. It may be that at least one, if not all, of these separate metadata objects 3135 also includes indications of characteristics associated with the entire data set 3300. Alternatively, it may be that a further separate metadata object 3135 is generated that includes such indications of characteristics associated with the entire data set 3300, and may be persistently stored either within the same single data file 3100 as the data set 3300 (e.g., either within the file header 3150 or the file payload 3130, as depicted), or may be persistently stored within a single separate metadata file 3103 that corresponds to the single data file 3100.

FIG. 14D presents an example of the data set parts 3311 of a data set 3300 being persistently stored across multiple data files 3100. Just like the single data file 3100 of FIG. 14C, each of the data files depicted in FIG. 14D may also include a header 3150 that includes at least file metadata 3155 indicative of various aspects of the data file 3100, and a file payload 3130 in which at least one or more data set parts 3311 of the data set 3300 may each be persistently stored as part objects 3111. Thus, in some embodiments, it may be that each data set part 3311 is persistently stored in a separate data file 3100 as the sole part object 3111 therein. Alternatively, in other embodiments, it may be that at least a subset of the multiple files 3100 includes multiple ones of the data set parts 3311 persistently stored therein, wherein each is stored as a separate part object 3111. As also depicted, a variety of approaches may be used to store the data set metadata 3350.

By way of another example, in some embodiments, multiple metadata objects 3135 may be generated that each include a different set of indications of various characteristics of applicable to different portion(s) of the data set 3300. More specifically, a separate metadata object 3135 may be generated for each data set part 3311, may each include indications of characteristics associated with its corresponding data set part 3311 (as well as indications of characteristics associated with each row group 3312 within its corresponding data set part 3311), and may be persistently stored as either embedded within its corresponding data set part 3311 or as alongside (or otherwise associated with) its corresponding data set part 3311. It may be that at least one, if not all, of these separate metadata objects 3135 also includes indications of characteristics associated with the entire data set 3300. Alternatively, it may be that a further separate metadata object 3135 is generated that includes such indications of characteristics associated with the entire data set 3300, and may be persistently stored within a single separate metadata file 3103 (similar to what was earlier depicted in FIG. 14C).

Alternatively, by way of one example, in other embodiments, a single metadata object 3135 may be generated that includes indications of various characteristics applicable to the entire data set 3300, as well as indications of various characteristics applicable to individual data set parts 3311 and/or indications of characteristics applicable to individual row groups 3312. Such a single metadata object 3135 may be persistently stored within a single separate metadata file 3103 (again, similar to what was earlier depicted in FIG. 14C).

Turning to FIG. 14E, as previously discussed, in some embodiments, a data set 3300 may be accompanied by a corresponding data set index 3500, and components of the data set index 3500 may be persistently stored alongside the data set 3300 (or embedded therewith) so as to be available for retrieval from persistent storage along with the data set 3300. As also previously discussed, a new version of the data set index 3500 may be generated as part of preparations of the data set 3300 for persistent storage so that the data set index 3500 that is persistently stored with the data set 3300 is up to date enough to reflect changes made to the data set 3300. In this way, the version of the data set index 3500 that is persistently stored along with the data set 3300 is sufficiently up to date as to be usable to aid in determining a subset of the data set parts 3311 of the data set 3300 that may be retrieved (versus retrieval all of the data set parts 3311) to satisfy a need to access data values within just a subset of the rows 3313 that include portion(s) of one or more columns 3323 that meet particular search criteria, thereby reducing consumption of processing and/or storage resources, and/or increasing the speed with which the needed data values are retrieved.

As previously discussed, in generating a data set index 3500 for a data set 3300, a separate super cell index 3511 may be generated for each data set part 3311, and a separate cell index 3512 may be generated for each row group 3312 within each data set part 3311. Thus, for each data set part 3311, a corresponding super cell index 3511 and a corresponding set of cell indexes 3512 may be generated.

Turning to FIGS. 14F-G, as has been discussed, it may be that a data set index 3500 is persistently stored within the storage device(s) 2100 alongside the data set 3300 to which it corresponds (or may be embedded therein). More specifically, it may be that the super cell indexes 3511 and cell indexes 3512 of a data set index 3500 may be stored along with their corresponding data set parts 3311. Thus, and turning to FIG. 14F, where all of the data set parts 3311 of a data set 3300 are persistently stored within a single data file 3100 (as depicted and discussed in reference to FIG. 14C), each of those data set parts 3511 may be accompanied in its persistent storage as a part object 3111 by its corresponding super cell index 3511 and set of cell indexes 3512. Similarly, and turning to FIG. 14G, where the data set parts 3311 of a data set 3300 are persistently stored across multiple data files 3100 (as depicted and discussed in reference to FIG. 14D), again, each of those data set parts 3511 may be accompanied in its persistent storage as a part object 3111 by its corresponding super cell index 3511 and set of cell indexes 3512.

As discussed in the Distributed Indexing Cases listed above, it may be that a super cell index 3511 and set of cell indexes 3512 that correspond to a data set part 3311 (which may be regarded as being the equivalent of a "super cell" in the Distributed Indexing Cases) may be stored within the file payload 3130 of a data file 3100 at a position that follows the corresponding data set part 3311 to improve backward compatibility in situations where an executable routine may be used with the data file 3100 that was not originally written to either accommodate or work with a data set index 3500. In effect, the use of such an organization within the file payload 3130 may serve to keep the data set index 3500 "out of the way" of executable routines that were not written to take the presence of such portions of a data set index 3500 into account.

However, and turning to FIGS. 14H-I, as an alternative to persistently storing the entirety of a data set index 3500 into the same single data file 3100 as the entirety of its corresponding data set 3300 (as depicted in FIG. 14F), and as an alternative to dividing up a data set index 3500 into multiple portions for persistent storage across multiple data files 3100 along with corresponding data set parts 3311 of its corresponding data set 3300 (as depicted in FIG. 14G), the entirety of a data set index 3500 may be persistently stored in a separate and distinct index file 3105. This may be deemed desirable where one or more aspects of the file type of the data file(s) 3100 in which the corresponding data set 3300 is persistently stored would cause the inclusion of components of the data set index 3500 therein would cause the data file(s) 3100 to become incompatible with other pre-existing executable routines such that those other routines would be unable to access at least some of the contents within the data file(s) 3100.

Where the data set index 3500 is so separately stored, such one or more index files 3105 may include indications of a timestamp of the data set index 3500, and/or of the data set 3300 to which the data set index 3500 corresponds, to enable a check to be made at a later time of whether the data set 3300 has been modified since the generation of the data set index 3500 such that the data set index 3500 has become out of date, and should be discarded, regenerated and/or otherwise updated. Indeed, it may be that a protocol is followed in which a data set 3500 is to be persistently stored only after its corresponding data set 3300 has been persistently stored such that the index file(s) 3105 in which the data set index 3500 is stored should have a timestamp that is temporally later than the data file(s) 3100 in which the data set 3300 is stored. It may be that the storage device(s) 2100 are given the tasks of comparing such timestamps and/or of automatically discarding the index file(s) 3105 of a data set index 3500 that has become obsolete such that those index file(s) 3105 should be discarded. Alternatively, during retrieval of a data set 3300 from the storage device(s) 2100, it may be the control device 2500 (or the controller 2503) that performs such a comparison and/or makes the determination of whether a data set index 3500 is sufficiently up-to-date as to be used in the retrieval of its corresponding data set 3300, or is obsolete such that the index file(s) 3105 of that data set index 3500 should be discarded, regenerated and/or otherwise updated.

Turning to FIGS. 14J-K, where the persistent storage of a data set 3300 within the one or more storage devices 2100 includes the persistent storage of more than one file 3100, 3103 and/or 3105, such multiple files may be persistently stored together within a subdirectory 2101 that is dedicated to the persistent storage of the data set 3300 and related information. In some embodiments, such a subdirectory 2101 may be defined from a set of physical storage locations that are allocated through utilities of a file system employed by the one or more storage devices 2100. In other embodiments, such a subdirectory 2101 may be virtual in nature such that it is implemented by the one or more storage devices 2100 as just a stored indication of an association among the multiple files.

Turning to FIG. 14J, where the entirety of a data set 3300 has been persistently stored within a single data file 3100, and there are no other separate files for a corresponding data set metadata 3350 or a corresponding data set index 3500, then the single data file 3100 may not be stored within the storage device(s) 2100 in any form of subdirectory 2101 dedicated to the storage of the data set 3300. However, and as depicted as an example, where the entirety of a data set 3300 has been persistently stored within a single data file 3100, and there is also a metadata file 3103 and/or an index file 3105 associated with the data set 3300, then such a subdirectory 2101 may be defined and dedicated to the storage of such a set of multiple files, together.

As also depicted, a single data file identifier 3190 may be used by the control device 2500 and/or the node device(s) 2300 to refer to the single data file 3100 in communications with the storage device(s) 2100 via the network 2999. As further depicted, in some embodiments, such a single data file identifier 3190 may be formed from a combination of (e.g., via a concatenation of) a universally unique identifier (UUID) of the corresponding data set 3300 and an identifier of the file type of the data file 3100. Alternatively, such a single file identifier 3190 may be formed based on any of a variety of other identifying nomenclature, such as manually entered text. However, to enable reference to be made in such communications to individual ones of the data set parts 3311 that are persistently stored (as part objects 3111) within the data file 3100, a separate and unique data set part ID 3191 may be generated for each of those data set parts 3311.

Correspondingly, a similarly formed single metadata file identifier 3193 may be used to similarly refer to the depicted single metadata file 3103, and/or a similarly formed single index file identifier 3195 may be used to similarly refer to the depicted single index file 3105. In some embodiments, it may be that the metadata file identifier 3193 and/or the index file identifier 3195 may be distinguished from the data file identifier 3190 by having different identifier(s) of file type (e.g., separate file types for metadata and/or an index) from the identifier of the file type for the data file 3100. Across all of these identifiers 3190, 3193 and/or 3195, the identifier of the data set may be employed by the storage device(s) 2100 as a reference to the subdirectory 2101 that has been defined for the persistent storage of these files 3100, 3103 and/or 3105, respectively.

Turning to FIG. 14K, where the data set parts 3311 of a data set 3300 have been persistently stored in a distributed manner across multiple data files 3100, then again, such a subdirectory 2101 may be defined and dedicated to the storage of such a set of multiple files, together. As also depicted, multiple data file identifiers 3190 that each correspond to one of the multiple data files 3100 may be used by the control device 2500 and/or the node device(s) 2300 to refer to the multiple data file 3100 in communications with the storage device(s) 2100 via the network 2999. As further depicted, in some embodiments, each of the data file identifiers 3190 may be formed from a combination of (e.g., via a concatenation of) an identifier of the corresponding data set 3300, a sequence number that is unique to a corresponding one of the data files 3100, and an identifier of the file type of all of the data files 3100. Although not specifically depicted in FIG. 14K, at least where any of the multiple data files 3100 includes more than one data set part 3311 persistently stored therein (as part objects 3111), again, a separate and unique data set part ID 3191 may be generated for each of those data set parts 3311.

As will be explained in greater detail, the manner in which the single metadata file identifier 3193 and/or the single index file identifier 3195 are formed and/or are used may be unchanged from what was depicted and discussed above in reference to FIG. 14J. Again, across all of these identifiers 3190, 3193 and/or 3195, the identifier of the data set may be employed by the storage device(s) 2100 as a reference to the subdirectory 2101 that has been defined for the persistent storage of these files 3100, 3103 and/or 3105, respectively.

Referring back to both FIGS. 14J and 14K, it should be noted that other embodiments are possible in which metadata and an index for a data set 3300 may be stored together in a single file 3103 or 3105 that is nonetheless separate from the one or more data files 3100. Alternatively or additionally, and as will be explained in greater detail, there may be embodiments in which there is sufficient overlap in the contents of metadata and an index for a data set 3300 that it may be deemed desirable to combine them.

Figure 15A:
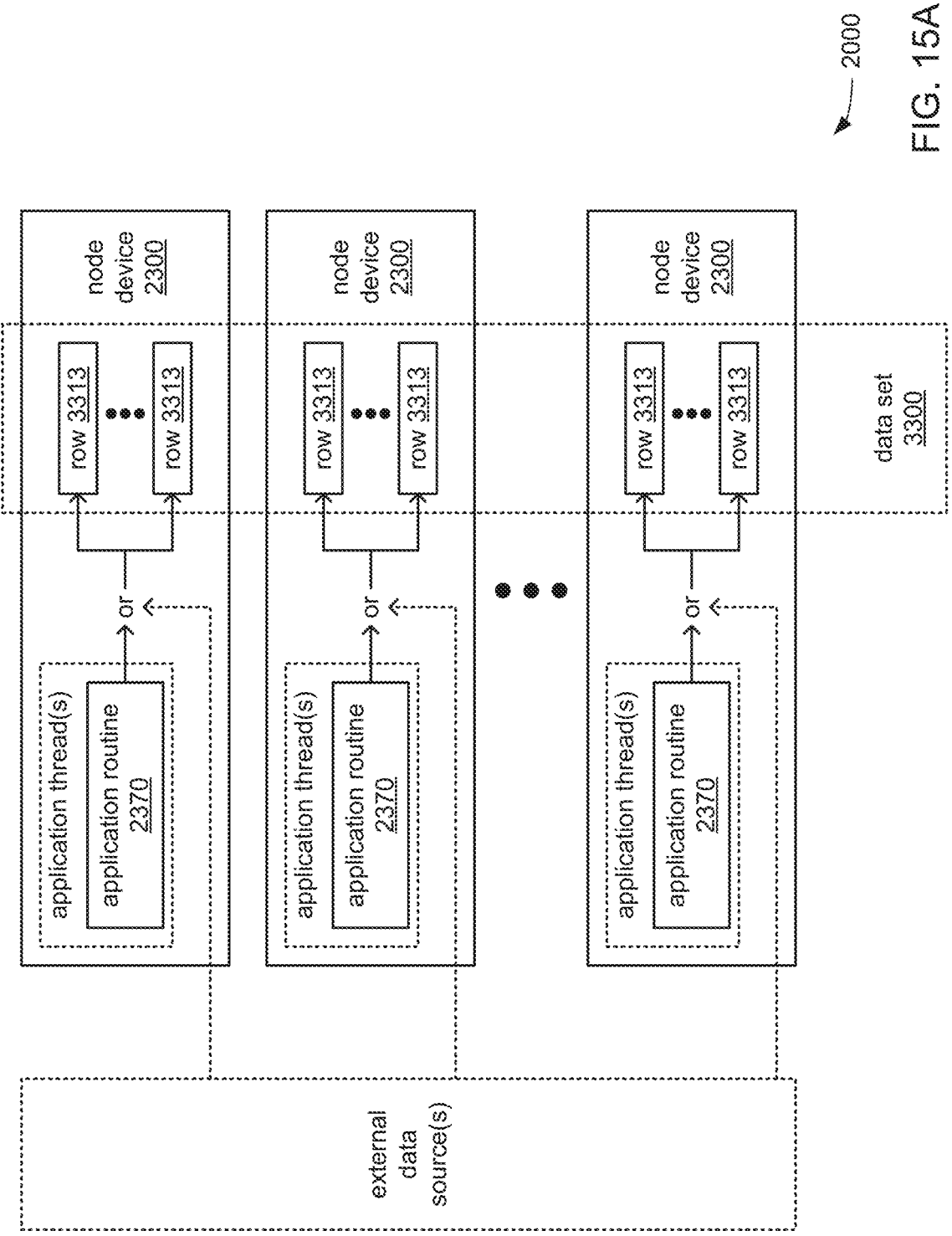
FIGS. 15A, 15B, 15C, 15D, 15E, 15F, 15G, 15H and 15I, together, illustrate an example embodiment of preparing a data set for persistent storage.
Figure 15B:
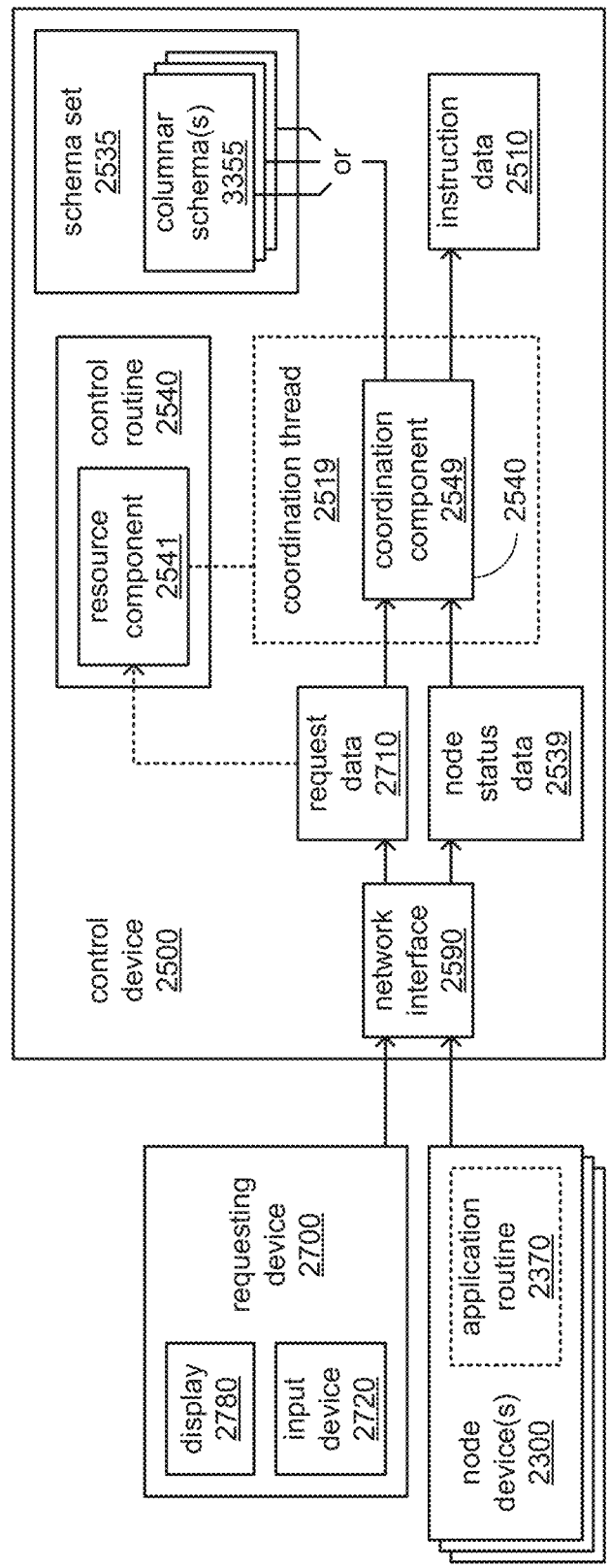

FIGS. 15A-G, together, depict various aspects of the manner in which an example data set 3300 may be prepared for persistent storage in columnar form within storage space provided by the storage device(s) 2100 of the distributed system 2000 of either FIG. 13A or 13B. FIGS. 15A-B, together, depict aspects of the receipt and/or generation of the data set 3300, and of the receipt of a request to persistently store the data set 3300. FIGS. 15C-G, together, depict aspects of the preparation, within an example node device 2300, of the data set 3300 to be persistently stored. Following such preparations for persistent storage as are depicted and about to be described in connection with FIGS. 15A-G, the example data set 3300 may be persistently stored within a single data file 3100 as depicted and described in reference to FIGS. 16A-C, or may be persistently stored across multiple data files 3100 as depicted and described in reference to FIGS. 17A-F.

Turning to FIG. 15A, as previously discussed, the data set 3300 may be generated within multiple ones of the node devices 2300. By way of example one or more instances of an application routine 2370 may be executed within each of multiple ones of the node devices 2300, and such execution thereof may result in the generation of multiple rows 3313 of the data set 3300 in a distributed manner across the multiple node devices 2300. It may be that execution of the application routine 2370 causes the generation of simulated data in support of the performance of any of a variety of regression analyses of a model, or still another type of analysis (e.g., a Bayesian analysis). Regardless of the exact purpose associated with the generation of the data set 3300, again, it may be that the generation of portions of the data set 3300 within each of the multiple node devices 2300 entails the generation of sets of values that become rows 3313 of the data set 3300.

Alternatively, and as also previously discussed, data values of the data set 3300 may be received by multiple ones of the node devices 2300 from one or more external sources, such as sensors, measuring devices, and/or still other varieties of device serving as a source of data values. By way of example, multiple ones of the node devices 2300 may be connected to any of a variety of external sensors and/or other forms of measuring device (not specifically shown) that capture data concerning any of a variety of subjects (e.g., natural phenomena, observations during experiments, monitoring of the performance of structures and/or mechanical devices etc.). By way of another example, multiple ones of the node devices 2300 may be provided with the data values in a transfer of the contents of an entire database, one or more tables of a database, rows formed from a relational (or other) join of multiple tables, one or more other subsets of a table thereof, or as a real-time stream of data from another storage system that is external to the distributed processing system 2000, and which may require some degree of processing to reformat or perform other operations with the received data values to form the data set 3300. Such external data sources may provide sets of data values to such node devices 2300 via the network 2999, and/or through other interconnects (not specifically shown), wherein each such set of data values becomes another row 3313 of the data set 3300. Alternatively or additionally, multiple ones of the node devices 2300 may directly incorporate sensors and/or other forms of measuring device.

As has been discussed, the data values of the data set 3300 may be any of a variety of types of data (e.g., societal statistics data, business operations data, raw data from sensors of large scale experiments, financial data, medical treatment analysis data, data from geological or meteorogical instruments, streams of data collected from Internet-attached appliances, etc.). The size of the data set 3300 may be sufficiently large that accessing and/or processing the data set 3300 using a single processing device (e.g., a single one of the node devices 2300) may be deemed to be at least highly impractical. Thus, it may be deemed desirable and/or necessary to access and/or process the data set 3300 in a distributed and at least partially parallel manner using the numerous processor cores 2355 of the processor(s) 2350 of multiple ones of the node devices 2300 such that multiple ones of the node devices 2300 may be operated together as a grid 2003 of node devices 2300.

Turning to FIG. 15B, as previously discussed, a control device 2500 (or controller 2503) of the distributed processing system 2000 may receive a request to persistently store the data set 3300 from a requesting device 2700. The received request may include an explicit instruction to persistently store the data set 3300. By way of example, ongoing distributed execution of the application routine 2370 may have caused the generation (or the collection, from an external data source) of at least a subset of the data set 3300, and further distributed execution of the application routine 2370 may require the persistent storage of the data set 3300 (e.g., to free up enough storage space within multiple ones of the node devices 2300 to enable further distributed execution of the application routine 2370). It may be that one or more of the node devices 2300 is caused by such execution of the application routine 2370 to transmit such an explicit request to the control device 2500 via the network 2999 to cause the data set 3300 to be persistently stored.

Alternatively, the received request may include instruction(s) that explicitly command the performance of one or more other tasks where the performance of those one or more other tasks necessarily includes persistently storing the data set 3300 such that the command to persistently store the data set 3300 is thereby implied. By way of example, an operator of the requesting device 2700 may operate the requesting device 2700 to transmit a request to the control device 2500 (or the controller 2503) to end the ongoing distributed execution of the application routine 2370, which may have generated (or collected from an external data source) at least a subset of the data set 3300, such that the cessation of such distributed execution of the application routine 2370 may implicitly necessitate the persistent storage of the data set 3300.

Regardless of the exact manner or reason for the provision of a request to persistently store the data set 3300 to the control device 2500 (or the controller 2503), and regardless of whether that request to do so is explicit or implied, in executing a resource component 2541 of the control routine 2540, a processor 2550 of the control device 2500 (or of the controller 2503) may be caused to respond to the receipt of the request by instantiating at least one coordination thread 2519. Within the at least one coordination thread 2519, at least one core 2555 of a processor 2550 of the control device 2500 may be caused to execute an instance of a coordination component 2549 of an instance of the control routine 2540. As will be explained in greater detail, in executing at least one instance of the coordination component 2549, one or more cores 2555 of processor(s) 2550 of the control device 2500 may be caused to perform various operations to coordinate a distributed performance, across multiple execution threads within multiple node devices 2300, of various tasks associated with persistently storing the data set 3300.

Among the first of such coordinating operations that at least one core 2555 of processor(s) 2550 of the control device 2500 (or of the controller 2503) may be caused to perform may be to operate the network interface 2590 to receive indications of the current availability and/or allocation of processing, storage and/or other resources of each of the node devices 2300. In so doing, indications may also be received of which ones of the node devices 2300 currently have a portion of the data set 3300 temporarily stored therein. In some embodiments where there are portions of the data set 3300 that are redundantly temporarily stored across more than one node device 2300, the receipt of such indications of current availability and/or allocation of the resources of each of the node devices 2300 may enable a selection of a subset of the node devices 2300 that have the best combinations of available processing, storage and/or other resources that are needed to perform at least the persistent storage of the data set 3300.

Also among the first of such coordinating operations that at least one core 2555 of processor(s) 2550 of the control device 2500 (or of the controller 2503) may be caused to perform may be the selection of a columnar schema 3355 from among multiple ones thereof that may be stored as a schema set 2535. As will be explained in greater detail, each columnar schema 3355 may specify such details as data type(s) and/or size(s) to which data values in particular column(s) are to conform, type(s) of compression and/or encryption that may be used in preparing a data set for persistent storage, quantities of rows 3313 per row group 3312 and/or quantities of row groups 3312 per data set part 3311, etc. As will also be explained in greater detail, such details may necessarily be associated with the specifications for various file types such that each columnar schema 3355 may be associated with a particular file type.

The request may include request data 2710 conveying various details of the request, including and not limited to, the specific task(s) that are requested to be performed, an identifier of the data set 3300, an identifier of the application routine 2370 that may be associated with the data set 3300 (e.g., where the data set 3300 was generated through execution of the application routine 2370, etc.), an indication of the file type of the data file(s) 3100 in which the data set 3300 is to be persistently stored, and/or an indication of a selection of a columnar schema 3355 that is to be applied in persistently storing the data set 3300. More specifically, it may be that the request data 2710 includes an express indication of which one of the columnar schemas 3355 of the schema set 2535 is to be used. Alternatively, it may be that the request data 2710 includes an express indication of the file type that is to be used in persistently storing the data set 3300, and a particular one of the columnar schemas 3355 may be associated with that file type. As still another alternative, it may be that a reference to the application routine 2370 may provide an indirect indication of which one of the columnar schemas 3355 is to be applied as a result of the application routine 2370 being associated with a particular file type, which in turn, may be associated with a particular one of the columnar schemas 3355. As yet another alternative, the request data 2710 may, itself, include the columnar schema 3355 that is to be used, and it may become added to the schema set 2535 maintained within the control device 2500, if not already present therein.

In still other embodiments, it may be that one or more of the node devices 2300 is caused to provide indications of various characteristics that the data set 3300 is observed to exhibit (e.g., data formats, data types, data sizes, quantities of rows and/or columns, etc.) to the control device 2500, especially where the data values of the data set 3300 are received by node devices 2300 from external data sources. In such other embodiments, execution of the coordination component 2549 within the at least one coordination thread 2519 may cause at least one core 2555 of processor(s) 2550 of the control device 2500 (or of the controller 2503) to employ such indications concerning characteristics of the data set 3300 to either derive a suitable columnar schema 3355, or to identify a columnar schema 3355 from among those within the schema set 2535 that is in some way deemed a best fit to accommodate a data set having those observed characteristics.

In yet other embodiments, the request data 2710 may include specifications for one or more parameters that might otherwise be specified by a columnar schema 3355 that may have been selected or generated in any of the ways just described above. Such included specifications for one or more parameters may be meant to override what may be specified for those one or more parameters in a columnar schema 3355 that is selected or derived. Alternatively, such included specifications for one or more parameters may be meant to fill in those one or more parameters where a selected or derived columnar schema 3355 does not, itself, specify them. Alternatively, it may be that such included specifications for one or more parameters serves to provide additional inputs to the derivation of a new columnar schema 3355 that may otherwise be based entirely on observations of characteristics of a data set 3300, or it may be that such included specifications for one or more parameters serve to provide additional factors (in addition to observations of characteristics of a data set 3300) in selecting a best fit one of the columnar schemas 3355 already previously generated and stored within the schema set 2535.

Regardless of the exact manner in which a columnar schema 3355 is selected and/or generated, further execution of the instance(s) of the coordination component 2549 within the at least one coordination thread 2519 may cause core(s) 2555 of processor(s) 2550 of the control device 2500 (or of the controller 2503) to generate instruction data 2510 that may include the selected or generated columnar schema 3355, as well as instructions to selected ones of the node devices 2300 for the coordinated performance of operations to at least effectuate the persistent storage of the data set 3300. Such core(s) 2555 of such processor(s) 2550 may then be caused to operate the network interface 2590 to transmit the instruction data 2510, including or otherwise accompanied by the corresponding columnar schema 3355, to each of the selected node devices 2300.

Figure 15C:
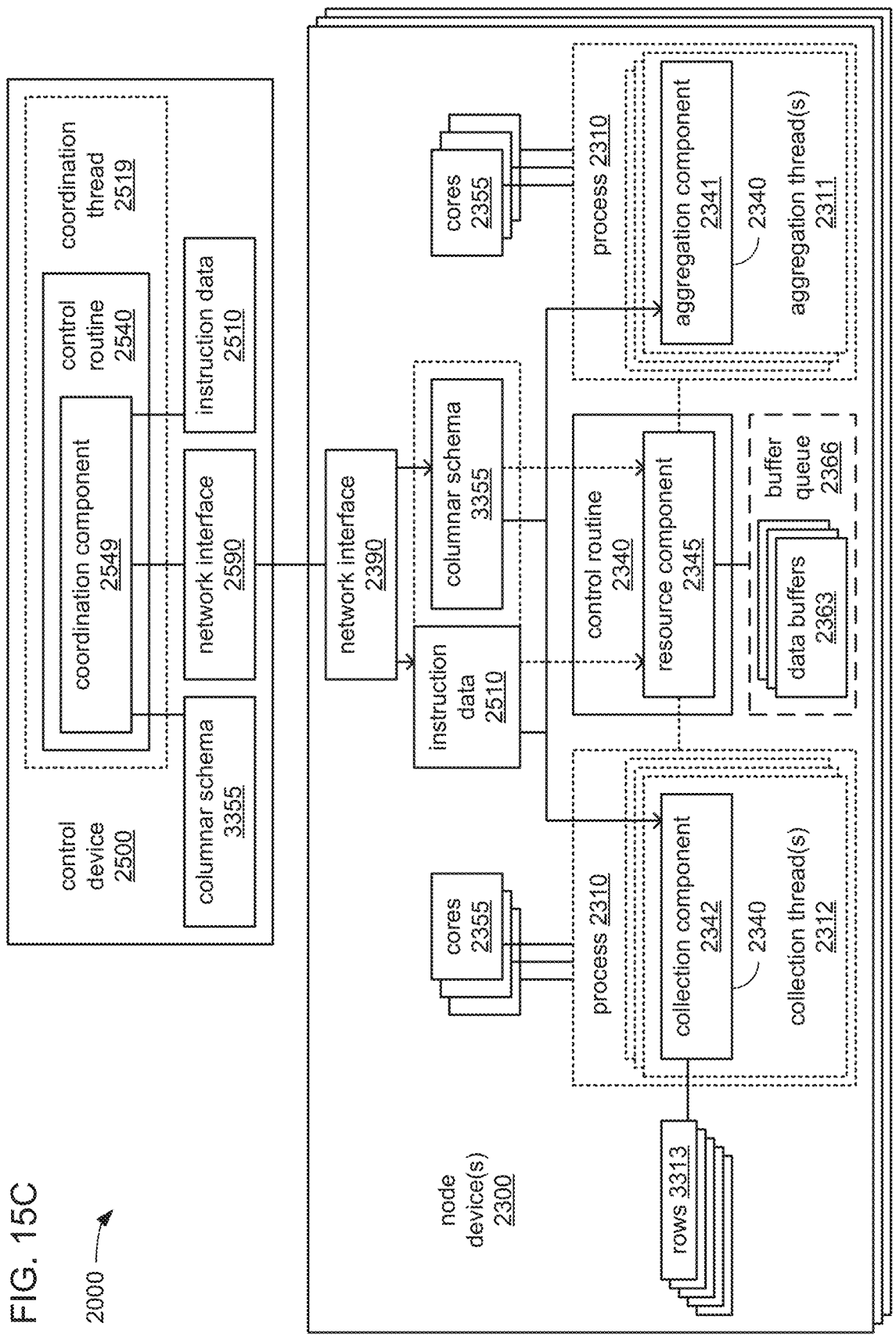

Turning to FIG. 15C, in executing a resource component 2345 of the control routine 2340 within each node device 2300, core(s) 2355 of processor(s) 2350 of each such node device 2300 may be caused to operate the network interface 2390 thereof to monitor for the receipt of instructions from the control device 2500. In response to the receipt of the instruction data 2510 that includes an indication that a data set is to be persistently stored, and/or that includes the columnar schema 3355 for the data set 3300 embedded therein (or otherwise accompanying the instruction data 2510), such core(s) 2355 of such processor(s) 2350 may be further caused to instantiate: 1) a pair of processes 2310; 2) multiple collection threads 2312 within one of the two processes 2310, where an instance of a collection component 2342 of the control routine 2340 is executed within each of the collection threads 2312; 3) multiple aggregation threads 2311 within the other of the two processes 2310, where an instance of an aggregation component 2341 of the control routine 2340 is executed within each aggregation thread 2311; and 4) a buffer queue 2366 that includes multiple data buffers 2363 that are operable together in a manner adhering to a FIFO algorithm to form a ring buffer of the multiple data buffers 2363.

In some embodiments, multiple cores 2355 of one or more processors 2350 within each such node device 2300 may be assigned to each of the two processes 2310. The cores 2355 assigned to one of the two processes 2310 may execute instructions of the instance of the collection component 2342 within each of the collection threads 2312 therein, while the cores 2355 assigned to the other of the two processes 2310 may execute instructions of the instance of the aggregation component 2341 within each of the aggregation threads 2311. As will shortly be explained in greater detail, within each node device 2300, rows 3313 of the data set may first be processed within the collection threads 2312 to become row groups 3312, and then within the aggregation threads 2311 to become data set parts 3311 that are then transmitted to the storage devices 2100 to be persistently stored. As will also shortly be explained, portions of metadata concerning the data set 3300 and/or of a data set index 3500 of the data set 3300 may also be generated within each of the threads 2312 and/or 2311. As will further be explained, the buffer queue 2366 may provide a thread-safe mechanism by which row groups 3312 and their associated portions of metadata and/or a data set index 3500 may be exchanged between collection threads 2312 and aggregation threads 2311.

In some embodiments, the quantity of collection threads 2312, the quantity of aggregation threads 2311, and/or the quantity of data buffers 2363 that are initially instantiated and/or actively used may be predetermined initial quantities. In other embodiments, one or more of these three initial quantities may be derived based on observations of available processing, storage and/or other resources within each of the node devices 2300 at the time that one or more of the collection threads 2312, the aggregation threads 2311 and/or the data buffers 2363 are initially instantiated. The interposing of the buffer queue 2366 between the collection threads 2312 and the aggregation threads 2311 to provide a thread-safe mechanism for transfers therebetween serves to decouple the quantities of the collection threads 2312 and the aggregation threads 2311 such that the quantity of each that is instantiated, and/or that is actively used such that instructions are being executed therein, may be selected, derived and/or altered without regard to the corresponding quantity of the other.

Regardless of the exact manner in which the initial quantities of the collection threads 2312, the aggregation threads 2311 and/or the data buffers 2363 is selected and/or derived, it may be that, subsequent to such initial instantiations, one or more of these three quantities are meant to be dynamically adjusted as various ones of the aforedescribed operations to process rows 3313 are performed within the collection threads 2312 and the aggregation threads 2311, and/or as the aforedescribed exchanges are made therebetween through the buffer queue 2366. More specifically, as such operations are performed within each thread 2312 and/or 2311, further execution of the resource component 2345 within each node device 2300 may cause core(s) 2355 of processor(s) 2350 thereof to monitor, on an ongoing basis, the availability of processing, storage and/or other resources of the node device 2300 versus the consumption of such resources by each thread 2312 and 2311 that is currently instantiated and active such that instructions are currently being executed therein, and/or the consumption of such resources by the operation of the buffer queue 2366.

As will be familiar to those skilled in the art, it may be that the multiple node devices 2300 of the distributed processing system 2000 are employed in persistently storing, retrieving and/or performing distributed processing operations on more than one data set at the same time. Thus, the availability of processing, storage and/or other resources within each of the node devices 2300 may be changing on an ongoing basis as a result of performing other operations that are entirely unrelated to the operations being performed that are associated with persistently storing the data set 3300. Thus, such levels of availability versus consumption of each of such resources may become factors used in determining, on an ongoing basis, whether the quantities of the collection threads 2312, of the aggregation threads 2311 and/or of the data buffers 2363 that are instantiated, and/or that are actively used, are to be increased or decreased.

Alternatively or additionally, further execution of the resource component 2345 within each node device may cause core(s) 2355 of processor(s) 2350 thereof to monitor, on an ongoing basis, aspects of the rate at which rows 3313 are processed through the collection threads 2312 and/or the aggregation threads 2311. As will be explained in greater detail, differences in various characteristics of rows 3313, and/or of the row groups 3312 generated therefrom, may cause differences in the rate at which operations are performed among the collection threads 2312, and/or differences in the rate at which operations are performed among the aggregation threads 2311. Alternatively or additionally, there may be a difference between the rate at which the collection threads 2312 are able to place row groups 3312 formed from rows 3313 into the buffer queue 2366 and the rate at which the aggregation threads 2311 are able to gather row groups 3312 from the buffer queue 2366 to use in forming data set parts 3311. Thus, such rates of processing of rows 3313, and/or such differences thereamong, may become factors used in determining, on an ongoing basis, whether the quantities of the collection threads 2312, of the aggregation threads 2311 and/or of the data buffers 2363 that are instantiated, and/or that are actively used, are to be increased or decreased.

By way of example, within each node device 2300, it may be that the progress that is made in processing rows 3313 through each of the collection threads 2312, the buffer queue 2366 and the aggregation threads 2311 is used as a basis to stagger the instantiation and uninstantiation of each, at least partially through dynamic adjustments of the quantities of each that are instantiated and actively used. More specifically, it may be that just collection threads 2312 are instantiated, at first, to begin the processing of rows 3313 through the collection threads 2312 to generate row groups 3312 therefrom. As at least one of the collection threads 2312 is able to place a row group 3312 into a data buffer 2363, the buffer queue 2366 with an initial quantity of data buffers 2363 therein may be instantiated. The filling of at least one data buffer 2363 with a row group 3312 may also spur the instantiation of an initial quantity of aggregation threads 2311 to begin gathering row groups 3312 from the buffer queue 2366 to form the first data set parts 3311 therefrom. It may be that the quantity of data buffers 2363 within the buffer queue 2366 and/or the quantity of aggregation threads 2311 are dynamically increased as more row groups 3312 are placed within data buffers 2363 by the collection threads 2312. It may also be that, as the supply of rows 3313 to be incorporated into row groups 3312 within the collection threads 2312 is exhausted, the quantity of collection threads 2312 that are instantiated and/or actively used is dynamically reduced eventually to zero. It may further be that, as the supply of row groups 3312 placed within data buffers 2363 of the buffer queue 2366 is exhausted, the quantity of data buffers 2363 within the buffer queue 2366 that are instantiated and/or actively used is dynamically reduced eventually to zero, and then the buffer queue 2366 may be entirely uninstantiated. It may still further be that, as the last data set parts 3311 are generated and persistently stored by the aggregation threads 2311, the quantity of aggregation threads 2311 that are instantiated and/or actively used is dynamically reduced eventually to zero.

In some embodiments, the manner in which the quantity of the threads 2312 or 2311 that are instantiated and actively used is dynamically increased is by instantiating more of the threads 2312 or 2311, and that the manner in which such a quantity is dynamically decreased is by uninstantiating one or more of the threads 2312 or 2311. As will be familiar to those skilled in the art, such uninstantiation of a thread may release a core 2355 that was assigned to execute instructions therein to become available for use in executing other instructions elsewhere, and may release storage space within the storage 2360 of a node device 2300 for use in storing other data and/or routines. However, in other embodiments, the manner in which the quantity of the threads 2312 or 2311 that are instantiated and actively used is dynamically increased is by causing more of the threads 2312 or 2311 that may have been instantiated earlier to become actively used such that instructions are executed therein by at least one core 2355, and that the manner in which such a quantity is dynamically decreased is by causing the execution of instructions to be suspended within one or more of the threads 2312 or 2311 that were being actively used. As will be familiar to those skilled in the art, such suspension of execution of instructions within a thread may also release a core 2355 that was assigned to execute instructions therein to become available for use in executing other instructions elsewhere, but may not release all of the storage space within the storage 2360 that is occupied by that thread, such that at least the storage space required to preserve aspects of the current state of that thread may remain assigned to that thread.

By way of another example, within each node device 2300, it may be that the quantities of the threads 2312 and 2311 are not dynamically adjusted, but that the quantity of data buffers 2363 within the buffer queue 2366 is dynamically adjusted. More specifically, during the processing of rows 3313 through the collection threads 2312 and then through the aggregation threads 2311, it may be that the quantity of data buffers 2363 within the buffer queue 2366 is dynamically increased and/or decreased to accommodate differences that may arise between the rate at which the collection threads 2312 are able to place row groups 3312 formed from rows 3313 into the buffer queue 2366 and the rate at which the aggregation threads 2311 are able to gather row groups 3312 from the buffer queue 2366 to use in forming data set parts 3311. It may be that the quantity of data buffers 2363 is dynamically increased as the collection threads 2312 are initially able to provide row groups 3312 at a rate greater than the rate at which the aggregation threads 2311 are able to take in and use row groups 3312. However, it may subsequently be that, as the supply of rows 3313 is exhausted, the quantity of data buffers 2363 is dynamically decreased as the collection threads 2312 are subsequently able to exhaust the supply of row groups 2312 stored within the buffer queue 2366.

Figure 15D:
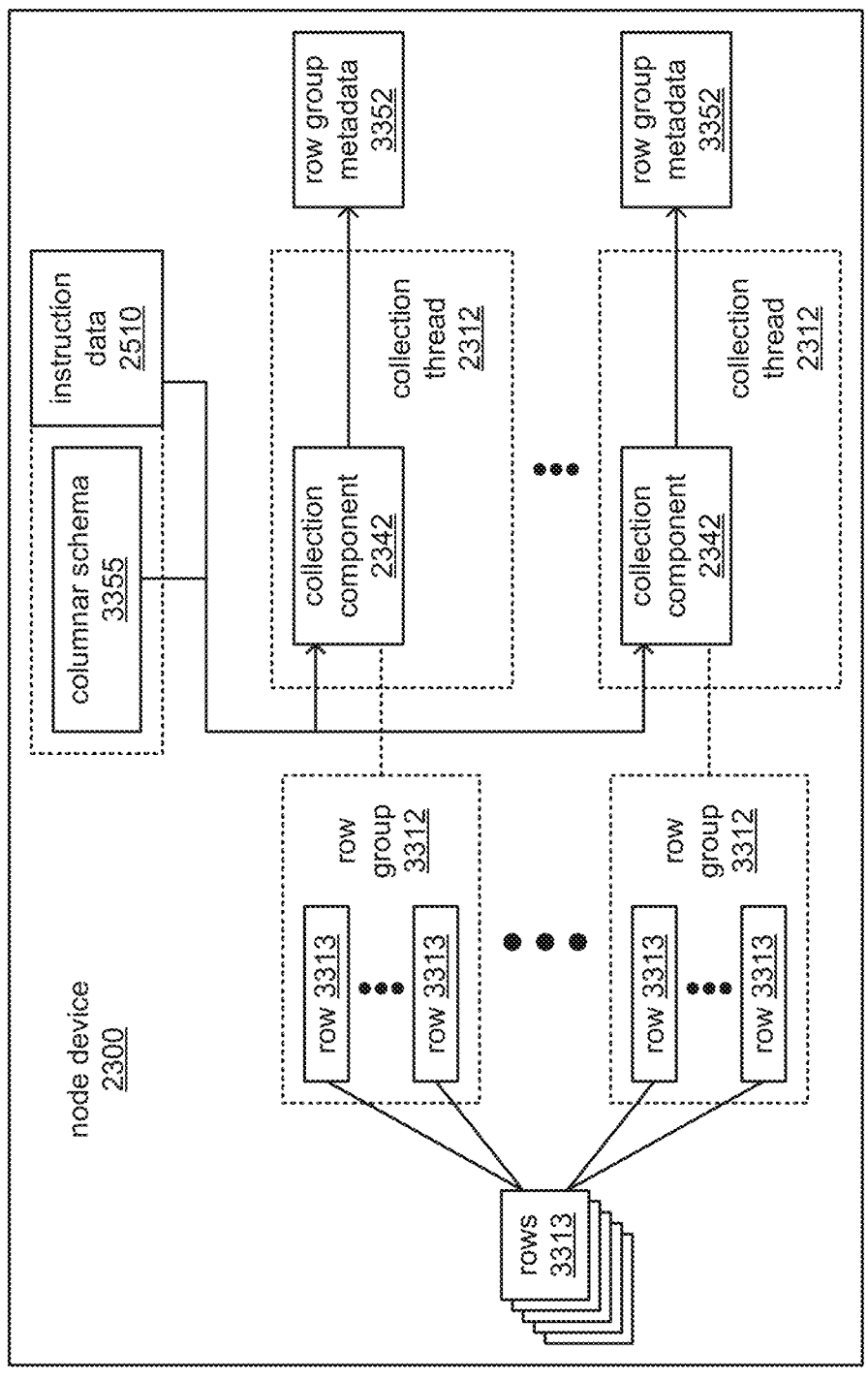

Turning to FIG. 15D, within each collection thread 2312 within each node device 2300, core(s) 2355 of processor(s) 2350 may be caused by execution of the instance of the collection component 2342 therein to define a row group 3312 from multiple ones of the rows 3313 of data values that were generated and/or received within the node device 2300. In so doing, specifications for such details as the quantity of rows 3313 to be included within a row group 3312 may be retrieved from the columnar schema 3355. In some embodiments, the quantity of rows 3313 per row group 3312 may be specified as a particular quantity of rows 3313, or may be a quantity that is required to meet one or more other specified requirements, such as a predetermined minimum and/or maximum quantity of rows 3313 per row group 3312. In other embodiments, the quantity of rows 3313 per row group 3312 may be derived within each node device 2300 based on a combination of how much storage space is occupied by the data values of each row 3313 and a specified data size for each row group 3312, such as specified minimum and/or maximum quantities of bytes per row group 3312.

In some embodiments, it may be that various aspects of the data values within each row 3313 are normalized while rows 3313 are combined to form a row group 3312. More specifically, it may be that, as the data size of each data value and/or each row 3313 is checked, core(s) 2355 of processor(s) 2350 within each node device 2300 are caused to convert data types, data formats and/or other aspects of data encoding to cause the data values within each row 3313 to conform to what may be specified within the columnar schema 3355 for each data field 3333 within each row 3313. By way of example, it may be that formats of times and/or of dates may be converted to adhere to pre-selected preferences that may be specified in the columnar schema 3355.

As also depicted, it may be that, as the row group 3312 is defined and/or as each data value within the row group 3312 is normalized, a corresponding row group metadata 3352 may be generated to include indications of: 1) observed characteristics of the data values, of the rows 3313 and/or of the corresponding row group 3312; 2) actions taken in generating the corresponding row group 3312 (e.g., how many rows 3313 are included, the data size of each row 3313, what normalizations were performed on data value(s), etc.), and/or 3) locations within the row group 3312 at which data values of each column 3323 are located (following reorganization into a columnar organization, as is about to be explained). As will shortly be explained in greater detail, the information contained within each row group metadata 3352 may be combined with the information in other pieces of metadata to eventually become the metadata 3350 descriptive of aspects of the entire data set 3300.

Figure 15E:
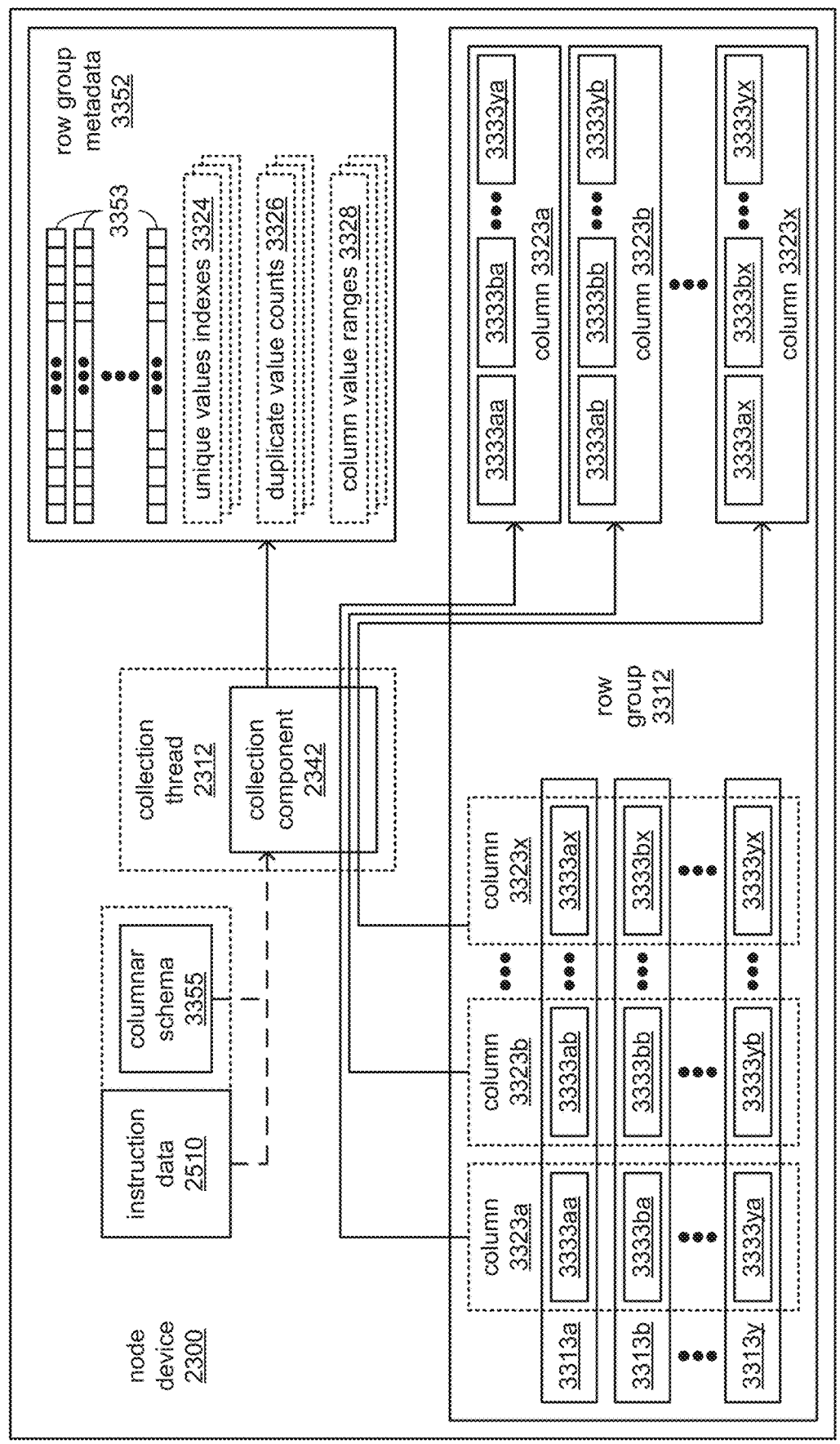

Turning to FIG. 15E, within each collection thread 2312 within each node device 2300, and following the definition of a corresponding row group 3312, further execution of the corresponding instance of the collection component 2342 may cause core(s) 2355 of processor(s) 2350 of the node device 2300 to reorganize the data values within the corresponding row group 3312 from a row-wise organization in which data values within the same row 3313 are stored contiguously at adjacent storage locations, and into a columnar organization in which data values within the same column 3323 across all of the rows 3313 of the corresponding row group 3312 are caused to be stored contiguously at adjacent storage locations. In this way, the data set 3300 becomes better optimized for per-column accesses than for per-row accesses, thereby becoming more efficiently usable as an input to columnar processing operations.

In some embodiments, as such a reorganization of the data values within a row group 3312 is performed within a collection thread 2312, it may be that further execution of the corresponding instance of the collection component 2342 also causes core(s) of processor(s) 2350 of processor(s) 2350 of the node device 2300 to generate indications of various aspects of the cardinality of the data values within each of the columns 3323 as part of the corresponding row group metadata 3352. More specifically, for each column 3323, a separate corresponding unique values index 3324 may be generated within the corresponding row group metadata 3352 that specifies each unique data value that is found to be present therein, as well as a corresponding duplicate value counts 3326 that specify the quantity of duplicates (if any) that are found to exist within the column 3323 of each unique value therein. Alternatively or additionally, for each column 3323, a separate column value range 3328 may be generated within the corresponding row group metadata 3352 that specifies the range of data values found to be present therein (e.g., indications of the highest and lowest data values found therein). As an alternative to, or in addition to, specifying full ranges of values within each column 3323, various subdivisions of ranges of values may be described (e.g., percentiles, deciles and/or quartiles), and may do so with indications of specific ones of the rows 3313 within which values falling within such ranges may be found.

In some embodiments, as such a reorganization of the data values within a row group 3312 is performed within a collection thread 2312, it may be that further execution of the corresponding instance of the collection component 2342 also causes core(s) 2355 of processor(s) 2350 of the node device 2300 to generate a set of flag vectors 3353 as part of the corresponding row group metadata 3352. In such embodiments, there may be a single one of the flag vectors 3353 generated for each column 3323 within the row group 3312, and each bit position within one of the flag vectors 3353 may correspond to one of the data values within its corresponding column 3323. It may be that each bit position within one of the flag vectors 3353 serves to indicate whether its corresponding data value within the corresponding column 3323 is a "null" value. As will be familiar to those skilled in the art, a data set 3300 may be filled with "sparse data" in which there may be large portions of the data set 3300 in which the data fields 3333 have never been filled with a data value such that they may be occupied, by default, with a "null" value. The provision of such flag vectors 3353 may enable advantage to be taken of such instances of sparse data to perform a form of lossless compression on the row group 3312 by using the such bit values to distinguish between data fields 3333 that contain actual data values versus those that contain "null" values, thereby enabling just the actual data values to be stored for each column 3323. Thus, where just a subset of the data fields 3333 within a column 3323 contain actual data values, the use of storage space may be limited to just those actual data values; and accordingly, where all of the data fields 3333 within a column 3323 contain "null" values, there may be no storage space used to store any data value from that column 3323. As a result, it may be that just columns 3323 in which actual data values are present may actually be stored, and for each column 3323 that is so stored, just the actual data values (i.e., skipping over any "null" values) may be stored in adjacent storage locations.

Alternatively or additionally, in embodiments in which at least a subset of the columns 3323 of a row group 3312 include data values that are part of nested data, other flag vectors 3353 in the form of arrays of integers may be generated for such columns 3323 as part of the corresponding row group metadata 3352. In such other vectors 3353, there may be an integer values (byte-sized, word-sized or of another size) at position(s) within the flag vectors 3353 that correspond to the data values within corresponding columns 3323 are indicative of levels of nesting and/or repetition levels, and/or that are indicative of other characteristics of the manner in data values within one or more of the columns 3323 within a row group 3312 represent nested data. Such indications may enable opportunities to occupy less storage space with the data values, themselves, thereby effectively enabling a form of lossless compression for those one or more columns 3323.

Also alternatively or additionally, as such a reorganization of the data values within a row group 3312 is performed within a collection thread 2312, it may be that further execution of the corresponding instance of the collection component 2342 also causes core(s) 2355 of processor(s) 2350 of the node device 2300 to selectively employ run length encoding (RLE) to losslessly compress the row group 3312. More specifically, where a column 3323 is found to have the same single data value across all rows 3313 within the row group 3312, the amount of storage space occupied by that column 3323 may be reduced to enable a single copy of that single data value to be stored, either within the row group 3312 after conversion to columnar organization or within the corresponding row group metadata 3352. In some embodiments, RLE may be employed to further compress the row group 3312 after the lossless compression just described has been employed to preclude the consumption of storage space to store "null" values. Thus, and more specifically, RLE (and/or other forms of lossless compression) may be employed to further compress the stored actual data values. Still further, in some embodiments, the set of flag vectors 3353 (of either of the aforedescribed types) that correspond to the columns 3323 of the row group 3312 may also be subjected to RLE (and/or other forms of lossless compression).

Regardless of whether some degree of normalization of data values may or may not have already been earlier performed while a row group 3312 is formed from multiple rows 3313, in some embodiments, it may be that various aspects of the data values within each of those rows 3313 are normalized during the reorganization of data values from a row-wise organization and into a columnar organization. More specifically, it may be that, as the data values within the same column 3323 are stored together in adjacent storage locations, core(s) 2355 of processor(s) 2350 are also caused to convert data types, data formats and/or other aspects of data encoding to cause the data values within each column 3323 to conform to what may be specified within the columnar schema 3355 for each data field 3333 within that column 3323.

Figure 15F:
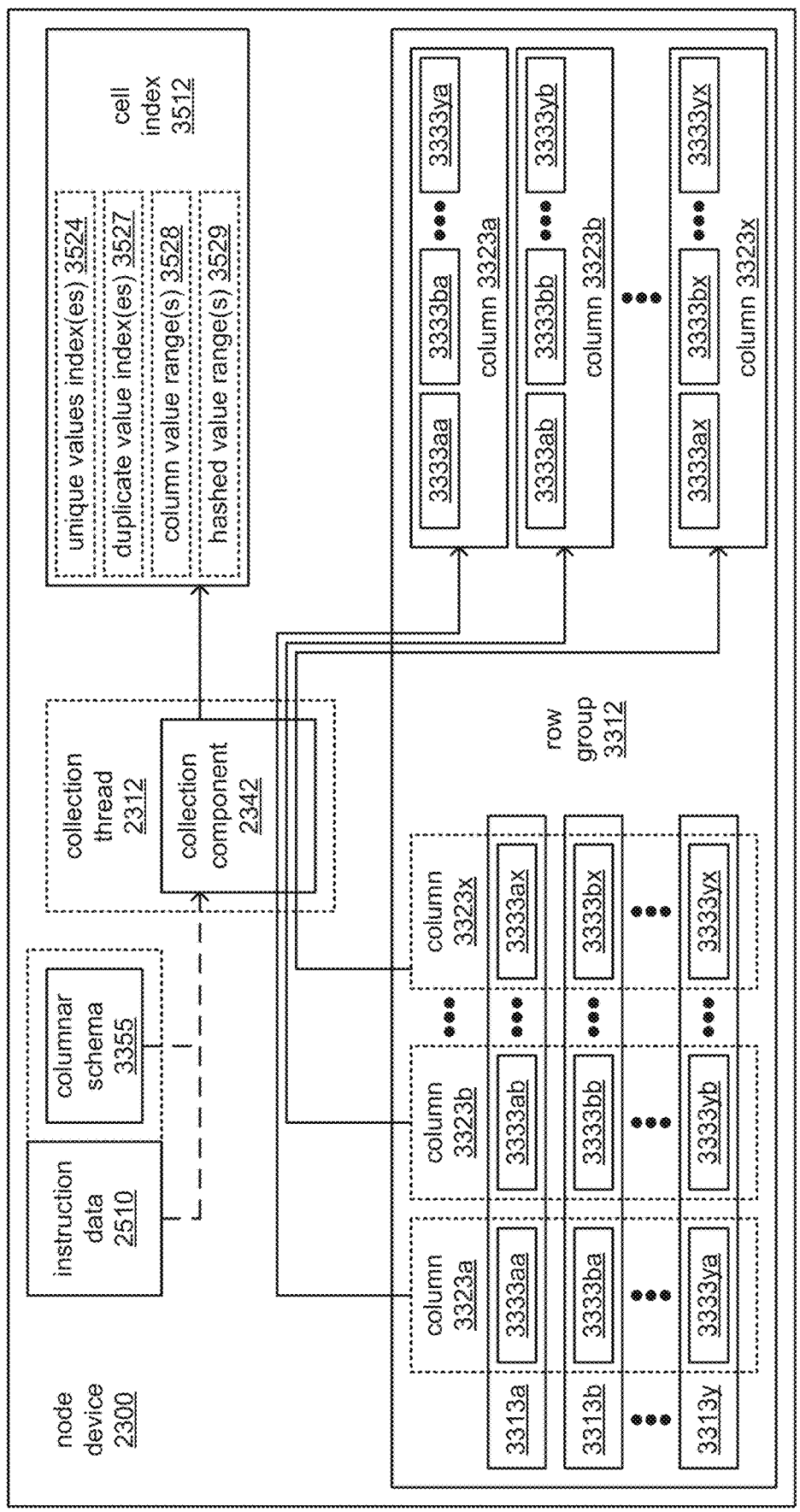

Turning to FIG. 15F, as such a reorganization of the data values within a row group 3312 is performed within a collection thread 2312 (as depicted in FIG. 15E, and as depicted again in FIG. 15F), it may be that further execution of the corresponding instance of the collection component 2342 also causes core(s) 2355 of processor(s) 2350 of the node device 2300 to generate a cell index 3512 that corresponds to the row group 3312. More specifically, those same core(s) 2355 may be caused to generate a corresponding cell index 3512 that includes at least a subset of the features described for cell indexes in the Distributed Indexing Cases, such as a unique values index 3524, one or more duplicate values indexes 3527, an indication of a column value range 3528 and/or an indication of a hashed value range 3529 for each column 3323 of a subset of the columns 3323 that are selected to be included in the data set index 3500. As described in the Distributed Indexing Cases, for each column 3323 of that subset, a unique values ordering tree may be generated and used to identify each unique value therein for inclusion in the corresponding unique values index 3524, and/or a duplicate values table may be generated and used to identify duplicate value(s) therein from which corresponding duplicate value index(es) 3527 may be generated. Alternatively or additionally, as described in the Distributed Indexing Cases, for each column 3323 of that subset, hash values may be generated from the identified unique values to derive a corresponding hashed value range 3529.

In embodiments in which both a row group metadata 3352 and a cell index 3512 is generated for each row group 3312, the unique values indexes 3524 and the column value ranges 3528 within the corresponding cell index 3512 may be redundant to corresponding ones of the unique values indexes 3324 and corresponding ones of the column value ranges 3328, respectively, within the corresponding row group metadata 3352 such that one may be copied from the other. Indeed, though not specifically depicted, in some embodiments, the data set metadata 3350 and the data set index 3500 may be combined in any of a variety of ways to eliminate such redundancies therebetween.

Figure 15G:
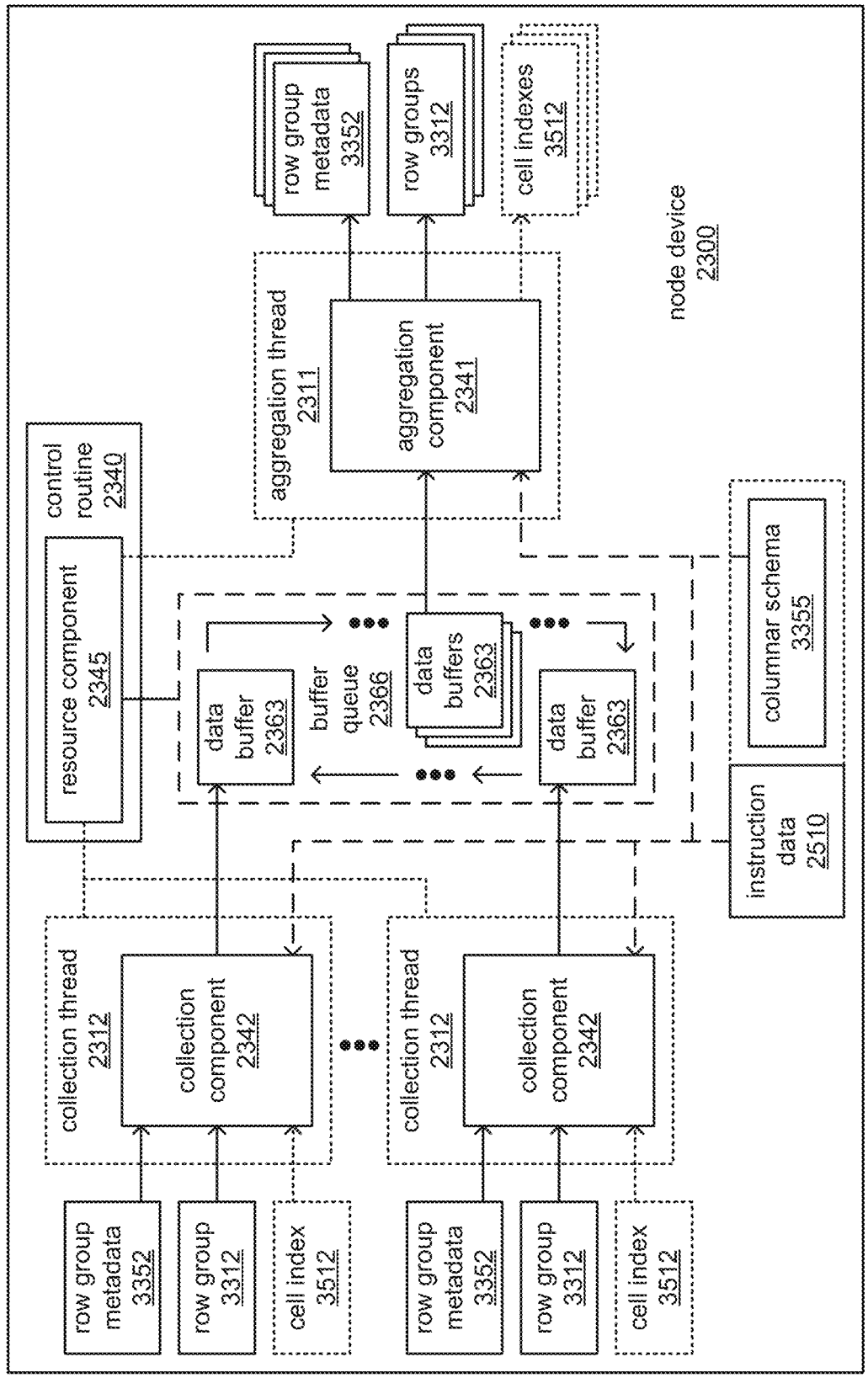

Turning to FIG. 15G, within each collection thread 2312 within each node device 2300, and following the reorganization of data values within the corresponding row group 3312 into a columnar organization, further execution of the corresponding instance of the collection component 2342 may cause core(s) 2355 of processor(s) 2350 of the node device 2300 to place the corresponding row group 3312, its associated row group metadata 3352, and/or its associated cell index 3512 within a data buffer 2363 of the buffer queue 2366. Following the deposit of the corresponding row group 3312, row group metadata 3352 and/or cell index 3512 into the data buffer 2363, core(s) 2355 of processor(s) 2350 may be caused by further execution of that instance of the collection component 2342 to return to repeating the various operations described above, starting with forming another row group 3312 from multiple rows 3313, and so on.

As previously discussed, within each node device 2300, ongoing execution of the resource component 2345 by core(s) 2355 of processor(s) 2350 may cause ongoing monitoring of the availability and utilization of resources of each collection thread 2312, cause ongoing monitoring of the relative rates of processing of rows 3313 across multiple collection threads 2312, and/or cause monitoring of the relative rates of the filling and emptying of data buffers 2363 within the buffer queue 2366, to determine whether the quantity of collection threads 2312, the quantity of data buffers 2363 and/or the quantity of aggregation threads 2311 currently instantiated within the node device 2300 is to be increased or decreased. Thus, for example, after depositing a row group 3312 and its associated row group metadata 3352 into a data buffer 2363 of the buffer queue 2366, a collection thread 2312 may be uninstantiated (or caused to have execution of instructions therein suspended) based on such factors as consumption of resources by that collection thread 2312 versus what resources are currently available, and/or based on a reduction of the supply of rows 3313 of the data set 3300 that haven't yet been incorporated into row groups 3312.

As those skilled in the art of data compression will readily recognize, the degree to which a particular type of data compression is performed, and accordingly, the degree to which a data set is able to be compressed, depends on various characteristics of the data values within that data set. By way of example, such compression algorithms as ceasing the use of storage space to store "null" values are more effective where there is sparse data, and such compression algorithms as RLE are more effective where the data values within a data set having relatively low cardinality and/or having lengthy contiguous runs of data values that are the same value. Thus, depending on the data values within a row group 3312, it may be that more or less per-column 3323 compression is able to be performed, thereby causing a degree of variability in the processing and/or other resources that are consumed for the performance of the various operations described above within each collection thread 2312, and/or causing a degree of variability in the amount of time required to perform the various processing operations required to generate a row group 3312. Accordingly, it may be that such variability in the consumption of resources and/or the required processing time by each collection thread 2312 may become a factor in triggering dynamic changes in the quantity of collection threads 2312 that may be instantiated and in which instructions are actively executed within a node device 2300.

As also previously discussed, within each node device 2300, ongoing execution of the resource component 2345 of the control routine 2340 may cause the buffer queue 2366 to be operated in a manner that implements a FIFO algorithm to convey row groups 3312, row group metadata 3352 and/or cell indexes 3512 in a thread-safe manner from collection threads 2312 to aggregation threads 2311. Again, such ongoing execution of the resource component 2345 may cause core(s) 2355 of processor(s) 2350 to change the quantity of data buffers 2363 within the queue 2366 based on ongoing observations of the degree of use thereof by the threads 2312 and 2311.

Within each aggregation thread 2311 within each node device 2300, execution of the corresponding instance of the aggregation component 2341 within the aggregation thread 2311 may cause core(s) 2355 of processor(s) 2350 of the node device 2300 to retrieve multiple row groups 3312 for inclusion within a single data set part 3311 from multiple ones of the data buffers 2363, along with their associated row group metadata 3352 and/or their associated cell indexes 3512. In so doing, such details as the quantity of row groups 3312 to be included within a data set part 3311 may be specified by the columnar schema 3355. In some embodiments, the quantity of row groups 3312 per data set part 3311 may be a particular specified quantity of row groups 3312, or may be a quantity that is required to meet one or more specified requirements, such as a predetermined minimum and/or maximum quantity of row groups 3312 per data set part 3311. In other embodiments, the quantity of row groups 3312 per row data set part 3311 may be derived within each node device 2300 based on how much storage space is occupied by the data values of each row group 3312 and a predetermined data size for each data set part 3311, such as a predetermined minimum and/or maximum quantity of bytes per data set part 3311.

Figure 15H:
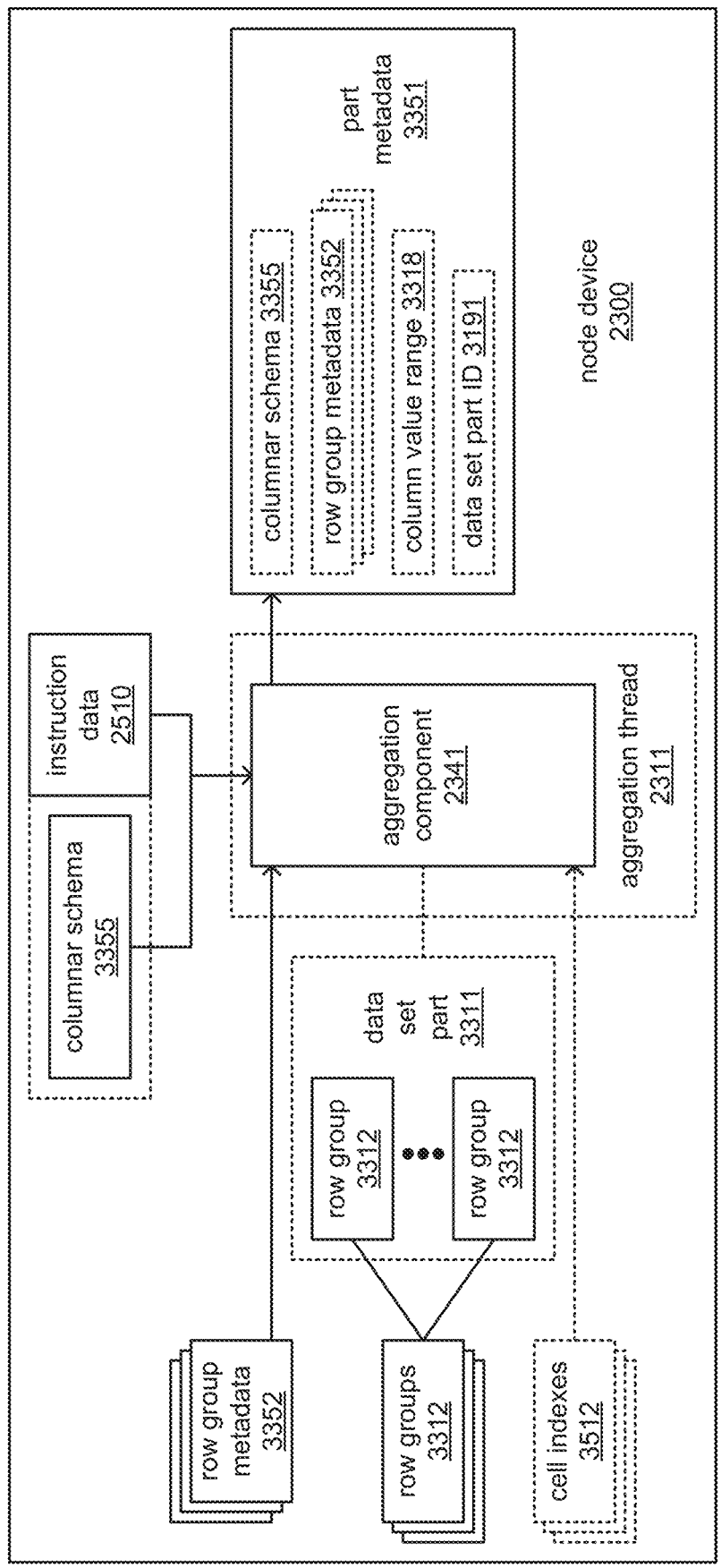

Turning to FIG. 15H, within each aggregation thread 2311 within each node device 2300, and following the gathering of multiple row groups 3312, along with associated metadata 3352 and/or associated cell indexes 3512, from multiple data buffers 3363, further execution of the corresponding instance of the aggregation component 2341 may cause core(s) 2355 of processor(s) 2350 to define a data set part 3311 from the multiple gathered row groups 3312. Still further execution of the corresponding instance of the aggregation component 2341 may also cause core(s) 2355 of processor(s) 2350 of the node device 2300 to compress and/or encrypt the entirety of the data set part 3311. Such compression of entire data set parts 3311, if performed, may be in addition to or in lieu of separate compression of individual columns 3323 within row groups 3312, and/or of whole row groups 3312 having already been performed during execution of instances of the collection routine 2342 within the collection threads 2312, as described above. It should also be noted that, in some embodiments, encryption may have similarly already been performed per column 3323 within row groups 3312, and/or per whole row group 3312.

As also depicted, it may be that, as the data set part 3311 is defined, is compressed and/or is encrypted, a corresponding part metadata 3351 may be generated to include: 1) the various indications of the row group metadata 3352 corresponding to each of the included row groups 3312 (e.g., what types of data compression may have been performed, what types of data value and/or data type normalization may have been performed, etc.); 2) actions taken in forming the corresponding data set part 3311 (e.g., how many rows groups 3312 are included, the data size of each row group 3312, what type of compression may have been performed, what type of encryption may have been performed, encryption data needed to decrypt the data set part 3311, etc.), and/or 3) locations within the data set part 3311 at which each row group 3312 is located. As will shortly be explained in greater detail, the information contained within each part metadata 3351 may be combined with the information in other pieces of metadata to eventually become the metadata 3350 descriptive of aspects of the entire data set 3300. More specifically, further execution of the corresponding instance of the aggregation component 2341 may cause core(s) 2355 of processor(s) 2350 of the node device 2300 to generate the corresponding part metadata 3351 to include a copy of the columnar schema 3355, copies of the row group metadata 3352 (or copies of the contents thereof in some other form) for each row group 3312 that is gathered for inclusion in the corresponding data set part 3311, and/or a separate column value range 3318 for each column 3323 that indicates the range of values found within its corresponding column 3323 across all rows 3313 across all of the row groups 3312 included in the corresponding data set part 3311.

Figure 15I:
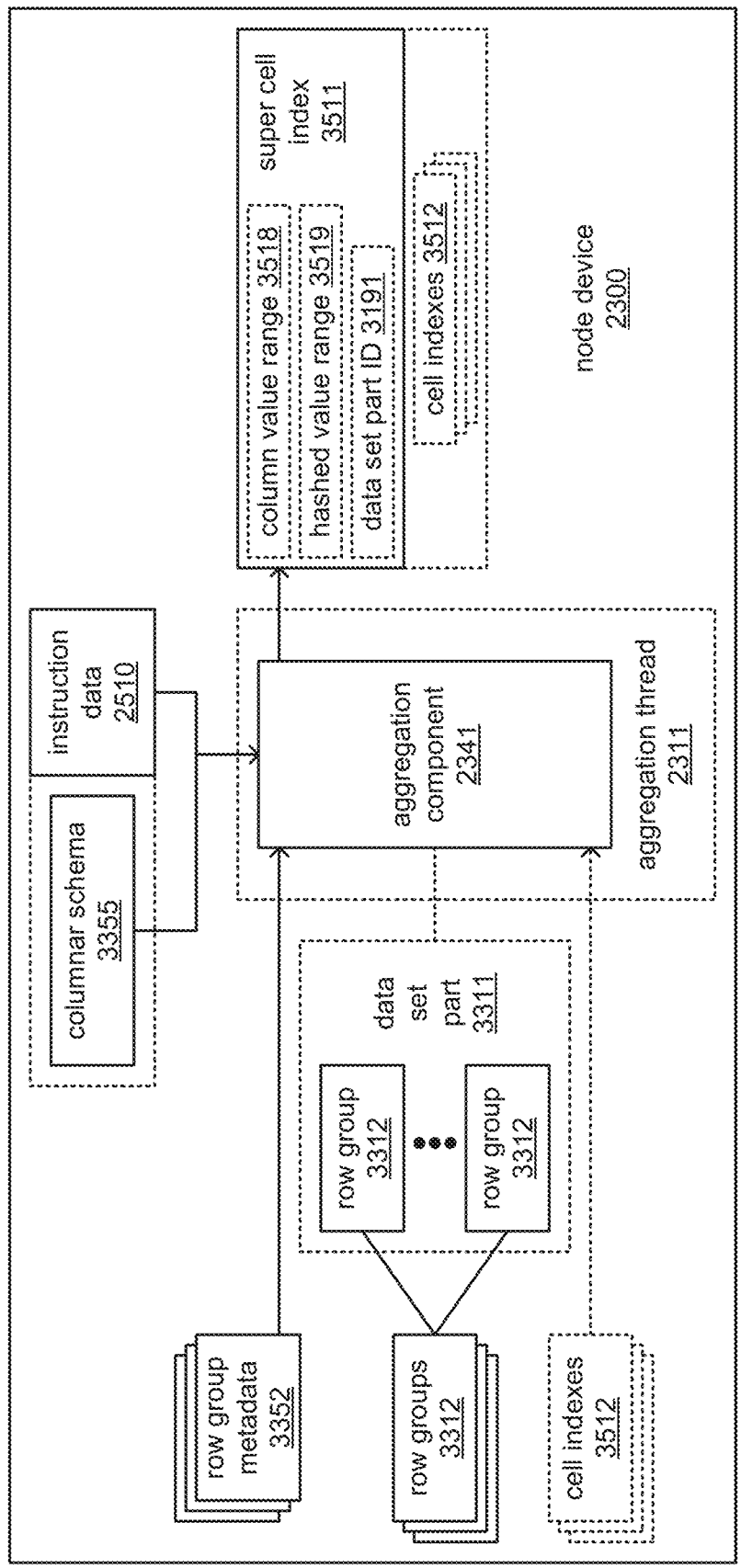

Turning to FIG. 15I, as the data set part 3311 is defined, is compressed and/or is encrypted within an aggregation thread 2311, it may be that further execution of the corresponding instance of the aggregation component 2341 also causes core(s) 2355 of processor(s) 2350 of the node device 2300 to generate a super cell index 3511 that corresponds to the data set part 3311. More specifically, those same core(s) 2355 may be caused to generate a corresponding super cell index 3511 that includes at least a subset of the features described for super cell indexes in the Distributed Indexing Cases, such as an indication of a column value range 3518 and/or an indication of a hashed value range 3529 for each column 3323 of the aforementioned subset of columns 3323 that are selected to be included in the data set index 3500. As described in the Distributed Indexing Cases, for each column 3323 of that subset, a column value range 3518 within a super cell index 3511 may be derived from the corresponding column value ranges 3528 of the corresponding cell indexes 3512, and each hashed value range 3519 within a super cell index 3511 may be similarly derived from the corresponding hashed values ranges 3529 of the corresponding cell indexes 3512. In some embodiments, and as depicted, it may be that the super cell index 3511 includes copies of each of the cell indexes 3312 (or the contents thereof) that correspond to one of the row groups 3312 included in the corresponding data set part 3311.

In embodiments in which both a part metadata 3351 and a super cell index 3511 is generated for data set part 3311, the column value ranges 3528 within the corresponding super cell index 3511 may be redundant to corresponding ones of the column value ranges 3528, respectively, within the corresponding part metadata 3351 such that one may be copied from the other. Again, though not specifically depicted, in some embodiments, the data set metadata 3350 and the data set index 3500 may be combined in any of a variety of ways to eliminate such redundancies therebetween.

Figure 16A:
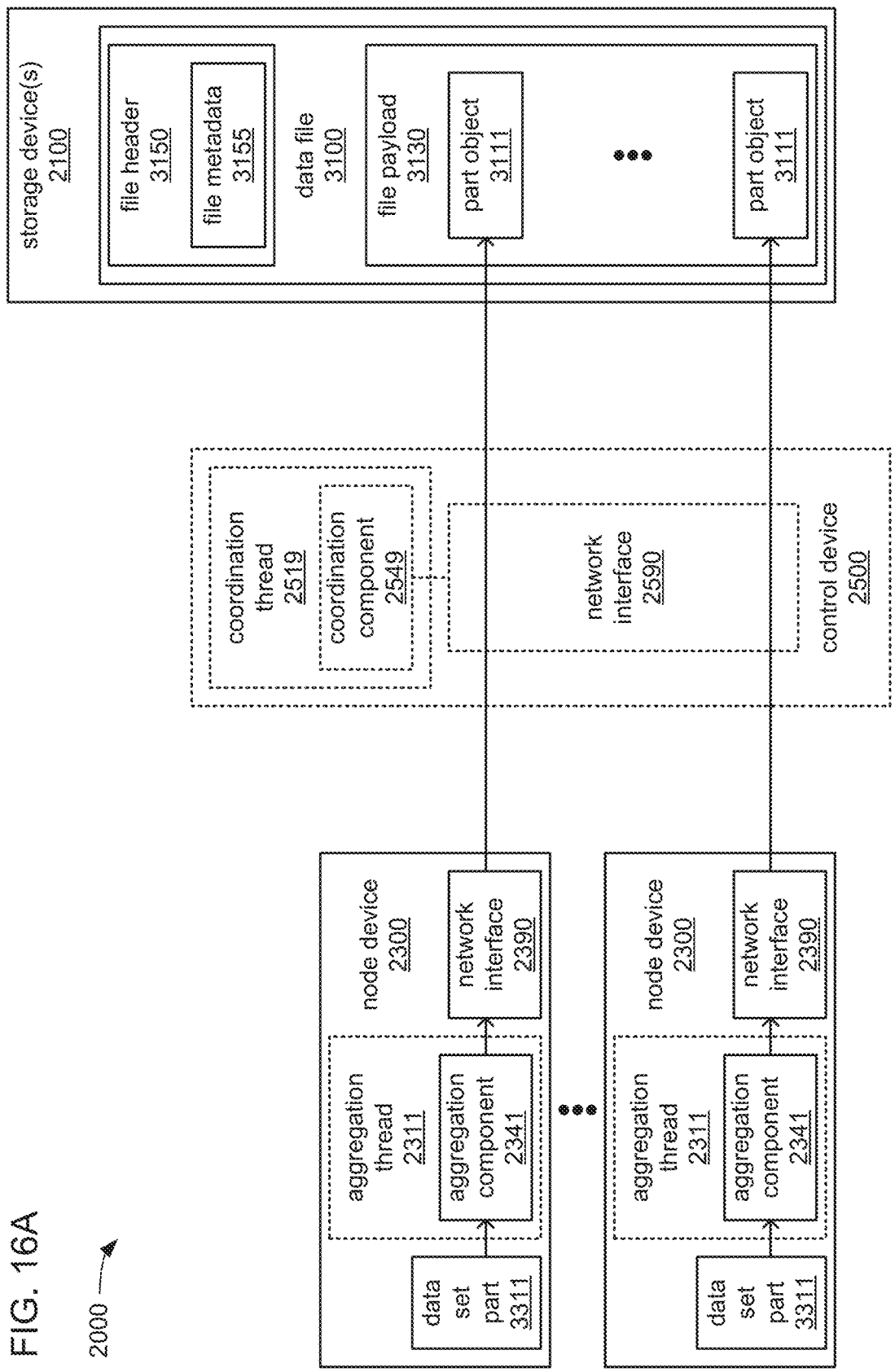
FIGS. 16A, 16B and 16C, taken together, illustrate aspects of an example embodiment of persistently storing a data set within a single data file.
Figure 16B:
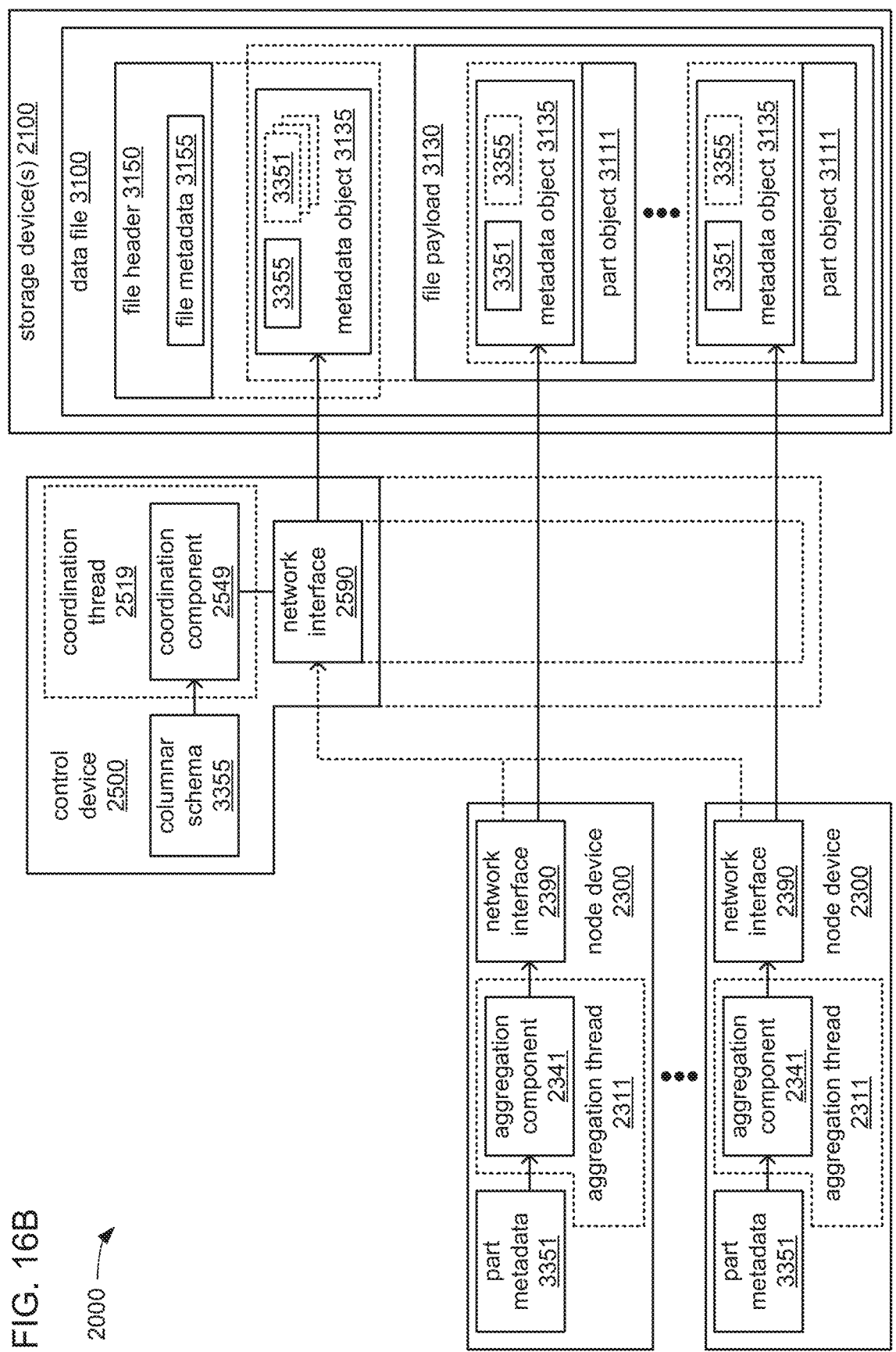
Figure 16C:
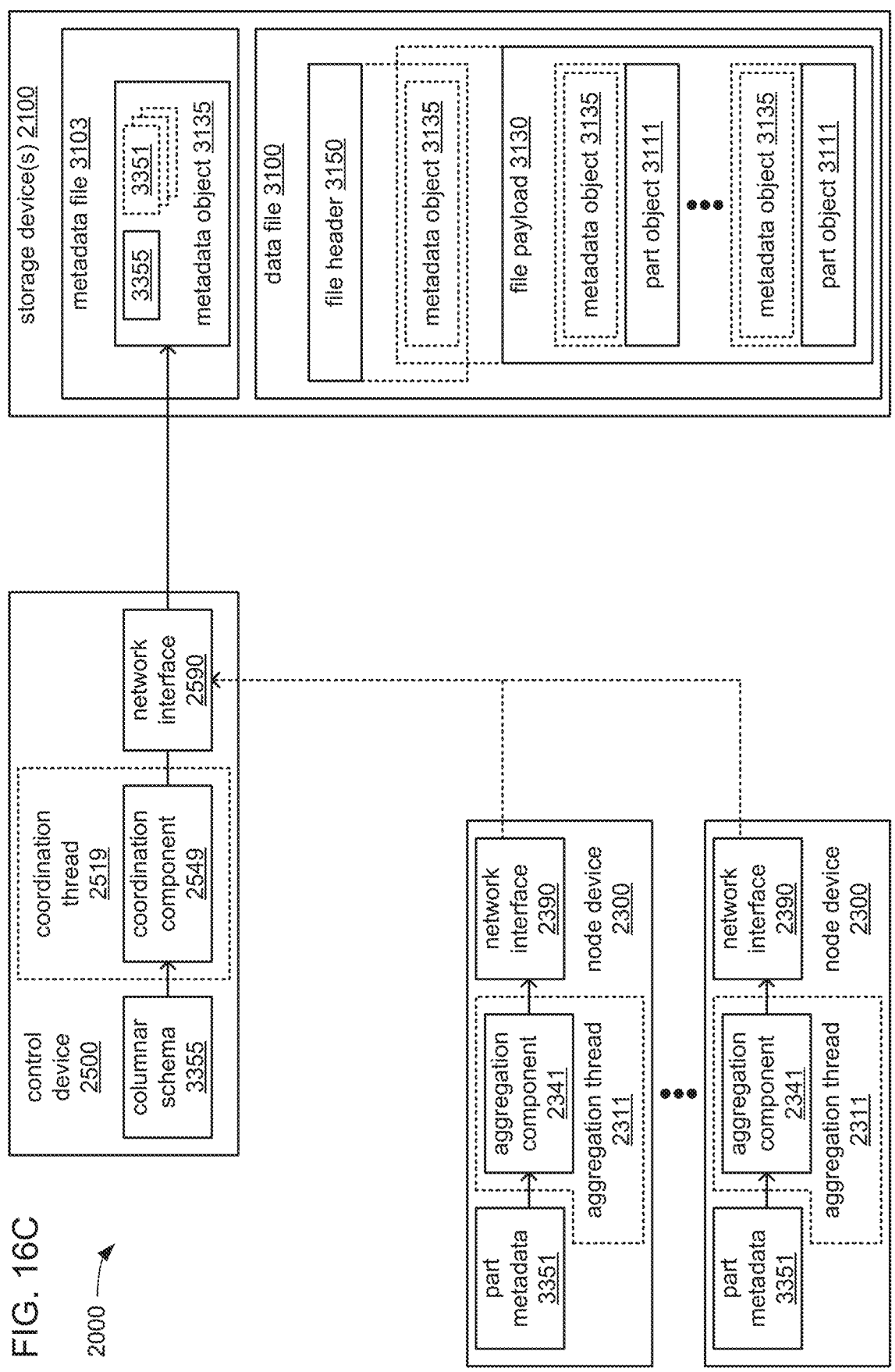

FIGS. 16A-C, together, depict various aspects of the manner in which the example data set 3300 that may have been prepared as depicted and discussed in connection with FIGS. 15A-I may then be persistently stored in columnar form within a single data file 3100 (as earlier depicted in at least FIGS. 14C and 14J) within storage space provided by the storage device(s) 2100 of the distributed system 2000 of either FIG. 13A or 13B. FIGS. 17A-F, together, depict various aspects of the manner in which the example data set 3300 that may have been prepared as depicted and discussed in connection with FIGS. 15A-I may then be persistently stored in columnar form across multiple data files 3100 (as earlier depicted in at least FIGS. 14D and 14K) within storage space provided by the storage device(s) 2100 of the distributed system 2000 of either FIG. 13A or 13B. FIGS.

Turning to FIG. 16A, within each aggregation thread 2311 within each node device 2300, and following the formation of a data set part 3311 and corresponding part metadata 3351 as a result of executing the corresponding instance of the aggregation component 2341 within the aggregation thread 2311, further execution of that instance of the aggregation component 2341 may cause core(s) 2355 of processor(s) 2350 to operate the network interface 2390 to transmit the data set part 3311 via the network 2999 to the storage device(s) 2100 to be persistently stored as a part object within the file payload 3130 of a single data file 3100 in which all other data set parts 3311 may also be persistently stored. As depicted, core(s) 2355 of processor(s) 2350 of other node devices 2300 may be caused to do the same, at least partially in parallel, as a result of executing other instances of the aggregation component 2311 within other aggregation threads 2311 therein.

It should also be noted that, although just a single instance of an aggregation component 2341 is actually depicted as being executed within just a single aggregation thread 2311 within each of the two depicted example node devices 2300, it may be that multiple aggregation threads 2311 have been instantiated within each node device 2300 with a separate corresponding instance of the aggregation component 2341 being executed by core(s) 2355 of processor(s) 2350 thereof. Thus, within each node device 2300, as well as among multiple node devices 2300, there may be multiple instances of the aggregation component 2341 being executed, thereby causing the at least partially parallel provision of multiple data set parts 3311 to the storage device(s) 2100 for persistent storage within the same single data file 3100.

As each data set part 3311 is so transmitted to the storage device(s) 2100, core(s) 2355 of processor(s) 2350 that are caused to operate a network interface 2390 to do so may be caused to accompany each such data set part 3311 with an instruction to the storage device(s) 2100 to persistently store that data set part 3311, using whatever protocol may have been selected for use in communicating portions of data sets 3300 to the storage device(s) 2100. Each such data set part 3311 may, alternatively or additionally, be accompanied by the data file identifier 3190 for the single data file 3100 and/or data set part identifier 3191 that uniquely refers to it. As previously discussed in reference to FIG. 14J, the data file identifier 3190 for such a single data file 3100 in which the entirety of a data set 3300 is persistently stored may be automatically formed by combining a universal unique identifier (UUID) of the data set 3300 with a file type identifier that specifies the file type of the single data file 3100. In other embodiments, it may be that the data file identifier 3190 for such a single data file 3100 may be at least partially formed based on manual input from an operator of the requesting device 2700, such as a manually entered text. However, it may be that the file type identifier is still required to be included in data file identifier 3190 to aid in identifying the data file 3100 as a data file and/or to identify the file type of the data file 3100.

As was discussed in each of the afore-listed Distributed File System Cases, the Distributed Encryption Cases, the Distributed Grouping Cases and the Distributed Indexing Cases, in some embodiments of the distributed processing system 2000 of either of FIG. 13A or 13B, it may be that the node devices 2300 are incapable of communicating directly with the storage device(s) 2100 and/or are not permitted to do so. In such embodiments, and as depicted with dotted lines in FIG. 16A, it may be that each of the data set parts 3311 are relayed to the storage device(s) 2100 through the control device 2500 (or through a node device 2300 that incorporates the controller 2503). In such embodiments, it may be the control device 2500 (or controller 2503) that generates the identifier for the single data file 3100, instead of the node device(s) 2300.

FIGS. 16B and 16C depict various options for the storage of sufficient metadata concerning the data parts 3311 of the data set 3300 to enable the data set 3300 to later be retrieved from the storage device(s) 2100 and reassembled for use as an input to various processing operations. Turning to FIG. 16B, in some embodiments, it may be that each data set part 3311 is stored as a part object 3111 that embeds (or is otherwise accompanied with) a metadata object 3135 that includes at least the corresponding part metadata 3351. Where each part object 3111 does have such a corresponding metadata object 3135 embedded therein, it may be that each data set part 3311 is caused to be combined with its corresponding metadata object 3135 to form a part object 3111 by execution of an instance of the aggregation component 2341 within a node device 2300 before that data set part 3311 is transmitted to the storage device(s) 2100. As with the earlier-discussed provision of the data set parts 3311 to the storage device(s) 2100 for persistent storage, it may be that the node devices 2300 are not able or not permitted to directly provide such metadata to the storage device(s) 2100 such that it must be relayed thereto through the control device 2500 (or through a node device 2300 that incorporates a controller 2503).

In some embodiments, it may be that a separate copy of the columnar schema 3355 is included within each of the metadata objects 3135 that are embedded within (or that otherwise accompany) each part object 3111 within the payload 3130 of the single data file 3100. However, as an alternative to the storage of such multiple copies of the columnar schema 3355, it may be that a single copy of the columnar schema 3355 is stored as part of a metadata object 3135 within either the file header 3150 or the file payload 3130 of the single data file 3100. As depicted, it may be that a core 2555 of a processor 2550 of the control device 2500 is caused by execution of an instance of the coordination component 2549 within a coordination thread 2519 to operate the network interface 2590 to transmit such a single metadata object 3135 that includes the columnar schema 3355 to the storage device(s) 2100 via the network 2999 to be so persistently stored.

Thus, as depicted, it may be that each data set part 3311 is persistently stored as a part object 3111 that is accompanied by its corresponding part metadata 3351 that stored therein (or therewith) as a corresponding metadata object 3135, and it may be that a single copy of the columnar schema 3355 is separately stored as still another metadata object 3135. However, in other embodiments, it may be that the part metadata 3351 corresponding to all of the data set parts 3311 within the single data file 3100 are stored together with such a single copy of the columnar schema 3355 within the single metadata object 3135 that may be stored within either the file header 3150 or the file payload 3130 of the single data file 3100. In such other embodiments, it may be that core(s) 2355 of processor(s) 2350 are caused by execution of instances of the aggregation component 2341 to operate corresponding network interfaces 2390 to transmit each part metadata 3351 to the control device 2500 (or to a controller 2503 within one of the node devices 2300) to be assembled together with the single copy of the columnar schema 3355 into the single metadata object 3135 for transmission to the storage device(s) 2100.

However, and turning to FIG. 16C, in still other embodiments, it may be that such a single metadata object 3135 that includes at least the columnar schema 3355, if not also the part metadata 3351 for all of the data set parts 3311 of the data set 3300, is persistently stored as a metadata object 3135 within an entirely separate metadata file 3103. Such separate storage of at least the columnar schema 3355 may be in addition to, or in lieu of, one or more of the above-described possibilities for the storage of the columnar schema 3355 and the part metadata 3351 for each data set part 3311 within the single data file 3100.

Again, as previously discussed in reference to at least FIG. 14J, where the single data file 3100 in which the entirety of a data set 3300 is persistently stored is accompanied by such another file as the separate metadata file 3103, those multiple files 3100 and 3103 may be maintained by the storage device(s) 2100 together within a subdirectory 2101. Further, the UUID of the data set 3300 may form part of the single data file identifier 3190 generated for the single data file 3100 and part of the metadata file identifier 3193 for the single metadata file 3103, and may be used by the storage device(s) 2100 to refer to the subdirectory 2101 in which these files are maintained.

Figure 17A:
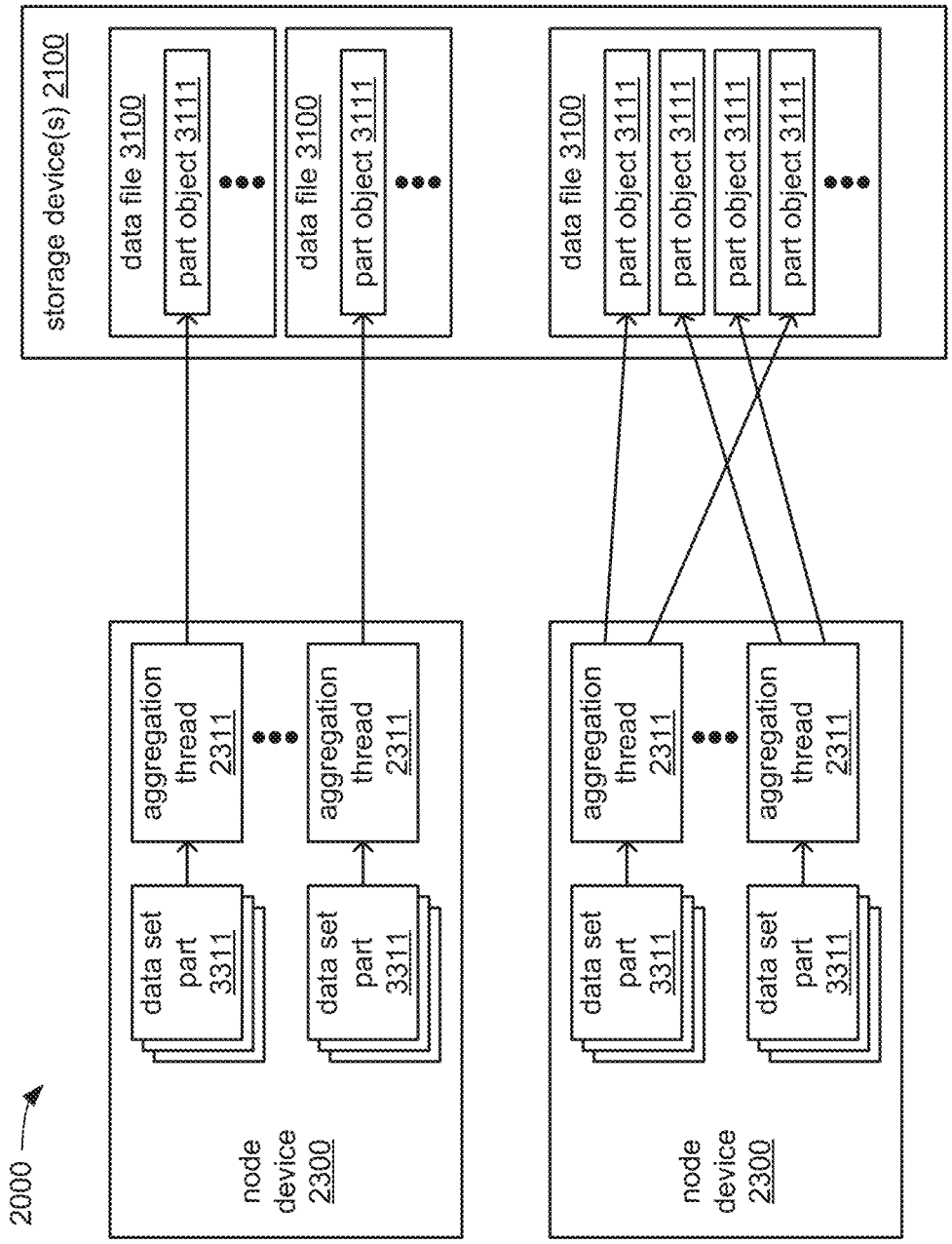
FIGS. 17A, 17B, 17C, 17D, 17E and 17F, taken together, illustrate aspects of an example embodiment of persistently storing a data set across multiple data files.

Turning to FIG. 17A, within each aggregation thread 2311 within each node device 2300, and following the formation of a data set part 3311 and corresponding part metadata 3351, further execution of the instance of the aggregation component 2341 may cause core(s) 2355 of processor(s) 2350 to operate the network interface 2390 to transmit the data set part 3311 via the network 2999 to the storage device(s) 2100 to be persistently stored as a part object within the file payload 3130 of one of multiple data files 3100 across which the data set parts 3311 of the data set 3300 may be persistently stored. Again, as depicted, core(s) 2355 of processor(s) 2350 of other node devices 2300 may be caused to do the same, at least partially in parallel, as a result of executing other instances of the aggregation component 2311 within other aggregation threads 2311 therein.

Again, and as more specifically depicted in FIG. 17A, it may be that multiple aggregation threads 2311 have been instantiated within each node device 2300 with a separate corresponding instance of the aggregation component 2341 being executed by core(s) 2355 of processor(s) 2350 thereof. Thus, within each node device 2300, as well as among multiple node devices 2300, there may be multiple instances of the aggregation component 2341 being executed, thereby causing the at least partially parallel provision of multiple data set parts 3311 to the storage device(s) 2100 for persistent storage across multiple data files 3100.

As also more specifically depicted in FIG. 17A, the ability to execute instructions within each aggregation thread 2311 independently of the execution of instructions within each of the others enables the transmission of data set parts 3311 from each aggregation thread 2311 toward the storage device(s) 2100 to be directed at storing data set part(s) 3311 within multiple separate data files 3100, regardless of whether those aggregation threads 2311 are instantiated within different node devices 2300 or within the same node device 2300. Alternatively or additionally, and as also depicted, there may be sufficient cooperation across two or more aggregation threads 2311 instantiated within the same node device 2300 to enable transmissions of data set parts 3311 from each to be directed at storing data set parts 3311 within the same one of the multiple data files 3100.

As previously discussed in reference to at least FIG. 14D, where the multiple data set parts 3311 of a data set 3300 is persistently stored across multiple data files 3100, it may be that just a single data set part 3311 is stored within each one of those multiple data files 3100, or it may be that each of at least a subset of the multiple data set files 3100 are caused to have multiple ones of the data set part 3311 stored therein. As also previously discussed in reference to at least FIG. 14K, where a data set is so persistently stored across multiple data files 3100, those multiple data files 3100 may be maintained by the storage device(s) 2100 together within a subdirectory 2101. Further, the UUID of the data set 3300 may form part of the data file identifier 3190 generated for each of the multiple data files 3100, and may be used by the storage device(s) 2100 to refer to the subdirectory 2101 in which all of the multiple data files 3100 are maintained.

Figure 17B:
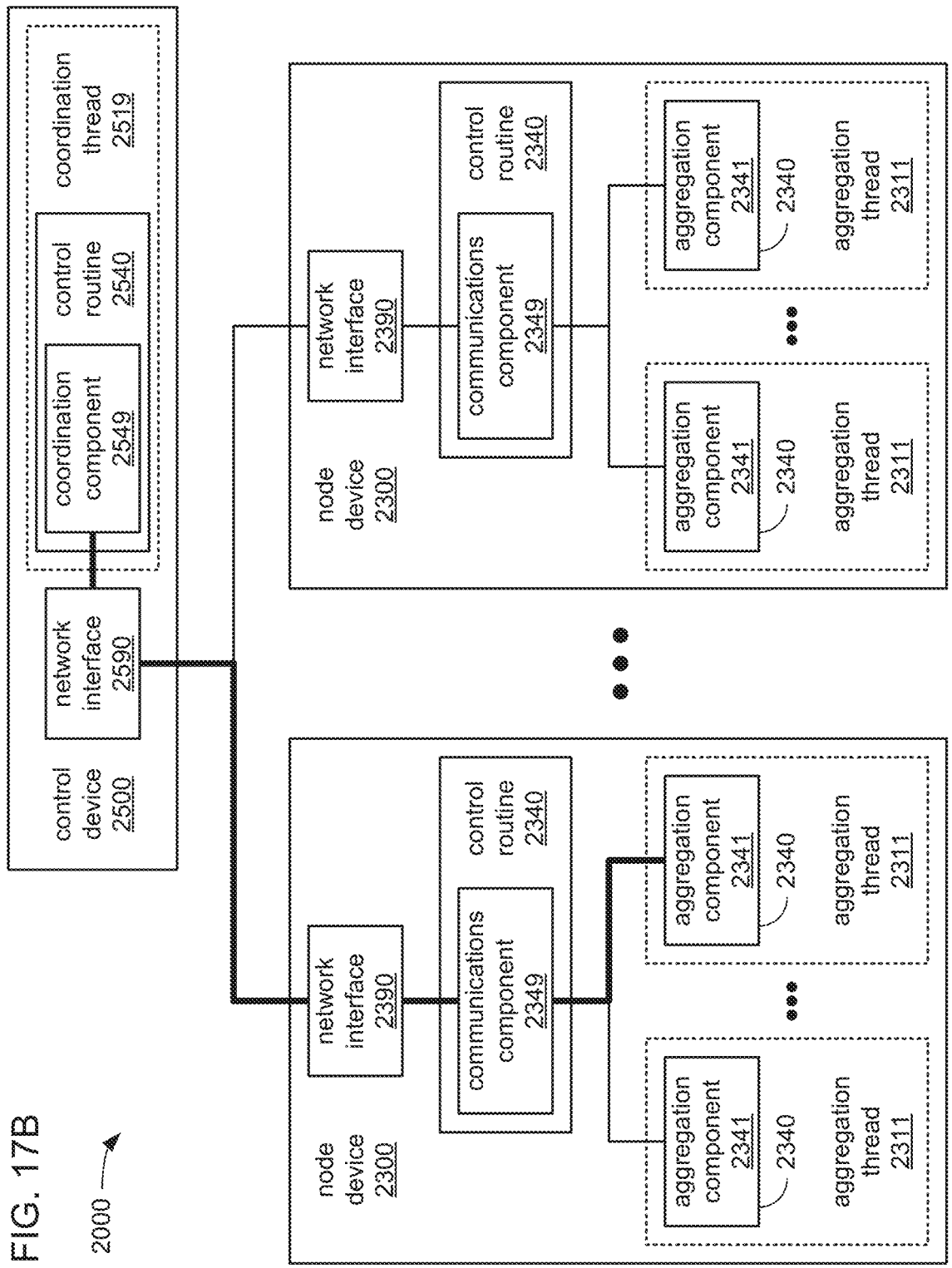

Turning to FIG. 17B, as previously discussed in reference to FIGS. 16A-C, at least where all data set parts 3311 of a data set 3300 were persistently stored within a single data file 3100, each transmission of a data set part 3311 to the storage device(s) 2100 may have been accompanied by an identifier for the single data file 3100 based on a combination of the UUID of the data set 3300 and an identifier of the file type of the single data file 3100. However, where the data set parts 3311 of a data set 3300 are to be stored across multiple data files 3100, it may be deemed desirable to assign a unique sequence number to each data set part 3311 to enhance various aspects of their persistent storage. More specifically, in preparation for transmitting a data set part 3311 to the storage device(s) 2100 from an instantiated aggregation thread 2311, it may be that core(s) 2355 of processor(s) 2350 within each node device 2300 are caused by execution of the corresponding instance of the aggregation component 2341 to operate the network interface 2390 to transmit a request for a unique sequence number for the data set part 3311 to the control device 2500 (or to a node device 2300 that incorporates a controller 2503).

Within the control device 2500, core(s) 2555 of processor(s) 2550 may be caused by execution of the coordination component 2549 to operate the network interface 2590 to monitor for such requests from node devices 2300 for such sequence numbers. As depicted with darkened lines, it may be that a protocol is used in transmitting such requests and/or the responses thereto that enables a "lock" to be formed through the network 2999 with one of the node devices 2300 from which such a request is received at a time. Such a lock may be used as a mechanism to ensure that such requests are responded to in the order in which they are received, and/or to ensure that a unique sequence number is generated for each single request, and not accidentally used in responding to more than one request.

Within each of the node devices 2300, access to the network interface 2390 thereof may be shared among the multiple aggregation threads 2311, and such sharing may be facilitated by a communications component 2349 of the control routine 2340 that, in being executed by core(s) 2355 of processor(s) 2350, may cause such core(s) 2355 to serialize access among the aggregation threads 2311 to the network interface 2390. In so doing, access to a lock formed between the control device 2500 and a node device 2300 may, accordingly, be serialized. Thus, while core(s) 2555 of processor(s) 2550 of the control device 2500 may be caused to form a lock with a node device 2300, core(s) 2355 of processor(s) 2350 of that node device 2300 may be caused to extend that lock to an aggregation thread 2311.

More specifically, for each request for a unique sequence number that is received at the control device 2500, a core 2555 of a processor 2550 of the control device may: 1) operate the network interface 2590 to cooperate with the requesting node device 2300 to implement a lock between the coordination thread 2519 and the requesting node device 2300; 2) increment a counter maintained under the control of a single instantiated coordination thread 2519 by an integer value of 1 to generate the next sequence number; 3) operate the network interface 2590 to transmit the newly generated sequence number back to the requesting node device 2300; and/or 4) further operate the network interface 2590 to disengage the lock. Correspondingly, core(s) 2355 of processor(s) 2350 within the requesting node device 2300 may be caused by execution of the communications component 2349 to extend the lock within the node device 2300 from the network interface 2390 to the aggregation thread 2311 from which the request originates during such communications with the control device 2500, and then disengage that extension of the lock within the node device 2300 to allow another of the aggregation threads 2311 access to such communications.

In embodiments in which each data set part 3311 is to be persistently stored within a separate data file 3100 such that there is to be one-to-one correspondence of data set parts 3311 and data files 3100, for each sequence number that is received by an aggregation thread 2311 from the control device 2500, a data file identifier 3190 may be formed within that aggregation thread 2311 from a combination of the UUID for the data set 3300, the received sequence number, and an identifier for the file type of whichever data file 3100 (out of multiple data files 3100) the data set part 3311 will be stored within. The core(s) 2355 of the processor(s) 2350 may then be caused to operate the network interface 2390 to so transmit the data set part 3311 to the storage device(s) 2100 along with the data file identifier 3190. The data file identifier 3190 (or at least the sequence number included therein) may be associated by the storage device(s) 2100 with both the data set part 3311 that it accompanies and the data file 3100 into which that data set part 3311 is persistently stored as a part object 3111. Additionally, and as previously discussed in connection with at least FIG. 14J, the UUID for the data set 3300 within the data file identifier 3190 may be associated by the storage device(s) with a subdirectory 2101 in which the multiple data files 3100 may be persistently stored.

However, in other embodiments in which multiple data set parts 3311 are to be stored in each of at least a subset of the multiple data files 3100, for each sequence number that is received by an aggregation thread 2311 from the control device 2500, a data set part identifier 3191 may be formed within that aggregation thread 2311 from at least the received sequence number, if not also the UUID for the data set 3300. The data file identifier 3190 may be formed from a combination of the UUID for the data set 3300, the received sequence number for one of the multiple data set parts 3311 that is to be stored within the data file 3100, and an identifier for the file type of the data file 3100 that the data set part 3311 is to be stored within as one of the multiple data set parts to be stored therein. The core(s) 2355 of the processor(s) 2350 may then be caused to operate the network interface 2390 to so transmit the data set part 3311 to the storage device(s) 2100 along with the data set part identifier 3191 and the data file identifier 3190. Again, the UUID for the data set 3300 within the data file identifier 3190 may be associated by the storage device(s) with a subdirectory 2101 in which the multiple data files 3100 may be persistently stored.

Within the storage device(s) 2100, the sequence number included in the identifier that accompanies each data set part 3311 that is received from the node devices 2300 may be used to check whether all of the data set parts 3311 have been received. More specifically, a check may be made as to whether a full sequence of the sequence numbers has been received such that none of the sequence numbers have been skipped such that its associated data set part 3311 has not yet been received. If a data set part 3311 is found to have not been received, then the storage device(s) 2100 may transmit an indication of there being at least one data set part 3311 that has not been received, and that indication may include the skipped sequence number as an identifier of the non-received data set part 3311.

Figure 17C:
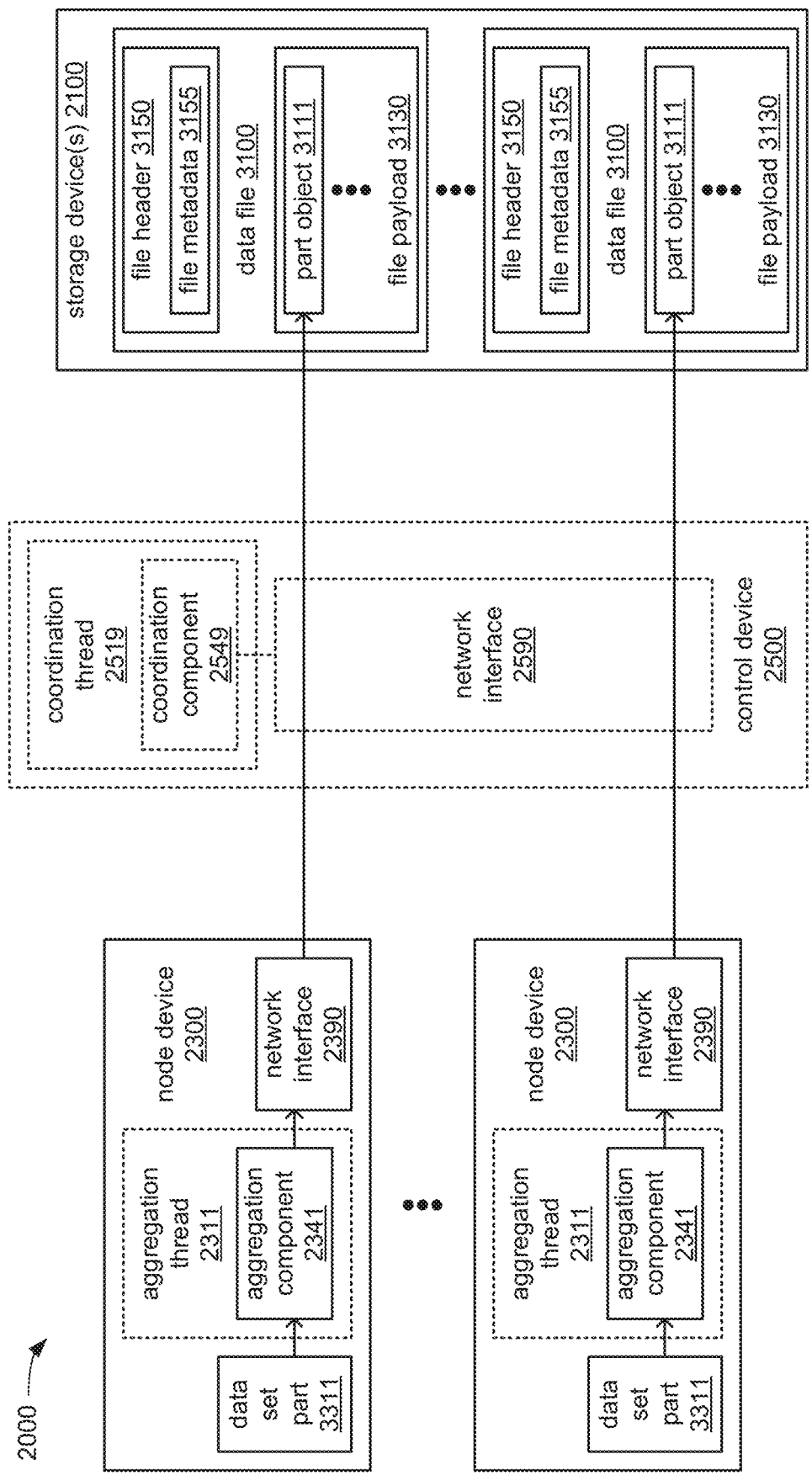

Turning to FIG. 17C, as each data set part 3311 is transmitted from an instantiated aggregation thread 2311 to the storage device(s) 2100, core(s) 2355 of processor(s) 2350 that are caused to operate a corresponding network interface 2390 of the corresponding node device to so transmit the data set part 3311 may be caused to accompany that data set part 3311 with an instruction to the storage device(s) 2100 to persistently store that data set part 3311, using whatever protocol may have been selected for use in communicating portions of data sets 3300 to the storage device(s) 2100. Again, it may be that the node devices 2300 are either incapable of communicating directly with the storage device(s) 2100 or are not permitted to do so. Thus, in such embodiments, and as depicted with dotted lines in FIG. 17C, it may be that each of the data set parts 3311 are relayed to the storage device(s) 2100 through the control device 2500 (or through a node device 2300 that incorporates the controller 2503). In such embodiments, it may be the control device 2500 (or controller 2503) that generates the identifier (including the unique sequence number) for each transmitted data set part 3311, instead of the node device(s) 2300.

Figure 17D:
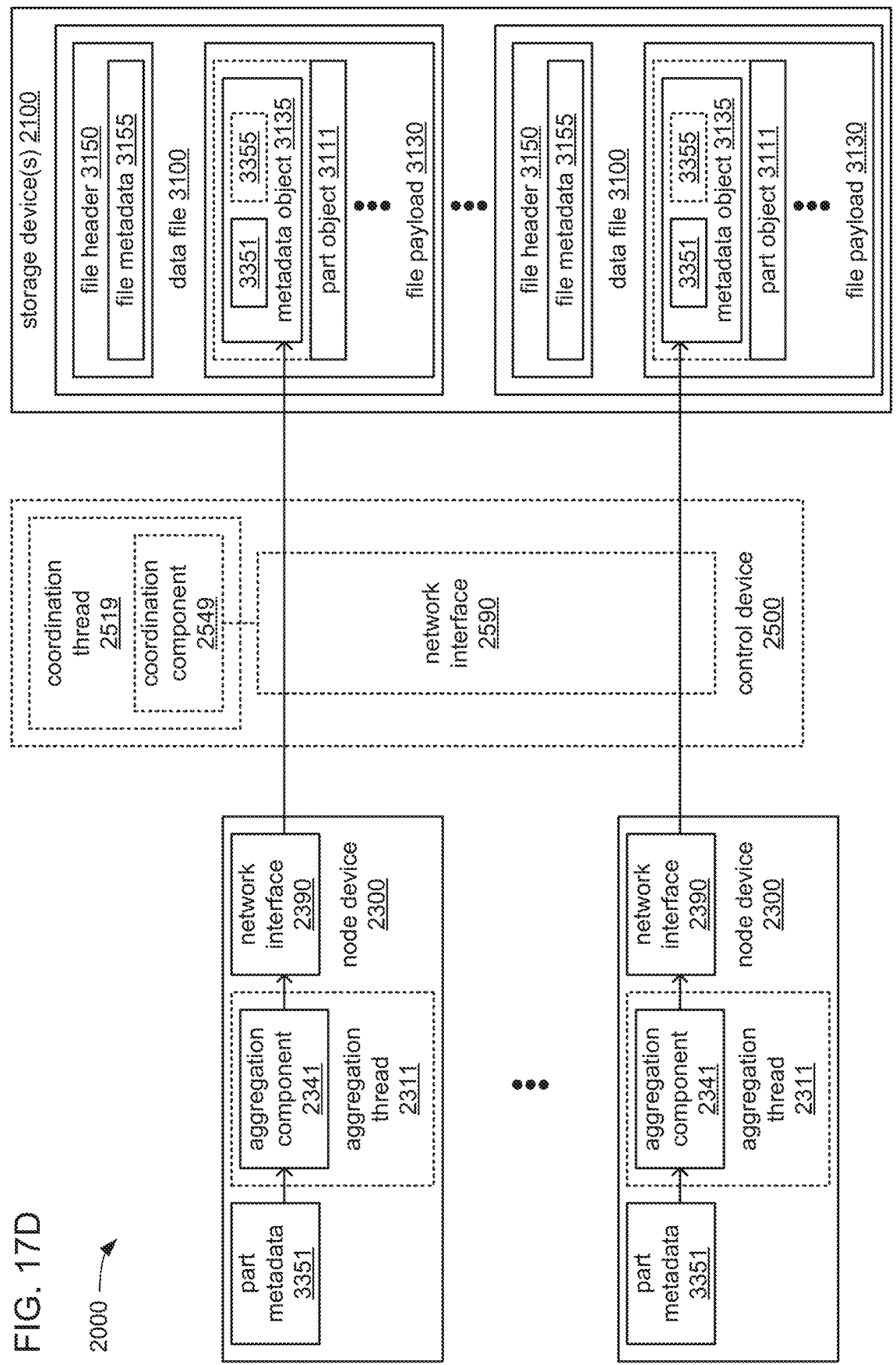
Figure 17E:
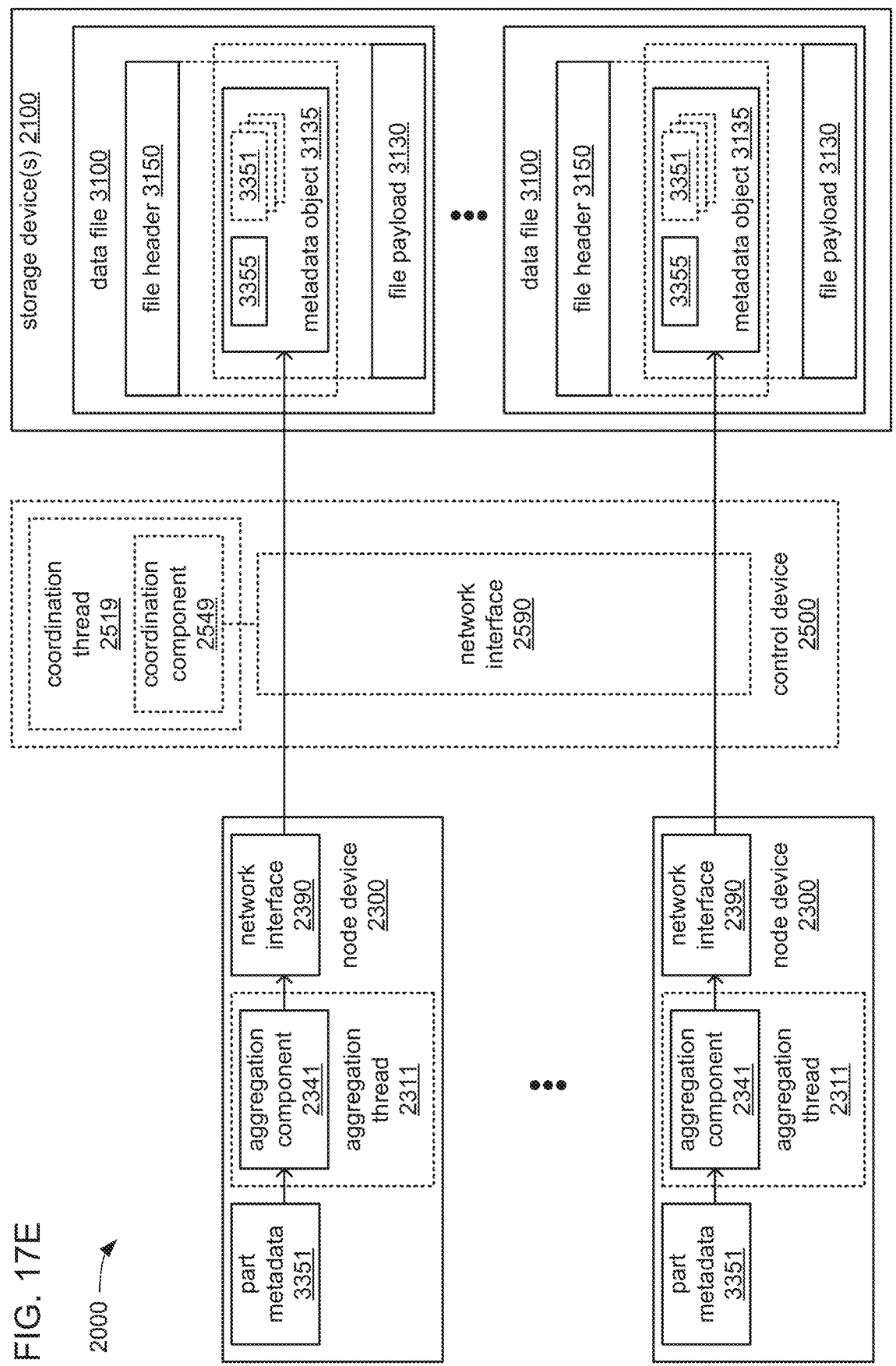
Figure 17F:
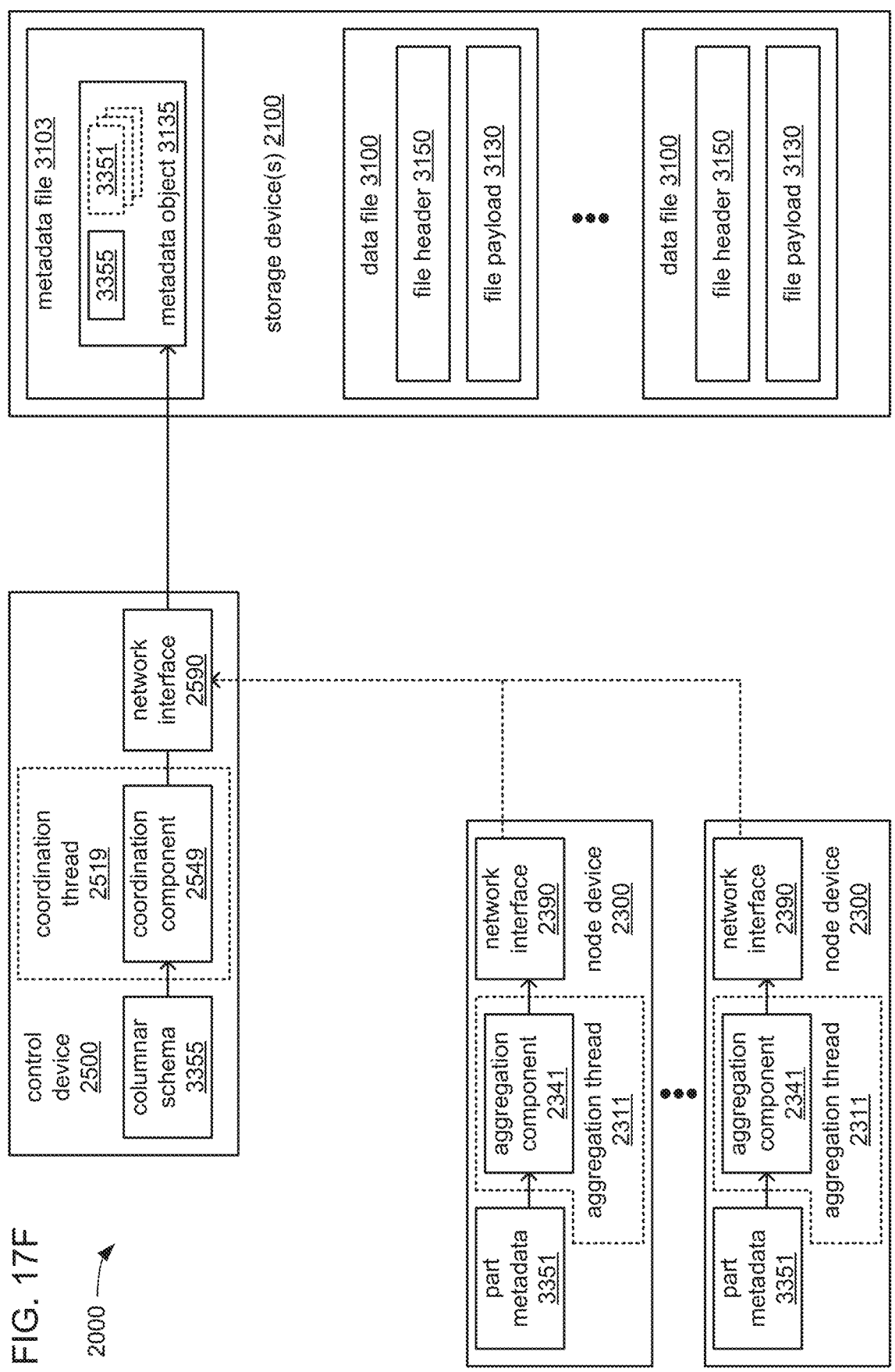

FIGS. 17D, 17E and 17F depict various options for the storage of sufficient metadata concerning the data parts 3311 of the data set 3300 to enable the data set 3300 to later be retrieved from the storage device(s) 2100 and reassembled for use as an input to various processing operations. Turning to FIG. 17D, in some embodiments, and in a manner resembling what was earlier depicted and described in reference to FIG. 16B, it may be that each data set part 3311 is stored as a part object 3111 that embeds (or is otherwise accompanied with) a metadata object 3135 that includes at least the corresponding part metadata 3351. Where each part object 3111 does have such a corresponding metadata object 3135 embedded therein, it may be that each data set part 3311 is caused to be combined with its corresponding metadata object 3135 to form a part object 3111 by execution of an instance of the aggregation component 2341 within a node device 2300 before that data set part 3311 is transmitted to the storage device(s) 2100. In some embodiments, it may be that a separate copy of the columnar schema 3355 is included within each of the metadata objects 3135 that are embedded within (or that otherwise accompany) each part object 3111 within the payload 3130 of the single data file 3100. Again, it may be that the node devices 2300 are not able or not permitted to directly provide such metadata to the storage device(s) 2100 such that it must be relayed thereto through the control device 2500 (or through a node device 2300 that incorporates a controller 2503).

Turning to FIG. 17E, as an alternative to the storage of such multiple copies of the columnar schema 3355 across multiple metadata objects that are embedded within (or that otherwise accompany) the part objects 3111, it may be that a copy of the columnar schema 3355 is stored as part of a metadata object 3135 that is persistently stored within either the file header 3150 or the file payload 3130 of each one of the multiple data files 3100. It may be that a core 2555 of a processor 2550 of the control device 2500 is caused by execution of an instance of the coordination component 2549 within a coordination thread 2519 to operate the network interface 2590 to transmit such a metadata object 3135 that includes the columnar schema 3355 to the storage device(s) 2100 via the network 2999 to be so persistently stored within each of the multiple data files. Thus, as depicted, it may be that, within each of the data files 3100, each data set part 3311 is persistently stored as a part object 3111 that is accompanied by its corresponding part metadata 3351 that is stored therein (or therewith) as a corresponding metadata object 3135, and it may be that a copy of the columnar schema 3355 is separately stored as a different metadata object 3135 within either the file header 3150 or the file payload 3130.

In other embodiments, it may be that the part metadata 3351 corresponding to all of the data set parts 3311 within each one of the multiple data files 3100 are stored together with a single copy of the columnar schema 3355 within the single metadata object 3135 that may be stored within either the file header 3150 or the file payload 3130 within that one of the multiple data files 3100. In such other embodiments, it may be that core(s) 2355 of processor(s) 2350 are caused by execution of instances of the aggregation component 2341 to operate corresponding network interfaces 2390 to transmit each part metadata 3351 to the control device 2500 (or to a controller 2503 within one of the node devices 2300) to be assembled together into separate metadata objects 3135 that each correspond to one of the data files 3100, and that each include the part metadata 3351 for each data set part 3311 that is stored within that one of the data files 3100.

However, and turning to FIG. 17F, in still other embodiments, it may be that a single metadata object 3135 that includes at least the columnar schema 3355, if not also the part metadata 3351 for all of the data set parts 3311 of the data set 3300, is persistently stored as a metadata object 3135 within an entirely separate metadata file 3103. Such separate storage of at least the columnar schema 3355 may be in addition to, or in lieu of, one or more of the above-described possibilities for the storage of the columnar schema 3355 and the part metadata 3351 for each data set part 3311 across the multiple data files 3100.

Figure 18A:
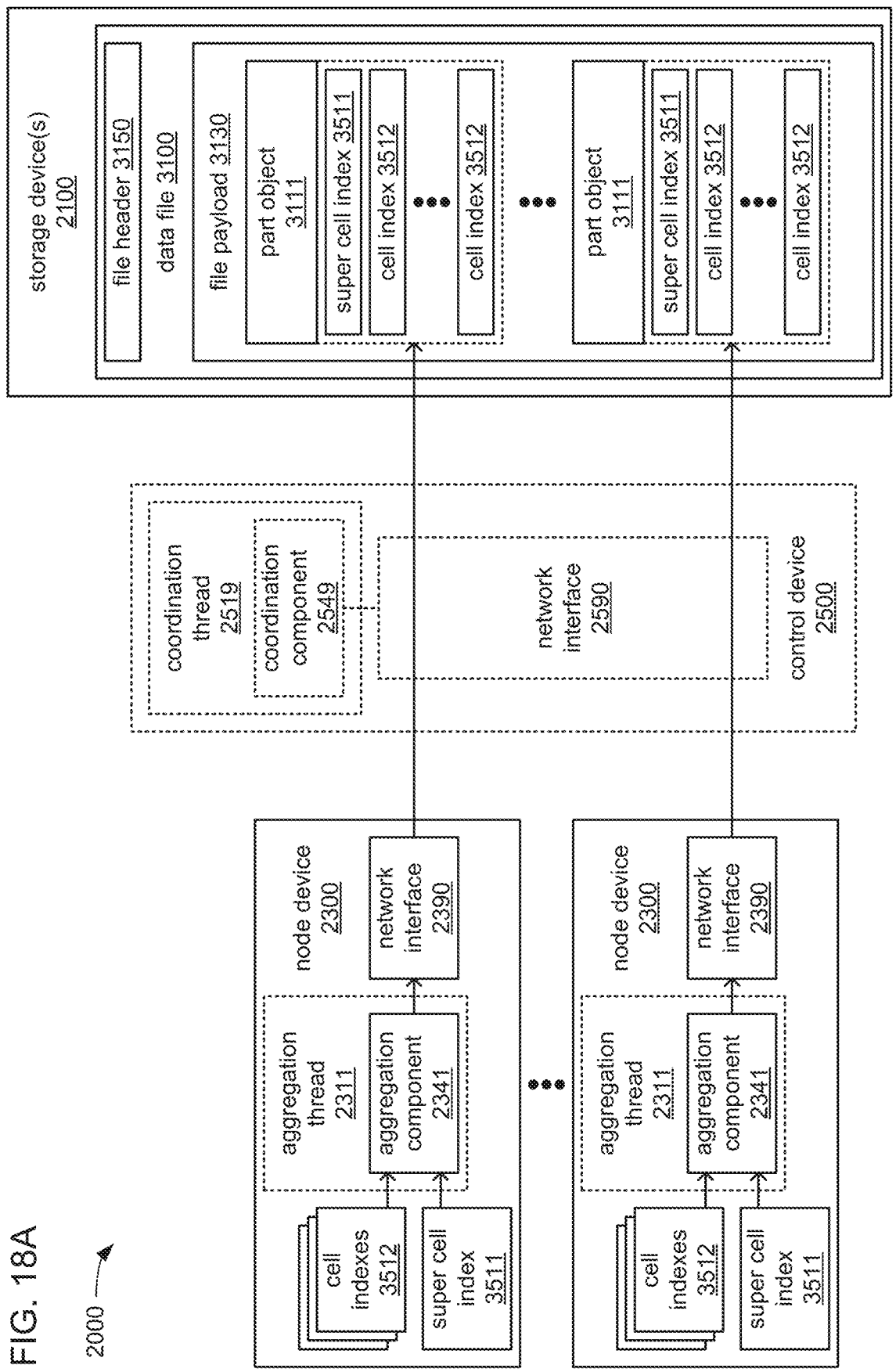
FIGS. 18A, 18B and 18C, taken together, illustrate aspects of an example embodiment of persistently storing a data set index.
Figure 18B:
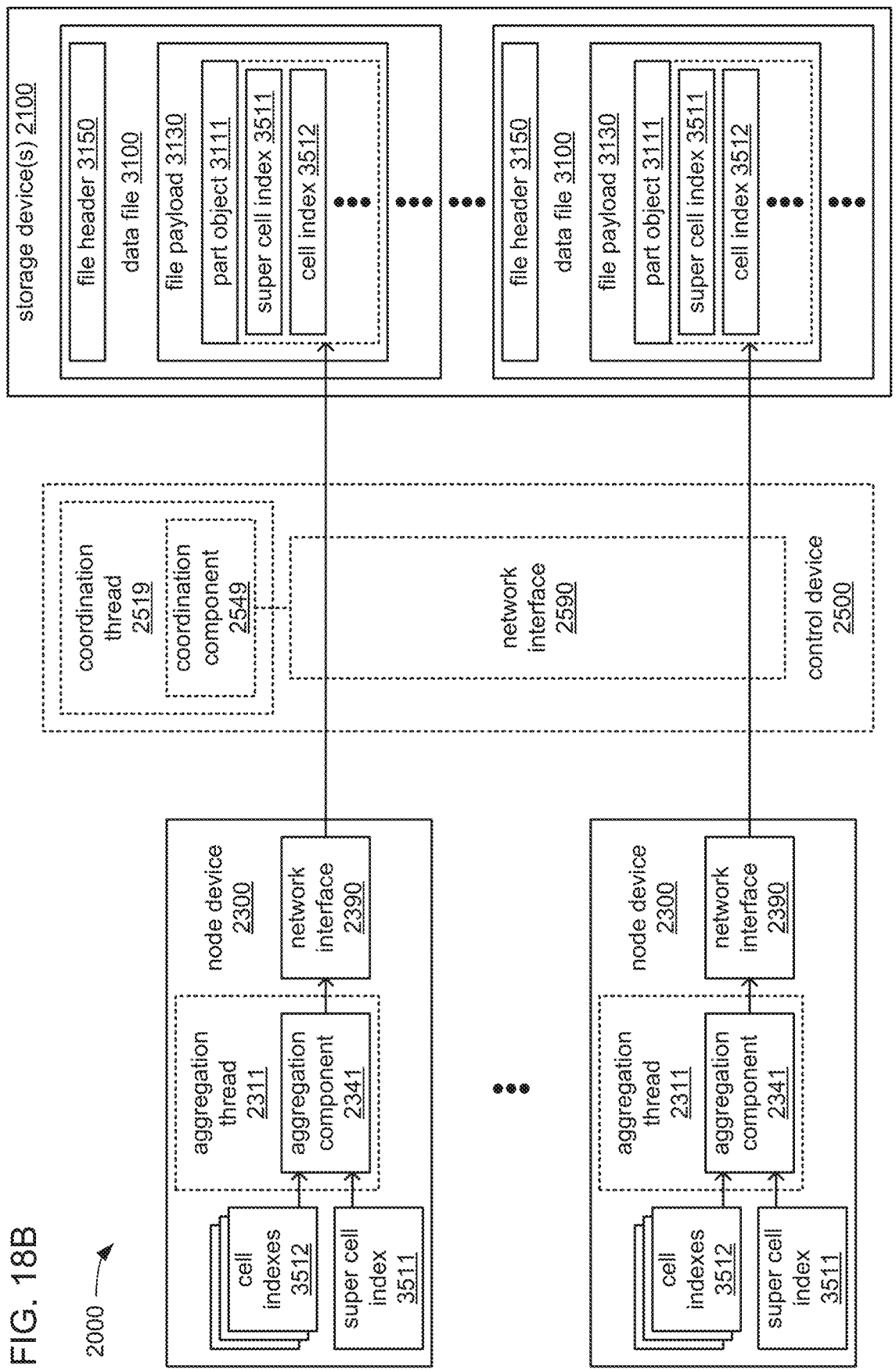
Figure 18C:
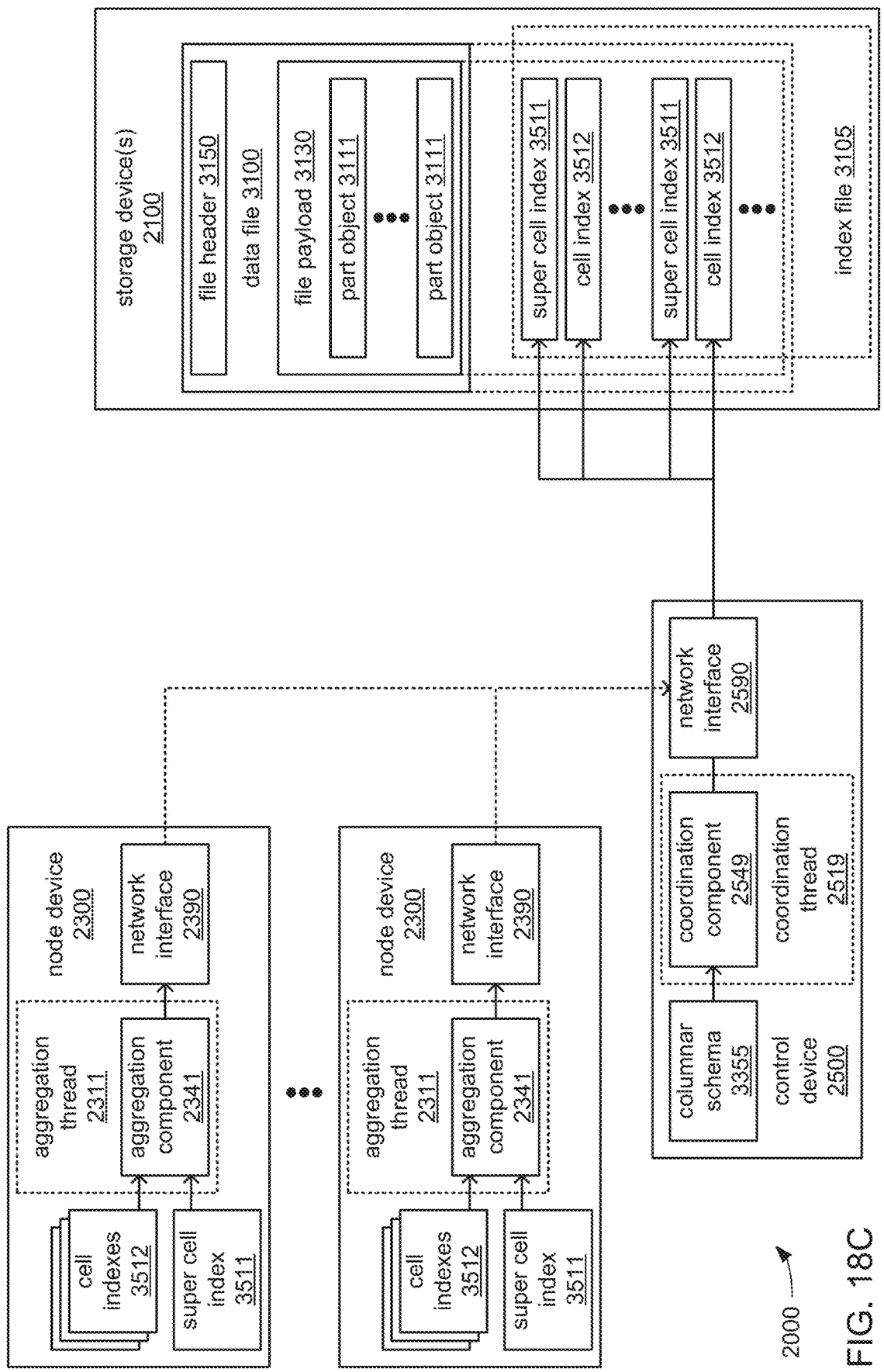

FIGS. 18A-C, together, depict various aspects of the manner in which an example data set index 3500, which was generated from the example data set 3300 that may have been prepared as depicted and discussed in connection with FIGS. 15A-I, may be persistently stored to enable its retrieval and use to retrieve a subset of the data set 3300. Like the data set metadata 3350 of the data set 3300, at least portions of the data set index 3500 may be persistently stored within the data file(s) 3100 within which the data set 3300 is persistently stored, and/or may be persistently stored in an entirely separate index file 3105.

Turning to FIG. 18A, in some embodiments, it may be that each data set part 3311 is persistently stored, within a single data file 3100, as a part object 3111 that embeds (or is otherwise accompanied with) a combination of the super cell index 3511 that corresponds to the data set part 3311, and multiple cell indexes 3512 that each correspond to one of the row groups 3312 within the data set part 3311. Where each part object 3111 does have such a corresponding combination of portions of the data set index 3500 embedded therein, it may be that each data set part 3311 is caused to be combined therewith to form a part object 3111 by execution of an instance of the aggregation component 2341 within a node device 2300 before that data set part 3311 is transmitted to the storage device(s) 2100. As with the earlier-discussed provision of the data set parts 3311 to the storage device(s) 2100 for persistent storage, it may be that the node devices 2300 are not able or not permitted to directly provide such metadata to the storage device(s) 2100 such that it must be relayed thereto through the control device 2500 (or through a node device 2300 that incorporates a controller 2503).

Turning to FIG. 18B, in other embodiments, where the data set parts 3311 are persistently stored in a manner across multiple data files 3100, it may again be that each data set part 3311 is stored as a part object 3111 that embeds (or is otherwise accompanied with) a combination of the super cell index 3511 that corresponds to the data set part 3311, and multiple cell indexes 3512 that each correspond to one of the row groups 3312 within the data set part 3311. Again, where each part object 3111 does have such a corresponding combination of portions of the data set index 3500 embedded therein, it may be that each data set part 3311 is caused to be combined therewith to form a part object 3111 by execution of an instance of the aggregation component 2341 within a node device 2300 before that data set part 3311 is transmitted to the storage device(s) 2100. Again, it may be that the node devices 2300 are not able or not permitted to directly provide such metadata to the storage device(s) 2100 such that it must be relayed thereto through the control device 2500 (or through a node device 2300 that incorporates a controller 2503).

Turning to FIG. 18C, in some embodiments, as an alternative to the storage of portions of the data set index 3500 in such a distributed manner as is described and depicted in connection with FIGS. 18A and 18B, it may be that the entirety of the data set index 3500 is stored all together, either within the file payload 3130 of a single data file 3100 (whether that data file 3100 is the sole data file 3100, or is one of multiple data files 3100), or within an entirely separate and distinct index file 3105.

Again, either where a single data file 3100 in which the entirety of a data set 3300 is persistently stored is accompanied by such other files as a separate metadata file 3103 and/or a separate index file 3105, or where there are multiple ones of the data files 3100 (regardless of whether they are accompanied by such other files), the resulting multitude of files may be maintained by the storage device(s) 2100 together within a subdirectory 2101. Further, the UUID of the data set 3300 may form part of the data file identifier 3190 generated for the single or multiple data files 3100, may form part of the metadata file identifier 3193 for such a metadata file 3103, may form part of the index file identifier 3195 for such an index file 3105, and/or may be used by the storage device(s) 2100 to refer to the subdirectory 2101 in which these multiple files are maintained.

Although not specifically depicted, it should again be noted that still other embodiments are possible in which the entireties of both a data set metadata 3350 and a data set index 3500 may be persistently stored together within a single file 3103 or 3105 that is still separate from the one or more data files 3100 in which a corresponding data set 3300 may be persistently stored. Indeed, and as also previously discussed, it may alternatively or additionally be that there is sufficient overlap between the contents of metadata and an index that these two are combined.

Figure 19A:
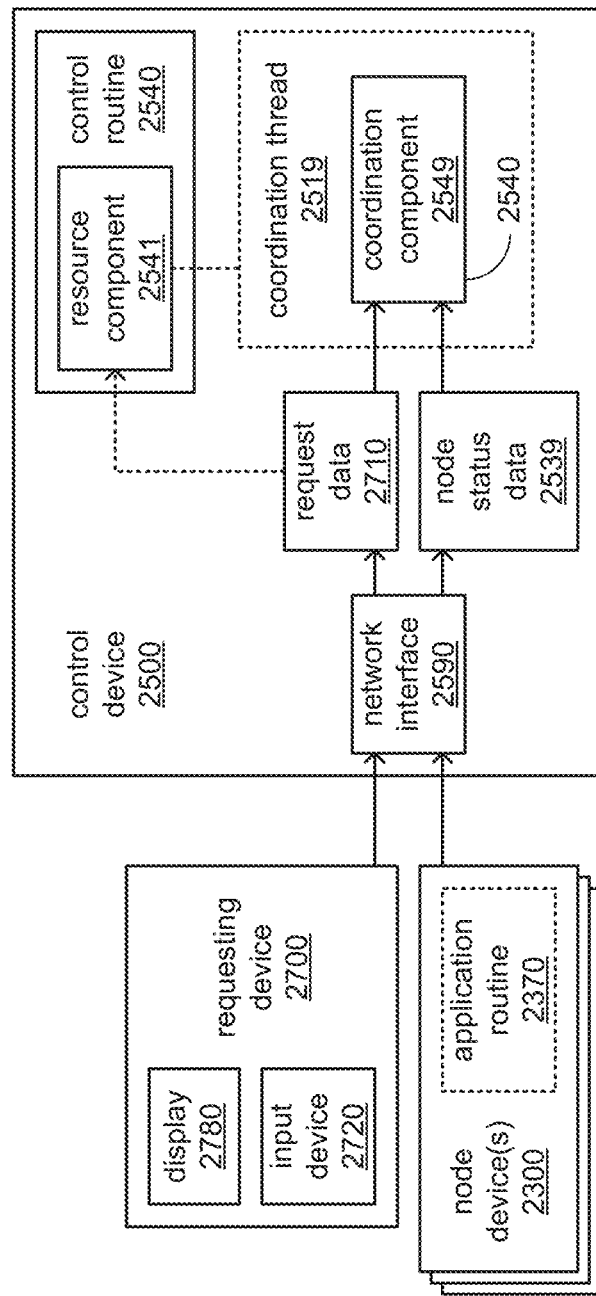
FIGS. 19A, 19B, 19C, 19D, 19E, 19F and 19G, taken together, illustrate aspects of an example embodiment of retrieving a data set from persistent storage.
Figure 19B:
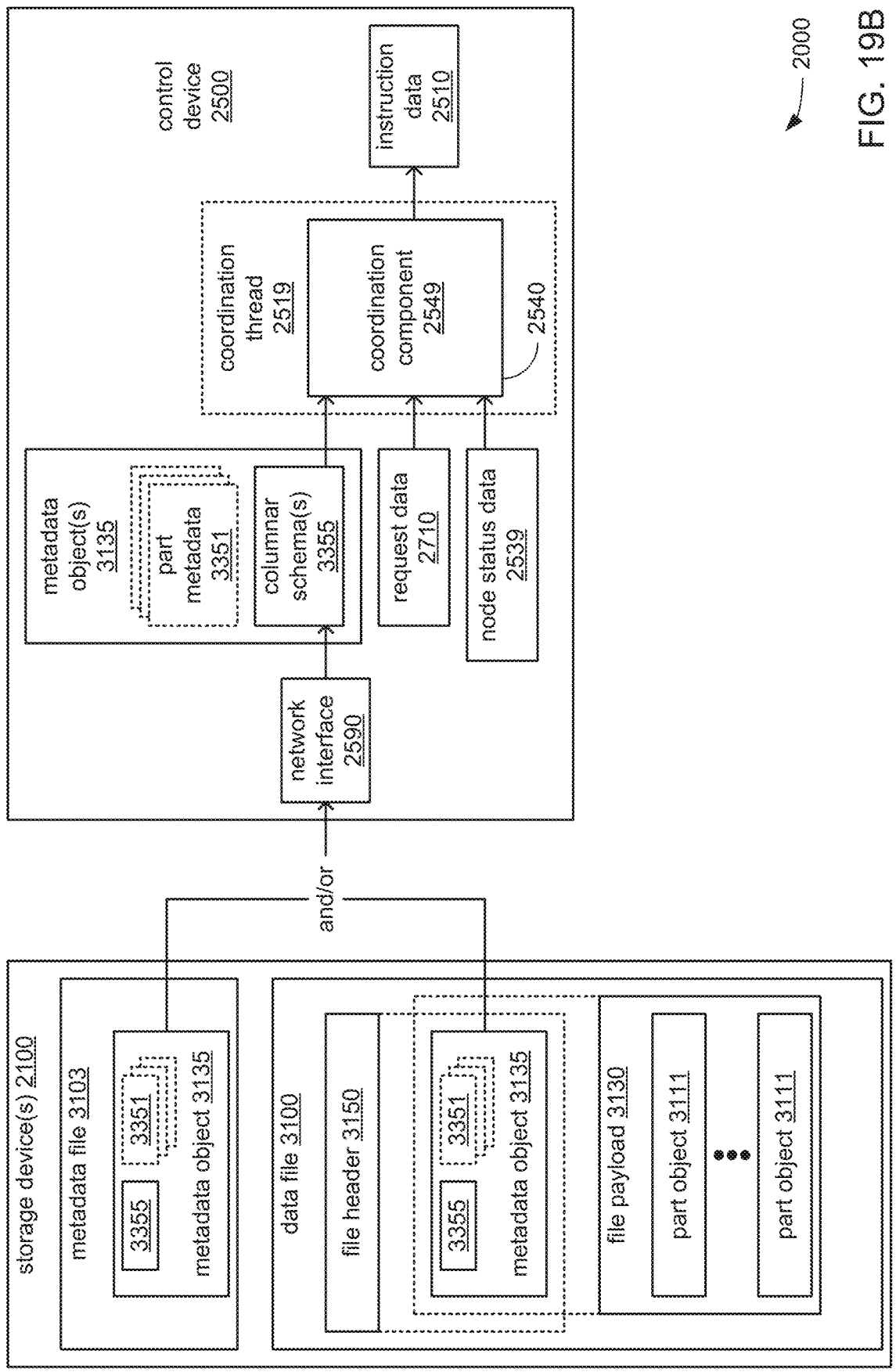
Figure 19C:
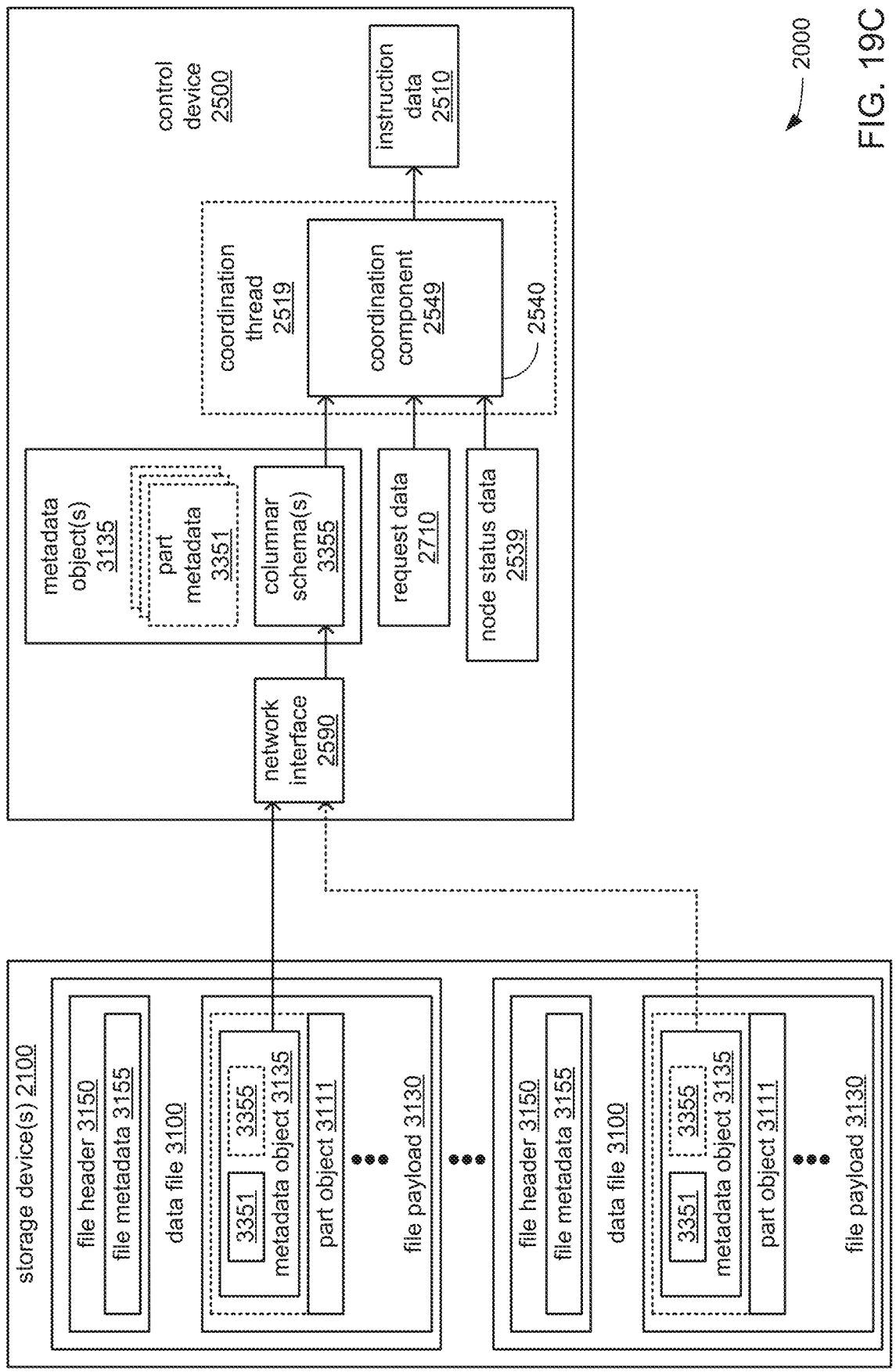
Figure 19D:
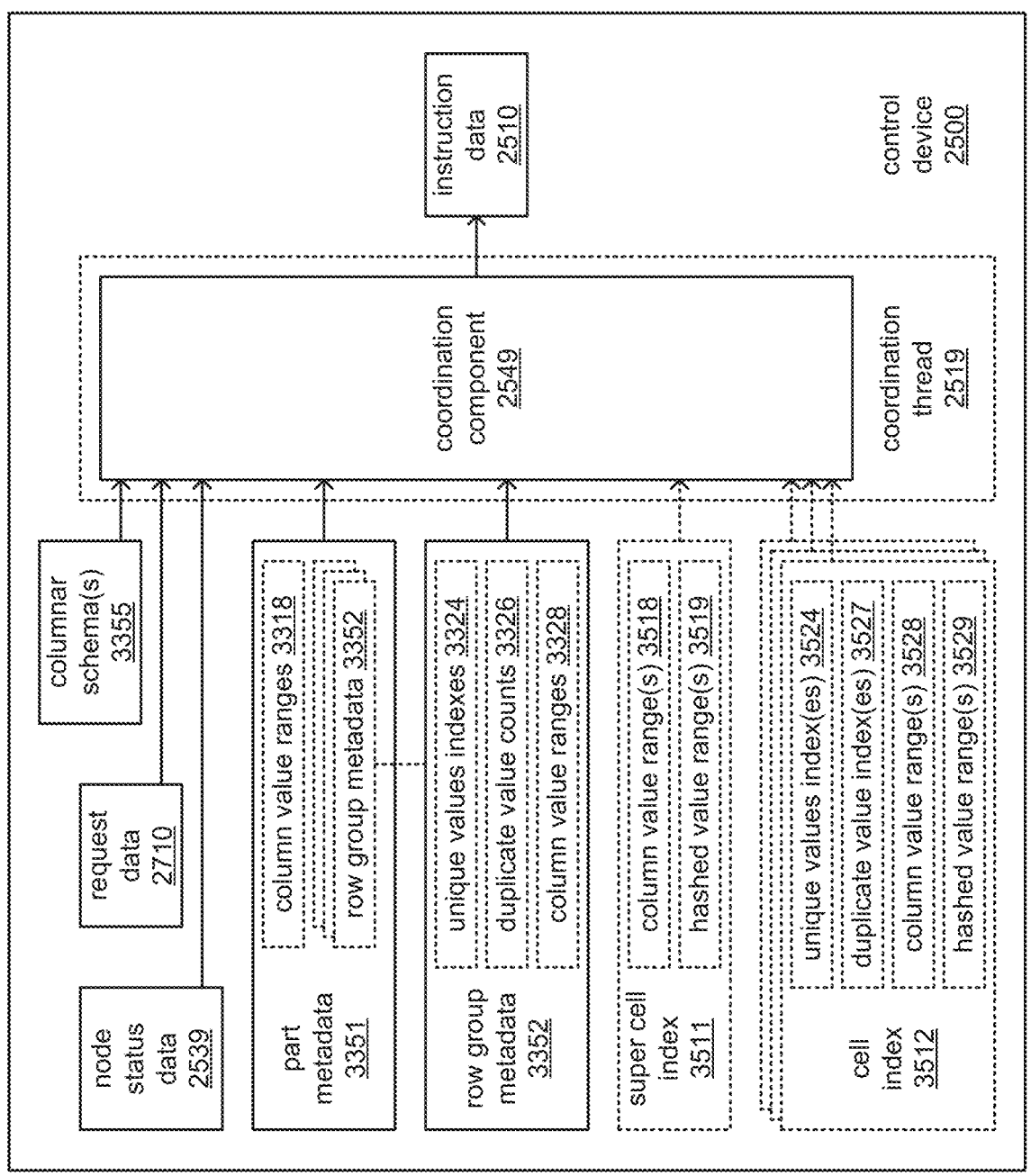
Figure 19E:
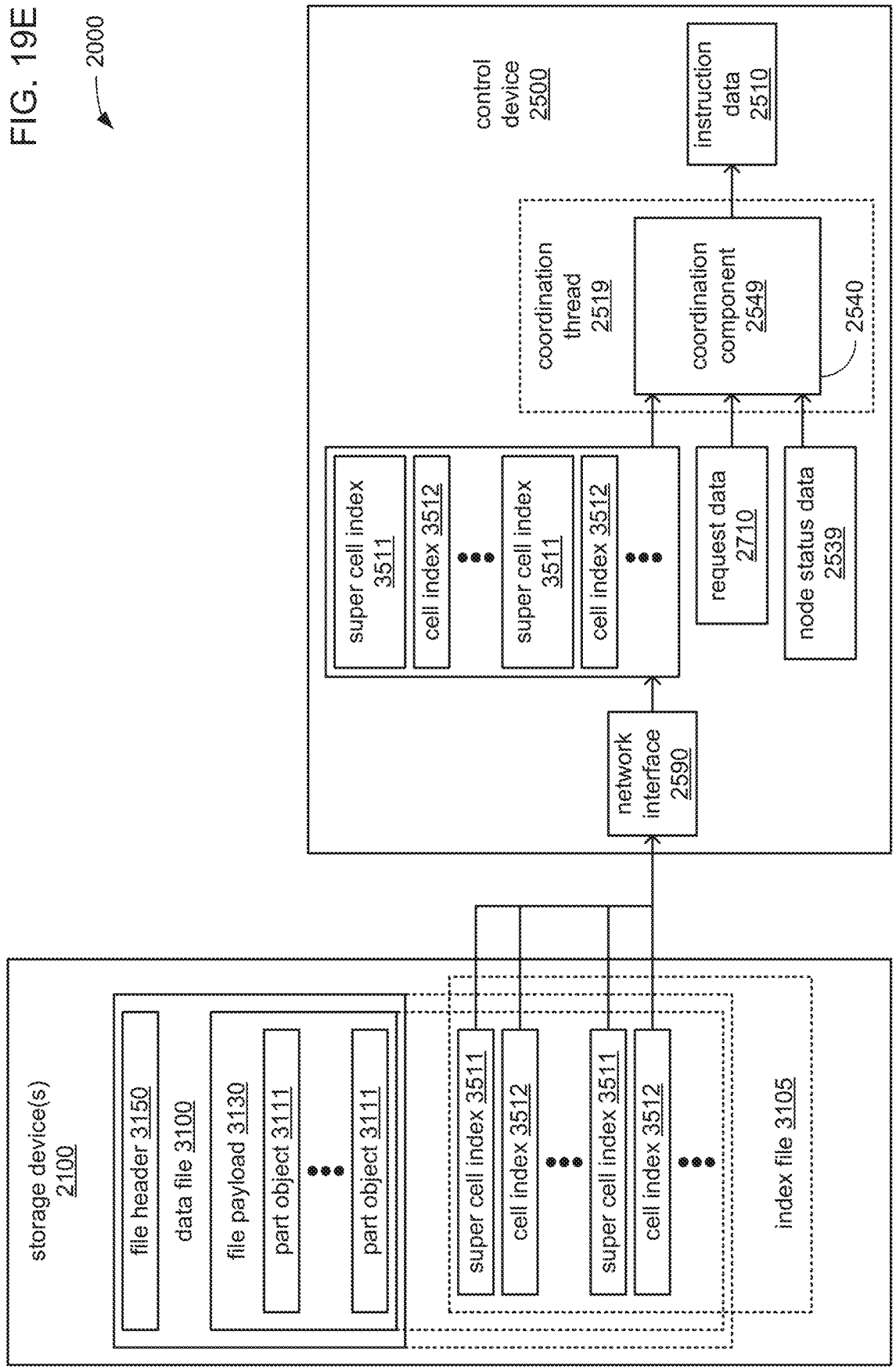
Figure 19F:
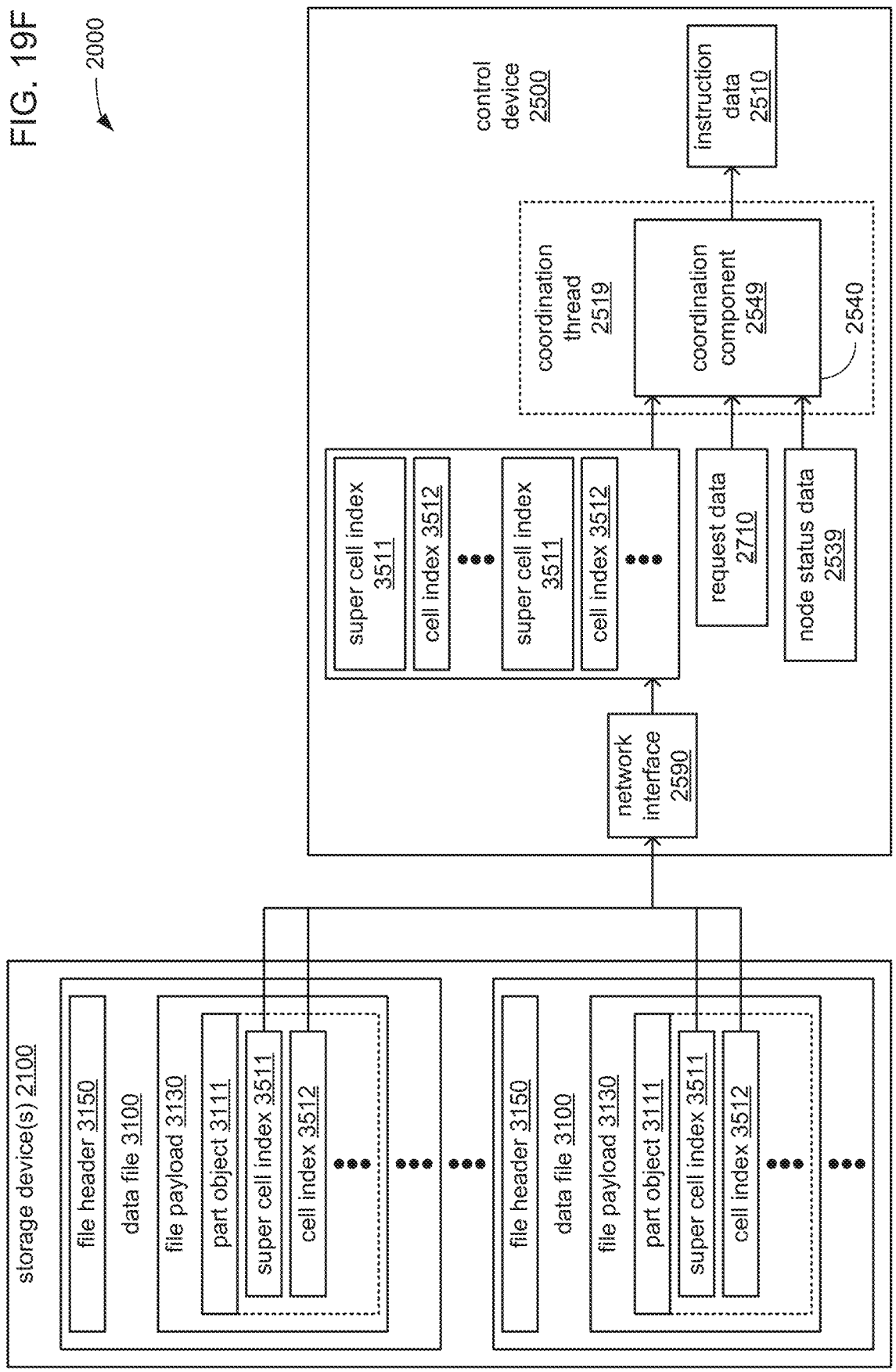
Figure 19G:
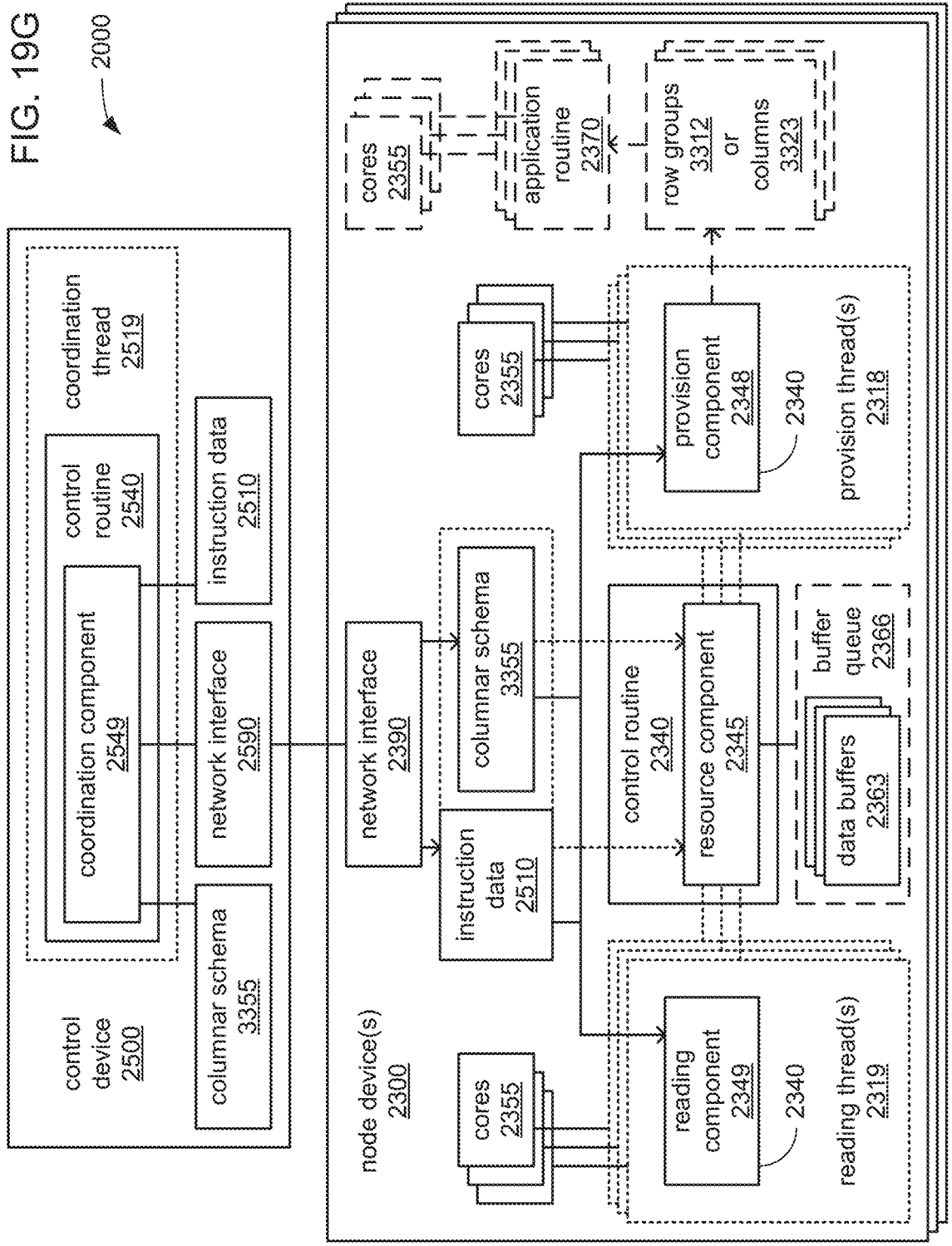

FIGS. 19A-G, together, depict various aspects of the manner in which an example data set 3300 may be retrieved from persistent storage in columnar form within storage space provided by the storage device(s) 2100 of the distributed system 2000 of either FIG. 13A or 13B. FIG. 19A depicts aspects of the receipt of the receipt of a request to retrieve the data set 3300 from persistent storage. FIGS. 19B-C, together, depict aspects of the retrieval, by the control device 2500, of at least portions of the data set metadata 3350 needed to assign and coordinate further aspects of the retrieval thereof among the node devices 2300. FIG. 19D depicts aspects of the use, by the control device 2500, of information within at least the data set metadata 3350 (if not also a corresponding data set index 3500) to select at least a subset of the data set parts 3311 to be retrieved in embodiments where the retrieval of just a subset of the data set 3300 is supported. FIGS. 19E-F, together, depict aspects of the retrieval, by the control device 2500, of at least portions of a corresponding data set index 3500 needed in support of selecting a subset of the data set 3300 to be retrieved for assignment to the node devices 2300. FIG. 19G depicts aspects of preparations for such further aspects for the retrieval of the data set 3300 within an example node device 2300. Following such preparations for the retrieval of the data set 3300 as are depicted and about to be described in connection with FIGS. 19A-G, the example data set 3300 may then be retrieved directly retrieved by node devices 2300 as depicted and described in reference to FIGS. 20A-J, or may be indirectly retrieved through the control device 2500 as depicted and described in reference to FIG. 21.

Turning to FIG. 19A, as previously discussed, a control device 2500 (or controller 2503) of the distributed processing system 2000 may receive, from a requesting device 2700, a request to retrieve the data set 3300 from persistent storage within the storage device(s) 2100. Similar to what was previously discussed in reference to FIG. 15B concerning the receipt of a request to persistently store the data set 3300, the received request may include an explicit instruction to retrieve the data set 3300. By way of example, ongoing distributed execution of the application routine 2370 may require the retrieval of the data set 3300 as an input to enable further distributed execution of the application routine 2370. It may be that one or more of the node devices 2300 is caused by such execution of the application routine 2370 to transmit such an explicit request to the control device 2500 via the network 2999 to cause the data set 3300 to be retrieved.

Alternatively, the received request may include instruction(s) that explicitly command the performance of one or more other tasks where the performance of those one or more other tasks necessarily includes retrieving the data set 3300 from persistent storage such that the command to retrieve the data set 3300 is thereby implied. By way of example, an operator of the requesting device 2700 may operate the requesting device 2700 to transmit a request to the control device 2500 (or the controller 2503) to begin the distributed execution of the application routine 2370, which may require the data set 3300 as an input to enable such distributed execution of the application routine 2370.

Regardless of the exact manner or reason for the provision of a request for the retrieval of the data set 3300 to the control device 2500 (or the controller 2503), and regardless of whether that request to do so is explicit or implied, the request may include request data 2710 conveying various details of the request. Such details may include, and are not limited to, the specific task(s) that are requested to be performed, the identifier (UUID) of the data set 3300, an identifier of the application routine 2370 that may be associated with the data set 3300 (e.g., where the data set 3300 is required as an input to execution of the application routine 2370, etc.), the data file identifier 3190 of at least one data file 3100 within which the data set 3300 was persistently stored, an identifier of the subdirectory 2101 (e.g., an identifier that may include the UUID of the data set), and/or encryption data (e.g., an encryption key, password or passphrase, etc.) needed for decrypting data set parts 3311 and/or row groups 3312. In embodiments where the retrieval of a particular subset of a data set 3300 from persistent storage is supported, the details conveyed in the request data 2710 may alternatively or additionally include, and are not limited to, indications of specific columns 3323 that are to be retrieved (e.g., by column identifier, by data type, by data format, etc.), and/or indications of which rows 3313 (or row groups 3312) are to be retrieved (e.g., based one or more data values within one or more data fields 3333 meeting one or more specified conditions).

In executing a resource component 2541 of the control routine 2540, a processor 2550 of the control device 2500 (or of the controller 2503) may be caused to respond to the receipt of the request by instantiating at least one coordination thread 2519. Within the at least one coordination thread 2519, at least one core 2555 of a processor 2550 of the control device 2500 may be caused to execute an instance of a coordination component 2549 of an instance of the control routine 2540. As will be explained in greater detail, in executing at least one instance of the coordination component 2549, one or more cores 2555 of processor(s) 2550 of the control device 2500 may be caused to perform various operations to coordinate a distributed performance, across multiple execution threads within multiple node devices 2300, of various tasks associated with retrieving the data set 3300.

Among the first of such coordinating operations that at least one core 2555 of processor(s) 2550 of the control device 2500 (or of the controller 2503) may be caused to perform may be to operate the network interface 2590 to receive indications of the current availability and/or allocation of processing, storage and/or other resources of each of the node devices 2300. In so doing, indications may also be received of which ones of the node devices 2300 are currently executing an instance of the application routine 2370 and/or are capable of execution a portion of the application routine 2370 such that a portion of the data set 3300 is to be provided thereto.

Also among the first of such coordinating operations that at least one core 2555 of processor(s) 2550 of the control device 2500 (or of the controller 2503) may be caused to perform may be the retrieval of at least a portion of the data set metadata 3350 (persistently stored as one or more metadata objects 3135) that is sufficient to include the columnar schema 3355. again, the columnar schema 3355 may specify such details as data types and/or sizes to which data values in particular columns are to conform, type(s) of compression and/or encryption that may be used in preparing a data set for persistent storage, quantities of rows 3313 per row group 3312 and/or quantities of row groups 3312 per data set part 3311, etc. As previously discussed, such details may necessarily be associated with the specifications for the file type of the data file(s) 3100 within which the data set 3300 may have been persistently stored. The retrieval of the data set metadata 3350 may also include the retrieval of instances of part metadata 3351 that are indicative of the manner in which corresponding ones of the data set parts 3311 of the data set 3300 were prepared for being persistently stored as part objects 3111.

Turning to FIG. 19B, where the entirety of the data set metadata 3350 has been persistently stored as a single metadata object 3135 within a separate and distinct metadata file 3103, such retrieval of the columnar schema 3355 and/or such instances of part metadata 3351 may entail accessing such a single metadata file 3103 to effect the retrieval of the metadata object 3135 therefrom. Alternatively, where the entirety of the data set metadata 3350 has been persistently stored as a single metadata object 3135 within either the file header 3150 or file payload 3130 of a single data file 3100 in which the entirety of the data set 3300 may have been persistently stored, such retrieval of the columnar schema 3355 and/or such instances of part metadata 3351 may entail accessing such a single data file 3100 to effect the retrieval of the metadata object 3135 therefrom. Alternatively, and turning to FIG. 19C, where the data set metadata 3350 has been divided into multiple instances of part metadata 3351 that have been persistently stored in a distributed manner such that each is persistently stored as a separate metadata object 3135 alongside (or embedded within) corresponding data set parts 3311 that have been persistently stored as part objects 3111, such retrieval of at least the columnar schema 3355 may entail accessing the single data file 3100, or one of the multiple data files 3100, to effect retrieval of one of such metadata objects 3135 therefrom. However, while retrieving the columnar schema 3355 may require the retrieval of just one of such multiple metadata objects 3135, obtaining the part metadata 3351 for each of the data set parts 3311 may entail the retrieval of all instances of such metadata objects 3135 from the single data file 3100, or all of the multiple data files 3100.

Turning to FIG. 19D, as previously discussed, in embodiments in which the retrieval of just a subset of the data set 3300 is supported, the request for the retrieval of the data set 3300 may specify particular columns 3323 (e.g., by column names, etc.), or may specify rows 3313 that have data value(s) meeting one or more specified criteria, etc. Where the retrieval of just particular columns 3323 is specified, and without any indication of the request being limited to rows 3313 that include particular data values, it may still be necessary to retrieve all of the data set parts 3311 of the data set 3300 in order to retrieve the specified columns from within each of the data set parts 3311. As has been described, various techniques may have been employed to compress and/or encrypt columns 3323 within each row group 3312 within each data set part 3311 such that retrieval of just portions of data set parts 3311 to retrieve particular column(s) 3323 may not be possible.

In contrast, where the retrieval of rows 3313 having data value(s) meeting one or more particular criteria is specified, there may be an opportunity to reduce the quantity of data set parts 3311 that must be retrieved. In such situations, core(s) 2555 of processor(s) 2550 of the control device 2500 (or of the controller 2503) may be caused to use information within the part metadata 3351 for each data set part 3311 to at least attempt to identify data set parts 3311 that could not possibly contain one or more rows 3313 having data value(s) that meet such specified criteria. As previously discussed, and as depicted, the part metadata 3351 for each data set part 3311 may include such pieces of information as the range of the data values (i.e., the highest and lowest data values) for each column 3323 across all of the row groups 3312 within the corresponding data set part 3311. As also previously discussed, and as also depicted, the part metadata 3351 for each data set part 3311 may include the row group metadata 3352 for each row group 3312 within the corresponding data set part 3311. Again, for each row group 3312 within a data set part 3311, the corresponding row group metadata 3352 may include, for each column 3323 within that row group 3312, such pieces of information as the unique data values and/or counts of duplicate data values therein, and/or the range of the data values (i.e., the highest and lowest data values) therein. The core(s) 2555 may be caused to use just the per data set part information provided in the part metadata 3351 for each data set part 3311, or may alternatively or additionally be caused to also use the per row group information provided within row group metadata 3352.

However, in some embodiments, it may be that the data set metadata 3350 lacks the particular information needed to enable the use of criteria based on data values that may be specified in the received request to reduce the quantity of data set parts 3311 that must be retrieved as just described, above. Instead, it may be that the data set 3300 was persistently stored along with a corresponding data set index 3500 that includes such information. In such situations, core(s) 2555 of processor(s) 2550 of the control device 2500 (or of the controller 2503) may be caused by to use information within at least the super cell index 3511 for each data set part 3311 to make the attempt at identifying data set parts 3311 that could not possibly contain one or more rows 3313 having data value(s) that meet such specified criteria. As previously discussed, and as depicted, the super cell index 3511 for each data set part 3311 may include such pieces of information as the range of the data values (i.e., the highest and lowest data values), and/or the range of hash values taken of the data values (i.e., the highest and lowest hash values), for each of at least a subset of the columns 3323 across all of the row groups 3312 within the corresponding data set part 3311. Also, for each row group 3312 within a data set part 3311, the corresponding cell index 3512 may include, for each of at least a subset of the columns 3323 within that row group 3312, such pieces of information as the unique data values and/or which unique values have at least one duplicate, the range of the data values therein, and/or the range hash values taken of the data values therein. The core(s) 2555 may be caused to use just the per data set part information provided in the super cell index 3511 for each data set part 3311, or may alternatively or additionally be caused to also use the per row group information provided within cell index 3512.

Turning to FIG. 19E, where at least a portion of the corresponding data set index 3500 is to be retrieved, and where the entirety of the data set index 3500 has been persistently stored all together within a separate and distinct index file 3105, such retrieval of the entirety of the data set index 3500 may entail accessing such a single index file 3105 to effect the retrieval thereof. Alternatively, where the entirety of the data set index 3500 has been persistently stored all together within either the file header 3150 or file payload 3130 of a single data file 3100 in which the entirety of the data set 3300 may have been persistently stored, such retrieval of the entirety of the data set index 3500 may entail accessing such a single data file 3100 to effect the retrieval thereof. Alternatively, and turning to FIG. 19F, where the data set index 3500 has been divided into multiple sets of a single super cell index 3511 and multiple cell indexes 3512 that each correspond to a single data set part 3311, and where each such set has been persistently stored alongside (or embedded within) the corresponding data set parts 3311 that have been persistently stored as part objects 3111, such retrieval of such a set may entail accessing the single data file 3100, or one of the multiple data files 3100, to effect retrieval thereof.

Returning to FIG. 19D, regardless of whether portions of the data set metadata 3350, or portions of the data set index 3500, or both are used to identify the data set parts that could not possibly contain one or more rows 3313 having data value(s) that meet the specified criteria, the data set part(s) 3311 that are not so identified may then be regarded as "candidate" data set parts 3311 (similar to the "candidate super cells" of the Distributed Indexing Cases). Following the retrieval of at least portions of the data set metadata 3350 and/or of the data set index 3500, further execution of the instance(s) of the coordination component 2549 within the at least one coordination thread 2519 may cause core(s) 2555 of processor(s) 2550 of the control device 2500 (or of the controller 2503) to generate instruction data 2510 that may include the retrieved columnar schema 3355 and/or the retrieved instances of part metadata 3351, as well as instructions to selected ones of the node devices 2300 for the coordinated performance of operations to at least effectuate the retrieval of the data set 3300 from persistent storage. Where the retrieval request did specify criteria to be met by ones of the rows 3313 and/or columns 3323 that are requested to be retrieved, and where it possible to use at least portions of the data set metadata 3350 and/or of the data set index 3500 along with such criteria to reduce the quantity of data set parts 3311 to just candidate data set parts 3311, such instruction data 2510 may identify just the candidate data set parts 3311 as the ones to be retrieved. Such core(s) 2555 of such processor(s) 2550 may then be caused to operate the network interface 2590 to transmit the instruction data 2510, including or otherwise accompanied by the corresponding columnar schema 3355, to each of the selected node devices 2300.

Turning to FIG. 19G, and as previously discussed in connection with FIG. 19A, in executing a resource component 2345 of the control routine 2340 within each node device 2300, core(s) 2355 of processor(s) 2350 of each such node device 2300 may be caused to operate the network interface 2390 thereof to monitor for the receipt of instructions from the control device 2500. In response to the receipt of the instruction data 2510 that includes an indication that a data set 3300 is to be retrieved from persistent storage, and/or that includes the columnar schema 3355 for the data set 3300 embedded therein (or otherwise accompanying the instruction data 2510), such core(s) 2355 of such processor(s) 2350 may be further caused to instantiate: 1) a pair of processes 2310; 2) multiple reading threads 2319 within one of the two processes 2310, where an instance of a reading component 2349 of the control routine 2340 is executed within each of the reading threads 2319; 3) multiple provision threads 2318 within the other of the two processes 2310, where an instance of a provision component 2348 of the control routine 2340 is executed within each provision thread 2318; and 4) a buffer queue 2366 that includes multiple data buffers 2363 that are operable together in a manner adhering to a FIFO algorithm to form a ring buffer of the multiple data buffers 2363.

Again, multiple cores 2355 of one or more processors 2350 within each such node device 2300 may be assigned to each of the two processes 2310. The cores 2355 assigned to one of the two processes 2310 may execute instructions of the instance of the reading component 2349 within each of the reading threads 2319 therein, while the cores 2355 assigned to the other of the two processes 2310 may execute instructions of the instance of the provision component 2348 within each of the provision threads 2318. As will shortly be explained in greater detail, within each node device 2300, data set parts 3311 of the data set 3300 may first be processed within the reading threads 2319 to become row groups 3312, and then within the provision threads 2318 to become rows 3313 or columns 3323 that are then provided to an instance of an application routine 2370 for use thereby. As will also shortly be explained, portions of metadata concerning the data set 3300 and/or of a data set index 3500 of the data set 3300 may be used within each of the threads 2319 and/or 2318. As will further be explained, the buffer queue 2366 may provide a thread-safe mechanism by which row groups 3312 and their associated portions of data set metadata 3350 and/or of a data set index 3500 may be exchanged between reading threads 2319 and provision threads 2318.

In some embodiments, the quantity of reading threads 2319, the quantity of provision threads 2318, and/or the quantity of data buffers 2363 that are initially instantiated and/or actively used may be predetermined initial quantities. In other embodiments, one or more of these three initial quantities may be derived based on observations of available processing, storage and/or other resources within each of the node devices 2300 at the time that one or more of the reading threads 2319, the provision threads 2318 and/or the data buffers 2363 are initially instantiated. In still other embodiments, it may be that the instruction data 2510 provides an indication to each node device 2300 of how many data set parts 3311 each node device 2300 is to retrieve and/or perform various operation with as part of preparing at least a subset of the data set 3300 to be. In yet other embodiments, each node device is given indications of the total quantity of data set parts 3311 of the data set 3300, and total quantity of node devices 2300 that will be used to retrieve the data set 3300 to enable each node device 2300 to estimate the quantity of data set parts 3311 that each node device 2300 is to retrieve. Such indications of quantities of data set parts 3311 and/or of node device 2300 may serve as additional factors in the determination of initial quantities of reading threads 2319, data buffers 2363 and/or provision threads 2318. The interposing of the buffer queue 2366 between the reading threads 2319 and the provision threads 2318 to provide a thread-safe mechanism for transfers therebetween serves to decouple the quantities of the threads 2319 and 2318 such that the quantity of each that is instantiated, and/or that is actively used such that instructions are being executed therein, may be selected, derived and/or altered without regard to the corresponding quantity of the other.

Regardless of the exact manner in which the initial quantities of the reading threads 2319, the provision threads 2318 and/or the data buffers 2363 is selected and/or derived, it may be that, subsequent to such initial instantiations, one or more of these three quantities are meant to be dynamically adjusted as various ones of the aforedescribed operations to data set parts 3311 are performed within the reading threads 2319 and the provision threads 2318, and/or as the aforedescribed exchanges are made therebetween through the buffer queue 2366. More specifically, as such operations are performed within each thread 2319 and/or 2318, further execution of the resource component 2345 within each node device 2300 may cause core(s) 2355 of processor(s) 2350 thereof to monitor, on an ongoing basis, the availability of processing, storage and/or other resources of the node device 2300 versus the consumption of such resources by each thread 2319 and 2318 that is currently instantiated and active such that instructions are currently being executed therein, and/or the consumption of such resources by the operation of the buffer queue 2366.

Again, it may be that the multiple node devices 2300 of the distributed processing system 2000 are employed in persistently storing, retrieving and/or performing distributed processing operations on more than one data set at the same time. Thus, the availability of processing, storage and/or other resources within each of the node devices 2300 may be changing on an ongoing basis as a result of performing other operations that are entirely unrelated to the operations being performed that are associated with retrieving the data set 3300 from persistent storage. Thus, such levels of availability versus consumption of each of such resources may become factors used in determining, on an ongoing basis, whether the quantities of the reading threads 2319, of the provision threads 2318 and/or of the data buffers 2363 that are instantiated, and/or that are actively used, are to be increased or decreased.

Alternatively or additionally, further execution of the resource component 2345 within each node device may cause core(s) 2355 of processor(s) 2350 thereof to monitor, on an ongoing basis, aspects of the rate at which data set parts 3311 are processed through the reading collection threads 2319 and/or the provision threads 2318. As previously explained in greater detail, differences in various characteristics of rows 3313, and/or of the row groups 3312 generated therefrom, may cause differences in the rate at which operations are performed among the reading threads 2319, and/or differences in the rate at which operations are performed among the provision threads 2318. Alternatively or additionally, there may be a difference between the rate at which the reading threads 2319 are able to prepare data set parts 3311 within the buffer queue 2366 and the rate at which the provision threads 2318 are able to access the row groups 3312 from the buffer queue 2366 to retrieve the requested rows 3313 and/or columns 3323 therefrom. Thus, such differences may become factors used in determining, on an ongoing basis, whether the quantities of the reading threads 2319, of the provision threads 2318 and/or of the data buffers 2363 that are instantiated, and/or that are actively used, are to be increased or decreased.

By way of example, within each node device 2300, it may be that the progress that is made in processing data set parts 3311 through each of the reading threads 2319, the buffer queue 2366 and the provision threads 2318 is used as a basis to stagger the instantiation and uninstantiation of each of the threads 2319 and 2318, at least partially through dynamic adjustments of the quantities of each that are instantiated and actively used. More specifically, it may be that just reading threads 2319 are instantiated, at first, to begin the processing of data set parts 3319 through the reading threads 2319 to prepare the row groups 3312 therein for being accessed within the buffer queue 2366. As at least one of the reading threads 2319 is able to complete such preparations, the quantity of reading threads 2319 that are instantiated and/or actively used is dynamically reduced eventually to zero. It may further be that, as the last row groups 3312 are accessed to retrieve the requested rows 3313 and/or columns 3323 therefrom, the quantity of provision threads 2318 that are instantiated and/or actively used is dynamically reduced eventually to zero.

Similar to what was previously discussed in reference to the threads 2312 and 2311, the manner in which the quantity of the threads 2319 or 2318 that are instantiated and actively used is dynamically increased is by instantiating more of the threads 2319 or 2318, and that the manner in which such a quantity is dynamically decreased is by uninstantiating one or more of the threads 2319 or 2318. However, in other embodiments, the manner in which the quantity of the threads 2319 or 2318 that are instantiated and actively used is dynamically increased is by causing more of the threads 2318 or 2318 that may have been instantiated earlier to become actively used such that instructions are executed therein by at least one core 2355, and that the manner in which such a quantity is dynamically decreased is by causing the execution of instructions to be suspended within one or more of the threads 2319 or 2318 that were being actively used. As will be familiar to those skilled in the art, such suspension of execution of instructions within a thread may also release a core 2355 that was assigned to execute instructions therein to become available for use in executing other instructions elsewhere, but may not release all of the storage space within the storage 2360 that is occupied by that thread such that at least the storage space required to preserve aspects of the current state of that thread may remain allocated and occupied.

Figure 20A:
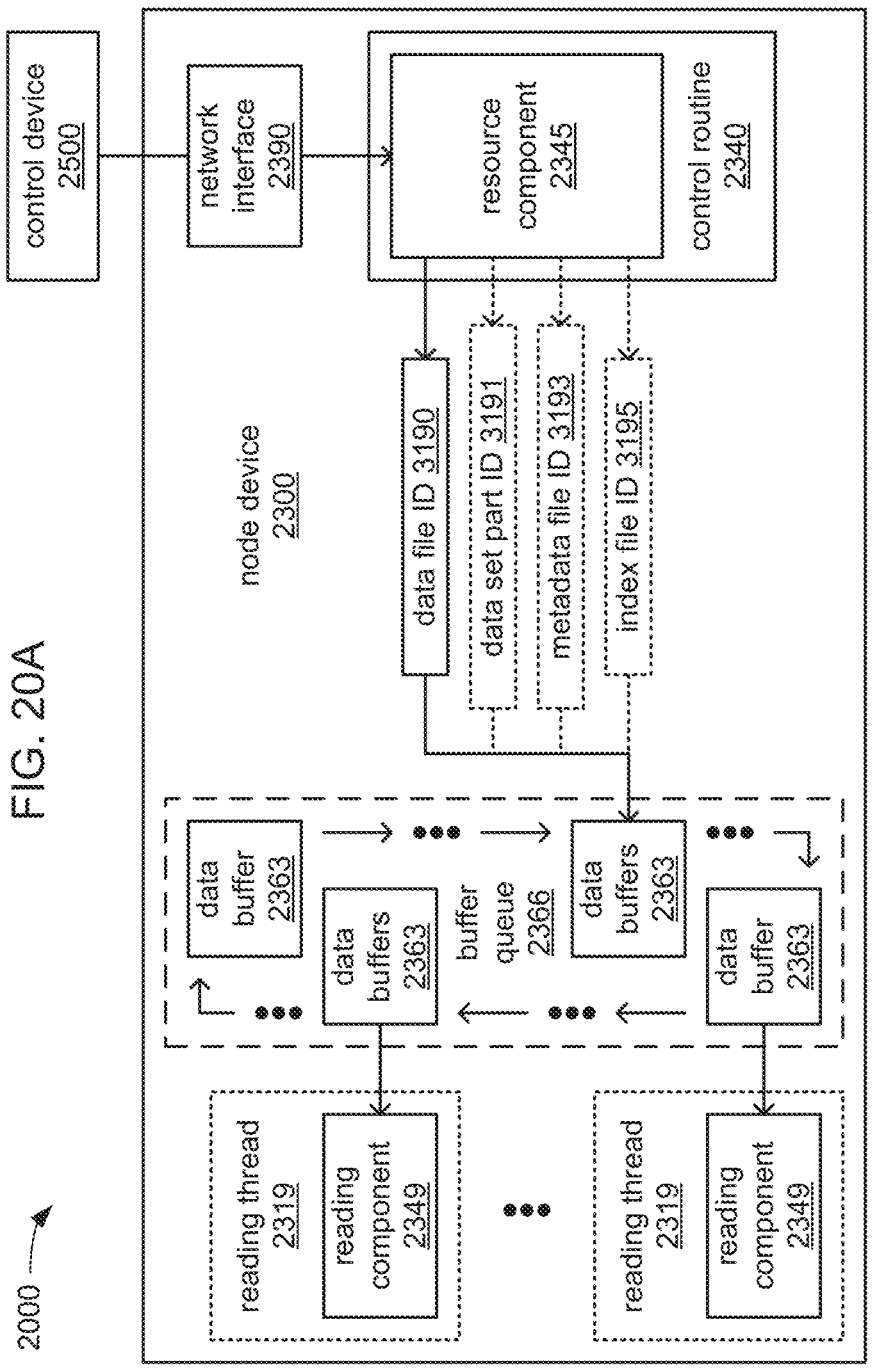
FIGS. 20A, 20B, 20C, 20D, 20E, 20F, 20G, 20H, 20I, 20J and 20K, taken together, illustrate aspects of an example embodiment of node devices directly retrieving a data set from persistent storage.
Figure 20B:
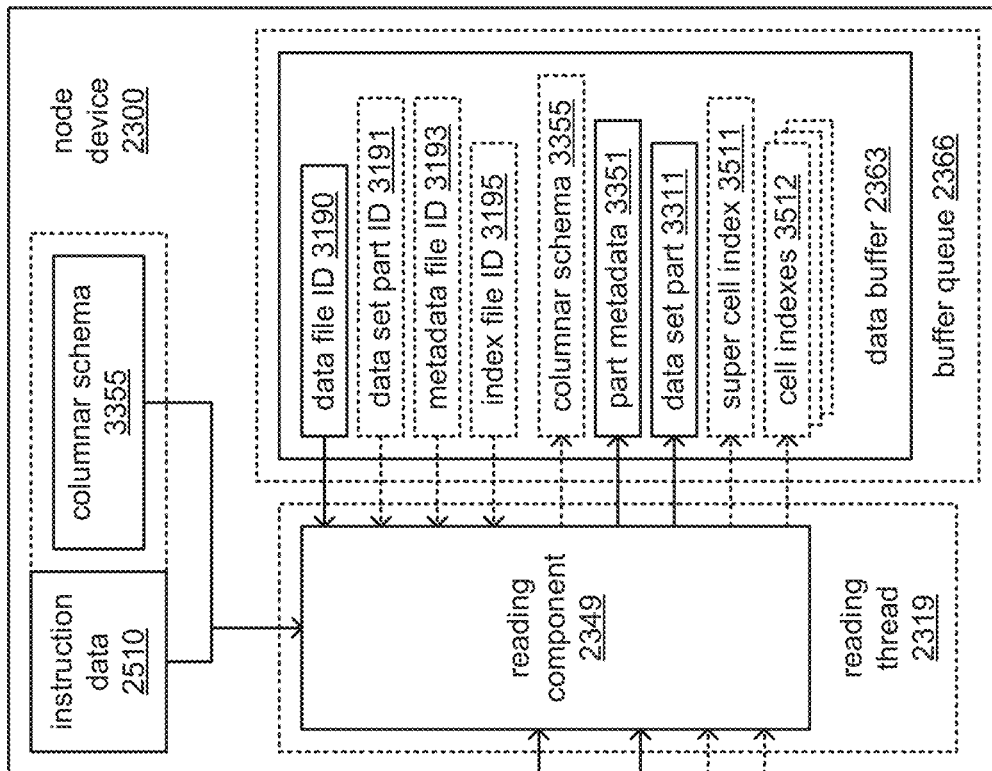
Figure 20C:
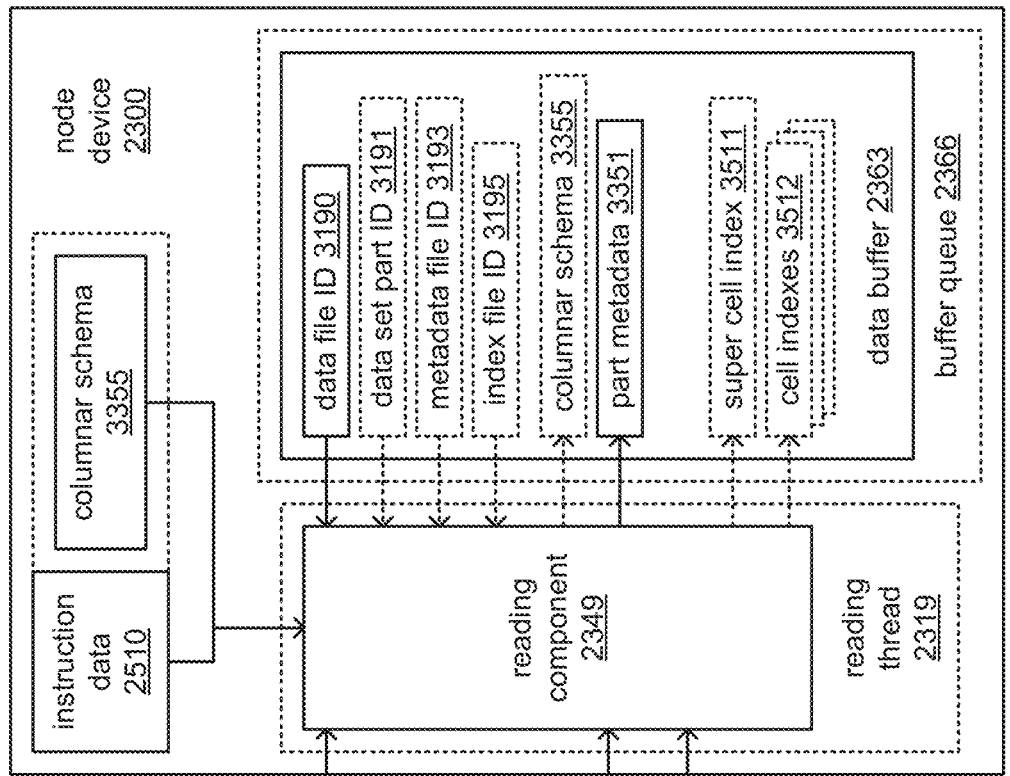
Figure 20C:
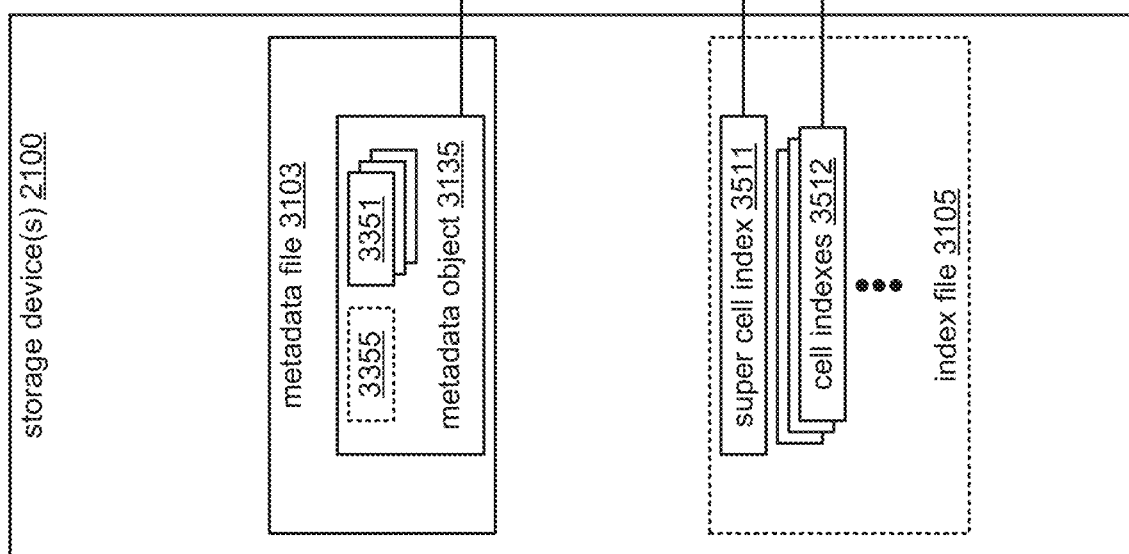

FIGS. 20A-J, together, depict various aspects of the manner in which at least a subset of an example data set 3300 may, following such preparations were discussed above in reference to FIGS. 19A-G, be at retrieved from persistent storage, and then prepared for being provided, in row-wise or columnar form, as an to instances of an application routine 2370. FIG. 21 depicts various aspects of some differences in the retrieval of at least a subset of the data set 3300 from what is depicted in FIGS. 20A-C.

Turning to FIG. 20A, in embodiments in which the node device(s) 2300 are able to directly communicate with the storage device(s) 2100, and are permitted to do so, each node device 2300 may receive indications from the control device 2500 (or the controller 2503) of which data set parts 3311 are to be retrieved by that node device 2300. More specifically, and as depicted, each node device 2300 may receive at least one or more data file identifiers 3190 based on whether the data set parts 3311 were persistently stored within a single data file 3100 or multiple data files 3100, and/or based on which data set parts 3311 each node device 2300 is to retrieve. Additionally, it may be that each node device 2300 also received at least one data set part identifier 3191 that serve to identify which data set part(s) 3311 are to be retrieved by that node device 2300, where the data file identifier(s) 3190 are not sufficient to do so.

As has been discussed, where the entirety of the data set 3300 is persistently stored within a single data file 3100, then each data set part 3311 (stored as a data object 3111) may be uniquely referred to using a data set part identifier 3191 that may be provided to a node device along with the data file identifier 3190 for the single data file 3100. However, where the data set parts 3311 of the data set 3300 have been persistently stored in a manner in which they are distributed across multiple data files 3100, then each one of the data files 3100 may be referred to using a different data file identifier 3190. Where there is just a single data set part 3311 stored within each of the multiple data files 3100, then as previously discussed, the different data file identifier 3190 for each data file 3100 may also serve as the unique identifier for the single data set part 3311 (or, at least the uniquely assigned sequence number therein) that is persistently stored therein. However, where one or more of the multiple data files 3100 include more than one data set part 3311 stored therein, then the different data file identifiers 3100 may serve to uniquely identify just their corresponding ones of the multiple data files 3100, while separately generated unique data set part identifiers 3191 may also be provided to the node device(s) 2300 to identify which data set part 3311 is to be retrieved by each.

In addition to such indicator(s) of what data set part(s) 3311 are to be retrieved by each node device 2300, each node device 2300 may also be provided with separate indications of where to retrieve portions of the data set metadata 3350 and/or of the data set index 3500 that provide information needed to perform various operations with data set parts 3300 to retrieve rows 3313 and/or columns 3323 from the data set parts 3311 that are to be retrieved by that node device 2300. More specifically, and as depicted, where the data set metadata 3350 has been stored in an entirely separate metadata file 3103, then each node device 2300 may additionally be provided with the metadata file identifier 3193 of that separate metadata file 3103. Alternatively or additionally, where the data set index 3500 has been stored in an entirely separate index file 3105, then each node device 2300 may additionally be provided with the index file identifier 3195 of that separate index file 3105.

As previously discussed, the quantity of data buffers 2363 within the buffer queue 2366 may be based on the quantity of data set parts 3311 that are to be retrieved and processed by each node device. More specifically, it may be that the quantity of data buffers 2363 instantiated within the buffer queue 2366 within each node device 2300, at least initially, may be equal to the quantity of data set parts 3311 to be retrieved and then processed by that node device 2300. As also previously discussed. the buffer queue 2366 within each node device 2300 may function together in a manner that adheres to a FIFO algorithm. Thus, it may be that, as the set of information needed to retrieve each data set part 3311 and related metadata and/or index portions (e.g., a set that includes a data file identifier 3190, a data set part identifier 3191, a metadata file identifier 3193 and/or an index file identifier 3195) are received by a node device 2300 from the control device 2500 (or from a controller 2503), each such set may be separately stored within one of the data buffers 2363. Following such a FIFO algorithm, such a set of information for each data set part 3311 may then be provided from one of the data buffers 2363 to one of the reading threads 2319 as a mechanism to assign the retrievals of individual data set parts 3311 to the reading threads 2319 in a round-robin manner that may follow the order in which the sets of information were received by the node device 2300 and stored within the buffer queue 2366. In this way, even as the quantity of data buffers 2363 within the buffer queue 2366 of a node device 2300 is linked to the quantity of data set parts 3311 to be retrieved and processed by the node device 2300, such use of the buffer queue 2366 enables the quantity of reading threads 2319 to be decoupled from that quantity of data set parts 3311.

Turning to FIG. 20B, as each such set of information for the retrieval of a data set part 3311 is provided, in what may be a FIFO ordering, to a reading thread 2319, core(s) 2355 of processor(s) 2350 of the node device 2300 in which that reading thread 2319 is instantiated may be caused by execution of a corresponding instance of a reading component 2349 of the control routine 2340 to retrieve such a set of information from one of the data buffers 2363, then use it in direct communications with the storage device(s) 2100 to retrieve a data set part 3311, and then store that data set part 3311 within the same data buffer 2363. Along with that data set part 3311, those core(s) 2355 may be further caused, to use such direct communications with the storage device(s) 2100 to also retrieve portions of the corresponding data set metadata 3350 and/or of a corresponding data set index 3500, and to then store either or both also within the same data buffer 2363. As previously discussed, as part of obtaining sufficient information to identify the data set parts 3311 of the data set 3300 that are requested to be retrieved, and/or as part of obtaining sufficient information to employ criteria that may have been specified in the received request to limit the quantity of data set parts 3311 to be retrieved, the control device 2500 may have retrieved numerous portions of the data set metadata 3350 (e.g., at least one copy of the columnar schema 3355), and therefore, may be able to relay a considerable amount of the data set metadata 3350 to the node devices 2300 (and to the reading threads 2319 within each). However, such obtained portions of metadata may still not include the particular portions needed by all of the reading threads 2319 within all of the node devices 2300 to enable each to retrieve all of the data set parts 3311 and related information that will be needed to enable processing of those data set parts 3311 to retrieve rows 3313 or columns 3323 therefrom. As a result, while each node device 2300 may be provided with a copy of the columnar schema 3355, each of at least a subset of the reading threads 2319 within at least a subset of the node devices 2300 may still need to retrieve the part metadata 3351 that corresponds to the data set part 3311 that it is assigned to retrieve and process.

Similarly, as also previously discussed, as part of obtaining sufficient information to employ criteria that may have been specified in the received request to limit the quantity of data set parts 3311 to be retrieved, the control device 2500 may have retrieved numerous portions of a corresponding data set index 3500 (if there is one), and therefore, may be able to relay a considerable amount of the data set index 3500 to the node devices 2300. However, such obtained portions of index may still not include the particular portions needed by all of the node devices 2300 to enable each to retrieve related information that each node device 2300 will need to enable processing of those data set parts 3311. As a result, each of at least a subset of the reading threads 2319 within at least a subset of the node devices 2300 may still need to retrieve the super cell index 3351 and/or the cell indexes 3512 that correspond to the data set part 3311 that it is assigned to retrieve and process.

Turning to FIG. 20C, as previously discussed, it may be that the entirety of the data set metadata 3350 of the data set 3300 is stored all together within a separate metadata file 3103, and/or it may be that the entirety of a corresponding data set index 3500 is stored all together within a separate index file 3105. In such situations, it may be that the core(s) 2355 of the processor(s) 2350 assigned to execute an instance of the reading component 2349 within a reading thread 2319 are caused to use the metadata file identifier 3193 to retrieve at least the part metadata 3351 for its corresponding data set part 3311 from such a separate metadata file 3103, and/or to use the index file identifier 3195 to retrieve at least the super cell index 3511 and corresponding cell index 3512 from such a separate index file 3105.

Figure 20D:
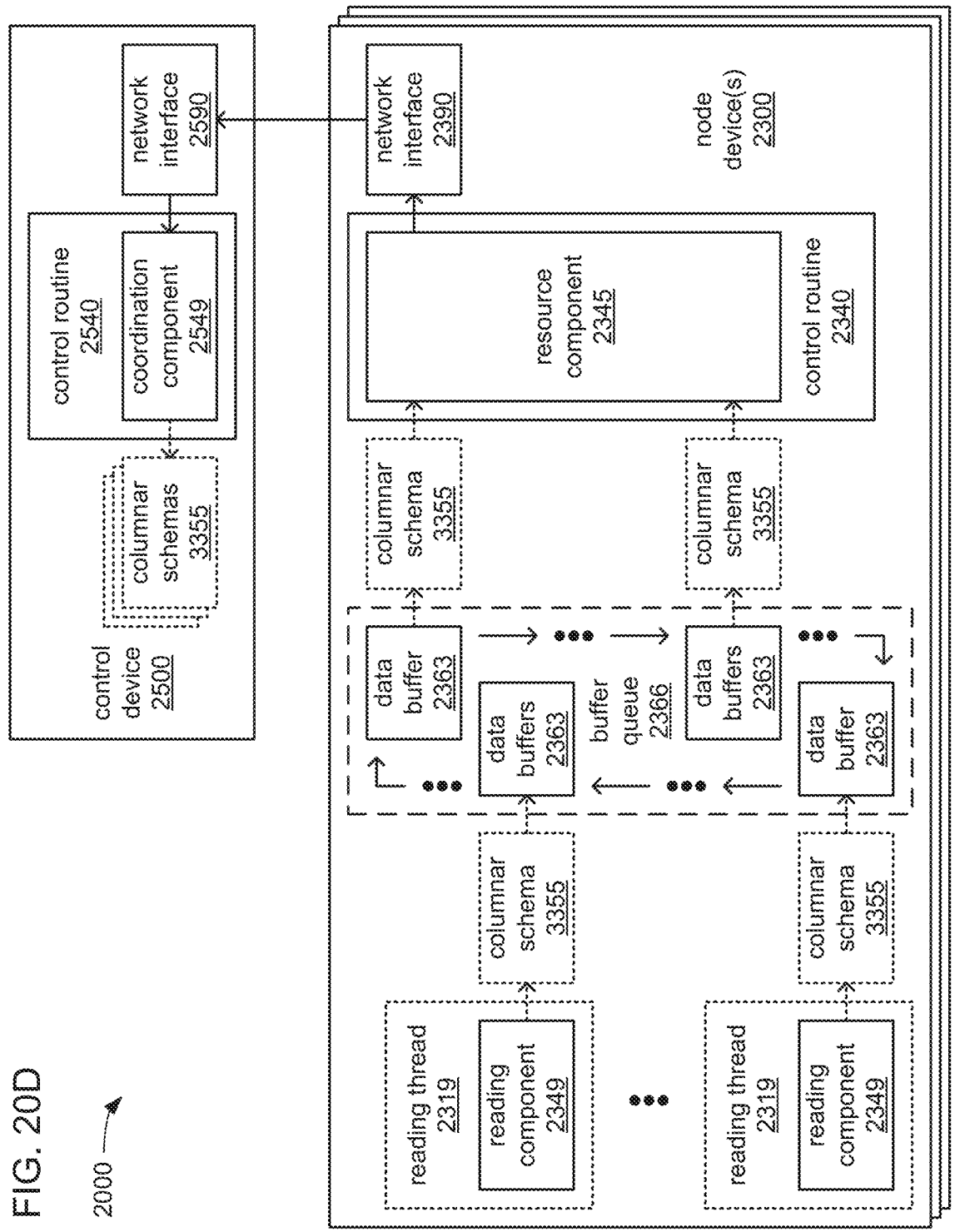
Figure 21:
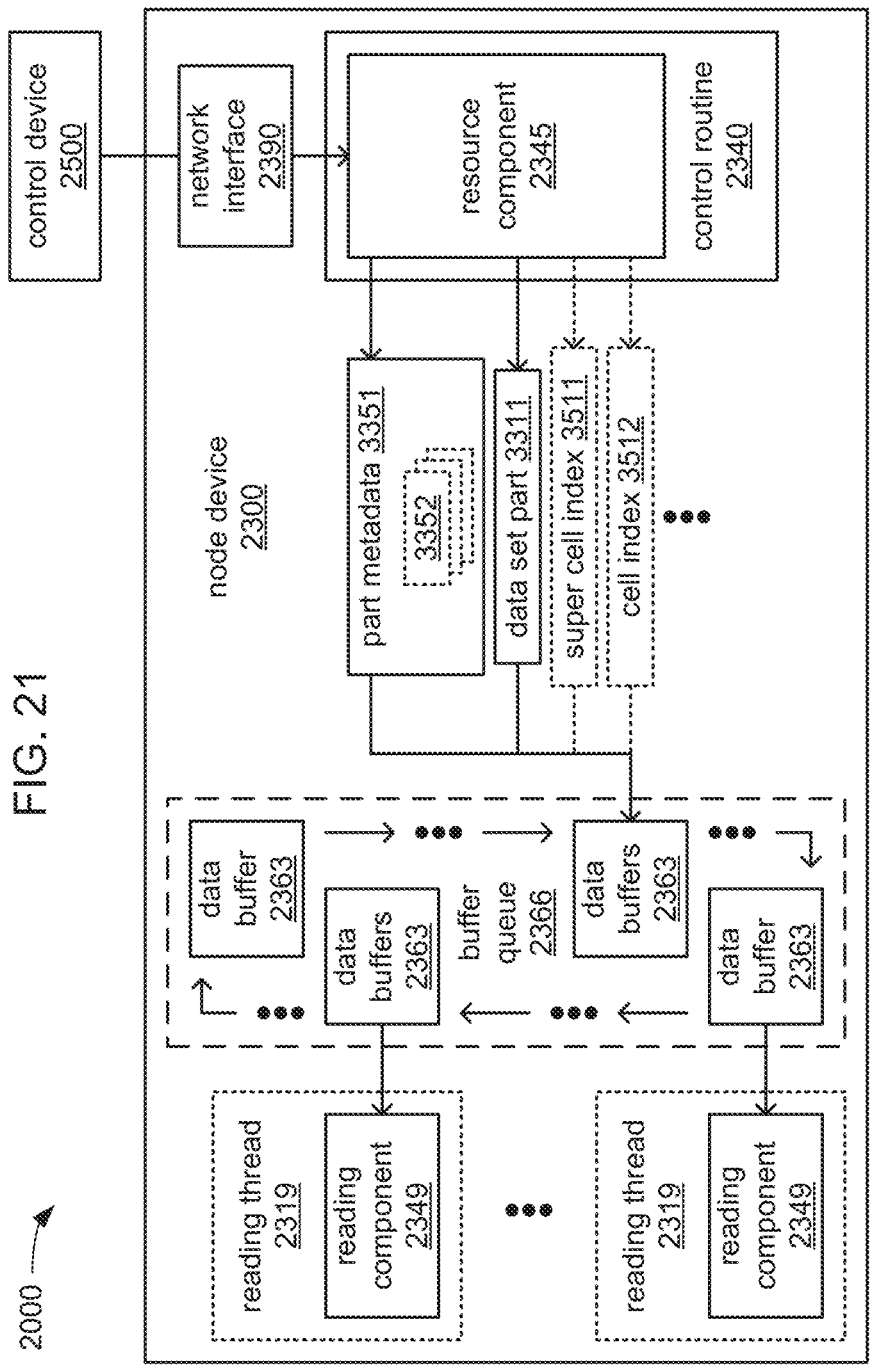
FIG. 21 illustrates aspects of an example embodiment of a control device retrieving a data set from persistent storage.

Turning to FIG. 20D, as previously discussed, where the data set metadata 3350 is persistently stored in a distributed manner such that separate part metadata 3351 is persistently stored (as metadata objects 3135) alongside (or embedded within) their corresponding data set parts 3311, and/or where separate part metadata 3351 is persistently stored across multiple data files 3101, it may be that multiple ones of such separated portions of metadata include a copy of the column schema 3355. As a result, even where each of the node devices 2300 receives a copy of the column schema 3355 from the control device 2500, that particular copy may have been retrieved by the control device 2500 from just a single metadata object 3135, whereas each of the node devices 2300 may separately retrieve a different copy of the column schema 3355 from one or more other metadata objects 3135. While it may be expected that all copies of the column schema 3355 are identical to each other, data corruption events and/or other circumstances may result in one or more of the copies of the column schema 3355 not being identical to the others.

To enable at least the discovery of such a situation, it may be that core(s) 2355 of the processor(s) 2350 of each of multiple node devices 2300 are caused by further execution of corresponding instances of the reading component 2349 to operate corresponding network interfaces 2390 to transmit the copies of the columnar schema 3355 that each has retrieved to the control device 2500 to be compared with each other to determine if there is a difference thereamong. In response to detecting such a difference, core(s) 2555 of processor(s) 2550 of the control device 2500 may be caused to operate the network interface 2590 to transmit an indication to the requesting device 2700 of a possible instance of data corruption having been discovered such that retrieval of data values of the data set 3300 fully intact may not be possible. Alternatively, it may be that one or more particular types of variation among such multiple copies of the columnar schema may be deemed permissible such that the transmission of such an error message to the requesting device 2700 may not occur if such a permissible variation is found. However, where a difference is found among the multiple copies of the columnar schema 3355 that is not among the one or more particular types of permissible variation, then such an error message may be so transmitted.

Figure 20E:
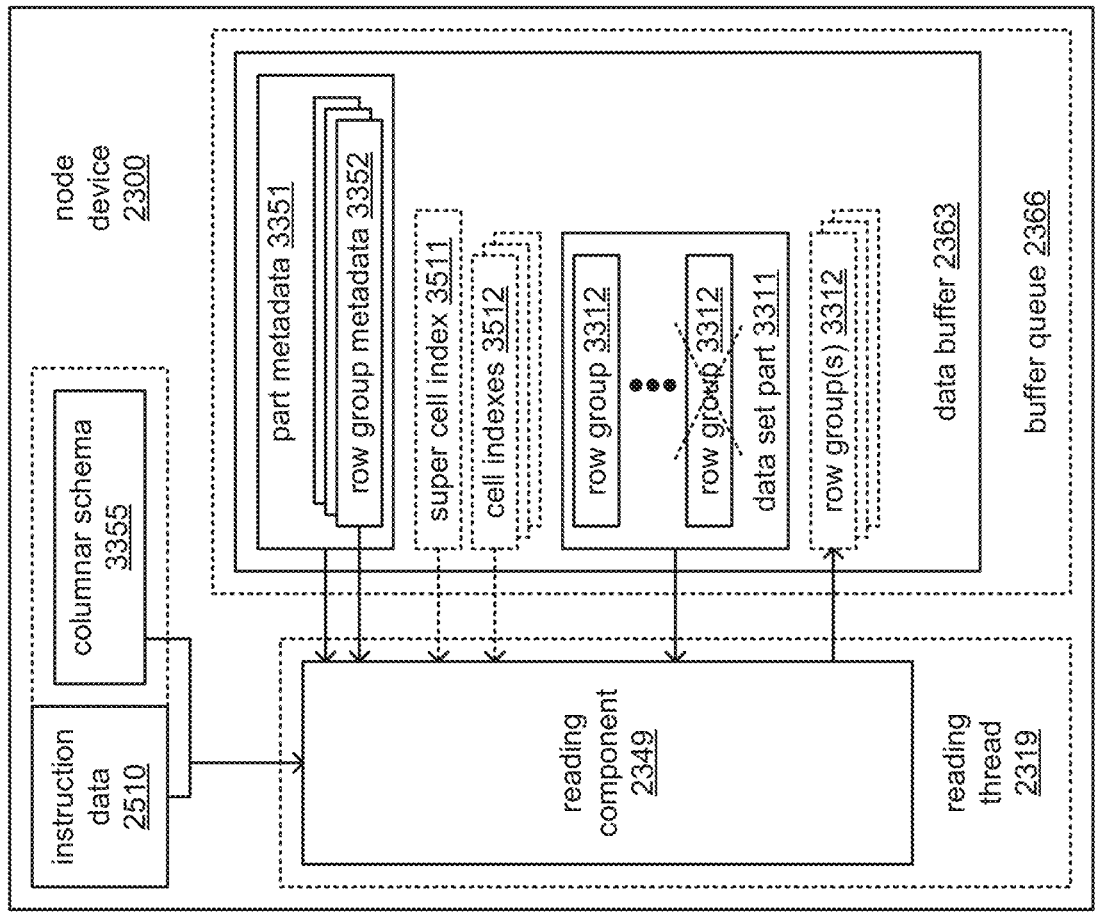

Turning to FIG. 20E, within each reading thread 2319 within each node device 2300, and following the retrieval of a data set part 3311 and associated portion(s) of metadata and/or of an index, and also following the storage thereof within the corresponding data buffer 2363, core(s) 2355 of processor(s) 2350 of a node device 2300 may be caused by further execution of the corresponding instance of the reading component 2349 to perform one or more further operations to retrieve one or more of the row groups 3312 from within the data set part 3311 so as to make those one or more row groups 3312 accessible for further processing operations. By way of example, where the entirety of the data set part 3311 was encrypted and/or compressed, as previously discussed, then such core(s) 2355 may be caused to reverse such encryption and/or compression. In so doing, such core(s) 2355 may retrieve indications of whatever encryption (along with encryption data, such as an encryption key, pass-phrase, etc.), and/or compression of the entirety of the data set part 3311 that may have been performed from the corresponding part metadata 3351. Following the performance of such reversal operation(s) on the data set part 3311, the now decrypted and/or decompressed form of the data set part 3311 (within which the row groups 3312 may now be accessible) may then stored within the same data buffer 2363 within which the originally retrieved encrypted and/or compressed form was stored, thereby overwriting that originally retrieved encrypted and/or compressed form. Alternatively, where the data set part 3311, as retrieved from the storage device(s) 2100 was neither encrypted nor compressed, then such an originally retrieved form of the data set part 3311 may be allowed to remain within the data buffer 2363 without change. As previously discussed, the corresponding part metadata 3351 may include indications of where each row group 3312 is located within the data set part 3311.

As previously discussed, it may be that original data set retrieval request includes one or more criteria for what rows 3313 of the data set 3300 are to be retrieved. Thus, within each reading thread, and either before or during such decryption and/or decompression as may be performed on the entirety of the data set part 3311, core(s) 2355 of processor(s) 2350 of the node device 2300 may be caused by further execution of the corresponding instance of the reading component 2349 to employ any such criteria, along with information within the each row group metadata 3352 and/or within each cell index 3512 concerning data values within corresponding ones of the row groups 3312 to at least identify row groups 3312 within the corresponding data set 3311 that could not possibly include a row 3313 that meets such criteria (as indicated by the "X" that overlies one of the row groups 3312 in FIG. 20E). The one(s) of the row groups 3312 within the data set 3311 that are not so identified may then be deemed to be "candidate" row groups 3312 (similar to the "candidate data cells" of the Distributed Index Cases) where each such candidate row group 3312 may include at least one row 3313 of data values that meets such criteria. Where such decryption and/or decompression of the entirety of the originally retrieved data set part 3311 is to be performed, as described just above, the overwriting of the originally retrieved data set part 3311 may be with just the candidate row group(s) 3312 in decrypted and/or decompressed form, instead of with the entire data set part 3311 in decrypted and/or decompressed form. Stated differently, each of the row groups 3312 that could not possibly include a row 3313 that meets the criteria may simply be discarded. Alternatively, where neither of such decryption or decompression of the data set part 3311 is needed, the originally retrieved form of the data set part 3311 may be allowed to remain within the data buffer 2363 without change, and an indication of which row group(s) 3312 therein are deemed to be candidate row groups may be added to the data buffer 2363 (or elsewhere). As another alternative where neither of such decryption or decompression of the data set part 3311 is needed, the data set part 3311 may be overwritten with just the one(s) of the row groups 3312 that are deemed to be candidate row groups.

Figure 20F:
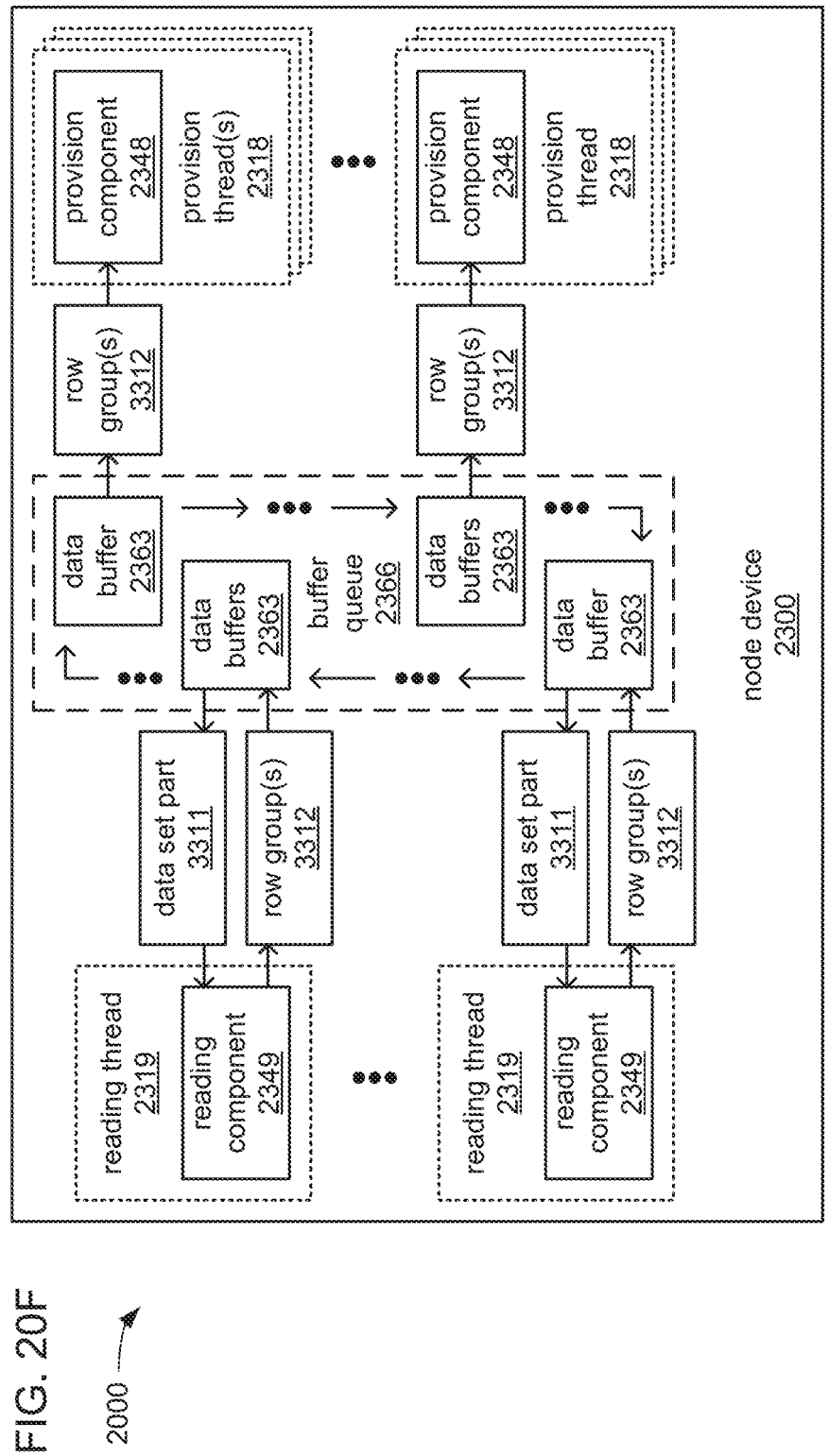

Turning to FIG. 20F, as each data buffer 2363 is used to store either a whole data set part 3311 (or a subset of row groups 3312 of a data set part 3311) that has been retrieved from a corresponding data set part 3311 along with associated metadata and/or index information, each such data buffer 2363 may become available in an order that again follows a FIFO algorithm, either to a single provision thread 2318 to further process all of the row groups 3312 included therein, or to multiple provision threads 2318 such that each row group 3312 included therein is further processed within a separate provision thread 2318. In this way, the buffer queue 2366 may become a thread-safe mechanism to assign further processing based on availability of row groups 3312 for being further processed. Following the storage of one or more of such row groups 3312 into the data buffer 2363, core(s) 2355 of processor(s) 2350 may be caused by further execution of that instance of the reading component 2349 within that reading thread 2319 may return to repeating the various operations described above with another set of information for the retrieval of a data set part 3311 from persistent storage that has been stored within another data buffer 2363.

As previously discussed, within each node device 2300, ongoing execution of the resource component 2345 by core(s) 2355 of processor(s) 2350 may cause ongoing monitoring of the availability and utilization of resources of each reading thread 2319, cause ongoing monitoring of the relative rates of processing of data set parts 3311 across multiple reading threads 2319, and/or cause monitoring of the relative rates of the filling and emptying of data buffers 2363 within the buffer queue 2366, to determine whether the quantity of reading threads 2319, the quantity of data buffers 2363 and/or the quantity of provision threads 2318 currently instantiated within the node device 2300 is to be increased or decreased. Thus, for example, after depositing one or more row groups 3312 and its associated metadata and/or index information into a data buffer 2363 of the buffer queue 2366, a reading thread 2319 may be uninstantiated (or caused to have execution of instructions therein suspended) based on such factors as consumption of resources by that reading thread 2319 versus what resources are currently available, and/or based on a reduction of the supply of data set parts 3311 of the data set 3300 that haven't yet been retrieved and/or have had row group(s) retrieved therefrom.

As also previously discussed, within each node device 2300, ongoing execution of the resource component 2345 of the control routine 2340 may cause the buffer queue 2366 to be operated in a manner that implements a FIFO algorithm to convey row groups 3312 and their associated metadata and/or index information in a thread-safe manner from reading threads 2319 to provision threads 2318. Again, such ongoing execution of the resource component 2345 may cause core(s) 2355 of processor(s) 2350 to change the quantity of data buffers 2363 within the queue 2366 based on ongoing observations of the degree of use thereof by the threads 2319 and 2318.

Figure 20G:
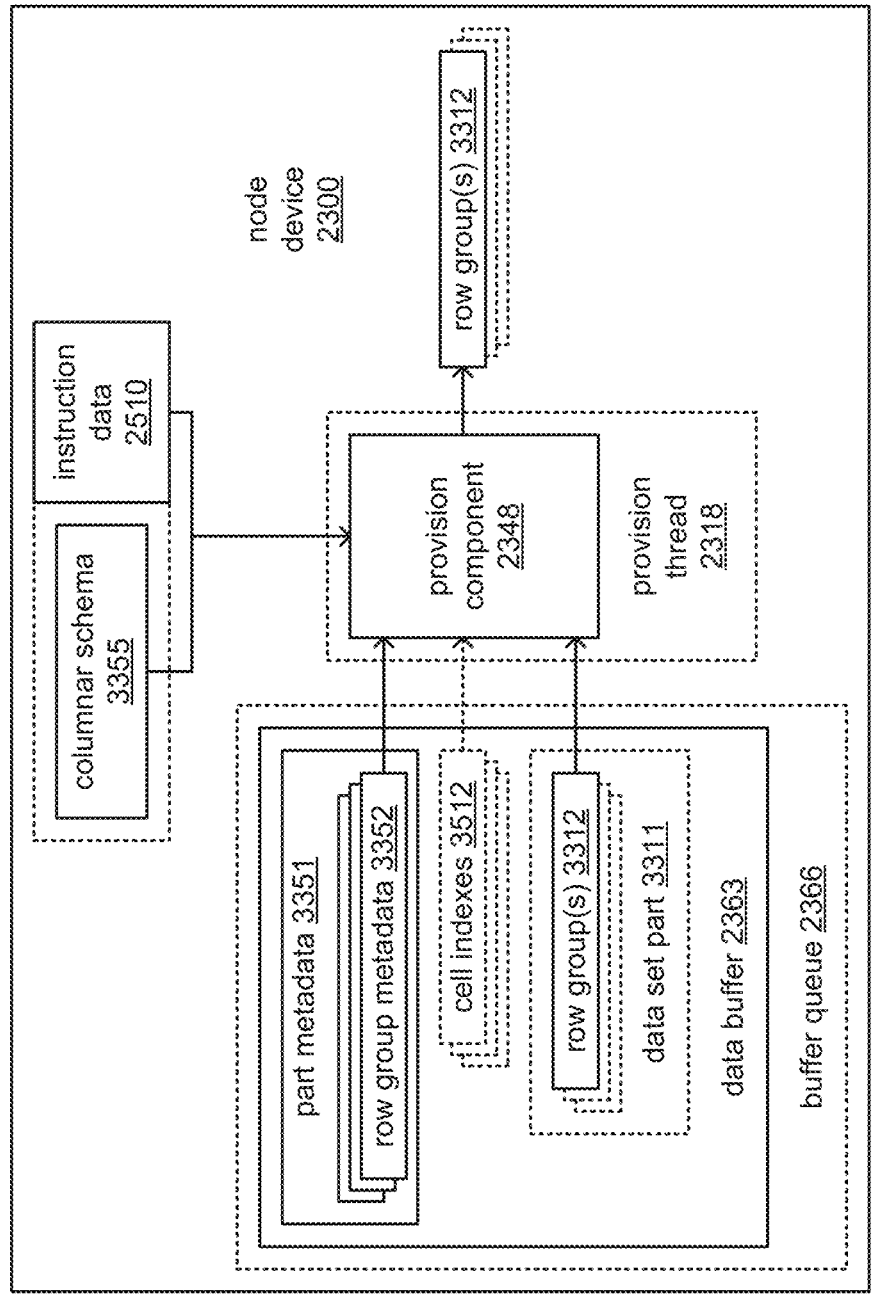

Turning to FIG. 20G, as each data buffer 2363 conveying such retrieved row group(s) 3312 and associated information is provided, in what may be a FIFO ordering, to a provision thread 2318, core(s) 2355 of processor(s) 2350 of the node device 2300 in which that provision thread 2318 is instantiated may be caused by execution of a corresponding instance of a provision component 2349 of the control routine 2340 to retrieve such row group(s) 3312 and associated information from one of the data buffers 2363, and then use it to process such row groups 3312 to retrieve rows 3313 or columns 3323 therefrom. In situations in which the data set retrieval request did not include any criteria limiting what portion of the data set 3300 is to be retrieved, it may be that all of the row groups 3312 within a corresponding data set part 3311 were stored within the data buffer 2363 by execution of an instance of the reading component 2349 within a reading thread 2319. In such situations, all of the row groups 3312 may be retrieved from the data buffer 2363 for further processing to within the provision thread 2318 to retrieve rows 3313 or columns 3323 therefrom.

However, in situations in which the data set retrieval request did include such criteria, then the one or more row groups 3312 so stored within data buffer 2363 may have been deemed to be candidate row group(s) 3312 as a result of the use of such criteria along with metadata and/or index information associated with the corresponding data set part 3311, as described just above in reference to FIG. 20E. In such situations, it may be that the information concerning data values within the row group metadata 3352 and/or cell indexes 3512 is retrieved from the data buffer 2363 along with whatever row groups 3312 are stored therein. Such information may subsequently be used to enhance the speed and/or efficiency with which the data values within each such row group 3312 are searched to identify and/or confirm which rows 3313 actually do meet the specified criteria so that the portion of the data set 3300 that is ultimately retrieved for use as an input to an application routine 2370 and/or, for whatever other purpose, fits the criteria specified in the data set retrieval request.

Figure 20H:
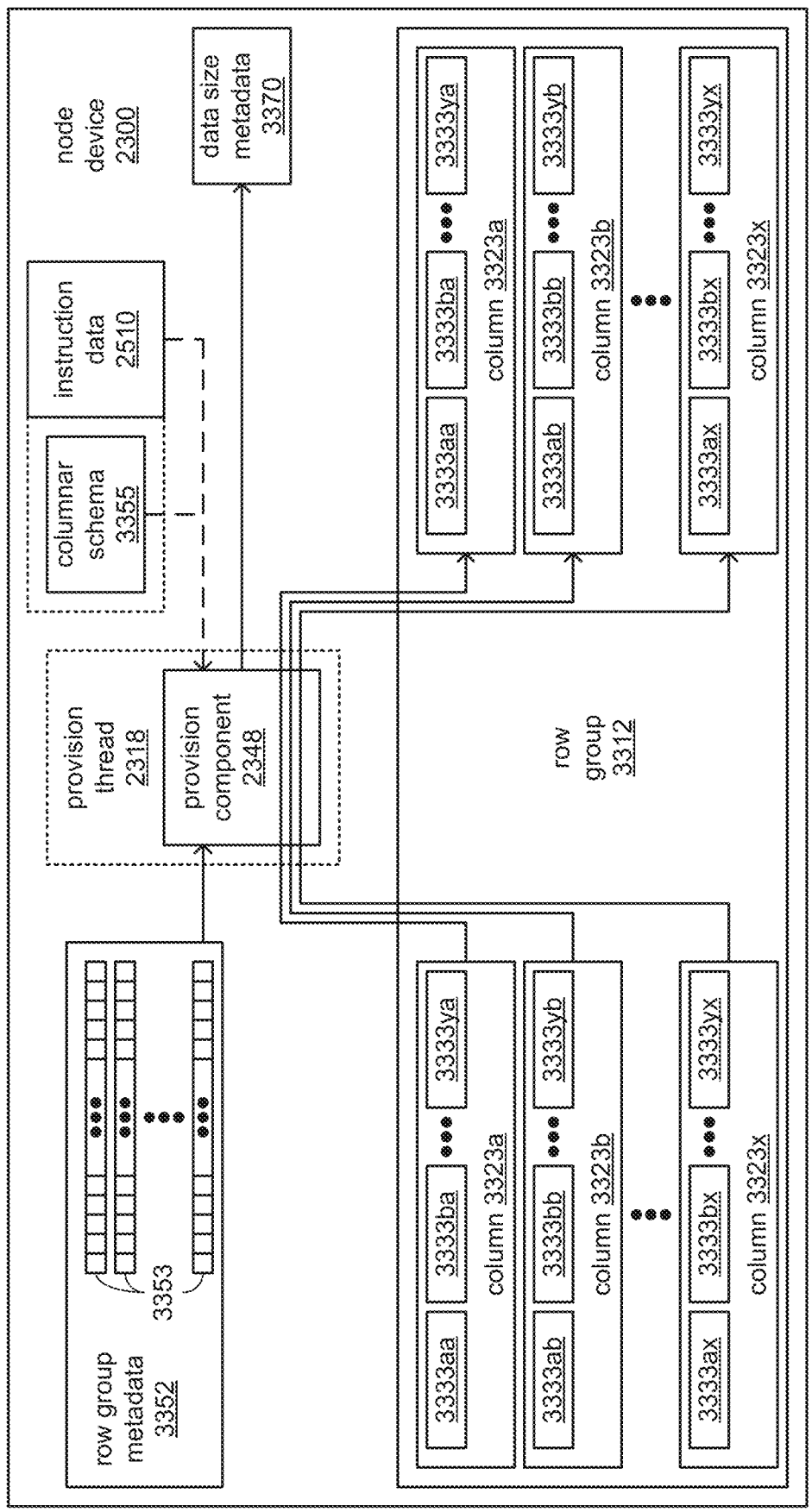

Turning to FIG. 20H, in situations in which the data set retrieval request specified the retrieval of at least a portion of the data set 3300 in columnar form, further execution of the instance of the provision component 2348 within the provision thread 2318 may cause core(s) 2355 of processor(s) 2350 to refrain from converting the columnar organization in which the data values of the data set 3300 were persistently stored into a row-wise organization. Instead, for each row group 3312 retrieved from the data buffer 2363, such core(s) 2355 may be caused to use indications the corresponding row group metadata 3352 of what processing operations were performed on the row group 3312 to prepare it for storage as the basis for undoing one or more of such processing operations. By way of example, and as depicted, such core(s) 2355 may be caused to employ flag registers 3353 within the corresponding row group metadata 3352 to reverse any compression of data values that may have performed across the row group 3312 and/or per individual ones of the columns 3323 (i.e., decompress the entirety of the row group 3312 and/or individual columns 3323 thereof, if any compression was performed). Alternatively or additionally, such core(s) 2355 may be caused to employ information within the row group metadata 3352, such as indications of an encryption key, passphrase, etc. to similarly reverse any encryption of data values that may have performed across the row group 3312 and/or per individual ones of the columns 3323 (i.e., decrypt the entirety of the row group 3312 and/or individual columns 3323 thereof, if any encryption was performed).

Figure 20I:
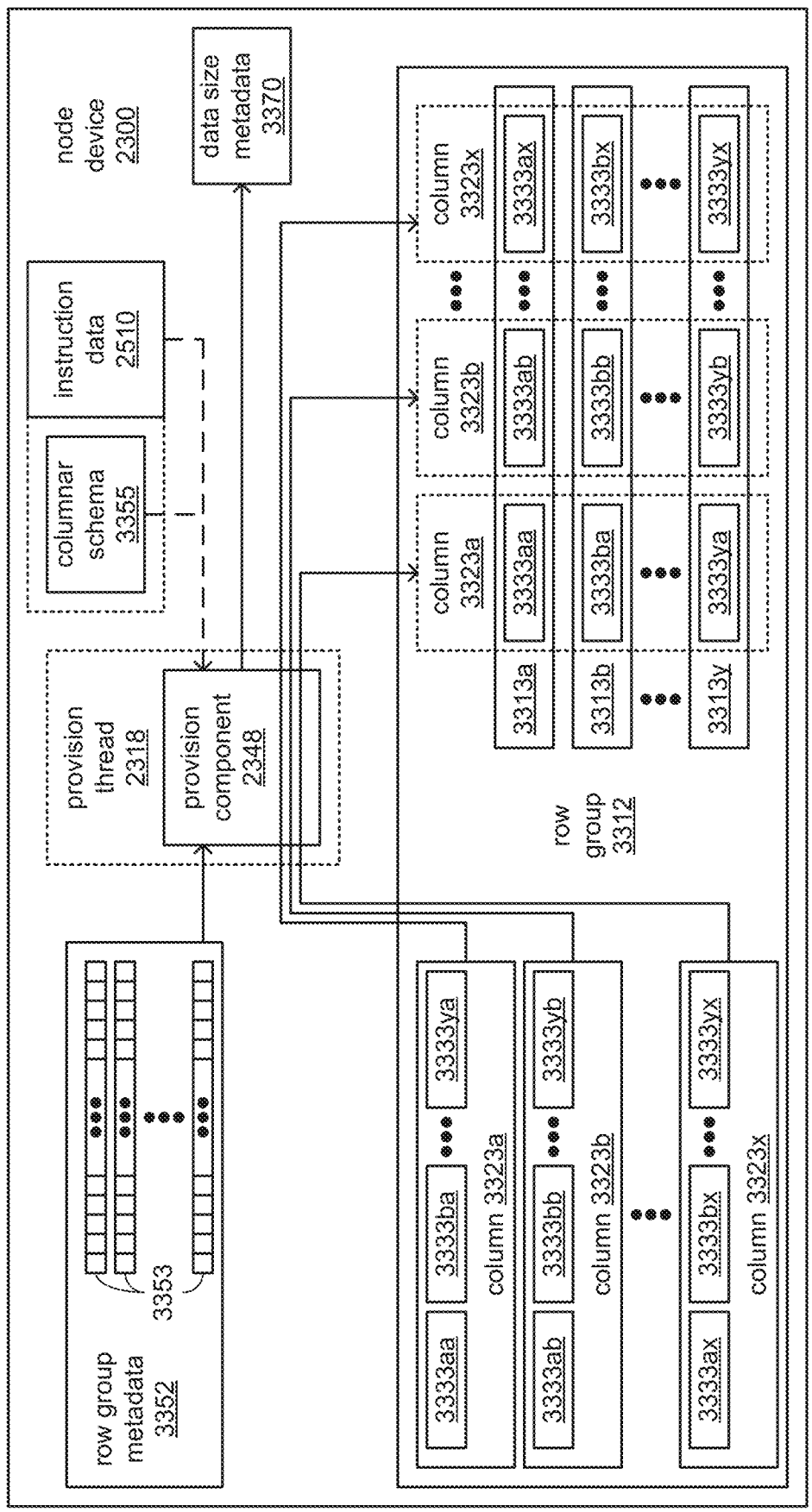

However, and turning to FIG. 20I, in situations in which the data set retrieval request specified the retrieval of at least a portion of the data set 3300 in row-wise form, further execution of the instance of the provision component 2348 within the provision thread 2318 may cause core(s) 2355 of processor(s) 2350 to proceed with converting the columnar organization in which the data values of the data set 3300 were persistently stored into a row-wise organization, and to do so after the performance of any decompression and/or decryption, as just described in reference to FIG. 20H.

Figure 20J:
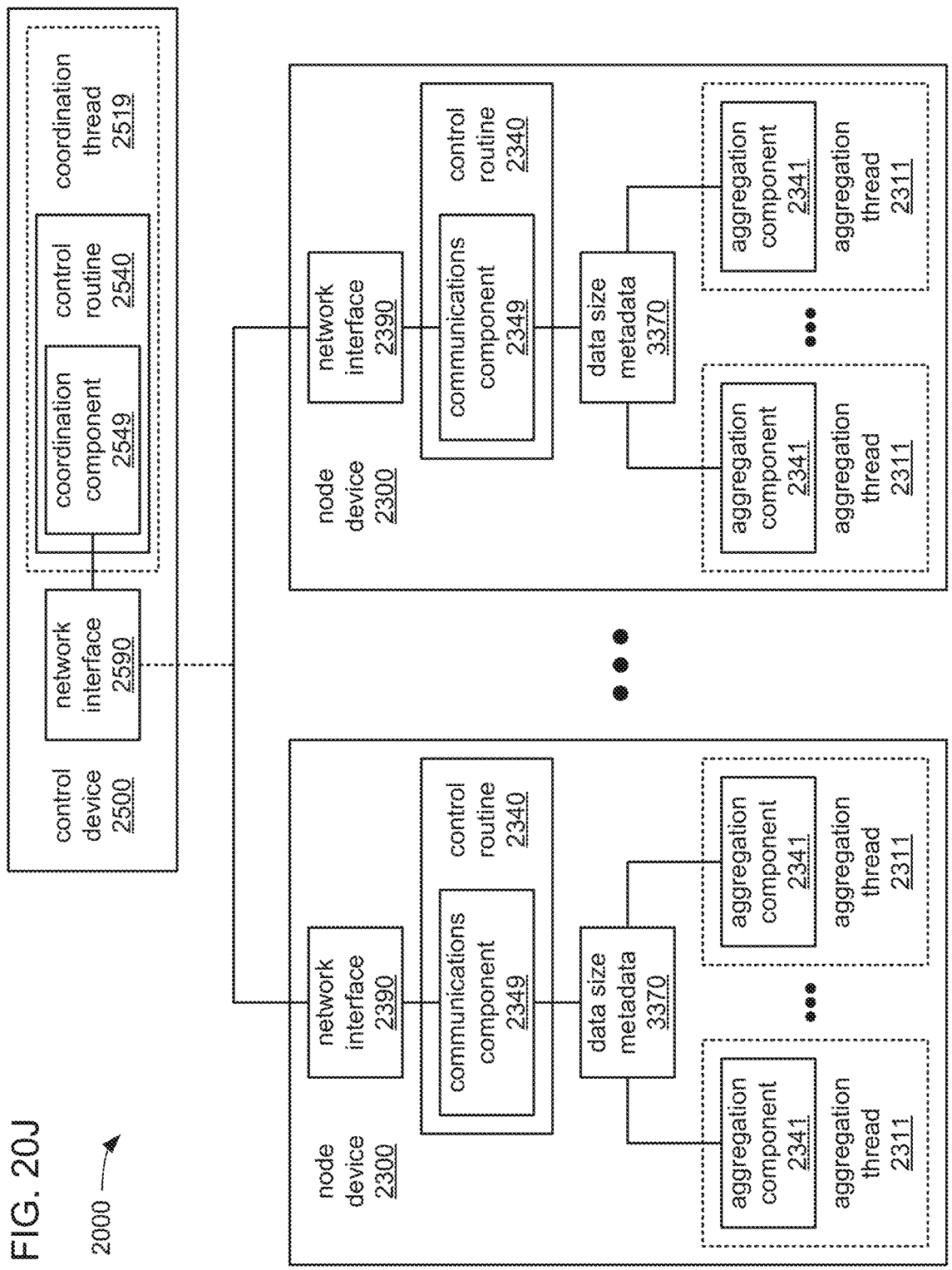

Turning to FIG. 20J, in embodiments in which one or more of the columns 3323 includes data values of a variable length, there may be a need to determine at least what is the largest size of any such variable that is present within each of such columns 3323. There may also be deemed desirable to determine what is the smallest size of any such variable that is present within each of such columns 3323. As will be familiar to those skilled in the art, the application routine 2370 and/or other routines within the node devices 2300 and/or within other devices may need to be apprised of such information to enable proper allocation of storage space for such variable size data values. It should be noted that, in situations in which the data set retrieval request includes criteria that retrieved rows 3313 must meet, the determinations of largest and/or smallest size of such data values may be limited to those that fall within the rows 3313 that are identified as meeting the criteria.

Within each provision thread 2318, it may be that such determinations of size are made during or after such operations as decryption and/or decompression of whole row groups 3312 and/or of individual columns 3323 are performed, as was discussed in reference to FIGS. 20H and 20I. Alternatively or additionally, such determinations of size may be made during or after reorganization of data values within row groups 3312 from a columnar organization to a row-wise organization. Regardless of when such determinations of size are made within each provision thread 2318, indications of such determinations for each column 3323 that includes variable size data values may be initially stored within separate instances of data size metadata 3370.

Continuing with FIG. 20J, within each node device 2300, core(s) 2355 of processor(s) 2350 thereof may be caused to effect exchanges of the per-thread instances of the data size metadata 3370 among the aggregation threads 2311 to derive largest and smallest data sizes of data values that were identified in such columns 3323 across the aggregation threads 2311. Such core(s) 2355 may then be caused to operate the network interfaces 2390 of the node devices 2300 to effect an exchange of per-node instances of the data size metadata 3370 among the node devices 2300 to derive largest and smallest data sizes of such data values across all of those node devices 2300. It should be noted that setting up communications among the node devices 2300 that are limited to the ones of the node devices 2300 that are involved in the retrieval of the data set 2300 may be enabled by cooperation with the control device 2500, which maintains information concerning which node devices 2300 are so involved.

Figure 20K:
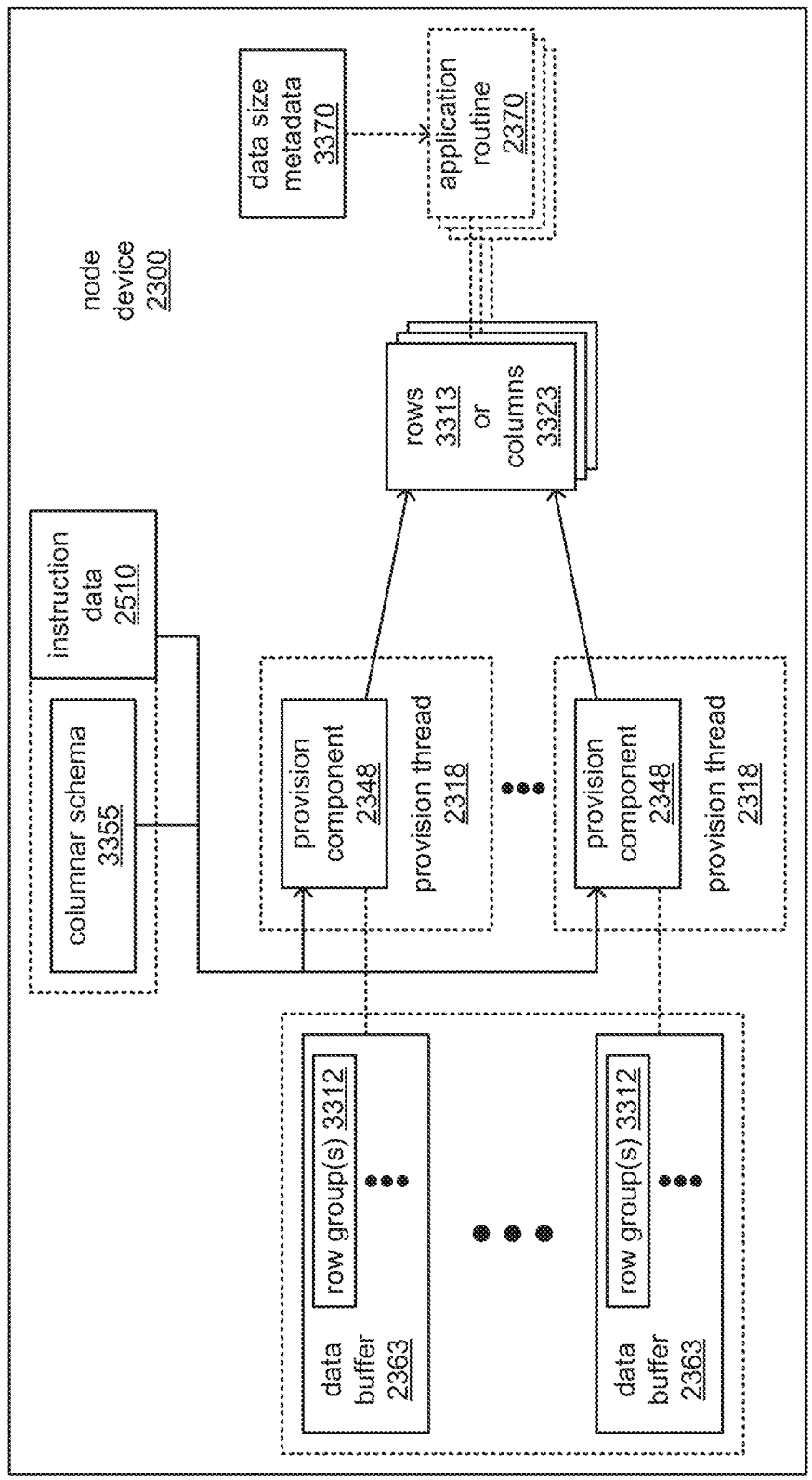

Turning to FIG. 20K, within each provision thread 2318 within each node device 2300, and following such decompression, decryption and/or conversion from columnar to row-wise organization as may be performed with the row group(s) retrieved from the data buffers 2363 after having been stored there by reading thread(s) 2319, further execution of the instance of the provision component 2348 within each such provision thread 2318 may cause core(s) 2355 of processor(s) 2350 of each of the node devices 2300 to provide the resulting rows 3313 or columns 3323 to instances of the application routine 2370 being executed within each of the node devices 2300 (maybe also with the data size metadata 3370), if so specified in the data set retrieval request. Alternatively, where the data set retrieval request specified the provision of such rows 3313 or columns 3323 to the requesting device 2700, then such core(s) 2355 may be caused by further execution of such instances of the provision component 2348 to operate corresponding ones of the network interfaces 2390 to transmit such rows 3313 or columns 3323 to the requesting device 2700 (maybe also with the data size metadata 3370).

Turning to FIG. 21, in embodiments in which the node device(s) 2300 are not able to directly communicate with the storage device(s) 2100, and/or are not permitted to do so, it may be the control device 2500 (or a controller 2503 within a node device 2300) that directly communications with the storage device(s) 2100 to retrieve data set parts 3311 therefrom, along with corresponding part metadata 3351 and/or corresponding combinations of a super cell index 3511 and a set of cell indexes 3512. Thus, instead of providing each node device 2300 of multiple node devices 2300 with indications of which data set parts 3311 are to be retrieved, along with their associated metadata and/or index information, the control device 2500 (or a controller 2503) may directly provide each such node device 2300 with one or more data set parts 3311 together with the corresponding metadata and/or index information for each.

Again, the buffer queue 2366 within each node device 2300 may function together in a manner that adheres to a FIFO algorithm. Thus, it may be that, as each data set part 3311 and related metadata and/or index information are received by a node device 2300 from the control device 2500 (or from a controller 2503), each such data set part 3311 and related metadata and/or index information may be separately stored within one of the data buffers 2363. Following such a FIFO algorithm, the data set part 3311 and related metadata and/or index information may then be provided from one of the data buffers 2363 to one of the reading threads 2319 as a mechanism to assign the processing of individual data set parts 3311 to the reading threads 2319 in a round-robin manner that may follow the order in which they were received by the node device 2300 and stored within the buffer queue 2366. Again, in this way, even as the quantity of data buffers 2363 within the buffer queue 2366 of a node device 2300 is linked to the quantity of data set parts 3311 to be retrieved and processed by the node device 2300, such use of the buffer queue 2366 enables the quantity of reading threads 2319 to be decoupled from that quantity of data set parts 3311.

As a result of being directly provided with data set parts 3311 and their related metadata and/or index information, there is no need for any action by core(s) 2355 of the node devices 2300 to be caused to retrieve any further information, and so the processing of the data set parts within the reading threads 2319 may then proceed as described above in reference to FIG. 20E, and onward. Additionally, there is no need for the transmission of multiple copies of the columnar schema 3355 to the control device 2500 to enable a comparison thereamong, as the control device 2500 may have already directly received such multiple copies thereof from the storage device(s) 2100.

Figure 22A:
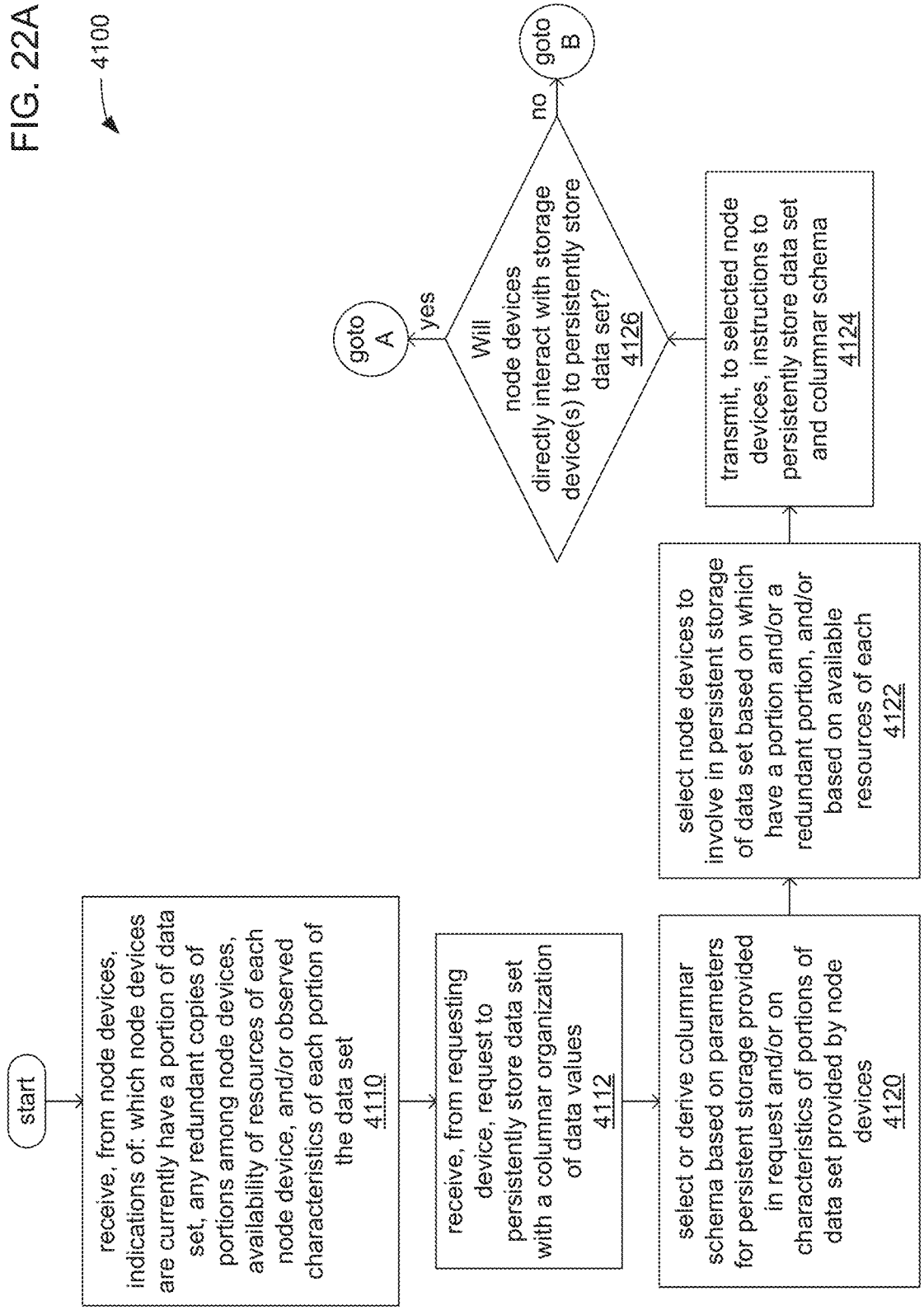

FIGS. 22A, 22B and 22C, together, illustrate an example embodiment of a logic flow 4100. The logic flow 4100 may be representative of some or all of the operations executed by one or more embodiments described herein. More specifically, the logic flow 4100 may illustrate operations performed by core(s) 2555 of the processor(s) 2550 of the control device 2500 (or a controller 2503) in executing the control routine 2540, and/or performed by other component(s) of the control device 2500 (or a controller 2503).

At 4110, a processor of a control device or controller (e.g., the control device 2500 or a controller 2503 incorporated into a node device 2300) of a distributed processing system (e.g., the distributed processing system 2000) may receive, from multiple node devices of the distributed processing system, indications of: 1) which node devices currently have a portion of a data set (e.g., the data set 3300); 2) which node devices currently have a redundant copy of a portion of the data set (if there are any node devices that do); 3) availability of processing, storage and/or other resources of each node device; and/or 4) observations made of characteristics of each of the portions of the data set (e.g., characteristics of the data values and/or of the manner in which the data values are organized). As has been discussed, it may be that the node devices receive data values of the data set from various external devices in small quantities, such as a row of data values at a time. Thus, it may be that the node devices 2300 provide indications of characteristics of what is being received to the control device.

At 4112, the processor may receive, from a requesting device (e.g., the requesting device 2700) a request to persistently store the data set within storage space provided by one or more storage devices (e.g., the storage device(s) 2100). As previously discussed, the request may expressly specify such aspects as a requirement that the data values be organized in columnar form. Alternatively, such details may specified indirectly by specifying a file type, an application routine that may have generated the data set, and/or other detail that is associated with persistent storage in columnar form.

At 4120, based on such information as has been received from the node devices and/or based on the information as may have been specified in the persistent storage request, the processor may select a columnar schema from among a set of available columnar schemas that is best associated with such information. By way of example, and as previously discussed, an indication of a characteristic of the data set received from one or more of the node devices may lead to the choice of a particular columnar schema that best accommodates that characteristic. Alternatively, and also by way of example, the request may specify a file type that is associated with a particular columnar schema, thereby leading to its selection. It should also be noted, and as also previously discussed, it may be that an existing columnar schema is to be selected from among a set of columnar schemas, but the persistent storage request may also include one or more parameters that are meant to augment and/or replace the specification of one or more details of that selected columnar schema.

At 4122, the processor may select a subset of the node devices that may be available within the distributing processing system for being involved in the persistent storage of the data set. In some embodiments, where no node device has a redundant copy of any portion of the data set, it may be that such a selection is based solely on which node devices currently have a portion of the data set. In other embodiments, where one or more node devices have a redundant copy of a portion of the data set, the processor may select one or more of the node devices based, at least in part, on which one(s) have more processing, storage and/or other resources available that will be needed to be involved in the persistent storage of the data set.

At 4124, the processor may transmit, to the selected ones of the node devices, instructions to persistently store the data set within storage space provided by the storage device(s). In so doing, the processor may transmit a copy of the columnar schema to each of the selected node devices.

At 4126, if the node devices will directly interact with the storage device(s), then the persistent storage of the data set may continue at 4130. Otherwise, if the node devices are not able to interact directly with storage device(s) and/or are not permitted to, as previously discussed, then the persistent storage of the data set may continue at 4150.

At 4130, the processor may receive indications of status of the persistent storage of the data set from one or more of the selected node devices. If, at 4132, the received statuses do not yet indicate that all of the selected node devices are finished in persistently storing their respective portions of the data set, then the processor may check at 4134 for any requests from one of the selected node devices for a unique sequence number to be used in generating a data part identifier and/or a data file identifier that is unique to a particular data set part. If not, at 4134, then the processor may return to receiving status at 4130. If so, at 4134, then the processor may generate a new unique sequence number (e.g., a number from an incrementing integer sequence) at 3136, and may then transmit that sequence number to the requesting node device at 4138, before returning to receiving status at 4130.

However, if at 4132, the received statuses do indicate that all of the selected node devices are finished in persistently storing their respective portions of the data set, then the processor may check at 4140 whether portion(s) of metadata corresponding to the data set (and which may include a copy of the columnar schema) and/or portion(s) of a data set index that may have been generated by the selected node devices, are to be persistently stored separate from the data set parts (e.g., within the file header 3130 of a data file 3100, within a separate metadata file 3103 and/or within a separate index file 3105). If so, then the processor may receive the portions of metadata and/or of an index at 4142, and may then transmit such metadata and/or an index to the storage device(s) to be so separately persistently stored at 4144.

At 4150, the processor may receive a data set part of the data set, along with a corresponding portion of metadata and/or of an index from a node device. At 4152, the processor may generate a new unique sequence number, and may then generate an identifier of the data set part and/or of a separate data file in which the data set part is to be persistently stored (if each data set part is to be persistently stored in a separate data file) at 4154. At 4156, the processor may then transmit that data set part with whichever identifiers were just generated, and along with any accompanying portion of metadata and/or of an index, to the storage device(s) to be persistently stored. If, at 4158, the node devices are not yet finished providing the controller with data set parts to be persistently stored, then the processor may return to receiving another data set portion at 4150.

However, if at 4158, the selected node devices are finished providing such data set parts, then the processor may check at 4160 whether portion(s) of metadata corresponding to the data set (and which may include a copy of the columnar schema) and/or portion(s) of a data set index that may have been generated by the selected node devices, are to be persistently stored separate from the data set parts. If so, then the processor may receive the portions of metadata and/or of an index at 4162, and may then transmit such metadata and/or an index to the storage device(s) to be so separately persistently stored at 4164.

FIGS. 23A, 23B, 23C and 23D, together, illustrate an example embodiment of a logic flow 4200. The logic flow 4200 may be representative of some or all of the operations executed by one or more embodiments described herein. More specifically, the logic flow 4200 may illustrate operations performed by core(s) 2355 of the processor(s) 2350 of one of the node devices 2300 in executing the control routine 2340, and/or performed by other component(s) of a node device 2300.

At 4210, at least one processor of a node device (e.g., one of the node devices 2300) of a distributed processing system (e.g., the distributed processing system 2000) may transmit, to a control device, indications of: 1) whether the node device currently has a portion of a data set (e.g., the data set 3300); 2) availability of processing, storage and/or other resources of the node device; and/or 3) observations made of characteristics of each of the portion of the data set (e.g., characteristics of the data values and/or of the manner in which the data values are organized). As has been discussed, it may be that the node devices receive data values of the data set from various external devices in small quantities, such as a row of data values at a time. Thus, it may be that the node devices 2300 provide indications of characteristics of what is being received to the control device.

At 4212, the at least one processor may receive, from the control device, instructions to persistently store the data set within storage space provided by the storage device(s). A copy of the columnar schema may also be received from the control device. In response, at 4214, the at least one processor may instantiate multiple collection threads, multiple data buffers forming a buffer queue that is operated as a FIFO buffer, and multiple aggregation threads.

As has been previously discussed, with the instantiation of such multiple threads, numerous operations may be performed in an at least partially parallelized manner to prepare the multiple rows of the data set that are temporarily stored within the node device (e.g., rows 3313) to form multiple data set parts (e.g., data set parts 3311) for being transmitted to the storage device(s) to be persistently stored. Thus, the operations that are depicted starting at 4220, 4230 and 4240 in FIGS. 23B, 23C and 23D, respectively, should be understood to be occurring at least partially in parallel, at least until there are no more rows available for preparation and/or until there are no more data set parts that remain to be transmitted.

Figure 23A:
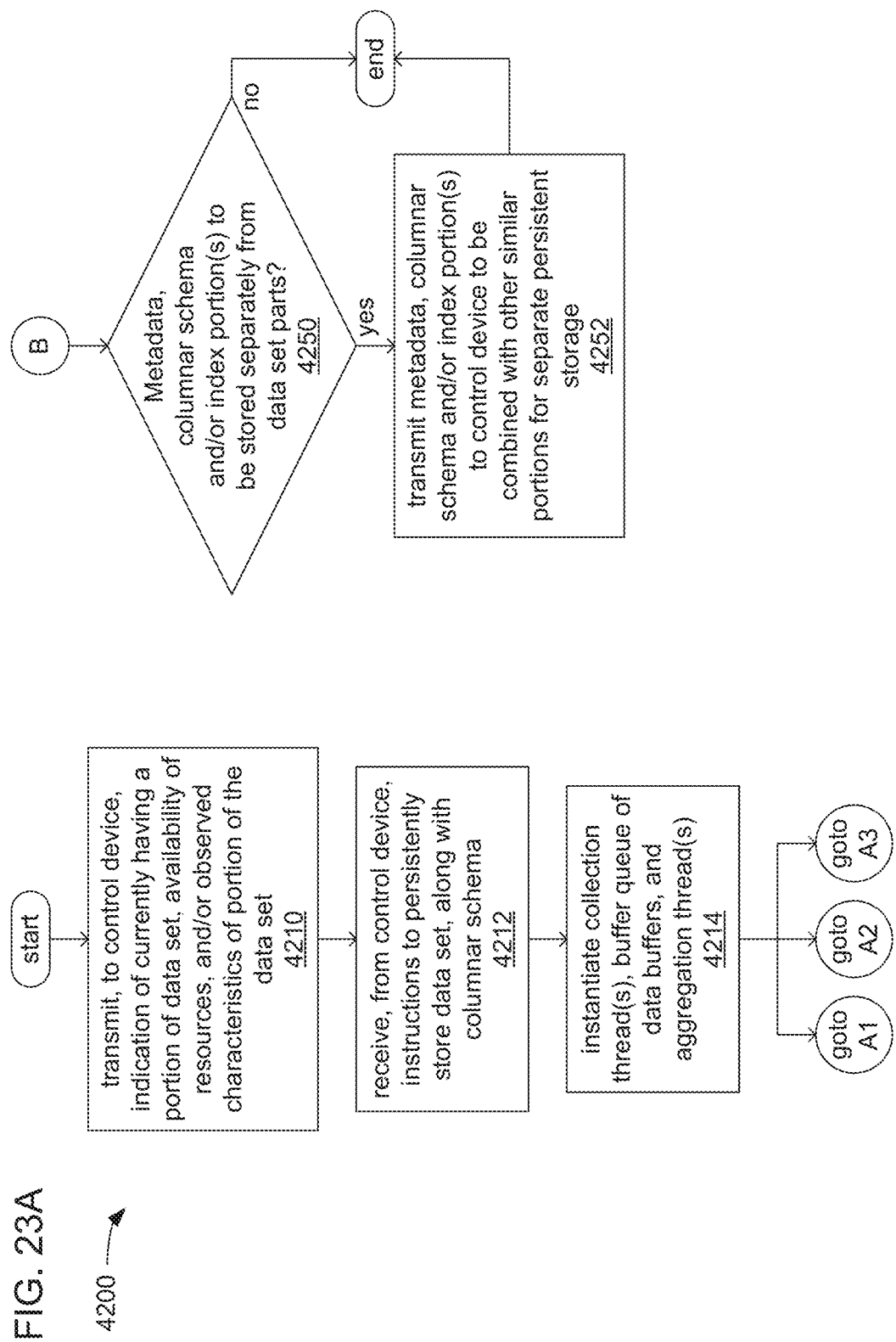
FIGS. 23A, 23B, 23C and 23D, together, illustrate an example logic flow of operations by a node device in persistently storing a data set.
Figure 23B:
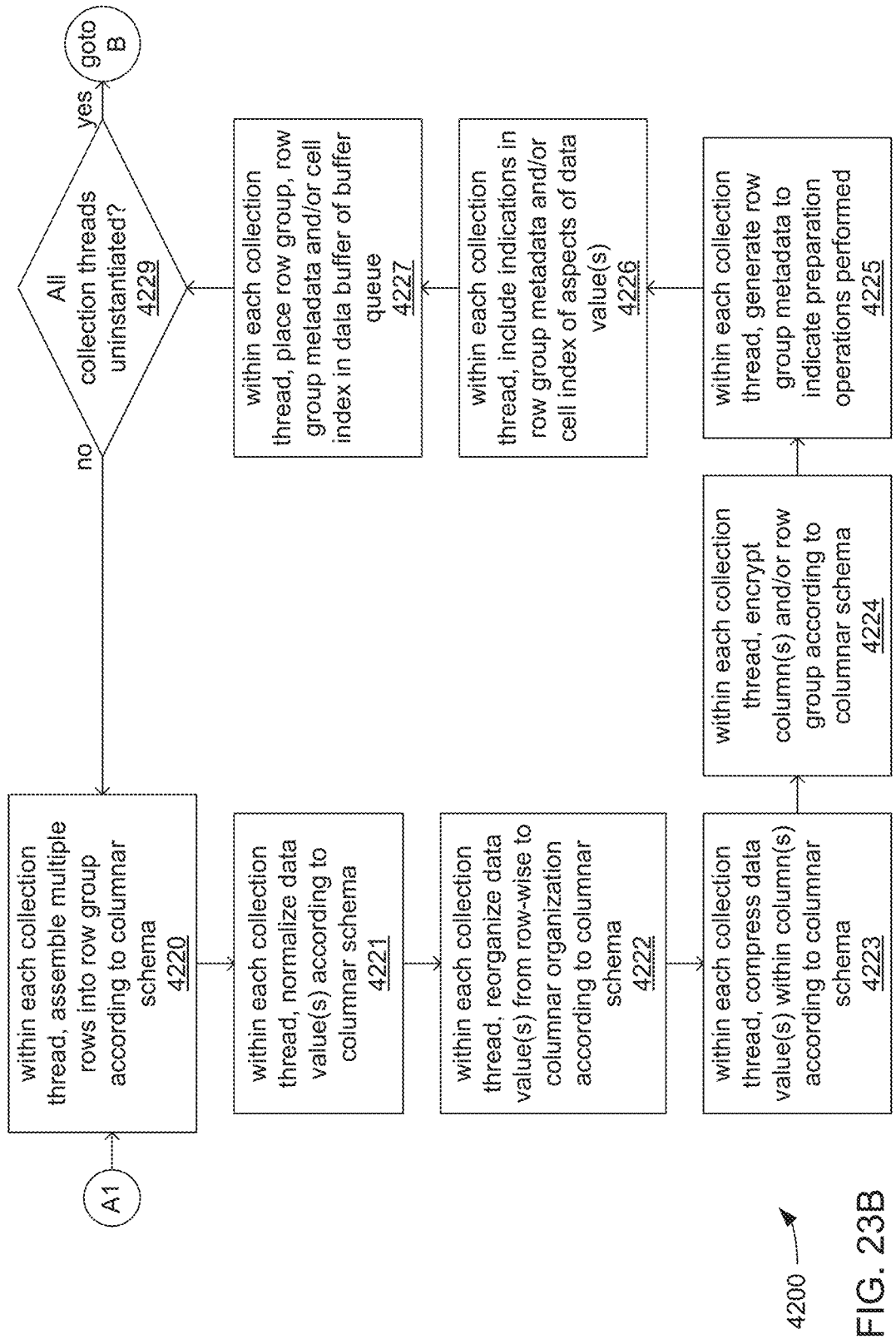

Turning to FIG. 23B, at 4220, in executing separate instances of instructions within each collection thread that was instantiated at 4214, the at least one processor may assemble multiple ones of the rows of the data set that are temporarily stored within the node device into a row group in accordance with the columnar schema that may have been received from the control device. At 4221, the at least one processor may normalize the data values (i.e., normalize data types, data formats, etc.) within one or more of the columns of the row group in accordance with the columnar schema. At 4222, the at least one processor may reorganize the data values within the row group from a row-wise organization and into a columnar organization in accordance with the columnar schema. At 4223, the at least one processor may compress data values within one or more of the columns of the row group in accordance with the columnar schema. At 4224, the at least one processor may compress the data values within one or more of the columns of the row group in accordance with the columnar schema. At 4225, the least one processor may generate row group metadata that corresponds to the row group to include indications of the normalization, reorganization, compression, encryption and/or other operations as part of preparing the data set for being persistently stored. At 4226, the at least one processor may additionally include, within the row group metadata and/or within a corresponding cell index, various indications of characteristics of the data values therein (e.g., highest, lowest, unique values, duplicated values, etc.). At 4227, the at least one processor may store at least the row group, if not also the corresponding row group metadata and/or corresponding cell index, in one of the data buffers of the buffer queue. At 4229, if it is not the case that all of the collection threads have been uninstantiated, then within at least one of the collection threads, the at least one processor may return to assembling another row group at 4220.

Figure 23C:
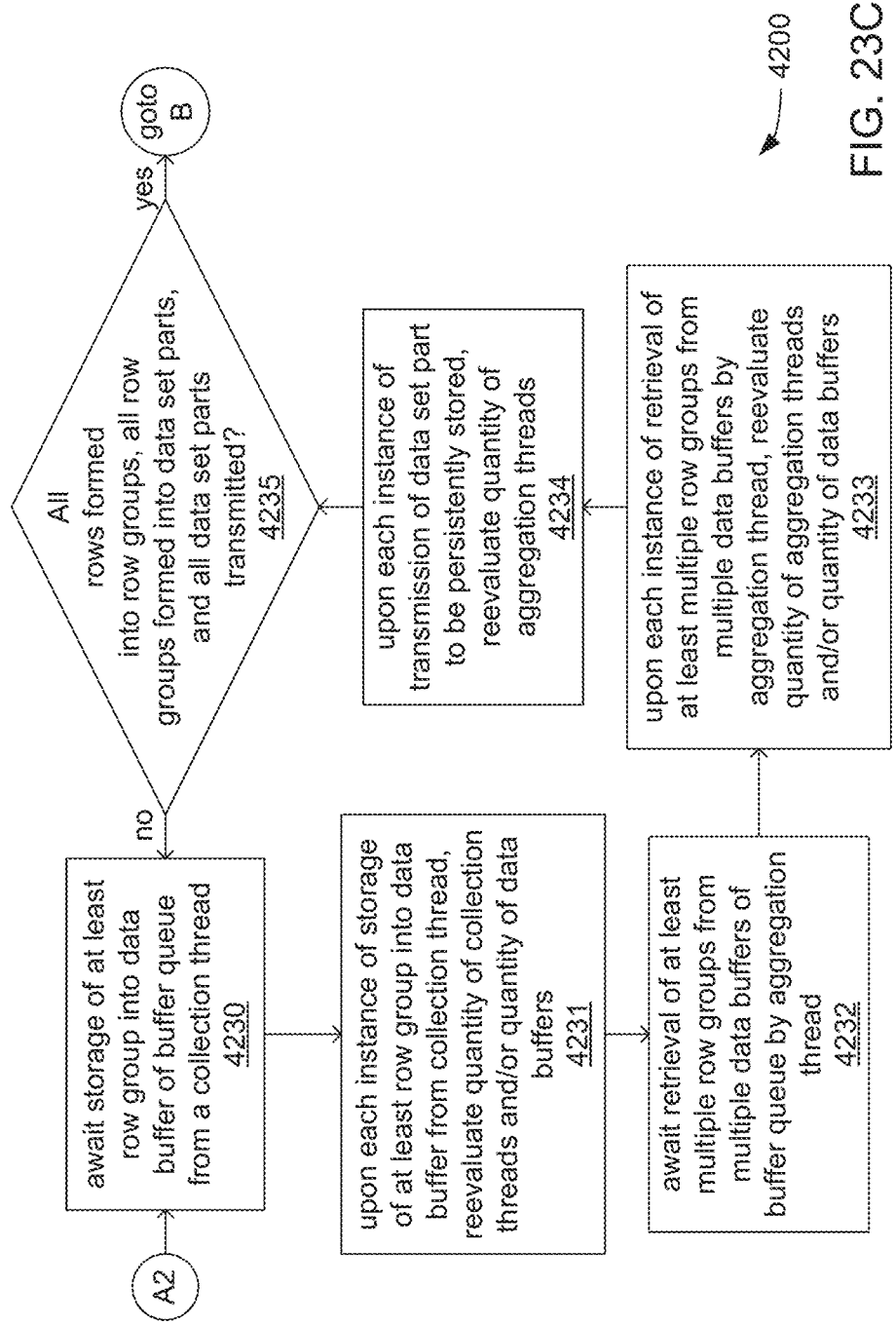

Turning to FIG. 23C, at 4230, in executing instructions associated with oversight of the allocation of the collection threads, the data buffers of the buffer queue and/or the aggregation threads, the at least one processor may await an instance of the storage of at least a row group into one of the data buffers of the buffer queue. At 4231, the at least one processor, in response to the instance at 4230, may reevaluate the quantity of collection threads and/or the quantity of data buffers that are currently instantiated and in active use. By way of example, and as previously discussed, as the level of availability of processing, storage and/or other resources within the node device fluctuates, the at least one processor may dynamically adjust the quantities of various threads and/or the quantity of data buffers of the buffer queue that have been allocated. At 4232, the at least one processor may await an instance of the retrieval of at least multiple row groups from multiple ones of the data buffers of the buffer queue by an aggregation thread. At 4233, the at least one processor, in response to the instance at 4232, may reevaluate the quantity of aggregation threads and/or the quantity of data buffers that are currently instantiated and in active use. Alternatively or additionally, at 4234, the at least one processor, in response to the transmission of at least a data set part (either directly to the storage device(s), or through the control device) to be persistently stored, may reevaluate the quantity of aggregation threads that are currently instantiated and in active use.

Figure 23D:
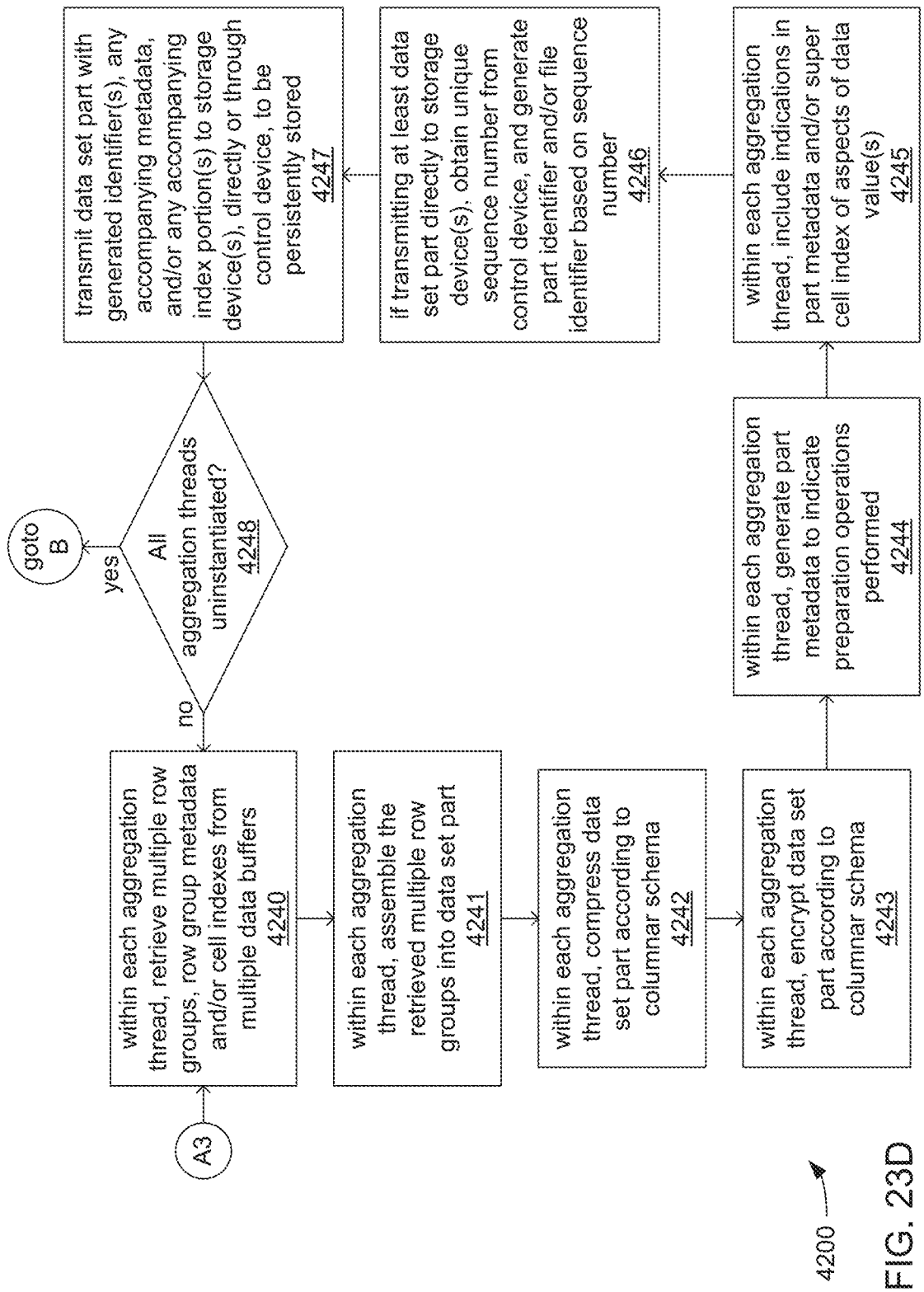

Turning to FIG. 23D, at 4240, in executing separate instances of instructions within each aggregation thread that was instantiated, at 4214, the at least one processor may retrieve multiple ones of the row groups from multiple ones of the data buffers of the buffer queue, if not also the corresponding row group metadata and/or corresponding cell index for each of those row groups. At 4241, the at least one processor may assemble the multiple retrieved row groups into data set part in accordance with the columnar schema that may have been received from the control device. At 4242, the at least one processor may compress the data set part in accordance with the columnar schema. At 4243, the at least one processor may encrypt the data set part in accordance with the columnar schema. At 4244, the least one processor may generate part metadata that corresponds to the data set part to include indications of any compression, encryption and/or other operations that may have been performed on the data set part as part of preparing the data set for being persistently stored. At 4245, the at least one processor may additionally include, within the part metadata and/or within a corresponding super cell index, various indications of characteristics of the data values therein (e.g., highest, lowest, unique values, duplicated values, etc.). As previously discussed, at least some of such indications included in such part metadata and/or super cell index may be derived from corresponding indications within the row group metadata and/or cell index that correspond to each of the row groups from which the data set part is formed. At 4246, if the transmission of the data set part from the aggregation thread will be directly to the storage device(s), then the at least one processor may generate a new unique sequence number (e.g., a number from an incrementing integer sequence), and may then generate an identifier of the data set part and/or of a separate data file in which the data set part is to be persistently stored (if each data set part is to be persistently stored in a separate data file). At 4247, the at least one processor may then transmit that data set part along with any corresponding portion(s) of metadata and/or any corresponding portion(s) of an index, to the storage device(s) (either directly or through the control device) to be persistently stored. If the transmission is directly to the storage device, then the transmission may include whichever identifiers were just generated. At 4248, if it is not the case that all of the aggregation threads have been uninstantiated, then within at least one of the aggregation threads, the at least one processor may return to assembling retrieving another multitude of row groups at 4240.

Returning to FIG. 23A, at 4250, after all of the data set parts have been formed from all available rows temporarily stored within the node device, and have been transmitted, the at least one processor of the node device may check whether portion(s) of metadata corresponding to the data set (and which may include a copy of the columnar schema) and/or portion(s) of a data set index that may have been generated within the node device, are to be persistently stored separate from the data set parts. If so, then at 4252, the processor may transmit such portions of metadata and/or of an index to the control device to be combined by the control device with other similar portions from others of the node devices in preparation for such separate persistent storage.

Figure 24B:
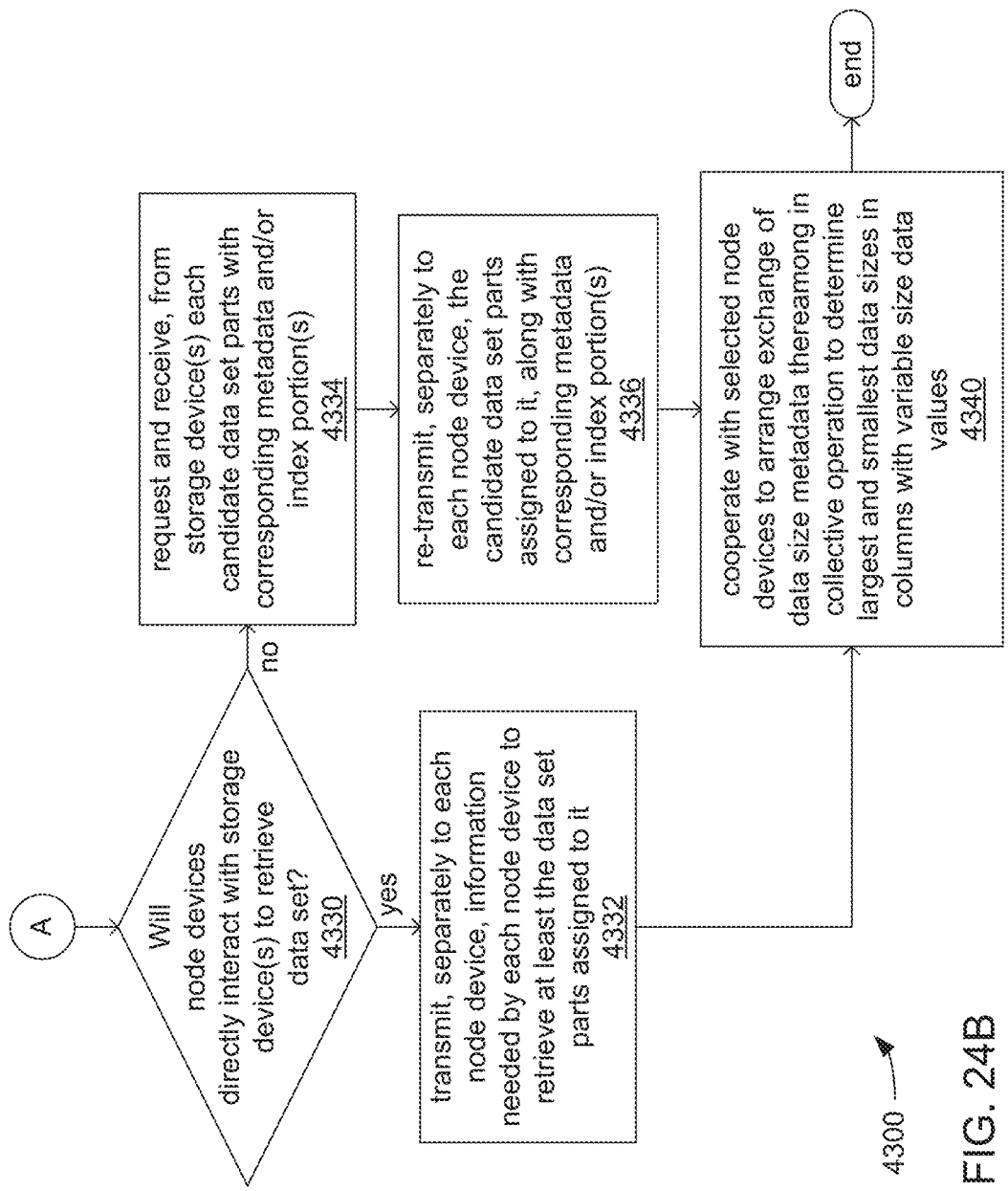

FIGS. 24A and 24B, together, illustrate an example embodiment of a logic flow 4300. The logic flow 4300 may be representative of some or all of the operations executed by one or more embodiments described herein. More specifically, the logic flow 4300 may illustrate operations performed by core(s) 2555 of the processor(s) 2550 of the control device 2500 (or a controller 2503) in executing the control routine 2540, and/or performed by other component(s) of the control device 2500 (or a controller 2503).

At 4310, a processor of a control device or controller (e.g., the control device 2500 or a controller 2503 incorporated into a node device 2300) of a distributed processing system (e.g., the distributed processing system 2000) may receive, from multiple node devices of the distributed processing system, indications of availability of processing, storage and/or other resources of each node device.

At 4312, the processor may receive, from a requesting device (e.g., the requesting device 2700) a request to retrieve a data set from persistent storage within storage space provided by one or more storage devices (e.g., the storage device(s) 2100). As previously discussed, the request may or may not include criteria concerning data values of the data set that may serve to limit what is retrieved to row(s) of the data set that meet the specified criteria.

At 4314, the processor may request and receive, from the storage device(s), at least a portion of metadata (e.g., at least a portion of the data set metadata 3350) corresponding to the data set (which may include the columnar schema that was used in earlier preparation of the data set for being persistently stored), and/or at least a portion of a data set index (e.g., at least a portion of the data set index 3500) that is needed to at least determine the quantity of data set portions of the data set as persistently stored.

At 4320, if the data set retrieval request did not include criteria for narrowing the portion(s) of the data set that are retrieved to row(s) that meet the specified criteria, then at 4326, the processor may select the node devices that are to become involved in the retrieval of the entirety of the data set based on the total quantity of data set parts of the data set and/or on the level of available resources within each node device. At 4328, the processor may then transmit, to those selected node devices, instructions to retrieve the data set. In so doing, the processor may transmit a copy of the columnar schema to each of the selected node devices.

However, if, at 4320, the data set retrieval request did include such criteria, then at 4322, the processor may use the criteria with the information concerning data value(s) of the data set in the received portion(s) of metadata and/or of an index to identify data set part(s) that could not possibly include any row that meets the criteria. At 4324, the processor may then select the node devices that are to become involved in the retrieval of the candidate data set parts based on the quantity of candidate data set parts of the data set and/or on the level of available resources within each node device, before transmitting instructions to retrieve the data set to the selected node devices at 4328.

At 4330, if the node devices will directly interact with the storage device(s) in retrieving the data set, then at 4332, the processor may transmit, separately to each node device, the information needed by each node device to retrieve the one or more data set parts that are assigned to it for retrieval. As previously discussed, depending on such factors as whether a data set is persistently stored within a single data file or across multiple data files, the information needed to retrieve a particular data set part may include a data file identifier for the data file within which that data set part is persistently stored and/or a data part identifier for the data set part, itself.

However, if at 4330, the node devices are not able to interact directly with storage device(s) and/or are not permitted to, then at 4334, the processor of the control device may request and receive, from the storage device(s), each of the data set parts that are to be retrieved, along with corresponding portion(s) of metadata and/or of an index (if there is one). At 4336, the processor may then re-transmit each of those directly retrieved data set parts, along with the retrieved corresponding portion(s) of metadata and/or of an index, to the one of the selected node devices to which it is assigned.

Regardless of the manner in which the data set parts are caused to be provided to the ones of the selected node devices to which they are assigned, at 4340, the processor may cooperate with each of the selected node devices to arrange for them to communicate directly among themselves to exchange data size metadata thereamong for any column(s) that includes data values of a variable data size. In this way, the node devices are able to directly compare the largest and/or smallest data sizes that each has identified as being found in each such column to determine the largest and smallest data sizes in each such column overall throughout the data set (or at least throughout the rows of the data set that meet the criteria, if provided).

FIGS. 25A, 25B, 25C and 25D, together, illustrate an example embodiment of a logic flow 4400. The logic flow 4400 may be representative of some or all of the operations executed by one or more embodiments described herein. More specifically, the logic flow 4400 may illustrate operations performed by core(s) 2355 of the processor(s) 2350 of one of the node devices 2300 in executing the control routine 2340, and/or performed by other component(s) of a node device 2300.

At 4410, at least one processor of a node device (e.g., one of the node devices 2300) of a distributed processing system (e.g., the distributed processing system 2000) may transmit, to a control device, indications of level of availability of processing, storage and/or other resources of the node device. At 4412, the at least one processor may receive, from the control device, instructions to retrieve a data set from persistent storage within storage space provided by storage device(s). In response, at 4414, the at least one processor may instantiate multiple reading threads, multiple data buffers forming a buffer queue that is operated as a FIFO buffer, and multiple provision threads.

As has been previously discussed, with the instantiation of such multiple threads, numerous operations may be performed in an at least partially parallelized manner to prepare retrieve either rows or columns from data set parts for use by an application routine executed within node device(s) and/or to be transmitted to another device (e.g., to the requesting device 2700). Thus, the operations that are depicted starting at 4420, 4430 and 4440 in FIGS. 25B, 25C and 25D, respectively, should be understood to be occurring at least partially in parallel, at least until there are no data set parts to be processed to retrieve row groups therefrom and/or until there are no more row groups retrieved row groups to be processed to retrieve the requested rows or columns therefrom.

Turning to FIG. 25B, at 4420, in executing separate instances of instructions within each reading thread that was instantiated at 4414, if an actual data set part (and corresponding portion(s) of metadata and/or of an index) was not stored from the control device within the data buffer that the reading thread is accessing, then the at least one processor may retrieve identifier(s) of the data set part and/or of the data file within which the data set part is persistently stored to retrieve the data set part directly from the storage device(s). At 4421, if the data set part is encrypted, then the at least one processor may use encryption data stored within the corresponding part metadata to decrypt the data set part. At 4422, if the data set part is compressed, then the at least one processor may use an indication of the type of compression used within the corresponding part metadata to decompress the data set part. At 4423, if the data set retrieval request included criteria for narrowing the portion(s) of the data set that are retrieved to row(s) that meet criteria specified in the request, then the at least one processor may use the criteria with information within the corresponding part metadata and/or the corresponding super cell index (if it exists) to identify row group(s) of the data set part that could not possibly include row(s) that meet the criteria. As has been discussed, the remaining row groups that are not so identified may be deemed to be candidate row groups in which it is still possible that there may be row(s) that doe meet the criteria. At 4423, if any of decryption at 4421, decompression at 4422 or identification of candidate row groups 4423 has been performed, then the at least one processor may then store the results of such operations (e.g., a decrypted and/or decompressed form of the data set part or candidate row groups thereof) in the data buffer in place of the whole data set part as it was originally retrieved from the storage device(s). At 4425, if it is not the case that all of the reading threads have been uninstantiated, then within at least one of the reading threads, the at least one processor may return to possibly directly retrieving another data set part at 4420.

Figure 25A:
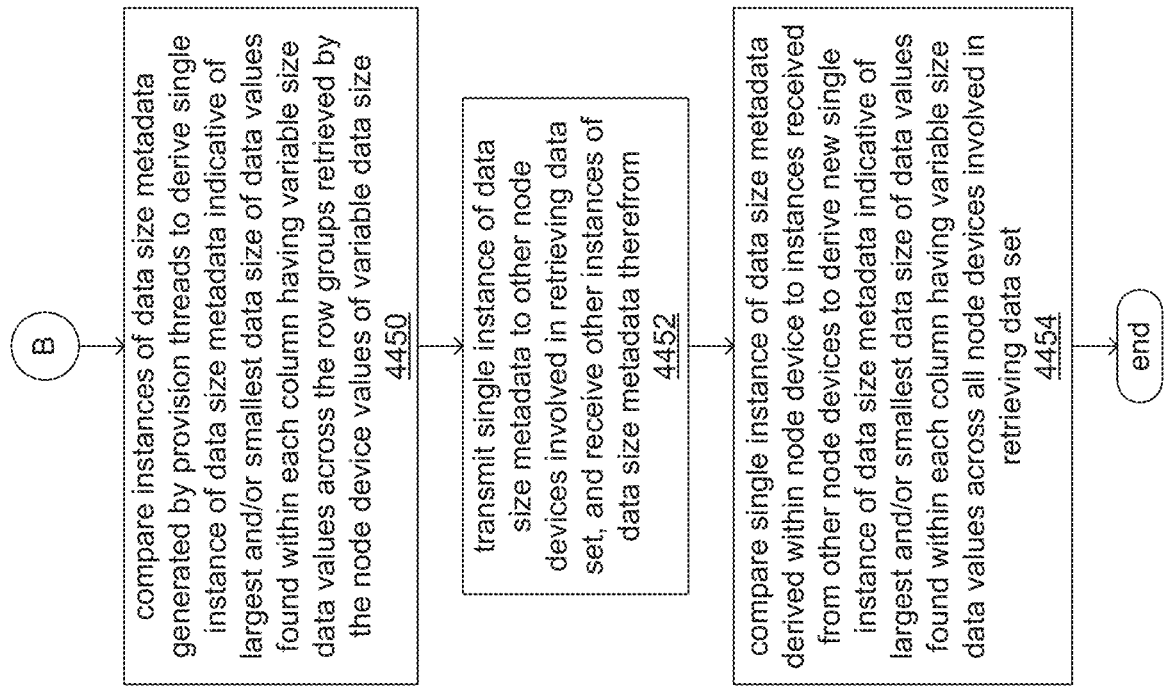
Figure 25A:
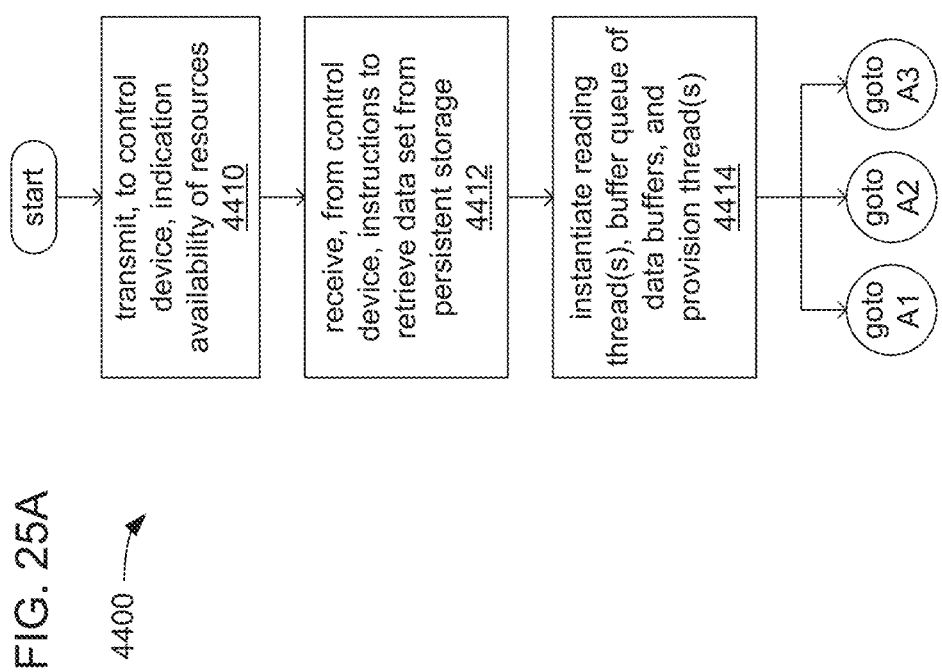
Figure 25C:
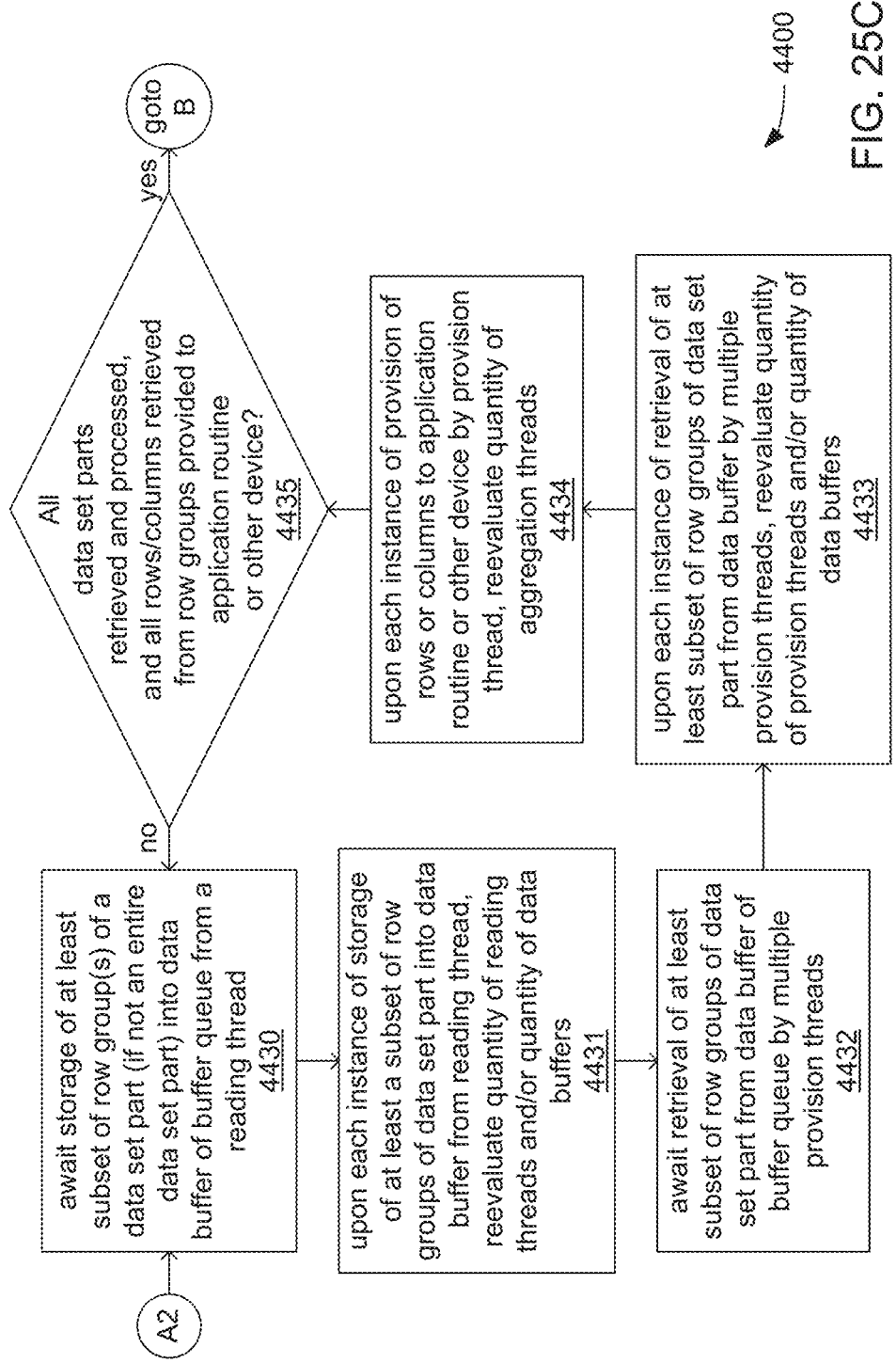

Turning to FIG. 25C, at 4430, in executing instructions associated with oversight of the allocation of the reading threads, the data buffers of the buffer queue and/or the provision threads, the at least one processor may await an instance of the storage of at least a subset of row groups of a data set part (if not an entire data set part) into one of the data buffers of the buffer queue. At 4431, the at least one processor, in response to the instance at 4430, may reevaluate the quantity of reading threads and/or the quantity of data buffers that are currently instantiated and in active use. By way of example, and as previously discussed, as the level of availability of processing, storage and/or other resources within the node device fluctuates, the at least one processor may dynamically adjust the quantities of various threads and/or the quantity of data buffers of the buffer queue that have been allocated. At 4432, the at least one processor may await an instance of the retrieval of at least a subset of row groups of a data set part from a data buffer of the buffer queue by multiple provision threads (each of which may retrieve a separate one of the row groups, as has been previously discussed. At 4433, the at least one processor, in response to the instance at 4432, may reevaluate the quantity of provision threads and/or the quantity of data buffers that are currently instantiated and in active use. Alternatively or additionally, at 4434, the at least one processor, in response to the provision of rows or columns of data values to an application routine or to another device from a provision thread, may reevaluate the quantity of provision threads that are currently instantiated and in active use.

Turning to FIG. 25D, at 4440, in executing separate instances of instructions within each provision thread that was instantiated, at 4414, the at least one processor may retrieve a single row group out of what may be multiple row groups within a data buffer of the buffer queue, if not also the corresponding row group metadata and/or corresponding cell index for each of that row group (leaving the other row groups therein to be retrieved for other provision threads). At 4441, if the row group or column(s) thereof are encrypted, then the at least one processor may use encryption data stored within the corresponding row group metadata to decrypt the row group or those column(s). At 4442, if the row group or column(s) thereof are compressed, then the at least one processor may use an indication of the type of compression used within the corresponding row group metadata to decompress the row group or those column(s).

At 4443, if the data set retrieval request specified that rows are to be provided, then the at least one processor may reorganize the data values within the row group from a columnar organization and into a row-wise organization. Also, if the request included criteria for narrowing the portion(s) of the data set that are retrieved to row(s) that meet criteria specified in the request, then the at least one processor may use the criteria with information within the corresponding row group metadata in searching the rows of the row group for one(s) of the rows that meet the criteria, and may provide those row(s) (if any are found) to an application routine or to another device, as specified. Otherwise, if the request did not include such criteria, then the at least one processor may provide all of the rows of the row group thereto.

At 4443, if the data set retrieval request specified that columns are to be provided, then the at least one processor may refrain from such reorganization of the data values into a row-wise organization. Also, if the request specified that just a subset of the columns be provided, then the at least one processor may limit the provision of columns to an application routine or to another device to just the specified subset. Otherwise, if the request did not include such specification of a subset, then the at least one processor may provide all of the columns of the row group thereto.

Returning to FIG. 25A, at 4450, after all of the data set parts that are assigned to be retrieved have been so retrieved and processed to retrieve rows or columns, and after all of the rows or columns that are to be provided have been so provided, the at least one processor of the node device may compare instances of data size metadata (e.g., instances of the data size metadata 3370) that were generated by each of the provision threads to derive a single data size metadata that indicates the largest and smallest data sizes found in each column that includes variable size data at 4450. At 4452, the at least one processor may transmit the single instance of data size metadata to other node devices that are also involved in retrieving the data set, and may receive the data size metadata transmitted by each. At 4454, the at least one processor may then compare the internally derived data size metadata each of the others received from each of the other node devices to derive a new single data size metadata that indicates the largest and/or smallest data sizes found in each of those same columns across all of the node devices involved in retrieving the data set.

In various embodiments, each of the processors 2350 and 2550 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

In various embodiments, each of the control routines 2340 and 2540, including the components of which each is composed, may be selected to be operative on whatever type of processor or processors that are selected to implement applicable ones of the processors 2350 and/or 2550 within each one of the devices 2300 and/or 2500, respectively. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 2350 and/or 2550. Where one or more device drivers are included, those device drivers may provide support for any of a variety of other components, whether hardware or software components, of the devices 2300 and/or 2500.

In various embodiments, each of the storages 2360 and 2560 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the input device 2710 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions.

In various embodiments, the display 2780 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the displays 2180 and/or 2880 may each be a touchscreen display such that the input devices 2110 and/or 2810, respectively, may be incorporated therein as touch-sensitive components thereof.

In various embodiments, each of the network interfaces 2390 and 2590 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, etc.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising at least one processor and a storage to store instructions that, when executed by the at least one processor, cause the at least one processor to perform operations comprising:

receive, at a node device of multiple node devices, and from a control device via a network, an instruction to the multiple node devices to persistently store a data set within at least one storage device, wherein:
  the data set comprises multiple data values organized into numerous rows;
  each row comprises multiple data fields that each fall within a column of multiple columns;
  the numerous rows of the data set are divided into subsets of multiple rows that are distributed among multiple storage spaces provided by the multiple node devices; and
  the data values of the multiple rows that are stored within the storage space provided by each node device are stored in a row-wise organization in which data values within each row are stored at adjacent storage locations;
in response to receiving the instruction to persistently store the multiple rows that are stored within the storage space provided by the node device, the at least one processor is caused to perform operations comprising:
  within each collection thread of a quantity of collection threads, the at least one processor is caused to perform operations comprising:
    assemble a subset of the multiple rows stored within the node device into a row group with the data values reorganized into a columnar organization; and
    store the row group within a data buffer of a buffer queue;
  operate the buffer queue as a first-in-first-out (FIFO) buffer in which the first data buffer of multiple data buffers to be filled with a row group from a collection thread becomes the first data buffer from which a row group is retrieved by an aggregation thread;
  within each aggregation thread of a quantity of aggregation threads, the at least one processor is caused to perform operations comprising:
    assemble a data set part from multiple row groups retrieved from multiple data buffers of the buffer queue; and
    transmit the data set part to the at least one storage device via the network; and
  in response to each instance of retrieval of a row group from a data buffer of the buffer queue for use within an aggregation thread, analyze a level of availability of at least storage space within the node device to determine whether to dynamically adjust a quantity of data buffers of the buffer queue.

2. The apparatus of claim 1, wherein, within each collection thread of the quantity of collection threads, the at least one processor is caused to perform operations comprising:
  reorganize the data values within the row group from the row-wise organization to the columnar organization, wherein the data values within each column of the multiple columns within the row group are stored at adjacent storage locations within the storage space provided by the node device;
  during or following the reorganization of the data values within the row group from the row-wise organization to the columnar organization, losslessly compress the data values within at least one column of the multiple columns within the row group;
  generate row group metadata corresponding to the row group that includes an indication of at least one of a type of lossless compression used to losslessly compress the data values within the at least one column, and an identifier of the at least one column; and
  store the row group metadata together with the row group within a data buffer of the buffer queue.

3. The apparatus of claim 2, wherein the type of lossless compression comprises, within each collection thread of the quantity of collection threads, the at least one processor being caused to perform operations comprising:
  generate a flag register of multiple flag registers for each column of the at least one column, wherein each flag register comprises multiple bits, wherein each bit indicates whether a corresponding data value within the corresponding column is a null value;
  include the multiple flag registers in the row group metadata; and
  remove each instance of the null value from the row group.

4. The apparatus of claim 2, wherein, within each aggregation thread of the quantity of aggregation threads, the at least one processor is caused to perform operations comprising:
  retrieve the multiple row groups from the multiple data buffers;
  retrieve, from the multiple data buffers, row group metadata corresponding to each row group of the multiple row groups retrieved from the multiple data buffers;
  generate part metadata corresponding to the data set part, that includes the row group metadata corresponding to each row group of the multiple row groups; and
  transmit, to the at least one storage device via the network, the part metadata together with the data set part.

5. The apparatus of claim 1, wherein, within each collection thread of the quantity of collection threads, the at least one processor is caused to perform operations comprising:
  reorganize the data values within the row group from the row-wise organization to the columnar organization, wherein the data values within each column of the multiple columns within the row group are stored at adjacent storage locations within the storage space provided by the node device;
  during or following the reorganization of the data values within the row group from the row-wise organization to the columnar organization, encrypt the data values within at least one column of the multiple columns within the row group;
  generate row group metadata corresponding to the row group that includes an indication of at least one of a type of encryption used to encrypt the data values within the at least one column, and an identifier of the at least one column; and
  store the row group metadata together with the row group within a data buffer of the buffer queue.

6. The apparatus of claim 1, wherein, within each aggregation thread of the quantity of aggregation threads, the at least one processor is caused to perform operations comprising:
  retrieve the multiple row groups from the multiple data buffers;
  retrieve, from the multiple data buffers, row group metadata corresponding to each row group of the multiple row groups retrieved from the multiple data buffers, wherein the row group metadata corresponding to each row group of the multiple row groups retrieved from the multiple data buffers includes at least one of:
    an indication of a quantity of rows from which the row group was formed;

an indication of a type of compression used to compress data values within at least one column;
an indication of a type of encryption used to encrypt data values within at least one column; and
a range of values identified as present within at least one column;
generate part metadata corresponding to the data set part, that includes the row group metadata corresponding to each row group of the multiple row groups; and
transmit the part metadata via the network, either together with the data set part to the at least one storage device, or to the control device to be combined with other part metadata corresponding to other data set parts of the multiple data set parts of the data set for persistent storage by the at least one storage device separately from all of the multiple data set parts.

7. The apparatus of claim 1, wherein the at least one processor is caused to perform operations comprising:
instantiate the quantity of collection threads of execution, the quantity of data buffers of a buffer queue, and the quantity of aggregation threads of execution; and
in response to each instance of storage of a row group into a data buffer of the buffer queue from a collection thread, analyze a level of availability of at least one of the storage space within the node device and processing resources of the at least one processor to determine whether to dynamically adjust the quantity of collection threads.

8. The apparatus of claim 1, wherein the at least one processor is caused to perform operations comprising:
instantiate the quantity of collection threads of execution, the quantity of data buffers of a buffer queue, and the quantity of aggregation threads of execution; and
in response to each instance of transmission of a data set part to the at least one storage device from an aggregation thread, analyze a level of availability of at least one of the storage space within the node device and processing resources of the at least one processor to determine whether to dynamically adjust the quantity of aggregation threads.

9. The apparatus of claim 1, wherein:
each data set part of the multiple data set parts is to be persistently stored by the at least one storage device within a separate data file of multiple data files;
the at least one storage device is to maintain a subdirectory in which the multiple data files are to be stored;
an identifier that uniquely identifies the data set is to be used by the at least one storage device to identify the subdirectory; and
within each aggregation thread, the at least one processor is caused to perform operations comprising:
transmit, to the control device via the network, a request for a sequence number;
receive, from the control device via the network, the sequence number;
combine the sequence number received from the control device with the identifier of the data set, and with an identifier of a file type of the data file in which the data set part is to be persistently stored, to form a file identifier to be used by the at least one storage device to uniquely identify the data file in which the data set part is to be persistently stored; and
transmit, to the at least one storage device via the network, the data set part along with the file identifier.

10. The apparatus of claim 1, wherein:
preparation of the data set for persistent storage within the at least one storage device comprises the performance of at least one preparation operation by the at least one processor in accordance with a columnar schema, wherein the at least one preparation operation comprises at least one of:
the assembly, performed by the at least one processor within each collection thread, of a row group from a quantity of rows specified in the columnar schema;
normalization, performed by the at least one processor within each collection thread, of data values within at least one column to at least one data type or at least one data format specified in the columnar schema;
compression, performed by the at least one processor within each collection thread, of the data values within each column of a row group or of the data values of an entire row group in accordance with a selection of a type of compression specified in the columnar schema;
encryption, performed by the at least one processor within each collection thread, of each row group in accordance with a selection of a type of encryption specified in the columnar schema;
the assembly, performed by the at least one processor within each aggregation thread, of a data set part from a quantity of row groups specified in the columnar schema;
compression, performed by the at least one processor within each aggregation thread, of each data set part in accordance with a selection of a type of compression specified in the columnar schema; and
encryption, performed by the at least one processor within each aggregation thread, of data set part in accordance with a selection of a type of encryption specified in the columnar schema; and
prior to the assembly of a row group within any collection thread of the quantity of collection threads, the at least one processor is caused to perform operations comprising:
identify characteristics of the data values within a plurality of the rows of the multiple rows stored within the storage space provided by the node device;
transmit, to the control device via the network, an indication of the characteristics of the data values to enable the control device to use the indication of the characteristics to generate the columnar schema or to select the columnar schema from among multiple columnar schemas;
receive, from the control device via the network, an indication of the columnar schema; and
perform the at least one preparation operation in accordance with the columnar schema.

11. A computer-program product tangibly embodied in a non-transitory machine-readable storage medium, the computer-program product including instructions operable to cause at least one processor of a node device of multiple node devices to perform operations comprising:
receive, at the node device, and from a control device via a network, an instruction to the multiple node devices to persistently store a data set within at least one storage device, wherein:
the data set comprises multiple data values organized into numerous rows;
each row comprises multiple data fields that each fall within a column of multiple columns;

the numerous rows of the data set are divided into subsets of multiple rows that are distributed among multiple storage spaces provided by the multiple node devices; and the data values of the multiple rows that are stored within the storage space provided by each node device are stored in a row-wise organization in which data values within each row are stored at adjacent storage locations;

in response to receiving the instruction to persistently store the multiple rows that are stored within the storage space provided by the node device, the at least one processor is caused to perform operations comprising:

within each collection thread of a quantity of collection threads, the at least one processor is caused to perform operations comprising:

assemble a subset of the multiple rows stored within the node device into a row group with the data values reorganized into a columnar organization; and store the row group within a data buffer of a buffer queue;

operate the buffer queue as a first-in-first-out (FIFO) buffer in which the first data buffer of multiple data buffers to be filled with a row group from a collection thread becomes the first data buffer from which a row group is retrieved by an aggregation thread;

within each aggregation thread of a quantity of aggregation threads, the at least one processor is caused to perform operations comprising:

assemble a data set part from multiple row groups retrieved from multiple data buffers of the buffer queue; and transmit the data set part to the at least one storage device via the network; and in response to each instance of retrieval of a row group from a data buffer of the buffer queue for use within an aggregation thread, analyze a level of availability of at least storage space within the node device to determine whether to dynamically adjust a quantity of data buffers of the buffer queue.

12. The computer-program product of claim 11, wherein, within each collection thread of the quantity of collection threads, the at least one processor is caused to perform operations comprising:

reorganize the data values within the row group from the row-wise organization to the columnar organization, wherein the data values within each column of the multiple columns within the row group are stored at adjacent storage locations within the storage space provided by the node device;

during or following the reorganization of the data values within the row group from the row-wise organization to the columnar organization, losslessly compress the data values within at least one column of the multiple columns within the row group;

generate row group metadata corresponding to the row group that includes an indication of at least one of a type of lossless compression used to losslessly compress the data values within the at least one column, and an identifier of the at least one column; and store the row group metadata together with the row group within a data buffer of the buffer queue.

13. The computer-program product of claim 12, wherein the type of lossless compression comprises, within each collection thread of the quantity of collection threads, the at least one processor being caused to perform operations comprising:

generate a flag register of multiple flag registers for each column of the at least one column, wherein each flag register comprises multiple bits, wherein each bit indicates whether a corresponding data value within the corresponding column is a null value;

include the multiple flag registers in the row group metadata; and remove each instance of the null value from the row group.

14. The computer-program product of claim 12, wherein, within each aggregation thread of the quantity of aggregation threads, the at least one processor is caused to perform operations comprising: retrieve the multiple row groups from the multiple data buffers; retrieve, from the multiple data buffers, row group metadata corresponding to each row group of the multiple row groups retrieved from the multiple data buffers; generate part metadata corresponding to the data set part, that includes the row group metadata corresponding to each row group of the multiple row groups; and transmit, to the at least one storage device via the network, the part metadata together with the data set part.

15. The computer-program product of claim 11, wherein, within each collection thread of the quantity of collection threads, the at least one processor is caused to perform operations comprising:

reorganize the data values within the row group from the row-wise organization to the columnar organization, wherein the data values within each column of the multiple columns within the row group are stored at adjacent storage locations within the storage space provided by the node device;

during or following the reorganization of the data values within the row group from the row-wise organization to the columnar organization, encrypt the data values within at least one column of the multiple columns within the row group;

generate row group metadata corresponding to the row group that includes an indication of at least one of a type of encryption used to encrypt the data values within the at least one column, and an identifier of the at least one column; and store the row group metadata together with the row group within a data buffer of the buffer queue.

16. The computer-program product of claim 11, wherein, within each aggregation thread of the quantity of aggregation threads, the at least one processor is caused to perform operations comprising:

retrieve the multiple row groups from the multiple data buffers;

retrieve, from the multiple data buffers, row group metadata corresponding to each row group of the multiple row groups retrieved from the multiple data buffers, wherein the row group metadata corresponding to each row group of the multiple row groups retrieved from the multiple data buffers includes at least one of:

an indication of a quantity of rows from which the row group was formed;

an indication of a type of compression used to compress data values within at least one column;

an indication of a type of encryption used to encrypt data values within at least one column; and a range of values identified as present within at least one column;

generate part metadata corresponding to the data set part, that includes the row group metadata corresponding to each row group of the multiple row groups; and transmit the part metadata via the network, either together with the data set part to the at least one storage device, or to the control device to be combined with other part metadata corresponding to other data set parts of the multiple data set parts of the data set for persistent storage by the at least one storage device separately from all of the multiple data set parts.

17. The computer-program product of claim 11, wherein the at least one processor is caused to perform operations comprising:

instantiate the quantity of collection threads of execution, the quantity of data buffers of a buffer queue, and the quantity of aggregation threads of execution; and in response to each instance of storage of a row group into a data buffer of the buffer queue from a collection thread, analyze a level of availability of at least one of the storage space within the node device and processing resources of the at least one processor to determine whether to dynamically adjust the quantity of collection threads.

18. The computer-program product of claim 11, wherein the at least one processor is caused to perform operations comprising:

instantiate the quantity of collection threads of execution, the quantity of data buffers of a buffer queue, and the quantity of aggregation threads of execution; and in response to each instance of transmission of a data set part to the at least one storage device from an aggregation thread, analyze a level of availability of at least one of the storage space within the node device and processing resources of the at least one processor to determine whether to dynamically adjust the quantity of aggregation threads.

19. The computer-program product of claim 11, wherein:

each data set part of the multiple data set parts is to be persistently stored by the at least one storage device within a separate data file of multiple data files;

the at least one storage device is to maintain a subdirectory in which the multiple data files are to be stored;

an identifier that uniquely identifies the data set is to be used by the at least one storage device to identify the subdirectory; and within each aggregation thread, the at least one processor is caused to perform operations comprising:

transmit, to the control device via the network, a request for a sequence number;

receive, from the control device via the network, the sequence number;

combine the sequence number received from the control device with the identifier of the data set, and with an identifier of a file type of the data file in which the data set part is to be persistently stored, to form a file identifier to be used by the at least one storage device to uniquely identify the data file in which the data set part is to be persistently stored; and transmit, to the at least one storage device via the network, the data set part along with the file identifier.

20. The computer-program product of claim 11, wherein:

preparation of the data set for persistent storage within the at least one storage device comprises the performance of at least one preparation operation by the at least one processor in accordance with a columnar schema, wherein the at least one preparation operation comprises at least one of:

the assembly, performed by the at least one processor within each collection thread, of a row group from a quantity of rows specified in the columnar schema;

normalization, performed by the at least one processor within each collection thread, of data values within at least one column to at least one data type or at least one data format specified in the columnar schema;

compression, performed by the at least one processor within each collection thread, of the data values within each column of a row group or of the data values of an entire row group in accordance with a selection of a type of compression specified in the columnar schema;

encryption, performed by the at least one processor within each collection thread, of each row group in accordance with a selection of a type of encryption specified in the columnar schema;

the assembly, performed by the at least one processor within each aggregation thread, of a data set part from a quantity of row groups specified in the columnar schema;

compression, performed by the at least one processor within each aggregation thread, of each data set part in accordance with a selection of a type of compression specified in the columnar schema; and encryption, performed by the at least one processor within each aggregation thread, of data set part in accordance with a selection of a type of encryption specified in the columnar schema; and prior to the assembly of a row group within any collection thread of the quantity of collection threads, the at least one processor is caused to perform operations comprising:

identify characteristics of the data values within a plurality of the rows of the multiple rows stored within the storage space provided by the node device;

transmit, to the control device via the network, an indication of the characteristics of the data values to enable the control device to use the indication of the characteristics to generate the columnar schema or to select the columnar schema from among multiple columnar schemas;

receive, from the control device via the network, an indication of the columnar schema; and perform the at least one preparation operation in accordance with the columnar schema.

21. A computer-implemented method comprising:

receiving, at a node device of multiple node devices, and from a control device via a network, an instruction to the multiple node devices to persistently store a data set within at least one storage device, wherein:

the data set comprises multiple data values organized into numerous rows;

each row comprises multiple data fields that each fall within a column of multiple columns;

the numerous rows of the data set are divided into subsets of multiple rows that are distributed among multiple storage spaces provided by the multiple node devices; and the data values of the multiple rows that are stored within the storage space provided by each node device are stored in a row-wise organization in which data values within each row are stored at adjacent storage locations;

in response to receiving the instruction to persistently store the multiple rows that are stored within the storage space provided by the node device, performing operations comprising:

within each collection thread of a quantity of collection threads, performing operations comprising:

assembling, by at least one processor of the node device, a subset of the multiple rows stored within the node device into a row group with the data values reorganized into a columnar organization; and store the row group within a data buffer of a buffer queue;

operating, by the at least one processor, the buffer queue as a first-in-first-out (FIFO) buffer in which the first data buffer to be filled with a row group from a collection thread becomes the first data buffer from which a row group is retrieved by an aggregation thread;

within each aggregation thread of a quantity of aggregation threads, performing operations comprising:

assembling, by the at least one processor, a data set part from multiple row groups retrieved from multiple data buffers of the buffer queue; and transmitting, from the at least one processor, the data set part to the at least one storage device via the network; and in response to each instance of retrieval of a row group from a data buffer of the buffer queue for use within an aggregation thread, analyzing, by the at least one processor a level of availability of at least storage space within the node device to determine whether to dynamically adjust a quantity of data buffers of the buffer queue.

22. The method of claim 21, comprising, within each collection thread of the quantity of collection threads, performing operations comprising:

reorganizing the data values within the row group from the row-wise organization to the columnar organization, wherein the data values within each column of the multiple columns within the row group are stored at adjacent storage locations within the storage space provided by the node device;

during or following the reorganization of the data values within the row group from the row-wise organization to the columnar organization, losslessly compressing the data values within at least one column of the multiple columns within the row group;

generating row group metadata corresponding to the row group that includes an indication of at least one of a type of lossless compression used to losslessly compress the data values within the at least one column, and an identifier of the at least one column; and storing the row group metadata together with the row group within a data buffer of the buffer queue.

23. The method of claim 22, wherein the type of lossless compression comprises, within each collection thread of the quantity of collection threads, and the method comprises performing operations comprising:

generating a flag register of multiple flag registers for each column of the at least one column, wherein each flag register comprises multiple bits, wherein each bit indicates whether a corresponding data value within the corresponding column is a null value;

including the multiple flag registers in the row group metadata; and removing each instance of the null value from the row group.

24. The method of claim 22, comprising, within each aggregation thread of the quantity of aggregation threads, performing operations comprising:

retrieving, the multiple row groups from the multiple data buffers;

retrieving, from the multiple data buffers, row group metadata corresponding to each row group of the multiple row groups retrieved from the multiple data buffers;

generating part metadata corresponding to the data set part, that includes the row group metadata corresponding to each row group of the multiple row groups; and transmitting, to the at least one storage device via the network, the part metadata together with the data set part.

25. The method of claim 21, comprising, within each collection thread of the quantity of collection threads, performing operations comprising:

reorganizing the data values within the row group from the row-wise organization to the columnar organization, wherein the data values within each column of the multiple columns within the row group are stored at adjacent storage locations within the storage space provided by the node device;

during or following the reorganization of the data values within the row group from the row-wise organization to the columnar organization, encrypting the data values within at least one column of the multiple columns within the row group;

generating row group metadata corresponding to the row group that includes an indication of at least one of a type of encryption used to encrypt the data values within the at least one column, and an identifier of the at least one column; and storing the row group metadata together with the row group within a data buffer of the buffer queue.

26. The method of claim 21, comprising, within each aggregation thread of the quantity of aggregation threads, performing operations comprising:

retrieving the multiple row groups from the multiple data buffers;

retrieving, from the multiple data buffers, row group metadata corresponding to each row group of the multiple row groups retrieved from the multiple data buffers, wherein the row group metadata corresponding to each row group of the multiple row groups retrieved from the multiple data buffers includes at least one of:

an indication of a quantity of rows from which the row group was formed;

an indication of a type of compression used to compress data values within at least one column;

an indication of a type of encryption used to encrypt data values within at least one column; and a range of values identified as present within at least one column;

generating part metadata corresponding to the data set part, that includes the row group metadata corresponding to each row group of the multiple row groups; and transmitting the part metadata via the network, either together with the data set part to the at least one storage device, or to the control device to be combined with other part metadata corresponding to other data set parts of the multiple data set parts of the data set for persistent storage by the at least one storage device separately from all of the multiple data set parts.

27. The method of claim 21, comprising:

instantiating the quantity of collection threads of execution, the quantity of data buffers of a buffer queue, and the quantity of aggregation threads of execution; and in response to each instance of storage of a row group into a data buffer of the buffer queue from a collection thread, analyzing the level of availability of at least one of the storage space within the node device and processing resources of the at least one processor to determine whether to dynamically adjust the quantity of collection threads.

28. The method of claim 21, comprising:

instantiating the quantity of collection threads of execution, the quantity of data buffers of a buffer queue, and the quantity of aggregation threads of execution; and in response to each instance of transmission of a data set part to the at least one storage device from an aggregation thread, analyzing the level of availability of at least one of the storage space within the node device and processing resources of the at least one processor to determine whether to dynamically adjust the quantity of aggregation threads.

29. The method of claim 21, wherein:

each data set part of the multiple data set parts is to be persistently stored by the at least one storage device within a separate data file of multiple data files;

the at least one storage device is to maintain a subdirectory in which the multiple data files are to be stored;

an identifier that uniquely identifies the data set is to be used by the at least one storage device to identify the subdirectory; and the method comprises, within each aggregation thread, performing operations comprising:

transmitting, to the control device via the network, a request for a sequence number;

receiving, from the control device via the network, the sequence number;

combining the sequence number received from the control device with the identifier of the data set, and with an identifier of a file type of the data file in which the data set part is to be persistently stored, to form a file identifier to be used by the at least one storage device to uniquely identify the data file in which the data set part is to be persistently stored; and transmitting, to the at least one storage device via the network, the data set part along with the file identifier.

30. The method of claim 21, wherein:

preparing the data set for persistent storage within the at least one storage device comprises performing at least one preparation operation by the at least one processor in accordance with a columnar schema, wherein the at least one preparation operation comprises at least one of:

the assembling, within each collection thread, a quantity of rows specified in the columnar schema;

normalizing, within each collection thread, of data values within at least one column to at least one data type or at least one data format specified in the columnar schema;

compressing, within each collection thread, of the data values within each column of a row group or of the data values of an entire row group in accordance with a selection of a type of compression specified in the columnar schema;

encrypting, within each collection thread, of each row group in accordance with a selection of a type of encryption specified in the columnar schema;

assembling, within each aggregation thread, of a data set part from a quantity of row groups specified in the columnar schema;

compressing, within each aggregation thread, of each data set part in accordance with a selection of a type of compression specified in the columnar schema; and encrypting, within each aggregation thread, of data set part in accordance with a selection of a type of encryption specified in the columnar schema; and prior to the assembly of a row group within any collection thread of the quantity of collection threads, performing operations comprising:

identifying characteristics of the data values within a plurality of the rows of the multiple rows stored within the storage space provided by the node device;

transmitting, to the control device via the network, an indication of the characteristics of the data values to enable the control device to use the indication of the characteristics to generate the columnar schema or to select the columnar schema from among multiple columnar schemas;

receiving, from the control device via the network, an indication of the columnar schema; and performing the at least one preparation operation in accordance with the columnar schema.

\* \* \* \* \*